United States Patent [19]

Finn et al.

[11] Patent Number: 4,816,989
[45] Date of Patent: Mar. 28, 1989

[54] SYNCHRONIZER FOR A FAULT TOLERANT MULTIPLE NODE PROCESSING SYSTEM

[75] Inventors: Alan M. Finn, Amston, Conn.; Roger M. Kieckhafer, Ellicott City; Chris J. Walter, Columbia, both of Md.

[73] Assignee: Allied-Signal Inc., Morris Township, Morris County, N.J.

[21] Appl. No.: 38,818

[22] Filed: Apr. 15, 1987

[51] Int. Cl.⁴ .............................................. G06F 15/16
[52] U.S. Cl. ...................................................... 364/200
[58] Field of Search ................................. 364/200, 900

[56] References Cited

U.S. PATENT DOCUMENTS

| 4,523,273 | 6/1985 | Adams et al. | 364/200 |
| 4,630,196 | 12/1986 | Bednar, Jr. et al. | 364/200 |

*Primary Examiner*—Raulfe B. Zache
*Attorney, Agent, or Firm*—Howard G. Massung

[57] ABSTRACT

A synchronizer for each node in a multiple node processing system having a message interface for receiving sync and pre-sync time-dependent message, counter means for generating a local time, a time stamp memory having an entry for each node in the multiple node processing system, a time stamper responsive to receiving a time-dependent message from a node for storing the local time in the entry of said time stamp memory for that node to generate a time stamp. The synchronizer has a time stamp voter for generating a medial time stamp value from all the time stamps in the time stamp memory, a sync correction generator for generating a sync delta having a value corresponding to the difference between the voted time stamp and the node's own time stamp, means for adding said sync delta to a nominal transmission timing interval to generate an actual transmission timing interval, and a message generator for generating a pre-sync time dependent message passed to the transmitter at the end of the nominal transmission timing interval and for generating a sync time-dependent message passed to the transmitter at the end of said actual transmission timing interval.

24 Claims, 58 Drawing Sheets

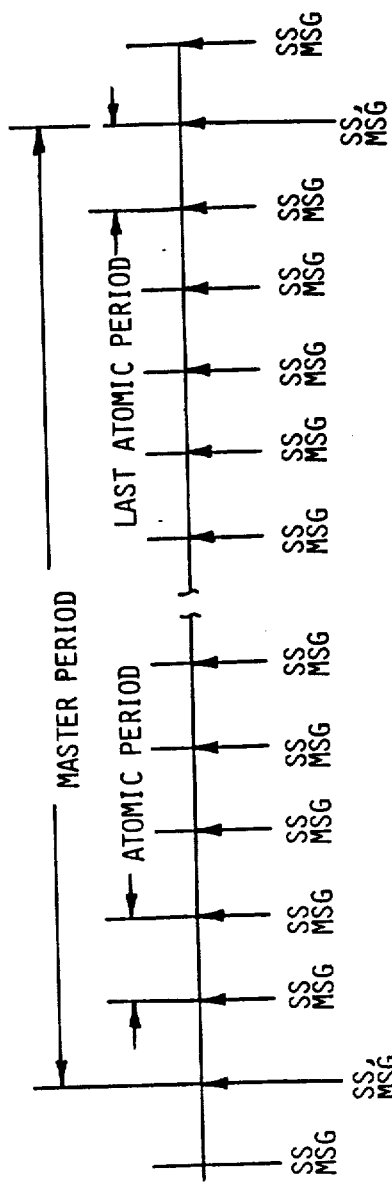
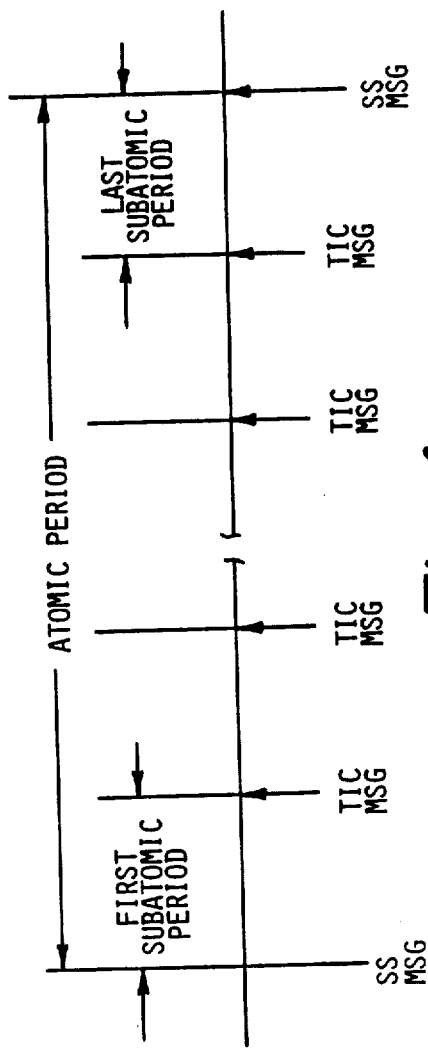

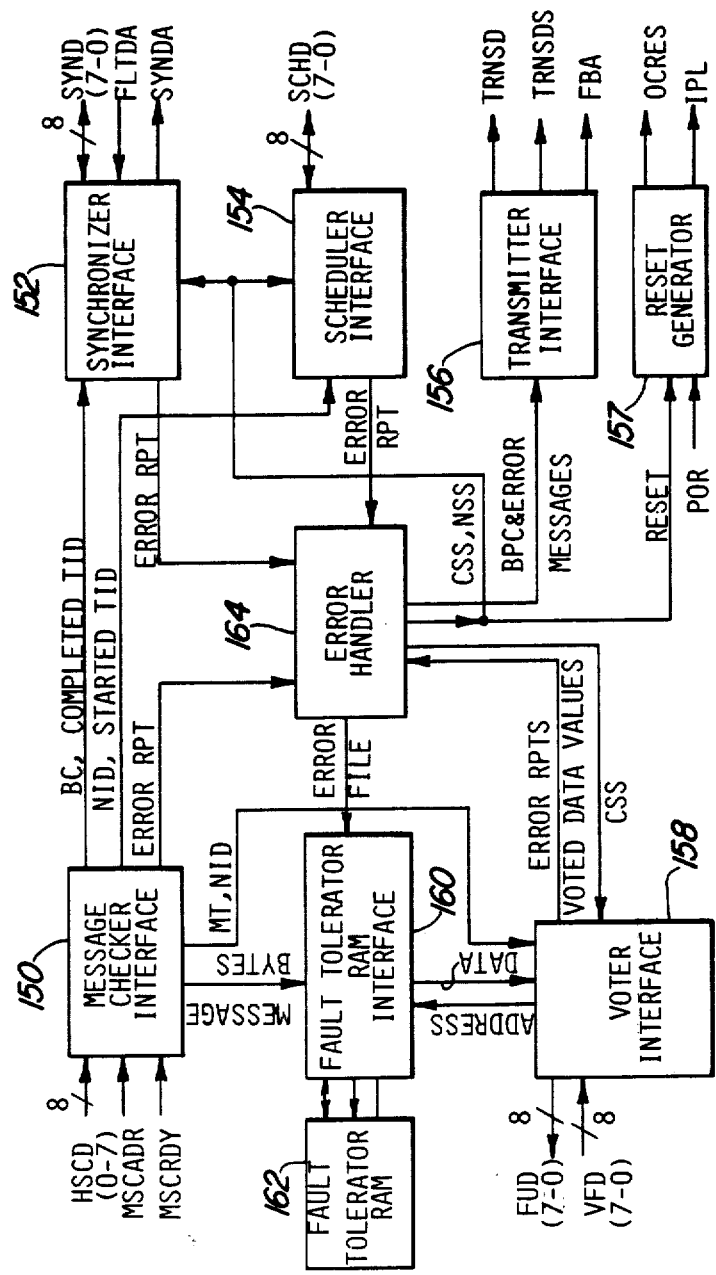

| FROM | D7 | D6 | D5 | D4 | D3 | D2 | D1 | D0 |
|---|---|---|---|---|---|---|---|---|
| REC MSC (low flags) | SELF TEST | 0 | 0 | 0 | DID INVALID | NID ERROR | MSG LENGTH | PARITY |
| REC MSC (high flags) | SELF TEST | 0 | 0 | 1 | LESS THAN | GREATER THAN | RANGE ERROR | MSG TYPE |
| SYN (low flags) | SELF TEST | 0 | 1 | 0 | 0 | SOFT ERROR | HARD ERROR | 0 |
| SCH | SELF TEST | 0 | 1 | 0 | 1 | MP MISALIGN | SEQ ERROR | MISSING MSG |
| VTR | SELF TEST | 0 | 1 | 1 | 0 | 0 | TID SEQ ERROR | TID EXEC TIMER ERROR |
| VTR | SELF TEST | 1 | 0 | 0 | 0 | TOO MANY BPC | ANY NSS DEV | ANY CSS DEV |
| TSC | SELF TEST | 1 | 0 | 0 | 1 | TOO MANY ERR | TOO MANY DATA | DID SEQ |
| FLT VTR | SELF TEST | 1 | 0 | 1 | 0 | AP ERROR | DATA VAL DEV | LAST DID SKIP |
| FLT VTR | SELF TEST | 1 | 1 | 0 | 0 | UNSUP ERROR | ERR MSG DEV | ERR MSG MISSING |
| FLT VTR | SELF TEST | 1 | 1 | 1 | MAX OF ERR | WRONG MSG | BPC MSG DEV | BPC MSG MISSING |

| ADDRESS | | | | | | | | | | | | | DATA | | | | | | | |
|---|---|---|---|---|---|---|---|---|---|---|---|---|---|---|---|---|---|---|---|---|
| 11 | 10 | 9 | 8 | 7 | 6 | 5 | 4 | 3 | 2 | 1 | 0 | | 7 | 6 | 5 | 4 | 3 | 2 | 1 | |
| 0 | 0 | 0 | 0 | C O N T E X T  B I T | NID 2-0 | | | 0 | 0 | 0 | 0 | | NOT USED | | | | | | | |
| | | | | | | | | 0 | 0 | 0 | 1 | | MESSAGE BYTE 1 | | | | | | | |
| | | | | | | | | 0 | 0 | 1 | 0 | | MESSAGE BYTE 2 | | | | | | | |
| | | | | | | | | 0 | 0 | 1 | 1 | | MESSAGE BYTE 3 | | | | | | | |
| | | | | | | | | 0 | 1 | 0 | 0 | | MESSAGE BYTE 4 | | | | | | | |
| | | | | | | | | 0 | 1 | 0 | 1 | | MESSAGE BYTE 5 | | | | | | | |
| | | | | | | | | 0 | 1 | 1 | 0 | | MESSAGE BYTE 6 | | | | | | | |
| | | | | | | | | 0 | 1 | 1 | 1 | | MESSAGE BYTE 7 | | | | | | | |
| | | | | | | | | 1 | 0 | 0 | 0 | | MESSAGE BYTE 8 | | | | | | | |
| | | | | | | | | 1 | 0 | 0 | 1 | | MESSAGE BYTE 9 | | | | | | | |
| | | | | | | | | 1 | 0 | 1 | 0 | | MESSAGE BYTE 10 | | | | | | | |
| | | | | | | | | 1 | 0 | 1 | 1 | | MESSAGE BYTE 11 | | | | | | | |
| | | | | | | | | 1 | 1 | 0 | 0 | | NOT USED | | | | | | | |
| | | | | | | | | 1 | 1 | 0 | 1 | | NOT USED | | | | | | | |
| | | | | | | | | 1 | 1 | 1 | 0 | | NOT USED | | | | | | | |
| | | | | | | | | 1 | 1 | 1 | 1 | | ERROR STATUS | | | | | | | |

Fig-18

| 11 | 10 | 9 | 8 | 7 | 6 | 5 | 4 | 3 | 2 | 1 | 0 |
|---|---|---|---|---|---|---|---|---|---|---|---|
| 0 | 0 | 0 | 0 | ERROR CODES | | | | | | | |

| 7 | 6 | 5 | 4 | 3 | 2 | 1 |
|---|---|---|---|---|---|---|
| PENALTY WEIGHT POINTERS | | | | | | |

Fig-19

| 11 | 10 | 9 | 8 | 7 | 6 | 5 | 4 | 3 | 2 | 1 | 0 |
|---|---|---|---|---|---|---|---|---|---|---|---|
| 0 | 0 | 1 | C O N T E X T  B I T | NID 2-0 | | | REPORT NUMBER | | | | |

| 7 | 6 | 5 | 4 | 3 | 2 | 1 |
|---|---|---|---|---|---|---|
| ERROR CODES | | | | | | |

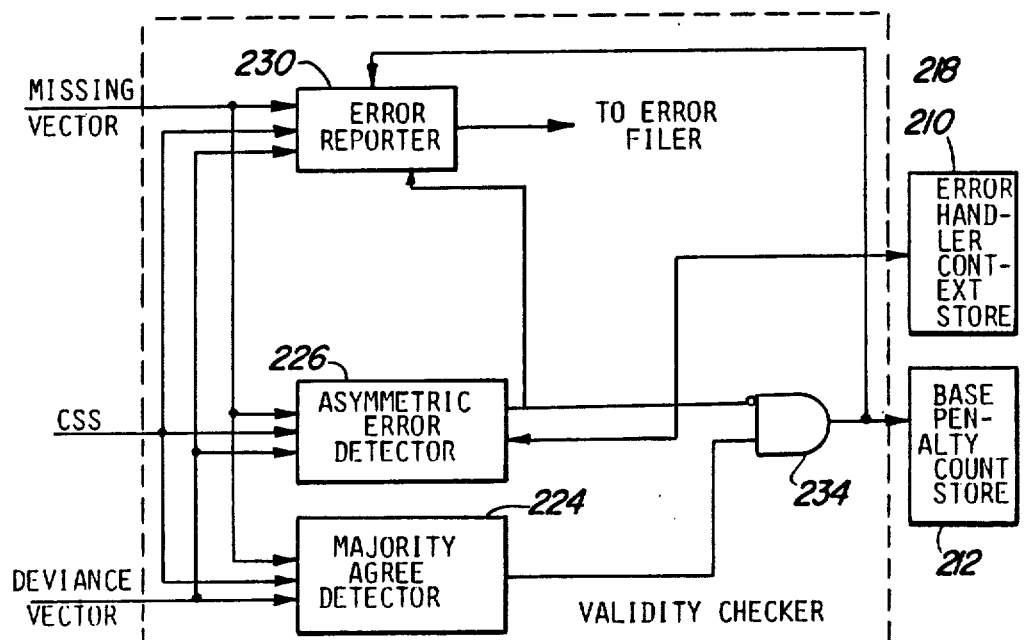

Fig-24

ERROR BYTES FORMAT

| | 7 | 6 | 5 | 4 | 3 | 2 | 1 | 0 |
|---|---|---|---|---|---|---|---|---|
| BYTE 0 | SELF TEST FLAG | PARITY | MESSAGE LENGTH | NID ERROR | DID INVALID | MESSAGE TYPE | RANGE ERROR | GREATER THAN LIMIT |
| BYTE 1 | LESS THAN LIMIT | SYN SOFT | SYN HARD | MASTER PERIOD MISALIGN | SYN SEQUENCE ERROR | SYN MISSING MESSAGE | CSS DEVIANCE | NSS DEVIANCE |
| BYTE 2 | TID SEQUENCE ERROR | TID EXEC TIMER | TOO MANY MSGS | DID SEQUENCE | AP REPORTED ERROR | DATA VALUE DEVIANCE | SKIPPED LAST DID | WRONG MSG REC'VD |
| BYTE 3 | UN- SUPPORTED ERROR | ERROR MSG REPORT DEV | BPC DEV | ERROR MSG MISSING | BPC MSG MISSING | TOO MANY ERROR MSGS | TOO MANY BPC MSGS | EXCEEDED MAX ERRORS IN TOC |

Fig-25

| ADDRESS | | | | DATA | | |
|---|---|---|---|---|---|---|
| | 10 9 8 7 6 5 4 3 2 1 0 | | | 15 14 13 12 11 10 9 8 7 6 5 4 3 2 1 0 | | |
| OLD TID | 1 1 1 0 | NID | 0 0 0 0 | 0 0 0 0 0 0 0 0 | TID | |
| SWAP TABLE | 1 1 0 | TID | | PRED-COUNT | PERIOD | SWAP COUNT 1 | SWAP COUNT 0 |
| ALLOCATION TABLES (4-7) | 1 0 1 | TID | | COUNT (t,7) | COUNT (t,6) | COUNT (t,5) | COUNT (t,4) |
| ALLOCATION TABLES (0-3) | 1 0 0 | TID | | COUNT (t,3) | COUNT (t,2) | COUNT (t,1) | COUNT (t,0) |
| SELECTION QUEUE (SQ) | 0 1 1 0 | NID | PAGE | WORD | USED | ITER-ATION | TID |
| COMPLETION STATUS LIST(CSL) | 0 1 0 | TID | | COMPLETION COUNT | BRANCH COUNT | ALLOCATION |
| PRIORITY SCAN LIST (PSL) | 0 0 1 | TID | | PRED-CNT | ITER-ATION | ALLOCATION |
| TASK ACTIVITY LIST (TAL) | 0 0 0 | TID | | PRED-CNT | PERIOD | ALLOCATION |

SCHEDULER RAM

*Fig-35*

| ADDRESS | | DATA | | |
|---|---|---|---|---|
| | 12 11 10 9 8 7 6 5 4 3 2 1 0 | 15 14 13 12 11 10 9 8 7 6 5 4 3 2 1 0 | | |
| | 13-BIT ADDRESS OF SUCCESSOR OFFSET (0C00h–13FFh) | SUCCESSOR TID (BC=1) | SUCCESSOR TID (BC=0) | |
| SUCCESSOR-LIST | TID | | | |
| PREFERENCE VECTORS (6-7) | 0 1 0 1 1 | PREF [t,7] | PREF [t,6] | |
| PREFERENCE VECTORS (4-5) | 0 1 0 1 0 | PREF [t,5] | PREF [t,4] | |
| PREFERENCE VECTORS (2-3) | 0 1 0 0 1 | PREF [t,3] | PREF [t,2] | |
| PREFERENCE VECTORS (0-1) | 0 1 0 0 0 | PREF [t,1] | PREF [t,0] | |
| RELEVANCE VECTOR | 0 0 1 1 1 | INCLUDE/EXCLUDE | REL [t] | |
| INITIAL SWAP TABLE | 0 0 1 1 0 | PRED-COUNT | PERIOD | SWAP COUNT 1 | SWAP COUNT 0 |
| INITIAL ALLOCATION COUNTERS (4-7) | 0 0 1 0 1 | COUNT [t,7] | COUNT [t,6] | COUNT [t,5] | COUNT [t,4] |
| INITIAL ALLOCATION COUNTERS (0-3) | 0 0 1 0 0 | COUNT [t,3] | COUNT [t,2] | COUNT [t,1] | COUNT [t,0] |
| MAXIMUM-EXECUTION TIME TABLE | 0 0 0 1 1 | MAXIMUM EXECUTION TIME (2s COMPLEMENT) | | |
| MINIMUM-EXECUTION TIME TABLE | 0 0 0 1 0 | MINIMUM EXECUTION TIME (2s COMPLEMENT) | | |
| SUCCESSOR-OFFSET | 0 0 0 0 1 | x x x | STARTING ADDRESS (13 BITS) | |
| INITIALIZATION TABLE | 0 0 0 0 0 | x x x x | 0 | MAX NID | MAX TID |

SCHEDULER ROM

*Fig-36*

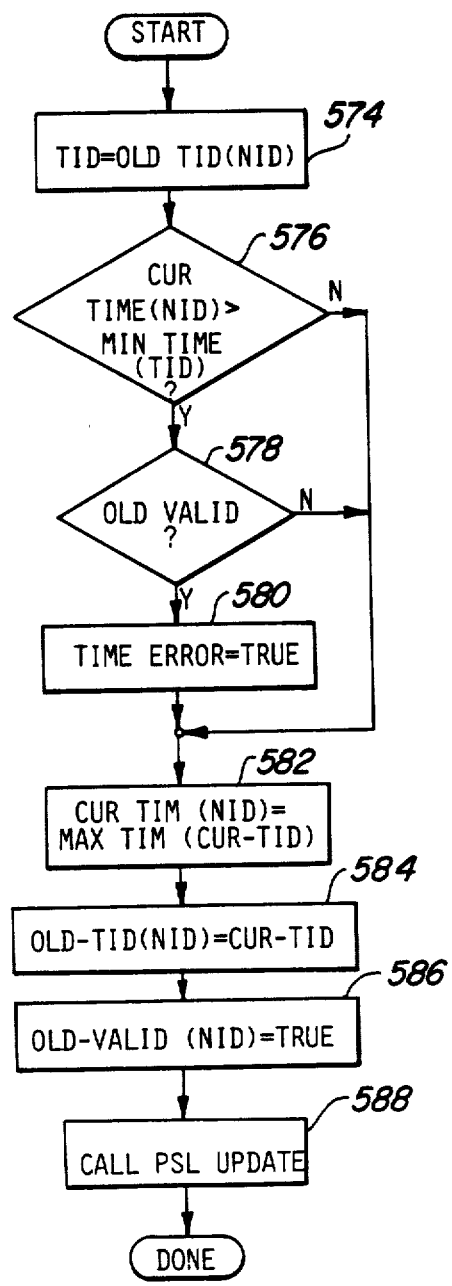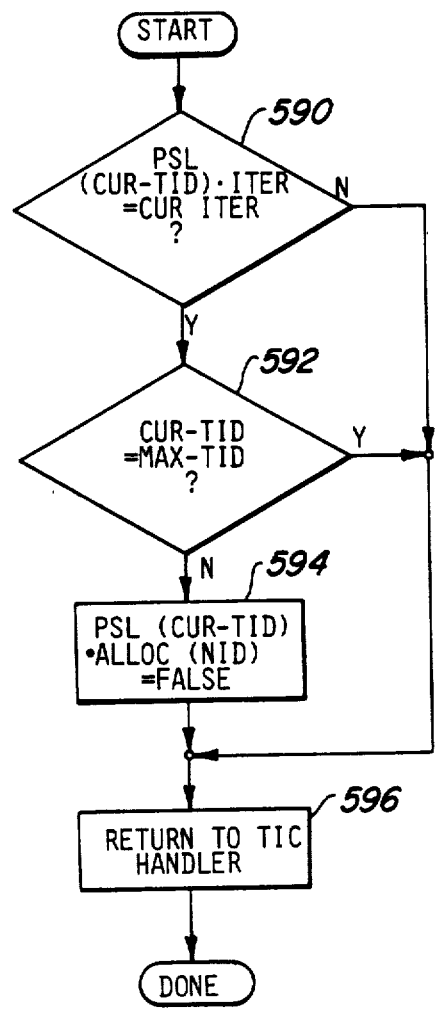
Fig-43
Fig-44

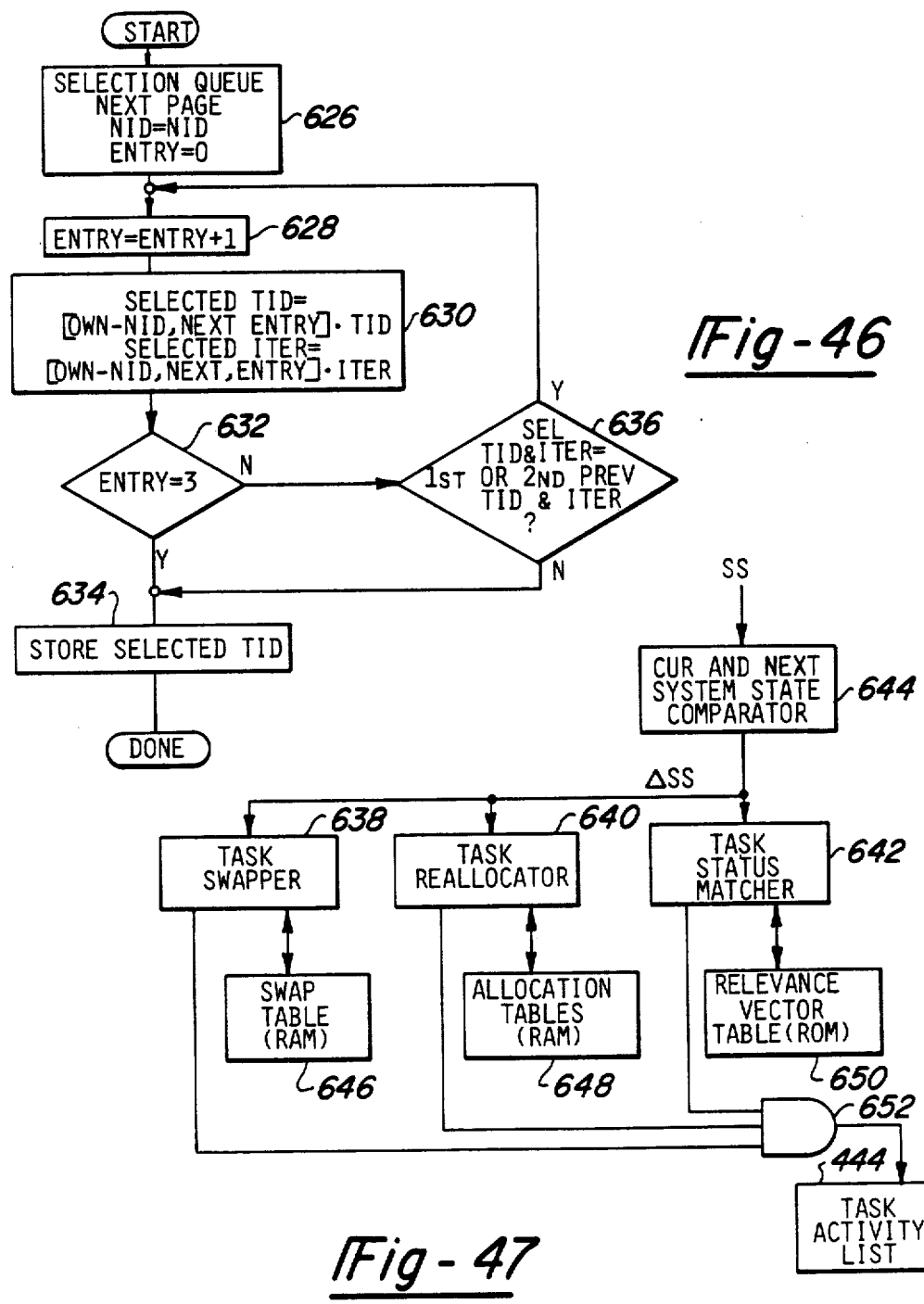

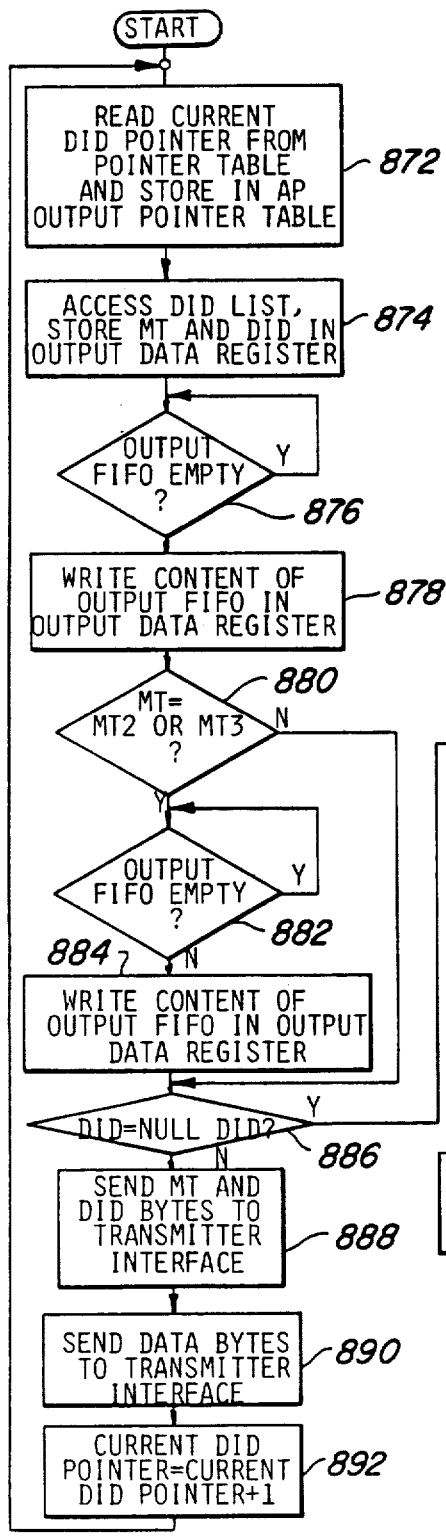
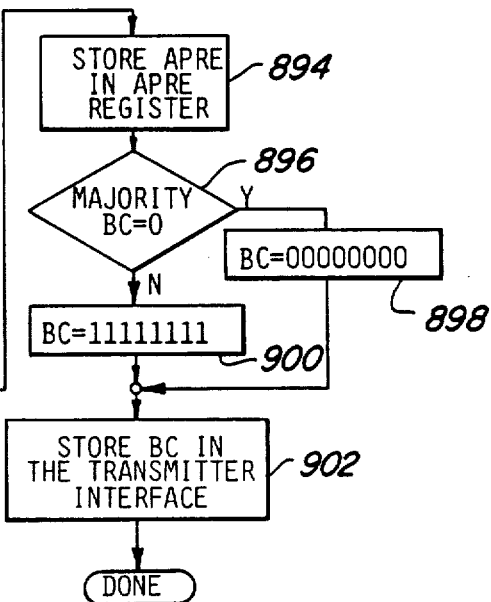
Fig-65
Fig-66
Fig-64

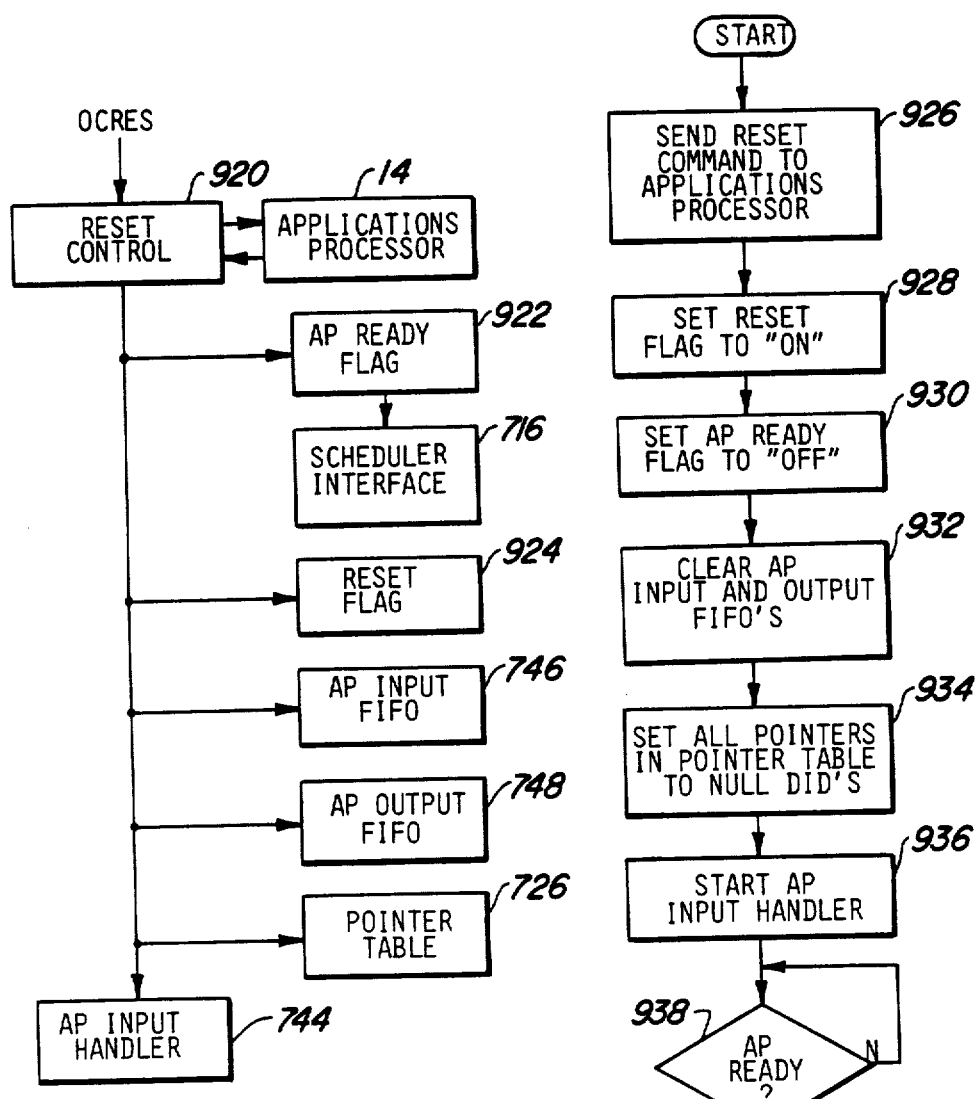

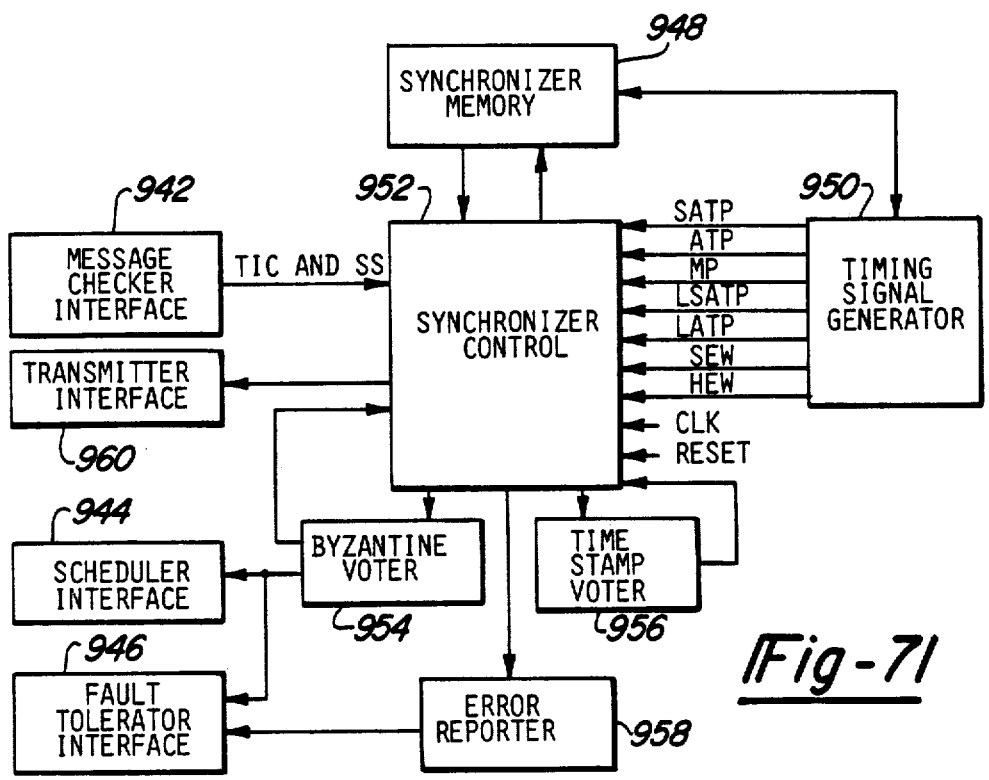
*Fig-71*
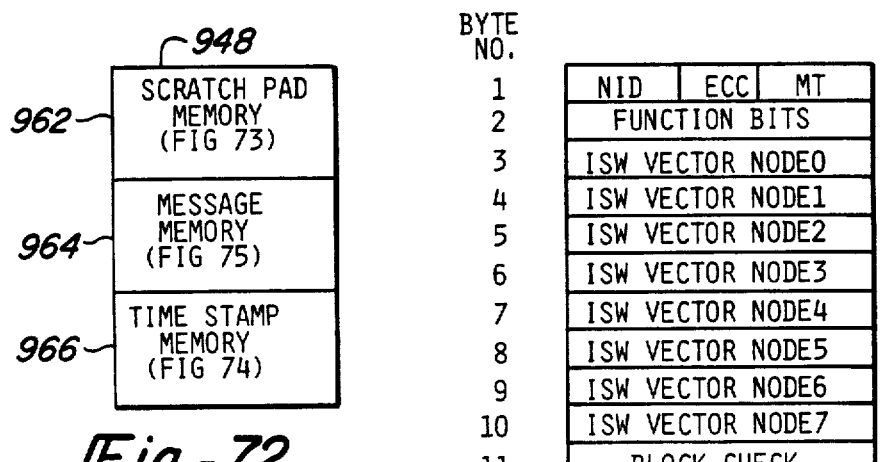
*Fig-72*
| BYTE NO. | | | |
|---|---|---|---|
| 1 | NID | ECC | MT |
| 2 | FUNCTION BITS | | |
| 3 | ISW VECTOR NODE0 | | |
| 4 | ISW VECTOR NODE1 | | |
| 5 | ISW VECTOR NODE2 | | |
| 6 | ISW VECTOR NODE3 | | |
| 7 | ISW VECTOR NODE4 | | |
| 8 | ISW VECTOR NODE5 | | |
| 9 | ISW VECTOR NODE6 | | |
| 10 | ISW VECTOR NODE7 | | |
| 11 | BLOCK CHECK | | |
COLD START PRESYNC
SYSTEM STATE MESSAGE
*Fig-85*

| BRANCH CONDITION BYTE | TASK COMPLETED VECTOR |
|---|---|
| NEXT SYSTEM STATE | CURRENT SYSTEM STATE |
| ATOMIC PERIOD COUNTER ||
| COLD START RESERVE | WARM START RESERVE |
| NODE 1 DATA ||
| NODE 2 DATA ||
| NODE 3 DATA ||
| NODE 4 DATA ||
| NODE 5 DATA ||
| NODE 6 DATA ||
| NODE 7 DATA ||

NODE0 (top four rows); ~964

MESSAGE MEMORY

*Fig-73*

| U | S/P | SAP T.S. COUNT | SYNC CLOCK T.S. COUNT | NODE 0 |
|---|---|---|---|---|
| U | S/P | SAP T.S. COUNT | SYNC CLOCK T.S. COUNT | NODE 1 |
| U | S/P | SAP T.S. COUNT | SYNC CLOCK T.S. COUNT | NODE 2 |
| U | S/P | SAP T.S. COUNT | SYNC CLOCK T.S. COUNT | NODE 3 |
| U | S/P | SAP T.S. COUNT | SYNC CLOCK T.S. COUNT | NODE 4 |
| U | S/P | SAP T.S. COUNT | SYNC CLOCK T.S. COUNT | NODE 5 |
| U | S/P | SAP T.S. COUNT | SYNC CLOCK T.S. COUNT | NODE 6 |
| U | S/P | SAP T.S. COUNT | SYNC CLOCK T.S. COUNT | NODE 7 |
| U | S/P | SAP T.S. COUNT | SYNC CLOCK T.S. COUNT | OWN NODE |

TIME STAMP MEMORY — 966

*Fig-74*

| ISW VECTOR NODE 0 | ISW VECTOR NODE 1 |
|---|---|
| ISW VECTOR NODE 2 | ISW VECTOR NODE 3 |
| ISW VECTOR NODE 4 | ISW VECTOR NODE 5 |
| ISW VECTOR NODE 6 | ISW VECTOR NODE 7 |
| TIC AND SS MESSAGE WARNING COUNTS ||
| SUBATOMIC PERIOD COUNTS ||
| NOMINAL SUBATOMIC PERIODS/ATOMIC ||
| ATOMIC PERIOD COUNT ||
| NO ATOMIC PERIODS/MASTER ||
| ACTUAL HEW TO WARNING PERIOD COUNT ||
| NOMINAL HEW TO WARNING PERIOD COUNT ||
| ERROR WINDOW PARAMETERS ||
| COMPUTED CORRECTION SAP ||
| COMPUTED CORRECTION SAP COUNT ||
| MAXIMUM SATP CORRECTION DELTA ||
| | MINIMUM START-UP SIZE |
| SPARE WORDS ||

—962

SCRATCH PAD MEMORY

*Fig-75*

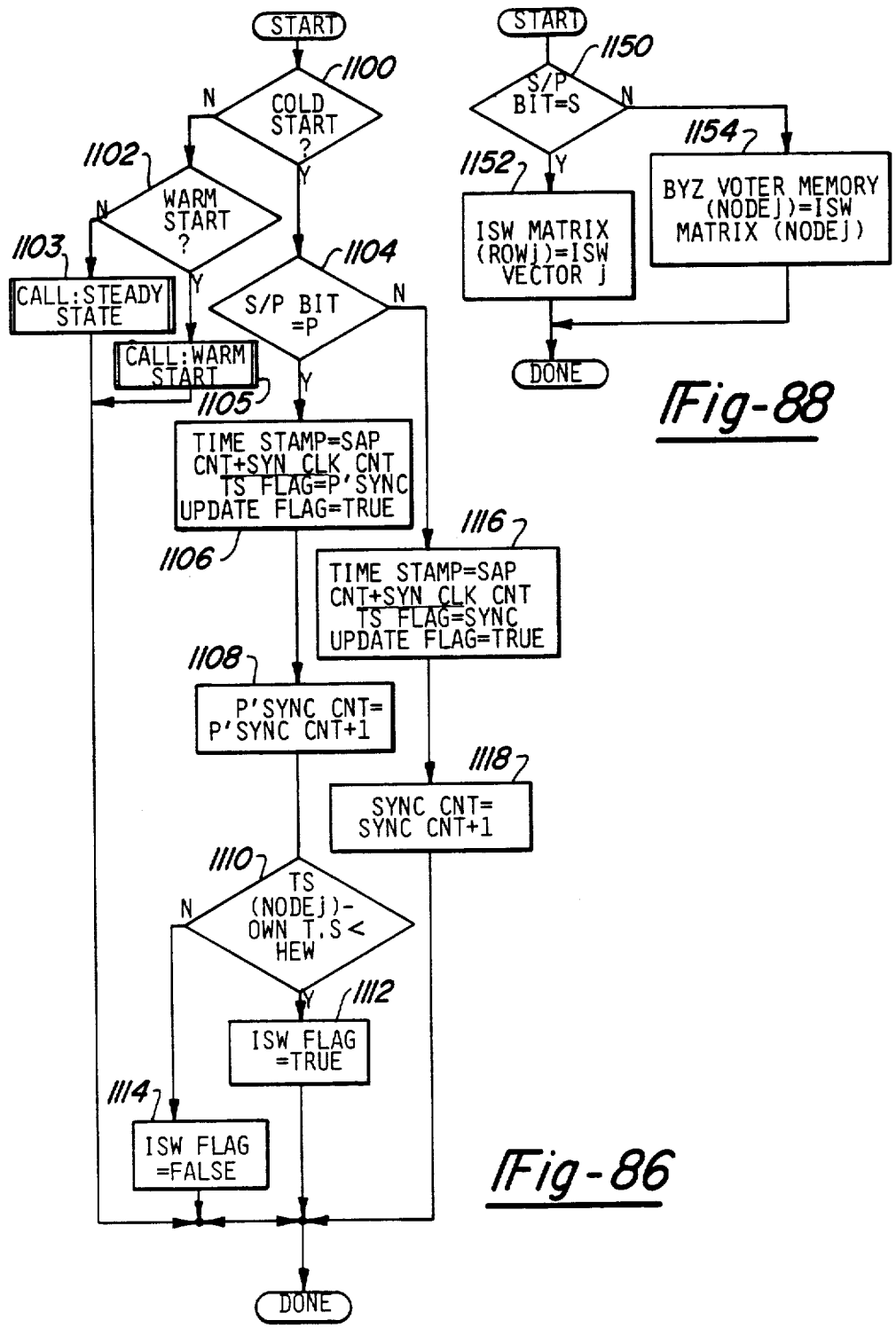

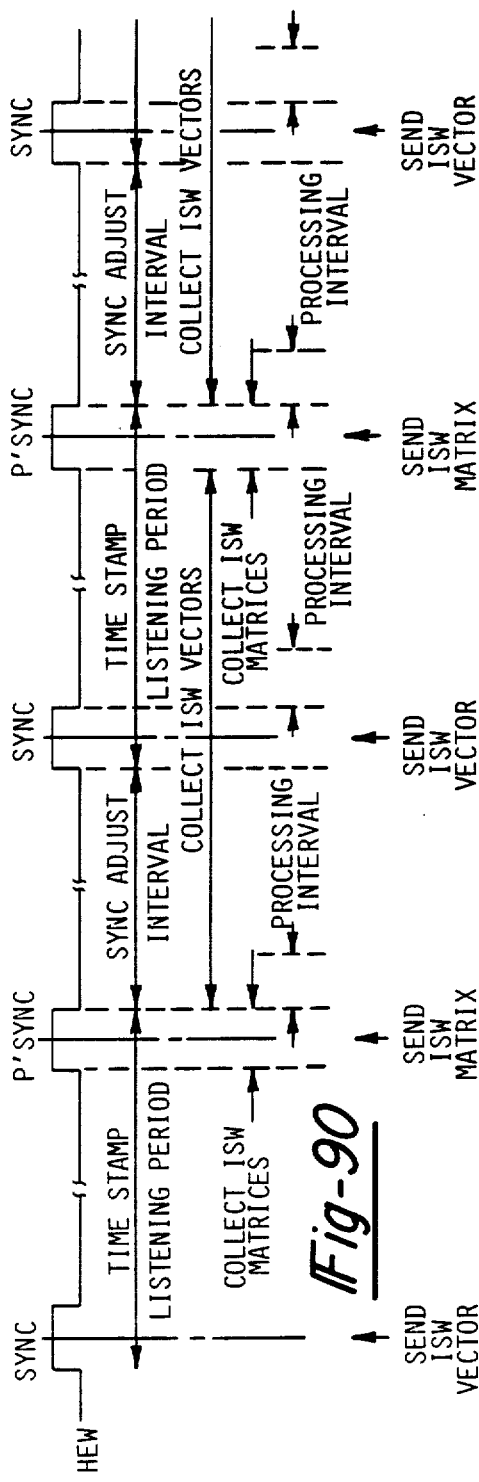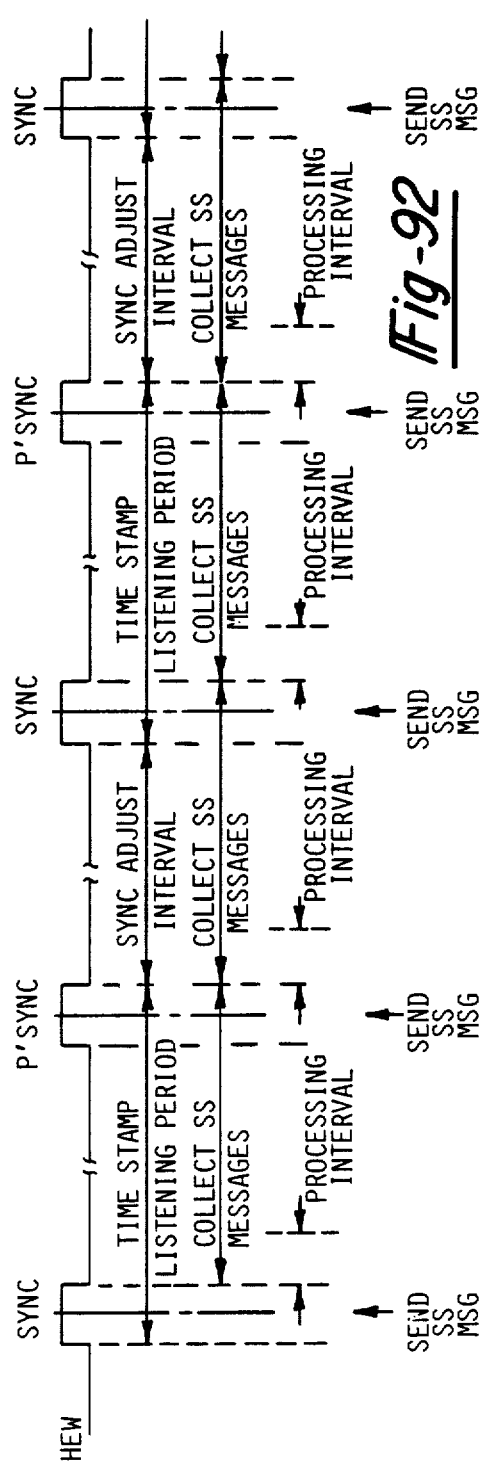

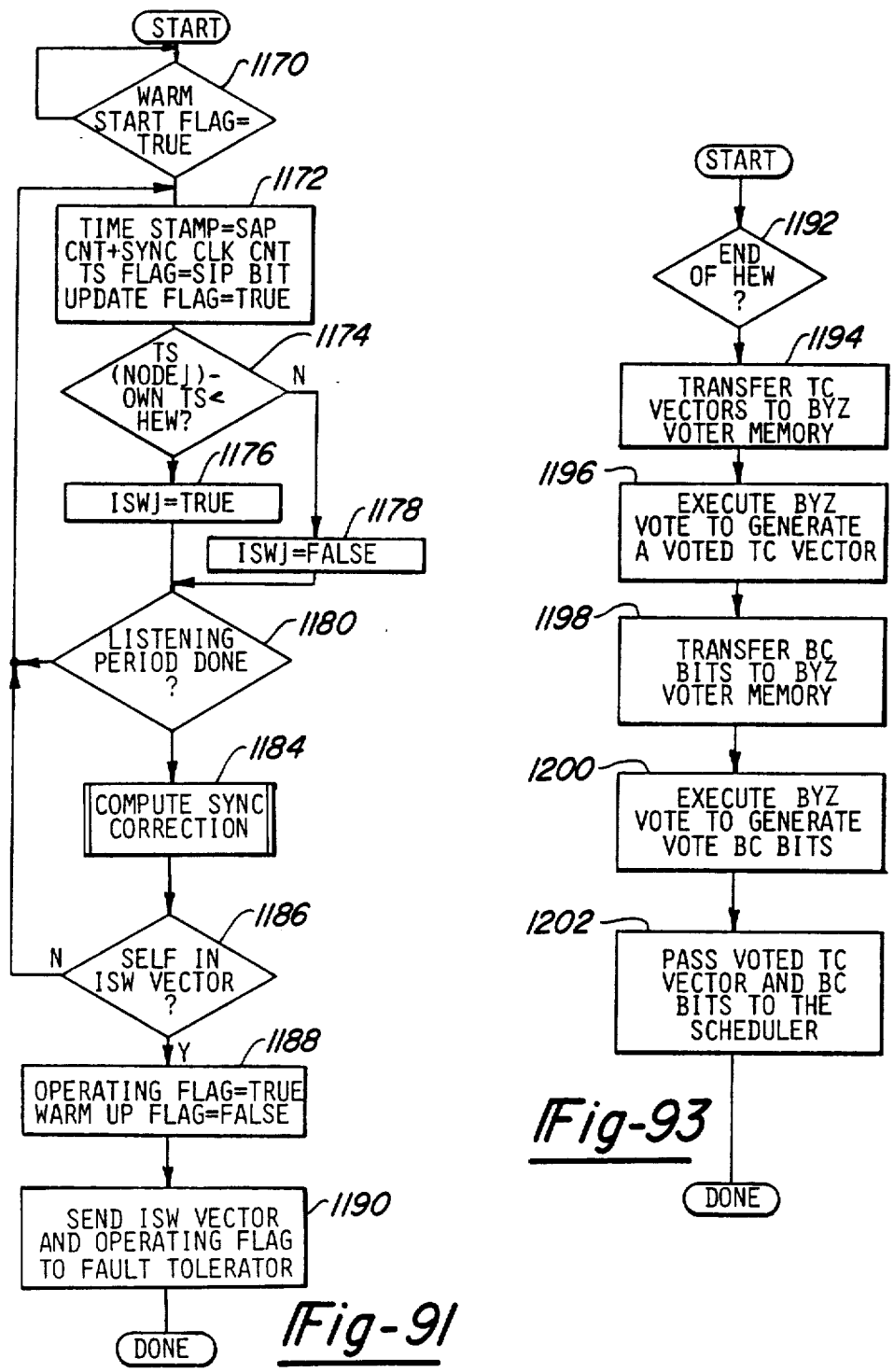

SYNCHRONIZER FOR A FAULT TOLERANT MULTIPLE NODE PROCESSING SYSTEM

CROSS REFERENCE

This invention is related to commonly assigned, co-pending patent applications Ser. Nos. 038,813 and 039,190 filed on Apr. 15, 187 concurrently herewith.

BACKGROUND OF THE INVENTION

1. Field of the Invention

The invention is related to the field of multiple node processing systems and in particular to a synchronizer for each node operative to synchronize the operation of its own node with the operation of all of the other nodes in the processing system.

2. Description of the Prior Art

The earliest attempts to produce fault tolerant computer systems provided redundant computers in which each computer simultaneously executed every task required for the control operation. Voting circuits monitoring the outputs of the multiple computers determined a majority output which was assumed to be the correct output for the system. In this type of system, a faulty computer may or may not be detected and the faulty computer may or may not be turned off.

The redundant computer concept, although highly successful, is expensive because it requires multiple computers of equivalent capabilities. These systems require powerful computers because each computer has to perform every task required for the operation of the system. As an alternative, the master-slave concept was introduced in which the operation of several computers were controlled and coordinated by a master control. The master control designated which tasks were to be executed by the individual computers. This reduced the execution time of the control operation because all the computers were no longer requied to execute every task, and many of the tasks could be executed in parallel. In this type of system when a computer is detected as faulty, the master could remove it from active participation in the system by assigning the task that would normally have been assigned to the faulty computer to the other computers. The problem encountered in the master-slave concept is that the system is totally dependent upon the health of the master and if the master fails then the system fails. This defect may be rectified by using redundant master controls, however, the increased cost of redundant masters limits the applicability of these systems to situations where the user is willing to pay for the added reliability. Typical of such situations are the controls of nuclear power plants, space exploration and other situations where failure of the control system would endanger lives.

Recent improvements to the master-slave and redundant execution fault tolerant computer systems discussed above are exemplified in the October 1978 proceedings of the IEEE, Volume 66, No. 10, which is dedicated to fault tolerant computer systems. Of particular interest are the papers entitled "Pluribus: An Operational Fault Tolerant Microprocessor" by D. Katuski et al., Pages 1146-1159 and "SIFT: The Design and Analysis of a Fault Tolerant Computer for Aircraft Control" by J. H. Wensley et al., Pages 1240-1255. The SIFT system uses redundant execution of each system task and of the master control functions. The Pluribus system has a master copy of the most current information which can be lost if certain types of faults occur.

More recently a new fault tolerant multiple computer architecture has been disclosed by Whiteside et al, in U.S. Pat. No. 4,256,547, in which each of the individual task execution nodes has an application processor and an operations controller which functions as a master for its own node. These operations controllers, in coordination with each other through the exchange of data and other information by means of inter-node messages, select the task its own node's application processor will execute. The task selection by the individual operations controllers is made on a distributed basis such that the execution of each task required for the operation of the control system may be selected by more than one of the operations controller in a fault tolerant manner. In this system each node is assigned a subset of the tasks it is capable of selecting and executing and no node is required to execute every task. The operations controllers are individually capable of detecting faulty nodes and excluding them from participation in the system. A predecessor of the multiple computer system is described by C. J. Walter et al in their paper "MAFT: A Multicomputer Architecture for Fault-Tolerance in Real-Time Control Systems" published in the proceedings of the Real Time System Symposium, San Diego, Dec. 3-6, 1985.

The present invention is a synchronizer for each node in a fault tolerant multiple node processing system which is based on the synchronizer taught by Whiteside et al in U.S. Pat. No. 4,323,966 and the synchronizer describd in the paper by C. J. Walter et al cited above.

SUMMARY OF THE INVENTION

The invention is a synchronizer for each node in a multiple node processing system for synchronizing the operation of its own node with the operation of all of the other nodes in the system through the exchange of inter-node time-dependent messages. These messages include alternating pre-sync and sync messages separated in time by a nominal timing interval. Each node has an application processor for processing a predetermined set of tasks and an operation controller for controlling the operation of its own node. The operations controller has a transmitter for transmitting the sync and pre-sync time-dependent messages to all of the other nodes in the processing system.

The synchronizer has a message interface for receiving the sync and pre-sync time-dependent messages, counter means for generating a local time, a time stamp memory having one entry for each node in the system, each entry storing a time stamp for the most recent time-dependent message received from the associated node, and a time stamper responsive to receiving a time-dependent message from each node to generate a time stamp corresponding to the local time at which the time dependent message is received. The time stamper also has means for storing the time stamp in the time stamp memory in the entry associated with the node from which it is received. A time stamp voter generates a voted time stamp corresponding to a medial value of the time stamps stored in the time stamp memory for the pre-sync time-dependent messages. A sync correction generator generates a sync delta having a value corresponding to the difference between the voted time stamp and the time stamp of its own pre-sync time-dependent message, and means for adding the sync delta to a nominal transmssion timing interval for generating an actual transmission timing interval. The nominal transmission timing interval corresponds to a nominal timing interval between the end of the transmission of the sync time-dependent message and the passing of the pre-sync time-dependent message to the transmitter. Message generator means generates the sync and pre-sync time-dependent messages and passes the pre-sync message to the transmitter at the end of the nominal transmission timing interval and passes the sync time-dependent messages to the transmitter at the end of the actual transmission timing interval.

The object of the invention is a synchronizer for synchronizing the individual nodes in a multi-node processing system with each other.

Another object of the invention is a synchronizer in which the synchronization is accomplished over two timing message intervals delimited by pre-sync and sync time-dependent messages which are transmitted in an alternating sequence.

Another object of the invention is a synchronizer having three modes of operation; a normal operating mode, a cold start mode, and a warm start mode.

Another object of the invention is a synchronizer which uses a Byzantine voted value to determine which nodes are in synchronization with each other during a cold start.

These and other objects of the invention will become more apparent from a reading of the specification in conjunction with the drawings.

BRIEF DESCRIPTION OF THE DRAWINGS

FIG. 3 is the master/atomic period timing diagram;
FIG. 4 is a the atomic/subatomic period timing diagram;
FIG. 13 is the format for the error status byte generated by the Message Checker;
FIG. 14 is a block diagram of the Fault Tolerator;
FIG. 16 shows the format of the Message partition of the Fault Tolerator RAM;
FIG. 17 shows the format of the Error Code Files partition of the Fault Tolerator RAM;
FIG. 18 shows the format of the Group Mapping partition of the Fault Tolerator RAM;
FIG. 19 shows the format of the Error Code Files partition of the Fault Tolerator RAM;
FIG. 24 is a block diagram of the Error Handler's Validity Checker;
FIG. 25 illustrates the format of the error byte in an error message;
FIG. 35 shows the data format of the Scheduler RAM;
FIG. 36 shows the data format of the Scheduler ROM;
FIG. 43 is a flow diagram of the TIC Handler's Execution Timer Reset sub-process;
FIG. 44 is a flow diagram of the TIC Handler's Priority Scan List Update sub-process;
FIG. 46 is a flow diagram of the Next Task Selector's operation;
FIG. 47 is a block diagram of the Reconfigure Module.

FIG. 64 is a flow diagram showing the AP Output Handler's operation:

FIG. 65 shows the format of the DID information as stored in the DID List;

FIG. 66 shows the format of the DID information with the NUDAT bit appended;

FIG. 69 is a partial block diagram of the Task Communicator showing the subsystems involved in "reset";

FIG. 70 is a flow diagram of the Reset Control during reset;

FIG. 71 is a block diagram of the Synchronizer;

FIG. 72 shows the format of the Synchroinzer Memory;

FIG. 73 shows the format of the Message Memory;

FIG. 74 shows the format of the Time Stamp Memory;

FIG. 75 shows the format of the Scratch Pad Memory;

FIG. 85 shows the format of the "cold start" pre-sync message;

FIG. 86 is a flow diagram showing the operation of the Synchronizer during a "cold start";

FIG. 88 is a flow diagram showing the storing of data during a "cold start";

FIG. 90 is a timing diagram used in the description of the "cold start";

FIG. 91 is a flow diagram of the operation of the Synchronizer during a "warm start";

FIG. 92 is a timing diagram used in the description of a "warm start";

FIG. 93 is a flow diagram of the operation of the Byzantine Voter to generate Byzantine voted task completed vector and Byzantine voted branch condition bits for the Scheduler;

DETAILED DESCRIPTION OF THE PREFERRED EMBODIMENT

Figure 1:
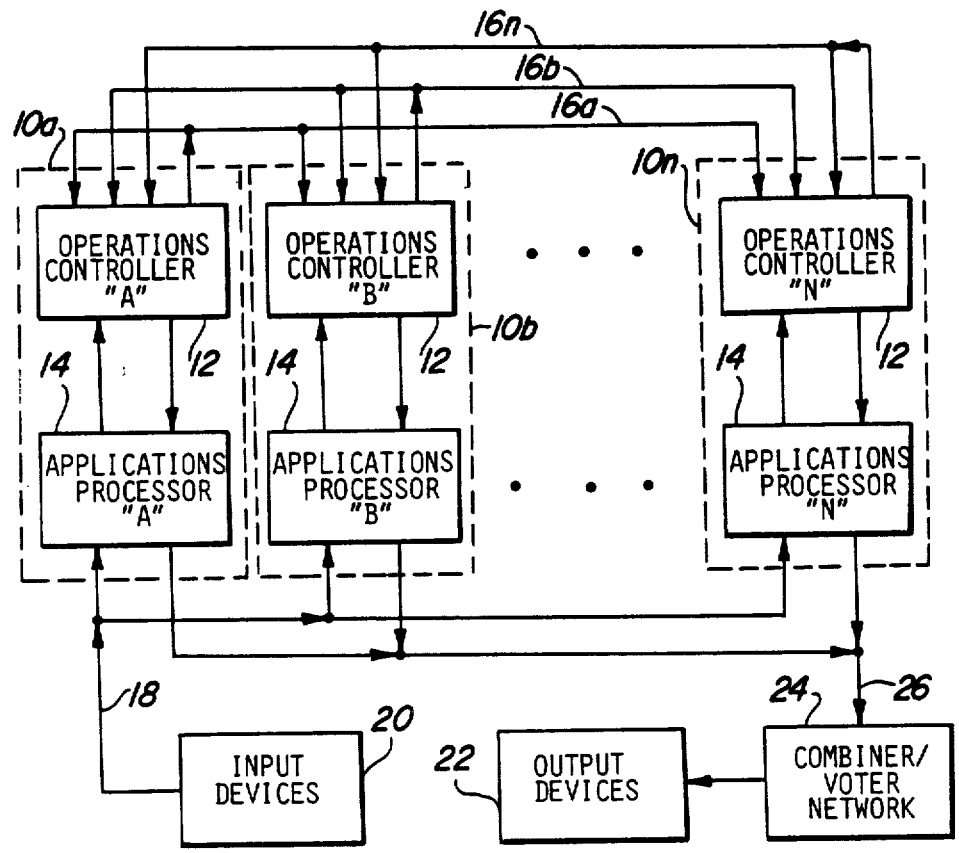
FIG. 1 is a block diagram of the multi-computer architecture.

The multi-computer architecture for fault tolerance is a distributed multi-computer system based on the functional and physical partitioning of the application tasks and the overhead functions, such as fault tolerance kand systems operations. As shown in FIG. 1, the multi-computer architecture consists of a plurality of Nodes 10A through 10N, each having an Operations Contoller 12 for performing the overhead functions and an Applications Processor 14 for executing the application tasks.

For each application, the multi-computer architecture is required to execute a predetermined set of tasks, collectively called appliation tasks. Each Node is allocated an active task set which is a subset of the application tasks. Each Node in coordination with all of the other Nodes is capable of selecting tasks from its active task set and executing them in a proper sequence. The active task set for each Node may be different from the active task set allocated to the other Niodes and each task in the application tasks may be included in the active taskset of two or more Nodes depending upon how many Nodes are in the system and the importance of the task to the particular application. In this way, the multi-computer architecture defines a distributed multi-computer system in which no one Node 10 is required to execute every one of the application tasks, yet the failure of one or more Nodes need not prevent the execution of any application task. As shall be more fully explained later on, the active task set in each Node is static for any given system configuration or system state and will change as the system changes with an increase or decrease in the number of active Nodes. This change in the active task set called "reconfiguration," takes place automatically and assures that every one of the important or critical application tasks will be inclined in the active task set of at least one of the remaining active Nodes in the system.

Each Node 10A through 10N is connected to every other Node in the multi-computer architecture through its Operational Controller 12 by means of a private communication link 16. For example, the Operations Controller "A" is the only Operations Controller capable of transmitting on communication link 16a. All of the other Nodes are connected to the communication link 16a and will receive every message transmitted by the Operations Controller "A" over communication link 16a. In a like manner, the Operations Controller "B" of Node 10b is the only Operations Controller capable of transmitting messages on communication link 16b, and Operations Controller N of the Node 10N is the only Operations Controller capable of transmitting messages on communication link 16n.

External information from sensors and manually operated devices collectively identified as Input Devices 20 are transmitted directly to the Applications Processors 14 of each Node through an input line 18. It is not necessary that every Applications Processor receive information from every sensor and/or Input Device, however, each Application Processor 14 will receive the information from every sensor and/or Input Device which it needs in the execution of the applications task.

In a like manner, the Applications Processor 14 in each Node will transmit data and control signals, resulting from the execution of the applications task to one or more actuators and/or display devices collectively identified as Output Devices 22. The data and/or control signals generated by the Applications Processor 14 in the individual Nodes 10A through 10N may be combined by a Combiner/Voter Network 24 before it is transmitted to the Output Devices 22. Further, when multiple values of the same data and/or control signals are generated by two or more of the Nodes, the Combiner/Voter Network 24 may also be used to generate a single voted value which is transmitted to the Output Devices 22. The use or omission of a Combiner/Voter Network 24 is optional. It is not necessary that every actuator or display receive the output generated by every Node in the system. The specific actuator or display only needs to be connected to the Node or Nodes whose Applications Processor 14 is capable of generating the data or command signals it requires.

The network of Operations Controllers 12 is the heart of the system and is responsible for the inter-node communications, system synchronization, data voting, error detection, error handling, task scheduling, and reconfiguration. The Applications Processors 14 are responsible for the execution of the application tasks and for communications with the Input Devices 20 and Output Devices 22. In the multi-computer architecture, the overhead functions performed by the Operations Controllers 12 are transparent to the operations of the Applications Processor 14. Therefore, the structure of the Applications Processor 14 may be based solely upon the application requirements. Because of this, dissimilar Applications Processor 14 may be used in different Nodes without destroying the symmetry of the multi-computer architecture.

Figure 2:
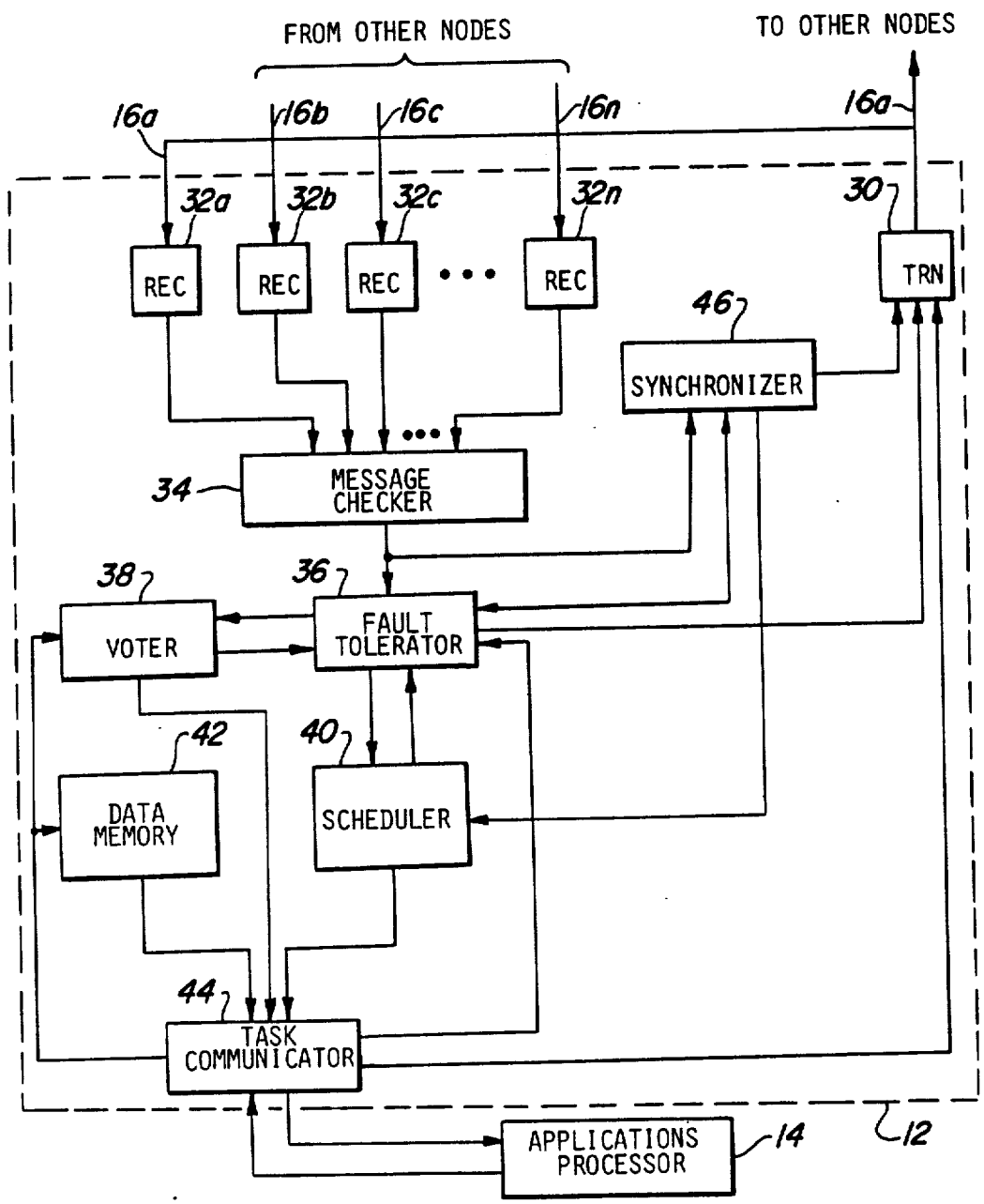
FIG. 2 is a block diagram of the Operations Controller.

The structural details of the Operations Controller 12 in each Node 10A through 10N are shown in FIG. 2. Each Operations Controller 12 has a transmitter 30 for serially transmitting messages on the Node's private communication link 16. For discussion purposes, it will be assumed that the Operations Controller illustrated in FIG. 2 is the Operations Controller A as shown in FIG. 1. In this case, the Transmitter 30 will transmit messages on the private communication link 16a. Each Operations Controller also has a plurality of Receivers 32a through 32n, each of which is connected to a different private communication link. In the preferred embodiment, the number of Receivers 32a through 32n is equal to the number of Nodes in the multi-computer architecture. In this way, each Operations Controller 12 will receive all of the messages transmitted by every Node in the system including its own. Each Receiver 32a through 32n will convert each message received over the private communication link to which it is connected from a serial format to a parallel format then forward it to a Message Checker 34. Each Receiver 32a through 32n will also check the vertical parity and the longitudinal redundancy codes appended to each of the received messages and will generate an error signal identifying any errors detected.

The Message Checker 34 monitors the Receivers 32a through 32n and subjects each received message to a variety of physical and logical checks. After completion of these physical and logical checks, the messages are sent to a Fault Tolerator 36. Upon the detection of any errors in any message, the Message Checker 34 will generate an error status byte which is also transmitted to the Fault Tolerator 36.

The Fault Tolerator 36 performs five basic functions. First, the Fault Tolerator performs further logical checks on the messages received from the Message Checker 34 to detect certain other errors that were not capable of being detected by the Message Checker 34. Second, the Fault Tolerator passes error free messages to a Voter 38 which votes on the content of all messages containing the same information to generate a voted value. Third, it passes selected fields from the error free messages to other subsystems as required. Fourth, the Fault Tolerator aggregates the internal error reports from the various error detection mechanisms in the Operations Controller and generates Error messages which are transmitted to all of the other Nodes in the system by the Transmitter 30. Finally, the Fault Tolerator 36 monitors the health status of each Node in the system and will initiate a local reconfiguration when a Node is added or excluded from the current number of operating Nodes. The Fault Tolerator 36 maintains a base penalty count table which stores the current base penalty counts accumulated for each Node in the system. Each time a Node transmits a message containing an error, every Node in the system, including the one that generated the message, should detect this error and generate an Error message identifying the Node that sent the message containing the error, the type of error detected, and a penalty count for the detected error or erros. Each Fault tolerator 36 will receive these Error messages from every other Node and will increment the base penalty count for that Node which is currently being stored in the base penalty count table, if the detection of the error is supported by Error messages received from a majority of the Nodes. The magnitude of the penalty count increment is predetermined and is proportional to the severity of the error. If the incremented base penalty count exceeds an exclusion threshold, as shall be discussed later, the Fault Tolerator initiates a Node exclusion and a reconfiguration process in which the faulty Node is excluded from active participation in the system and the active task sets for the remaining Nodes are changed to accommodate for the reduction in the number of active Nodes.

The Fault Tolerator 36 will also periodically decrement the base penalty count for each Node in the system so that a Node which was previously excluded may be readmitted into the active system. When a previously excluded Node continues to operate in an error free manner for a sufficient period of time, its base penalty count will be decremented below a readmittance threshold which will initiate a Node readmittance and reconfiguration process in which the previously excluded Node is readmitted into the active system. When the previously excluded Node is readmitted into the system the active task set for each Node is readjusted to accommodate for the increase in the number of active Nodes in the system.

The Voter 38 performs an "on-the-fly" vote using all of the current copies of the data values received from the Fault Tolerator 36. The voted data value and all copies of the received data are passed to a Task Communicator 44 which stores them in a Data Memory 42. The Voter will select a voted data value using an appropriate algorithm as shall be discussed relative to the Voter 38 itself. Each time a new copy of a data value is received, a new voted data value is generated which is written over the prior voted data value stored in the Data Memory 42. In this manner, the Data Memory 42 always stores the most current voted data value assuring that a voted data value is always available for subsequent processing independent of one or more copies of the data value failing to be generated or "hang" causing a late arrival. The Voter 38 will also perform a deviance check between the voted data value and each copy of the received data value, and will generate an error vector to the Fault Tolerator identifying each Node which generated a data value which differed from the voted data value by more than a predetermined amount. This arrangement will support both exact and approximate aggreement between the copies of the data values. The voter 38 supports several data types, included pack boolean values, fixed point formats, and the IEEE standard 32-bit floating point format.

A scheduler 40 has two modes of operation, normal and reconfiguration. In the normal mode of operation the Scheduler 40 is an event driven, priority based, globally verified scheduling system which selects from its active task set the next task to be excecuted by its associated Applications Processor 14. For a given system configuration (set of active nodes) the active task set assigned to each node is static. Each time the associated Application Processor begins a task, the Scheduler 40 selects the next task to be executed. The Applications processor will immediately begin the execution of the selected task and the Task Communicator 44 will immediately initiate the generation of a message informing all of the other Nodes of the identity of the selected task, the identity of the preceding task finished by the Applications Processor 14, and the branch conditions of the preceding task. Conditional branching is controlled by the Applications Processor 14 and is determined by conditions in the applications environment. The precedence between a task and its successor task may include conditional branches, concurrent forks, and join operations implemented at task boundaries.

Conditional branching provides an efficient means of switching operational modes and avoids the necessity of scheduling tasks not required by the current conditions. An interactive consistency voting process guarantees aggreement on the branch conditions generated by the other Nodes which executed the same task.

The Scheduler 40 in each Node replicates the scheduling process for every other Node in the system and maintains a global data base on the scheduling and execution of tasks by each Node. Upon the receipt of a message from another Node identifying the task completed and the task started, the Scheduler 40 will compare the task completed with the task previously reported as started and generate a scheduling error signal if they are not the same. The Scheduler 40 will also compare the task reported as started with a task it has scheduled to be started by that Node. If they are different, the Scheduler will also generate a scheduling error signal. The scheduler 40 will pass all scheduling error signals to the Fault Tolerator 36. All of the Scheduler's error detection mechanisms are globally verified and have been designed to ensure that failure of one or more copies of a task does not upset scheduling.

In the reconfiguration mode of operation, a reversible path independent reconfiguration algorithm provides graceful degradation of the workload as faulty Nodes are excluded from the operating system. Because the algorithm is reversible it also supports graceful restoration of the workload as previously excluded Nodes are readmitted following an extended period of error free operation.

In reconfiguration, the active task set allocated to each Node is altered to compensate for the change in the number of active Nodes. During reconfiguration after the exclusion of a faulty Node, the active task set, or at least the critical task of a faulty Node's active task set, may be reallocated and included in the active task set of the other Nodes. In other instances, individual tasks may be globally disabled and replaced with simpler tasks, and some noncritical tasks may be disabled with no replacement. The reconfiguration process readjusts the active task set for the active Nodes to accommodate the system capabilities. The algorithm supports true distributed processing, rather than just a replication of uniprocessor task loads on redundant Nodes.

A Task Communicator 44 functions as an input/output (I/O) interface between the Operations Controller 12 and the Applications Processor 14. The Applications processor 14 signals the Task Communicator 44 when it is ready for the next task. A simple handshaking protocol is employed to synchronize communications between the Applications Processor 14 and the Task Communicator 44. Upon receipt of this signal the Task Communicator 44 reads the selected task from the Scheduler 40 and transfers it to the Applications Processor 14. Concurrently, the Task Communicator 44 will initiate the transmission of the task completed/task started message identifying the task completed by the Applications Processor 14, the task being started by the Applications Processor and the branch conditions of the completed task. The Task Communicator 44 will then fetch the data required for the execution of the started task from the Data Memory 42 and temporarily store it in a buffer in the order in which it is required for the execution of the started task. The task Communicator will pass these data values to the Applications Processor as they are requested. Effectively, the Task Communicator 44 looks like an input file to the Applications Processor 14.

The Task Communicator 44 also receives the data values generated by the Applications Processor 14 in the execution of the selected task and generates Data Value messages which are broadcast by the Transmitter 30 to all of the other Nodes in the system. The Task Communicator will also append to the Data Value message a data identification (DID) code and a message type (MT) code which uniquely identifies the message as a Data Value message.

The Synchronizer 46 provides two independent functions in the operation of the multi-computer architecture. The first function pertains to the synchronization of the operation of the Nodes 10A through 10N during steady state operation, the second function pertains to the synchronization of the Nodes on start up. During steady state operation, the Synchronizer 46 effects a loose frame base synchronization of the Nodes by the exchange of messages which implicitly denote local clock times. The Synchronizer 46 in each Node counts at its own clock rate, up to a "nominal sync count," then issues a presynchronization System State message which is immediately broadcast by the Transmitter 30 to all of the other Nodes in the system. As the presynchronization System State messages from all the Nodes in the system, including its own, are received at each Node, they are time stamped in the Synchronizer as to their time of arrival from the Message Checker 34. The time stamps are voted on to determine a voted value for the arrival time of the presynchronization System State messages from all the Nodes. The difference between the voted time stamp value and the time stamp of the Node's own presynchronization System State message is an error estimate which is used to compute a corrected sync count. The error estimate includes any accumulated skew from previous synchronization rounds and the effects of clock drift. The Synchronizer 46 will then count up to the corrected sync count and issue a synchronization System State message which is immediately tranmitted by the Transmitter 30 to all of the other Nodes in the system. The synchronization System State messages will also be time stamped as to their arrival in the Synchronizers in each Node in the system.

The time stamps of all presynchronization and synchronization System State messages are all compared with the voted time stamp value to determine which Nodes are in synchronization with its own Node and which are not. When the difference in the time stamps exceeds a first magnitude a soft error signal is generated signifying a potential synchronization error. However, if the time stamp difference exceeds a second magnitude, larger than the first magnitude, a hard error signal is generated signifying a synchronization error has definitely occurred. The soft and hard error signals are transmitted to the Fault Tolerator 36 and are handled in the same manner as any other detected error. Start up is defined as a process for creating a functional configuration of Nodes called an "operating set." If an "operating set" is in existence, and the functional configuration is changed by the admittance or readmittance of one or more Nodes, the process is called a "warm start." If no "operating set" is in existence, it is called a "cold start." In a warm start, the Synchronizer 46 will recognize the existence of an operating set and will attempt to achieve synchronization with the operating set. A cold is initiated by a power on reset (POREST) signal generated in response to the initial application of electrical power to the system. Each Synchronizer 46 will attempt to achieve point-to-point synchronization with all the Nodes until an operating set is formed. Once an operating set is formed, those Nodes not included in the operating set will switch to the warm start process and will attempt to achieve synchronization with the operating set.

INTER-NODE MESSAGES

The operation of the multi-computer architecture depends upon the exchange of data and operational information by the exchange of inter-node messages. These inter-node messages are data-flow instructions which indicate to each individual Operations Controller how it should be processed.

The various inter-node messages and their information content are listed on Table 1.

TABLE I
Inter-Node Message Formats

| Message Type Number | Description/ Abbreviation | Byte Number | Context |
|---|---|---|---|
| MT0 | One Byte Data Value | 1 | NID/Message Type |
| | | 2 | Data ID |
| | | 3 | Data Value |
| | | 4 | Block Check |
| MT1 | Two Byte Data Value | 1 | NID/Message Type |
| | | 2 | Data I.D. |
| | | 3-4 | Data Value |
| | | 5 | Block Check |
| MT1 | Task Interactive Consistency (TIC) | 1 | NID/Message Type |
| | | 2 | Data I.D. = 0 |
| | | 3 | Task Completed Vector |
| | | 4 | Task Branch Condition Bits |
| | | 5 | Block Check |
| MT2 | Four Byte Data Value (D4B) | 1 | NID/Message Type |
| | | 2 | Data I.D. |
| | | 3-6 | Data Value |
| | | 7 | Block Check |
| MT3 | Four Byte Data Value (D4B2) | 1 | NID/Message Type |
| | | 2 | Data I.D. |
| | | 3-6 | Data Value |
| | | 7 | Block Check |
| MT4 | Base Penalty Count (BPC) | 1 | NID/Message Type |
| | | 2 | Base Count 0 |
| | | 3 | Base Count 1 |
| | | 4 | Base Count 2 |
| | | 5 | Base Count 3 |
| | | 6 | Base Count 4 |
| | | 7 | Base Count 5 |
| | | 8 | Base Count 6 |
| | | 9 | Base Count 7 |
| | | 10 | Block Check |
| MT5 | System State (SS) | 1 | NID/Message Type |
| | | 2 | Function Bits |
| | | 3 | Task Completed Vector |
| | | 4 | Task Branch Condition Bits |
| | | 5 | Current System State |
| | | 6 | New System State |
| | | 7 | Period Counter (High) |
| | | 8 | Period Counter (Low) |
| | | 9 | ISW Byte |
| | | 10 | Reserved |
| | | 11 | Block Check |
| MT6 | Task Completed/ Started (TC/S) | 1 | NID/Message Type |
| | | 2 | Completed Task ID |
| | | 3 | Started Task ID |
| | | 4 | Branch Condition/ ECC |
| | | 5 | Block Check |
| MT7 | Error (ERR) | 1 | NID/Message Type |
| | | 2 | Faulty Node ID |
| | | 3 | Error Byte 1 |
| | | 4 | Error Byte 2 |
| | | 5 | Error Byte 3 |
| | | 6 | Error Byte 4 |
| | | 7 | Penalty Base Count |
| | | 8 | Penalty Increment Count |
| | | 9 | Block Check |

The inter-node messages all have the same basic format so as to simplify their handling in the receiving mode. The first byte of each inter-node message contains the Node identification (NID) code of the Node from which the message originated and a message type (MT) code identifying the message type. The last byte in each inter-node message is always a block check byte which is checked by the Receivers 32a through 32n to detect transmission errors.

There are four different Data Value messages which range from a one byte Data Value message to a four byte Data Value message. These Data Value messages are identified as message types MT0 through MT4. The second byte of a Data Value message is a data identification (DID) code which when combined with the message type code uniquely identifies that particular data value from other data values used in the system. The ata identification (DID) code is used by the Message Checker 34 to define the types of checks that are to be performed. The MT/DID codes are used to identify which limits will be used by the Message Checker 34 and the deviance to be used by the Voter 38 to define the permissible deviance of each actual data value from the voted values and by the Task Communicator 44 to identify the data value to be supplied to the Applications Processor 14 in the execution of the current task. The bytes following the data identification byte are the data values themselves with the last byte being the block check byte as previously indicated.

A task Interactive Consistency (TIC) message is a special case of the two byte Data Value message which is identified by the DID being set to zero (0). The Task Interactive Consistency message, message type MT1, is a rebroadcast of the task completed vector and branch condition data contained in Task Completed/Started (CS) messages received from the other Nodes and are transmitted at the end of each Subatomic period (SAP), as shall be explained in the discussion of the timing sequence. The information content of the Task Interactive Consistency messages are voted on by each Node and the voted values are used by the Scheduler 40 in the task selection and scheduling process.

A base Penalty Count (BPC) message, message type MT4, contains the base penalty count that the individual Node is storing for each Node in the system including itself. Each Node will use this information to generate a voted base penalty count for each Node in the system. Thereafter, each Node will store the voted base penalty count as the current base penalty count for each Node. This assures that at the beginning of each Master period each Node is storing the same number of base penalty counts for every other Node in the system. The Base Penalty Count message is transmitted by each Node at the beginning of each Master period timing interval.

A System State (SS) message, message type MT5, is sent at the end of each Atomic period timing interval and is used for the point-to-point synchronization of the Nodes and to globally affirm reconfiguration when a majority of the Nodes conclude that reconfiguration is required. The transmission of the System State message is timed so that the end of its transmission coincides with the end of the preceding Atomic period and the beginning of the next Atomic period. The first byte of the System State message contains the node identification (NID) code of the originating Node and the message type (MT) code. The second byte contains three function bits, the first two bits are the synchronization and presynchronization bits which are used in the Synchronization process described above. The third bit identifies whether or not the Node is operating or excluded. The third and fourth bytes of the System State message are the task completed vector and the branch condition vector, respectively. Byte five contains the current system state vector and byte six contains the the new system state vector. When the sending Node has concluded reconfiguration is necessary, the new system state vector will be different from the current state vector. Byte seven and eight contain the higher and lower order of bits of the Node's own period counter. Byte nine is an "in sync with" (ISW) vector which defines which Nodes that particular Node determines it is synchronized with, and byte ten is reserved for future use. Byte eleven is the conventional block check byte at the end of the message. The Synchronizer uses the time stamp of the pre-synchronization System State messages, identified by the pre-synchronization bit in the second byte being set to generate an error estimate used to compute a correction to the time duration of the last Subatomic period. This correction synchronizes the beginning of the next Atomic period in that Node with the Atomic period being generated by the other Nodes. The period counter bytes are used to align the Master periods of all the Nodes in the system. The period counter counts the number of Atomic periods from the beginning of each period and is reset when it counts up to the fixed number of Atomic periods in each Master period. Byte nine is used only during an automatic cold start as shall also be explained in more detailed in the discussion of the Synchronizer 46.

The Task Completed/Started (TC/S) message, message type MT6, is generated by the Task Communicator 44 each time the Applications Processor 14 starts a new task. The second and third bytes of the Task Completed/Started message contain the task identification (TID) codes of the task completed and new task started by the Node's Applications Processor 14. The fourth byte of this message contains the branch condition of the completed task, and an error correction code (ECC).

The last inter-node message is the Error message, message type MT7, which is sent whenever the Transmitter 30 is free during an Atomic period. Only one error message reporting the errors attributed to a particular Node can be sent in an Atomic period. The second byte of the Error message is the Node identification (NID) code of the Node accused of being faulty. The following four bytes contain error flags identifying each error detected. The seventh and eighth bytes of the error message contain the base penalty count of the identified Node and the increment penalty count which is to be added to the base penalty count if the errors are supported by Error messages received from other Nodes. The increment penalty count is based on the number of errors detected and the severity of these errors. This information is used by the other Nodes to generate a new voted base penalty count for the Node identified in the Error message. A separate Error message is sent for each Node which generates a message having a detected error.

TIMING PERIODS

The overall control system of the multi-computer architecture contains a number of concurrently operating control loops with different time cycles. The system imposes the constraint that each cycle time be an integer power of two times a fundamental time interval called an Atomic period. This greatly simplifies the implementation of the Operations Controller 12 and facilitates the verification of correct task scheduling. The length of the Atomic period is selected within broad limits by the system designer for each particular application. The System State messages, which are used for synchronization are sent at the end of each Atomic period.

The longest control loop employed by the system is the Master period. Each Master period contains a fixed number of Atomic periods, as shown in FIG. 3. All task scheduling parameters are reinitialized at the beginning of each Master period to prevent the propagation of any scheduling errors. The Nodes will also exchange Base Penalty Count messages immediately following the beginning of each Master period.

The shortest time period used in the system is the Subatomic (SAP) period, as shown in FIG. 4, which defines the shortest execution time recognized by the Operations Controller 12 for any one task. For example, if the execution time of a task is less than a Subatomic period, the Operations Controller 12 will not forward the next scheduled task to the Applications Processor 14 until the beginning of the next Subatomic period. However, when the execution time of a task is longer than a Subatomic period, the Operations Controller 14 will forward the next scheduled task to the Applications Processor as soon as it is ready for it. There are an integer number of Subatomic periods in each Atomic period which are selectable by the systems designer to customize the multi-computer architecture to the particular application. As shown in FIG. 4, each Subatomic period is delineated by a Task Interactive Consistency message as previously described.

TRANSMITTER

Figure 5:
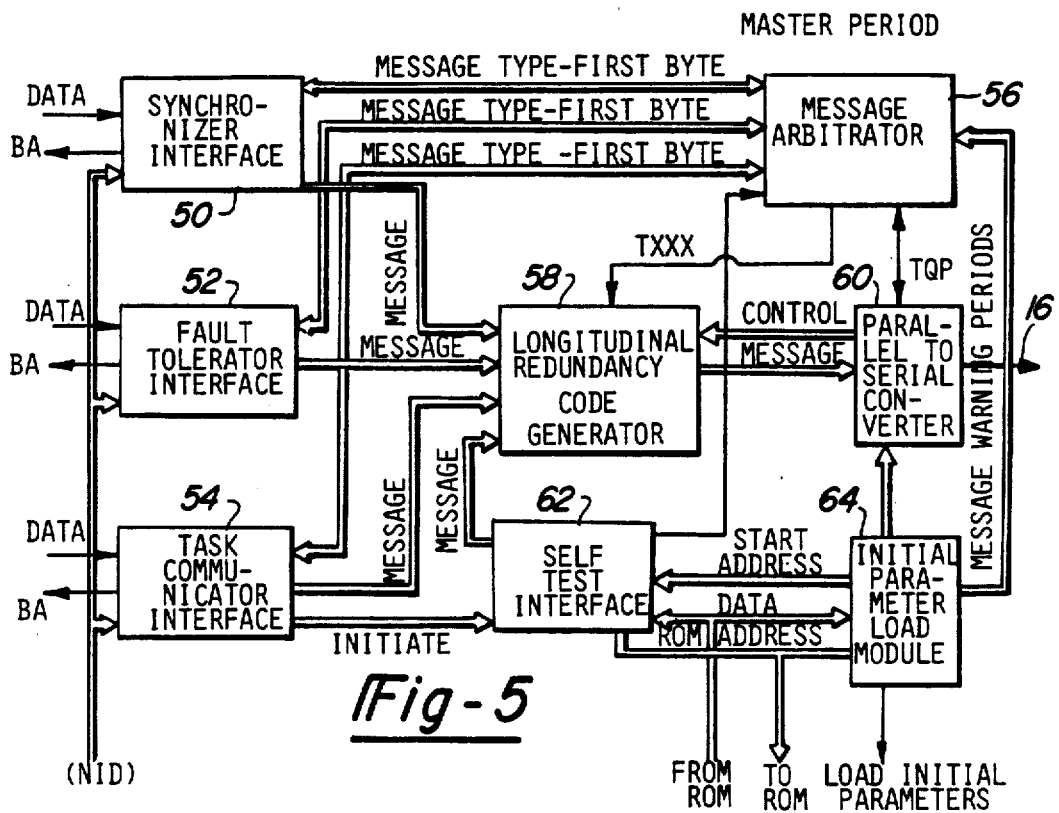
FIG. 5 is a block diagram of the Transmitter.

FIG. 5 is a block diagram of the Transmitter 30 embodied in each of the Operations Controllers 12. The Transmitter 30 has three interfaces, a Synchronizer Interface 50 receiving Task Interactive Consistency messages and System State messages generated by the Synchronizer 46, a Fault Tolerator Interface 52 receiving the Error and Base Penalty Count messages generated by the Fault Tolerator 36, and a Task Communicator Interface 54 receiving Data Value and Completed/Started messages generated by the Task Communicator 44. The three interfaces are connected to a Message Arbitrator 56 and a Longitudinal Redundancy Code Generator 58. The Message Arbitrator 56 determines the order in which the messages ready for transmission are to be sent. The Longitudinal Redundancy Code Generator 58 generates a longitudinal redundancy code byte which is appended as the last byte to each transmitted message. The message bytes are individually transferred to a Parallel-to-Serial Converter 60 where they are framed between a start bit and two stop bits, then transmitted in a serial format on communication link 16.

The Transmitter 30 also includes a Self-Test Interface 62 which upon command retrieves a predetermined self-test message from an external ROM (not shown) which is input into the Longitudinal Redundancy Code Generator 58 and transmitted to the communication link by the Parallel-to-Serial Converter 60. The Transmitter 30 also has an Initial Parameter Load Module 64 which will load into the Transmitter various predetermined parameters, such as the length of the minimum synchronization period between messages, the length of a warning period for Interactive Consistency and System State messages and the starting address in the ROM where the self-test messages are stored.

Figure 6:
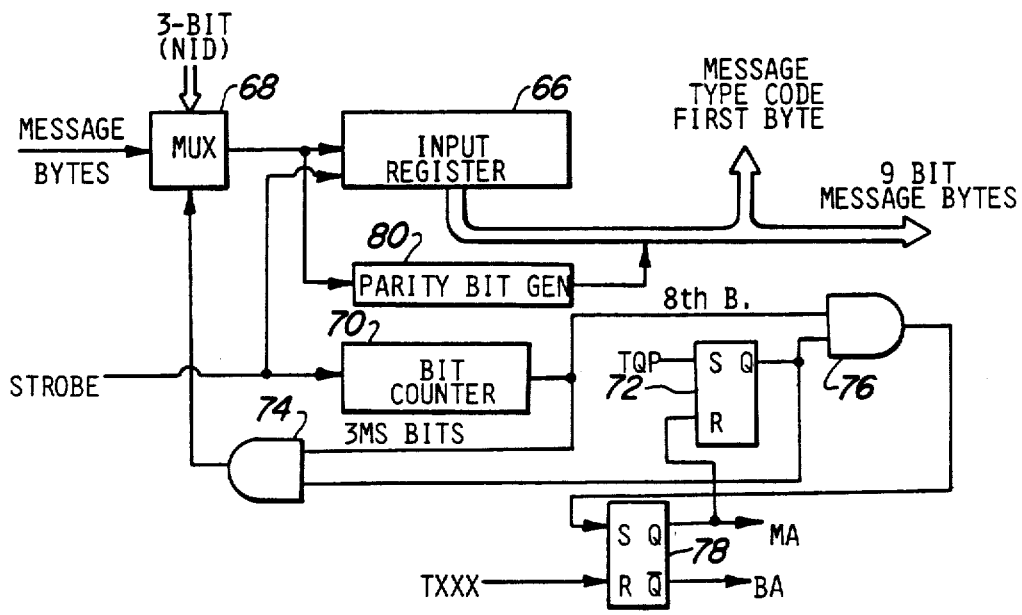
FIG. 6 is a circuit diagram of one of the interfaces.

As shown in FIG. 6, each of the three interfaces has an eight bit input register 66 which receives the messages to be transmitted from its associated message source through a multiplexer 68. The multiplexer 68 also receives the three bit Node identification (NID) code which identifies the Node which is generating the message.

Whenever the associated message source has a message to be transmitted, it will hold the message until a buffer available signal is present signifying the input register 66 is empty. The message source will then transmit the first byte of the message to the input register 66. A bit counter 70 will count the strobe pulses clocking the message into the Input Register 66 and will in coordination with a flip flop 72 and an AND gate 74 actuate the multiplexer 68 to clock the three bit Node identification code into the Input Register 66 as the last three most significant bits of the first byte. The flip flop 72 is responsive to the signal "transmit quiet period" (TQP) generated at the end of its preceding message to generate a first byte signal at its Q output which enables AND gates 74 and 76. The AND gate 74 will transmit the three most significant bits generated by the bit counter 70 in response to the strobe signals loading the first byte into the input register 66 and will actuate the multiplexer 68 to load the three bit Node identification code into the three most significant bit places of the input register 66.

The AND gate 76 will respond to the loading of the eighth bit into input register 66 and will generate an output which will actuate the flip flop 78 to a set state. In the set state, the flip flop 78 will generate a message available signal at its Q output and will terminate the buffer available signal at its $\bar{Q}$ output. The message available (MA) signal will reset the flip flop 72 terminating the first byte signal which in turn disables the AND gates 74 and 76. The message available (MA) signal is also transmitted to the Message Arbitrator 56 signifying a message is ready for transmission.

Termination of the buffer available (BA) signal when the flip flop 78 is put in the set state inhibits the message source from transmitting the remaining bytes of the message to the Transmitter 30. The first three least significant of bits of the first bytes, which are the message type code, are communicated directly to the Message Arbitrator 56 and are used in the arbitration process to determine which message is to be sent if more than one message is available for transmission or if the sending of that message will not interfere with the transmission of a time critical message generated by the Synchronizer 46.

The Message Arbitrator 56 will generate a transmit (Txxx) signal identifying the next message to be sent when there is more than one message ready for transmission. This message will actuate the Longitudinal Redundancy Code Generator 58 to pass the selected message to the Parallel-to-Serial Converter for transmission. The transmit signal will also reset the flip flop 78 in the appropriate interface which reasserts the buffer available (BA) signal, actuating the associated message source to transmit the remaining bytes of the message to the interface. These are then transmitted directly to the Longitudinal Redundancy Code Generator 58 as they are received. When all of the bytes of the message are transmitted, the Message Arbitrator 56 will generate a transmit quiet period (TQP) signal which actuates the Parallel-to-Serial Converter to transmit a null (synchronization) signal for a predetermined period of time following the transmission of each message. In the preferred embodiment, the quiet period is a time required for the transmission of 24 bits or two (2) null bytes. The transmit quiet period (TQP) signal will also set the flip flop 72 indicating that the preceding message has been sent and that the next byte received from the associated message source will be the first byte of the next message.

Figure 7:
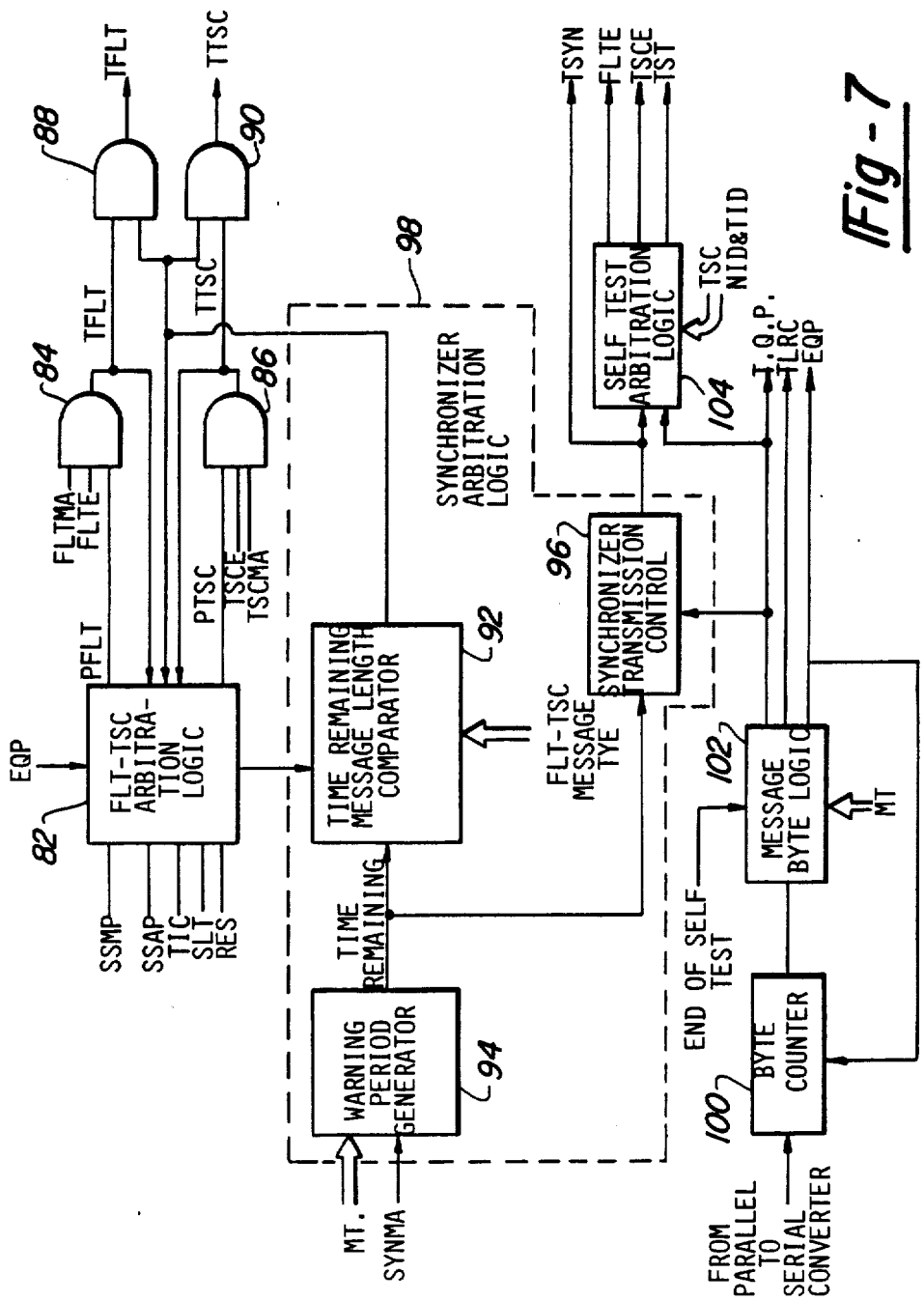
FIG. 7 is a block diagram of the Arbitrator.

The details of the Message Arbitrator 56 are shown on FIG. 7. Under normal operation when no critical time messages, such as Task Interactive Consistency (TIC) and System State (SS) messages, are to be sent, a Fault Tolerator (FLT) Task Communicator (TSC) Arbitration Logic 82 will generate, in an alternating manner, PFLT and a PTSC polling signals which are received at the inputs of AND gates 84 and 86, respectively. The AND gate 84 will also receive the Fault Tolerator Message Available (FLTMA) signal generated by the Fault Tolerator Interface 52 while AND gate 86 will receive a Task Communicator message available TSCMA) signal generated by the Task Communicator Interface 54 after the Task Communicator 44 has completed the loading of the first byte of the message ready for transmission. The outputs of the AND gates 84 and 86 are transmit Fault Tolerator (TFLT) and transmit Task Communicator (TSC) signals which are applied to AND Gates 88 and 90, respectively. The alternate inputs to AND gates 88 and 90 are received from a Time Remaining-Message Length Comparator 92 which produces an enabling signal whenever the transmission of the selected message will not interfere with the transmission of a time dependent message as shall be explained hereinafter. If the AND gate 88 is enabled it will pass the transmit Fault Tolerator (TFLT) signal to the Fault Tolerator Interface 52 to reassert the buffer available signal, enabling it to receive the remaining bytes of the message from the Fault Tolerator 36 and to the Longitudinal Redundancy Code Generator 58 enabling it to pass the message, byte-by-byte from the Fault Tolerator Interface 52 to the Parallel-to-Serial Converter 60 for transmission on the communication link 16. In a like manner, when the AND gate 90 is enabled, and the polling of the Task Communicator Interface 54 indicates that the Task Communicator 44 has a message ready for transmission, then the AND gate 86 will generate a transmit Task Communicator (TTSC) signal which, if passed by the AND gate 90, will result in the transmission of the Task Communicator's message. The TFLT and the TTSC signals, when generated, are fed back to lock the FLT-TSC Arbitration Logic 82 in its current state until after the message is sent.

The message arbitration between the Fault Tolerator's and Task Communicator's messages is primarily dependent upon the type of the message currently being transmitted. The logic performed by the FLT-TSC Arbitration Logic 82 is summarized on Table II.

TABLE II

| FLT-TSC Abitration Logic Table | | |
|---|---|---|
| Current Message | Poll Next Then Alternate | Poll Next Then Wait for Message |
| Fault Tolerator | Task Communicator | |
| Task Communicator | Fault Tolerator | |
| System State (Master Period) | | Fault Tolerator |
| System State (Atomic Period) | Task Communicator | |
| Interactive Consistency | Task Communicator | |
| Self Test | | Task Communicator |

Normally the FLT-TSC Arbitration Logic 82 will poll the Fault Tolerator Interface 52 and the Task Communicator Interface 54 in an alternating sequence. However, at the beginning of each Atomic period, the FLT-TSC Arbitration Logic 82 will first poll the Task Communicator Interface 54 for a Task Completed/Started message which will identify the task being started by that Node. If the Task Completed/Started message is not available it will then poll the Fault Tolerator Interface 52.

At the beginning of each Master period, all of the Nodes should transmit a Base Penalty Count message which is used for global verification of the health of each Node in the system. Therefore, after each System State message which is coincident with the beginning of a Master period, the FLT-TSC Arbitration Logic will first poll the Fault Tolerator Interface 52 and wait until it receives the Base Penalty Count message from the Fault Tolerator 36. After the transmission of the Base Penalty Count message, it will then poll the Task Communicator Interface 54 and transmit a Task Completed/Started message identifying the task scheduled to be started by the Applications Processor. If the Fault Tolerator 36 does not generate a Base Penalty Count message within a predetermined period of time, the FLT-TSC Arbitration Logic 82 will resume polling of the Fault Tolerator Interface 52 and the Task Communicator Interface 54 in an alternating sequence. In a like manner, after a self-test message, the FLT-TSC Arbitration Logic 82 will poll the Task Communicator Interface 54 and wait for a Task Completed/Started message.

The Synchronizer 46 will load the first byte of either a Task Interactive Consistency or System State message in the Synchronizer Interface 50 a predetermined period of time before the beginning of the next Subatomic or Atomic periods. A Warning Period Generator 94 will load a warning period counter with a number corresponding to the number of bits that are capable of being transmitted before the Task Interactive Consistency or System State messages are to be transmitted. As described previously, the transmission of the final bit of either of these messages marks the end of the previous Subatomic or Atomic periods respectively, therefore, their transmission will begin a predetermined time (bit counts) before the end of the period. Since the Task Interactive Consistency and System State messages are of different bit lengths, the number loaded into the warning period counter will be different. The Warning Period Generator 94 will decode the message type code contained in the first byte of the message stored in the Synchronizer Interface 50 and will load the warning period counter with a number indicative of the length of the warning period for that particular type of time critical message. The warning period counter will be counted down at the bit transmission rate of the Parallel-to-Serial Converter 60 to generate a number indicative of the time remaining for the transmission of a time critical message. The number of counts remaining in the warning period counter are communicated to a Synchronizer Transmission Control 96 and the Time Remaining-Message Length Comparator 92. When the warning period counter is counted down to zero the Synchronizer Message Control 96 will generate a transmit synchronizer (TSYN) signal which will actuate the Synchronizer Interface 50 to reassert the buffer available signal and will actuate the Longitudinal Redundancy Code Generator 58 to pass the message from the Synchronizer Interface 50 to the Parallel-to-Serial Converter 60 for transmission on the Node's own communication link 16.

The Time Remaining-Message Length Comparator 92 will decode the message type of a message selected for transmission by the FLT-TSC Arbitration Logic and determine the number of bits that have to be transmitted for that message. To this number the Time Remaining-Message Length Comparator 92 will add a number equal to the number of bits corresponding to the quiet period between the messages and compare the sum of the message and the quiet period with the count remaining in the warning period counter to determine if the transmission of the selected message will or will not interfere with the transmission of the time critical message from the Synchronizer Interface 50. If the transmission of the selected message will not interfere with the sending of the time critical message from the Synchronizer 46, the Time Remaining-Message Length Comparator 92 will generate a signal enabling AND gates 88 and 90 to pass the TFLT or TTSC signals, otherwise the Time Remaining-Message Length Comparator 92 will generate a signal disabling AND gates 88 and 90, inhibiting the transmission of the selected message from either the Fault Tolerator Interface 52 or the Task Communicator Interface 54. This signal will also toggle the FLT-TSC Arbitration Logic 92 to poll the nonselected interface to determine if it has a message to transmit. If the nonselected interface has a message ready for transmission, the Time Remaining-Message Length Comparator 92 will determine if there is sufficient time to transmit the message from the nonselected interface before the transmission of the time critical message from the Synchronizer Interface 50. If there is sufficient time, the message from the nonselected interface will be transmitted, otherwise the AND gates 88 and 90 will remain disabled.

The Message Arbitrator 56 also has a Byte Counter 100 which counts the number of bytes transmitted by the Parallel-to-Serial Converter 60. The output of the Byte Counter 100 is received by a Message Byte Logic 102. The Message Byte Logic 102 decodes the message type code of the message being transmitted and determines the number of bytes in that message. After the last byte of the message is transmitted, the Message Byte Logic 102 will first generate a transmit longitudinal redundancy code (TLRC) signal which enables the Longitudinal Redundancy Code Generator 58 to transmit the generated longitudinal redundancy code as the final byte of the message. The Message Byte Logic 102 will then generate a transmit quiet period (TQP) signal enabling the Parallel-to-Serial Converter 60 to transmit the null signal for a predetermined number of bytes which is used for message synchronization. The transmit quiet period (TQP) signal is also transmitted to the Synchronizer Transmission Control 96 where it is used to terminate the transmit synchronizer (TSYN) signal. At the end of the quiet period, the Message Byte Logic 102 will generate an end of quiet period (EQP) signal which will reset the Byte Counter 100 and unlatch the FLT-TSC Arbitration Logic 82 for selection of the next message for transmission.

Figure 8:
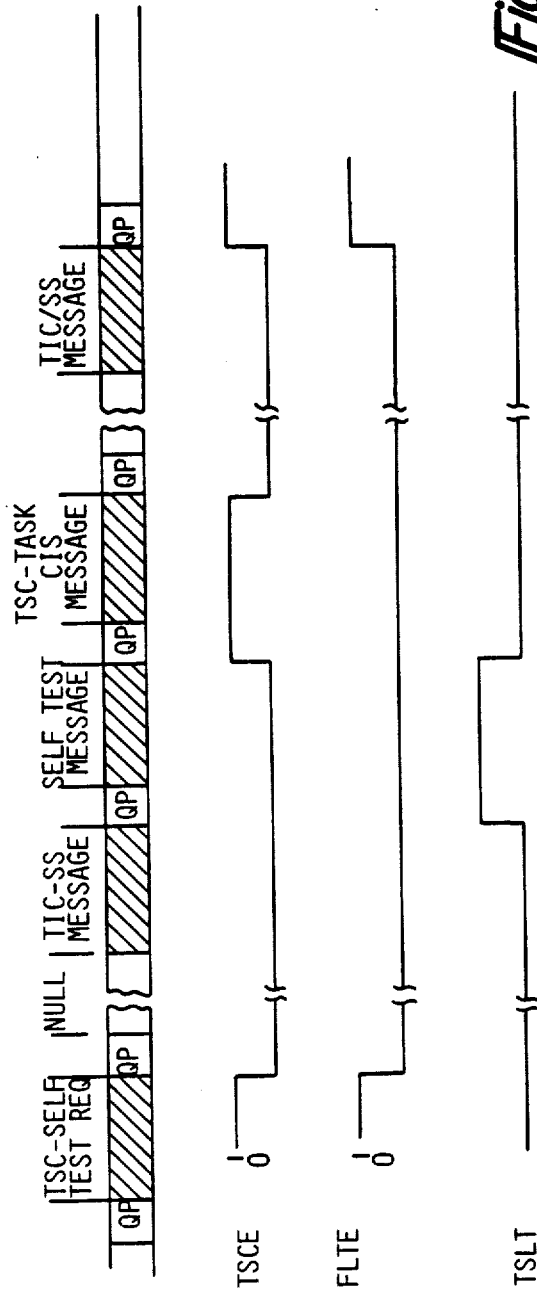
FIG. 8 shows waveforms for the Self-Test Arbitration Logic.

A Self-Test Arbitration Logic 104 recognizes a request for a self-test in response to a transmitted Task Completed/Started message in which the task identification (TID) code is the same as the Node identification (NID) code. After the transmission of a self-test request message, the Self-Test Arbitration Logic 104 will inhibit a Task Communicator Enable (TSCE) signal and a Fault Tolerator Enable (FLTE) signal as shown in FIG. 8 which, when applied to AND gates 84 and 86, respectively, inhibits all transmissions from the Fault Tolerator Interface 52 or the Task Communicator Interface 54. Immediately following the next Task Interactive Consistency or System State message, the Self-Test Arbitration Logic 104 will generate a transmit self-test (TSLT) signal which will actuate the Self-Test Interface 62 to read the self-test message from an associated off board (read only memory) ROM. The (TSLT) signal will also enable the Longitudinal Redundancy Code Generator 58 to pass the self-test message from the Self-Test Interface 62 to the Parallel-to-Serial Converter 60 for transmission. After transmission of the self-test message, the Self-Test Arbitration Logic 104 will restore the Task Communicator Enable (TSCE) signal to permit the transmission of a Task Completed/Started message signifying the completion of the self-test. As indicated in Table II, the FLT-TSC Arbitration Logic 82 will automatically select the message from the Task Communicator Interface 54 as the next message to be transmitted following the transmission of the self-test message. After the transmission of the Task Completed/Started message the Self-Test Arbitration Logic 104 will terminate the Task Communicator Enable (TSCE) signal until after the next Task Interactive Consistency or System State message is transmitted as indicated in FIG. 8.

The Self-Test Interface 62 serves to transfer the self-test message from the off board ROM (not shown) to the Longitudinal Redundancy Code Generator 58. The off board ROM will store a plurality of Self-test messages which are transmitted one at a time in response each time a Self-test is requested. The first byte of each Self-test message is a number indicative of the number of bytes in the Self-test message which is passed back to the Message Byte Logic 102 to identify the completion of the self-test. The last byte in each self-test message stored in the off board ROM is the starting address for the next Self-test message. The starting address is not transmitted, but rather is stored in the Self-Test Interface 62 to locate the next Self-test message in the off board ROM to be transmitted. The last byte of the last Self-test message stored in the off board ROM contains the starting address of the first Self-test message, so that the Self-test message sequence is repeated. The starting address for the first Self-test message is loaded into the Self-Test Interface 62 by the Initial Parameter Load Module 64 in response to an initial load command generated by the Synchronizer 46 in response to the electrical power being turned on.

Figure 9:
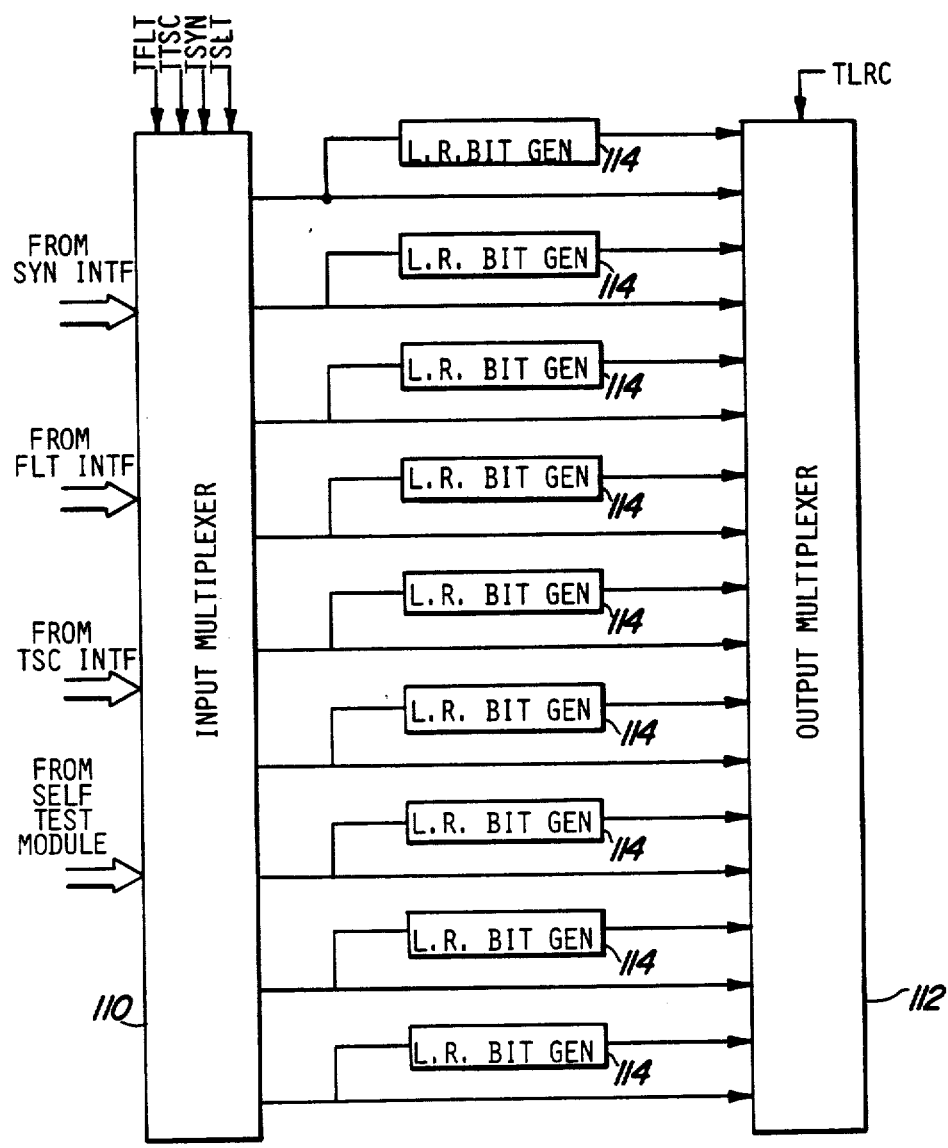
FIG. 9 is a block diagram of the Longitudinal Redundancy Code Generator.

As illustrated in FIG. 9, the Longitudinal Redundancy Code Generator 58 has an 4:1 Input Multiplexer 110 which receives the message bytes from the Syncrhonizer Interface 50, Fault Tolerator Interface 52, Task Communicator Interface 54, and Self-Test Interface 62. The Input Multiplexer 110 controls which message will be transmitted to the Parallel-to-Serial Converter 60 in response to the transmit (TFLT, TTSC, TSYN, and TSLT) signals generated by the Message Arbitrator 56, as previously described. Each byte of a message selected for transmission by the Message Arbitrator 56 is transmitted to an Output Multiplexer 112 by means of nine parallel lines, one for each bit in the received byte plus the parity bit generated by the associated interface. A Longitudinal Redundancy (LR) Bit Generator 114 is connected to each of the nine parallel bit lines and collectively generate a nine bit longitudinal redundancy code. Each bit in the longitudinal redundancy code is a function of the bit values in the same bit locations in the preceding bytes. The outputs of all the LR bit generators 114 are also received by the Output Multiplexer 112. The output Multiplexer 112 is responsive to the transmit longitudinal redundancy code (TLRC) signal generated by the Message Arbitrator 56 to output the last bit generated by each of the LR bit generators 114 as the last byte of the message being transmitted. The output of the Output Multiplexer 112 is connected directly to the Parallel-to-Serial Converter 60 which frames each received byte between predetermined start and stop bits before it is transmitted on the Node's communication link.

RECEIVERS

Figure 10:
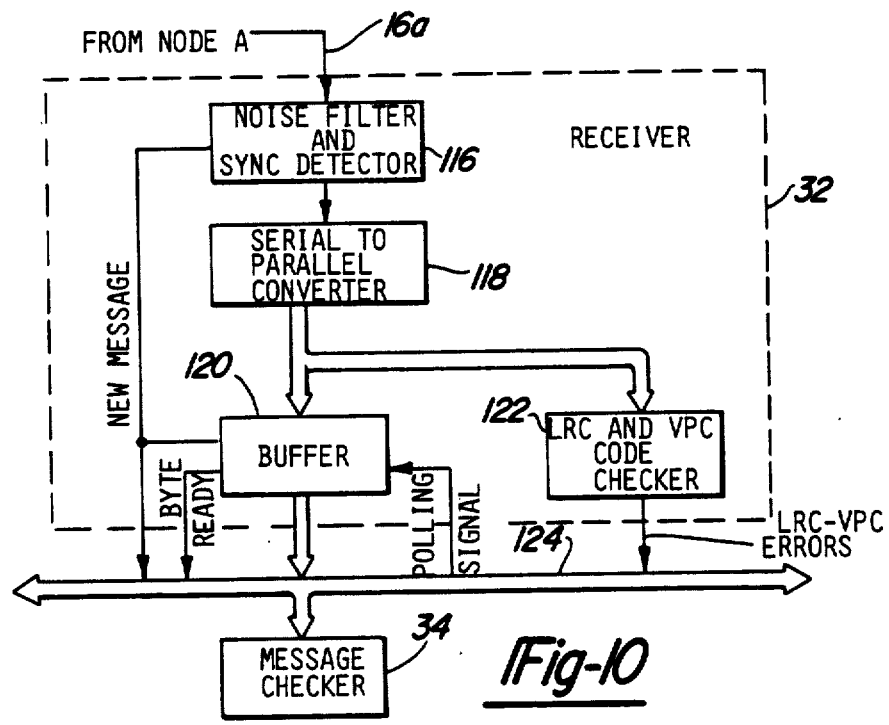
FIG. 10 is a block diagram of a Receiver.

The structures of the Receivers 32a through 32n are identical, therefore, only the structure of the Receiver 32a will be discussed in detail. Referring to FIG. 10, the messages from Node A transmitted on communication link 16a are received by a Noise Filter and Sync Detector 116. The synchronization portion of the Noise Filter and Sync Detector 116 requires that a proper synchronization interval exists prior to the reception of a message. As described relative to the Transmitter 30, the synchronization interval preferably is the time required for the Transmitter 30 to transmit two complete null bytes after each transmitted message.

The low pass portion of the Noise Filter and Sync Detector 116 prevents false sensing of the "start" and "stop" bits by the Receiver 32a due to noise which may be present on the communication link 16a. The low pass filter portion requires that the signal on the communication link 16a be present for four (4) consecutive system clock cycles before it is interpreted as a start or a stop bit. The Noise Filter and Sync Detector 116 will generate a new message signal in response to receiving a start bit after a proper synchronization interval.

After passing through the Noise and Sync Detector 116 the message, byte-by-byte, is converted from a serial to a parallel format in a Serial-to-Parallel Converter 118. The Serial-to-Parallel Converter 118 also determines when a complete 12-bit byte has been received. If the 12-bit byte is not properly framed by a "start" and two "stop" bits, a new bit is added, the bit first received is discarded and the framing is rechecked. Framing errors are not flagged by the Receiver 32a since this fault will manifest itself during a vertical parity check. After conversion to a parallel format, the start and stop bits are stripped from each byte and the remaining 9-bit byte is transferred to a Longitudinal Redundancy Code and Vertical Parity Code (LRC and VPC) Checker 122 to check fior parity errors. The error checking logic outputs the current combinational value of the vertical parity and the longitudinal redundancy codes. The vertical parity check portion checks the parity vertically across the received message while the longitudinal redundancy code checker portion performs a longitudinal redundancy code check on each byte received from the Serial-to-Parallel Converter 118. The Message Checker 34 decodes the message type information contained in the first byte of the message and determines which byte is the last byte in the message and, therefore, for which byte the longitudinal redundancy code check is valid. The Message Checker 34 will ignore all other LRC error signals generated by the LRC and VPC Code Checker 122.

In parallel with the vertical parity and longitudinal redundancy checks, the 8-bit message byte is transferred to a Buffer 120 which interfaces with the Message Checker 34. The Buffer 120 temporarily stores each 8-bit message byte until the Message Checker 34 is ready to check it. Upon receipt of a message byte, the Buffer will set a byte ready flag signifying to the Message Checker 34 that it has a message byte ready for transfer. The Message Checker 34 will unload the message bytes from the Buffer 120 independent of the loading of new message bytes of the Serial-to-Parallel Converter 118. The 8-bit message bytes are transferred to the Message Checker 34 via a common bus 124 which is shared with all of the Receivers 32a through 32n in the Operations Controller 12. The transfer of the message between the Receivers 32 and the Message Checker 34 is on a byte-by-byte basis in response to a polling signal generated by the Message Checker. The Message Checker 34 will systematically poll each Receiver one at a time in a repetitious sequence.

MESSAGE CHECKER

Figure 11:
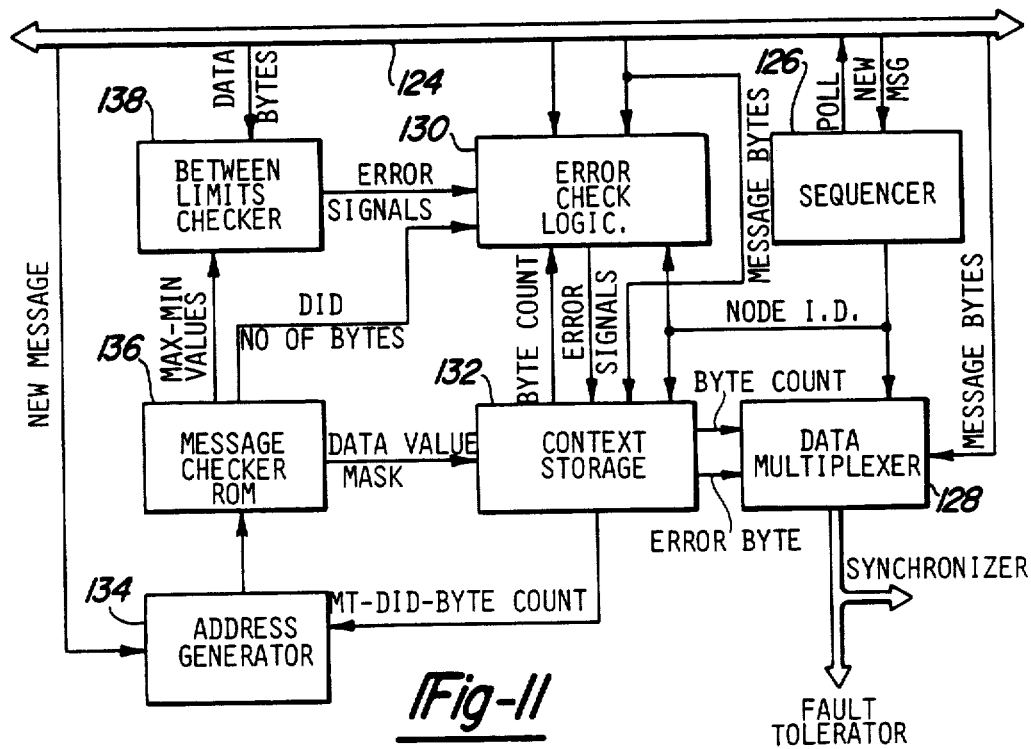
FIG. 11 is a block diagram of the Message Checker.

The details of the Message Checker 34 are shown in FIG. 11. The Message Checker 34 processes the messages received by the Receivers 32a through 32n and verifies their logical content, records any errors detected, and forwards the messages to the Fault Tolerator 36. The operation of the Message Checker 34 is controlled by a Sequencer 126 which context switches among the multiple Receivers 32a through 32n in order to prevent overrun of the Buffers 120 in each Receiver. Each Receiver 32a through 32n is polled in a token fashion to determine if it has a message byte ready for processing. If the message byte is ready for processing when it is polled by the Sequencer 126 the byte will be processed immediately by the Message Checker 34. Otherwise the Sequencer 126 will advance and poll the next Receiver in the polling sequence. The Sequencer 126 stores the Node identification (NID) code of the Node 10 associated with each Receiver. The Sequencer 126 also has a Byte Counter associated with each Receiver 32a through 32n which is indexed each time the Sequencer 126 unloads a byte from that particular Receiver. The byte count uniquely identifies the particular byte being processed by the Message Checker 34.

The Sequencer 126 will transfer the Node identification code and the byte count to a Data Multiplexer 128 to tag the message byte as it is transferred to the Fault Tolerator 36. The Node identification code and the byte count are also transmitted to an Error Check Logic 130 and a Context Storage 132. The Error Check Logic 130 will check the Node identification code expected by the Sequencer 126 with the Node identification code contained in the first byte of the message being checked to determine if they are the same. When they are the different the Error Checker Logic 130 will generate an error signal which is recorded in an error status byte being generated in the Context Storage 132. The Node identification code is also used as an address into the Context Storage 132 where the relevant information pertaining to the message being processed is stored. The Context Storage 132 has a separate storage location for each Node 10 in the system which is addressed by the Node identification code contained in the message.

The Context Storage 132 stores the message type (MT) code, the data identification (DID) code, the byte count, an error status byte, a data value mask, and an intermediate error signal for each message as it is being processed. As each byte is unloaded from the Receivers, the information in the Context Storage 132 will be used by an Address Generator 134 with the message type (MT) code, the data identification (DID) code, and the byte count which identifies the specific byte to be processed. In response to this information, the Address Generator 134 will output an address where the required processing information is stored in a Message Checker ROM 136. The Message Checker ROM 136 stores the maximum and minimum values for the data contained in the message, the valid data indentification numbers for each message type, and a data mask which identifies how many data values are contained in the message being processed and the number of bytes in each data value.

The maximum and minimum data values are transmitted to a Between Limits Checker 138 which will check the data containd in each data byte against these maximum and minimum values. The Between Limits Checker 138 will generate four different error signals as a result of the between limits checks. The first two are the maximum value (MXER) and a minimum value (MNER) error signals, signifying the data value exceeded the maximum value or was less than the minimum value. The other two error signals are the equal to maximum value (MXEQ) and equal to minimum value (MNEQ) signals. These latter error signals are transmitted to the Error Check logic 130 which will store them in the Context Storage 132 as intermediate error signals.

The Error Check Logic 130 will OR the vertical parity code and the longitudinal redundancy code error signals generated by the Receiver and generate a parity error signal which is recorded in the error status byte being generated in the Context Storage 132. As previously described, the Error Check Logic 130 will check the expected Node identification (NID) code against the Node identification code contained in the first byte of the message and will check the message type (MT) code by checking to see if bits in the bit position 1, 3 and 4 of the first byte are identical. As previously described in the detailed description of the Transmitter 30 the middle bit of the 3-bit message type code is repeated in bit positions 3 and 4 for message type error detections. The Error Check Logic 130 will also check the validity of the data identification (DID) code contained in the second byte of the message against the maximum value for a (DID) code received from the Message Checker ROM 136 and will generate an error signal if the data identification code has a value greater than the maximum value. The Error Check Logic 130 will further check the two's compliment range of the appropriate data byte and generate a range error (RNGER) signal when a two's compliment error range is detected. It will also record in the Context Storage 132 the maximum (MXER) and the minimum (MNER) error signals generated by the Between Limits Checker 138.

Figure 12:
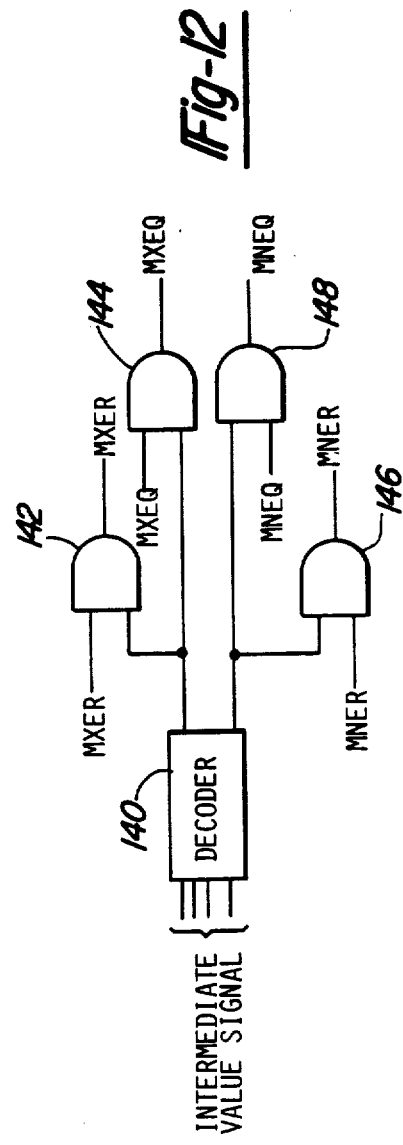
FIG. 12 is a block diagram of the decision logic for the Between Limits Checker.

With regard to the Between Limits Checker 138, often it can be determined from the first byte of a multi-byte data value if the data value within or outside the maximum or minimum values received from the Message Checker ROM 136 and checking of the remaining bytes is no longer necessary. However, when the Between Limits Checker 138 generates a MXEQ or MNEQ signal signifying that the data value of the byte being checked is equal to either the maximum or minimum limit value, it will be necessary to check the next byte against a maximum or a minimum value to make a factual determination of whether or not the received data value is within or outside the predetermined limits. The Error Check Logic 130 in response to an MXEQ or a MNEQ signal from the Between Limits Checker 138 will store in the Context Storage an intermediate value signal which signifies to the Context Storage 132 that the between limits check is to be continued on the next byte containing that data value. This process will be repeated with the next subsequent byte if necessary to make a final determination. During the checking of the next byte of the particular data value, the Context Storage 132 will supply to the Error Check Logic 130 stored intermediate value which identified to which limit, maximum or mininum, the data value of the preceding data byte was equal. From this information, the existence or non-existence of a between the limits error can readily be determined by relatively simple logic as shown on FIG. 12. A Decoder 140 responsive to the intermediate value stored in the Context Storage 132 will enable AND gates 142 and 144 if the preceding between limits check generated a signal signifying the data value contained in the preceding byte was equal to the maximum value. Alternatively, the intermediate value will enable AND gates 146 and 148 signifying that the data value contained in the preceding byte was equal to the minimum value. If on the second byte the Between Limits Checker 138 detects a maximum limit error (MXER) and AND gate 142 is enabled, the maximum limit erorr MXER will be recorded in the error status byte being generated in the Context Storage 132. In a like manner, if a minimum limit error (MNER) is detected on the second byte and the AND gate 146 is enabled, the minimum limit error (MNER) will be stored in the error status byte. If the second byte applies an equal to maximum (MXEQ) or equal to minimum (MNEQ) signal to the inputs of the AND gates 144 and 148, respectively, an intermediate value will again be stored in the Context Storage 132 and the final decision delayed to the next byte. The data value mask received by the Context Storage 132 from the Message Checker ROM 136 identifies the number of individual data values that are in the Data Value message being processed in which data bytes belong to data value. This mask is used by the Error Check Logic 130 to identify the last byte in each data value. On the last byte of any data value, only maximum or minimum limit errors will be recorded in the Context Storage error status bytes. The MXEQ and MNEQ signals will be ignored.

The Error Check Logic 130 will also detect if the message contained the correct number of bytes. The Context Storage 132 stores the message type (MT) code for each message being processed. In response to a message signal received with a message byte from a particular Receiver 32, the Error Check Logic 130 will decode the message type code stored in the Context Storage 132 and generate a number corresponding to the number of bytes that type of message should have. It will then compare this number with the byte count generated by the Sequencer 126 prior to receiving a new message signal from the Receiver 32 and will generate a message length error (LENER) signal when they are not the same. Because the length error (LENER) signal may not be generated until after the error status byte has been sent to the Fault Tolerator 36, the message length error signal will be passed to the Fault tolerator 36 in the error status byte for the next message received from that Node.

The format of the error status byte formed in the Context Storage 132 is shown in FIG. 13. In an ascending order of bit positions, starting with the least significant or zero bit position the error status byte contains a flag for the parity error (PARER) a flag for the length error (LENER) for the preceding message, a flag bit for the Node identification (NID) error, a flag bit for the data identification (DID) error, a flag bit for the message type (MT) error, a flag bit for the two's compliment range error (RNGER) and flag bits for the maximum and minimum limit (MXER and MNER) errors.

Returning to FIG. 11 the Data Multiplexer 128 transmits each message byte directly to the Fault Tolerator 36 is it is processed by the Message Checker 34. The Data Multiplexer will append to each message byte a descriptor byte which contains the Node identification code (NID) and the byte count (BYTC) received from the Sequencer 126 for that particular byte of the message. At the end of the message, independent of its length, the Data Multiplexer 128 will transmit the error status byte stored in the Context Storage 132 as the last byte. The last byte is identified by a byte count "15" so that it can readily be identified by the Fault Tolerator 36 for fault analysis.

FAULT TOLERATOR

The details of the Fault Tolerator 36 are shown on FIG. 14. The Fault Tolerator 36 has a Message Checker Interface 150 which receives the messages byte-by-byte after being checked by the Message Checker 34. Upon receipt of an error free Task Completed/Started message, the Message Checker Interface 150 will forward the identity (NID) of the Node which sent the message condition contained in the message to a Synchronizer Interface 152, the identity (TID) of the new task started, and the branch condition contained in the message to the Scheduler Interface 154. The Message Checker Interface 150 will also send the Node identification (NID) code and the message type (MT) code to a Voter Interface 158 and the data along with a partition bit to a Fault Tolerator RAM Interface 160. The Message Checker Interface 150 will also forward the error status byte (byte=15) generated by the Message Checker 34 to an Error Handler 164 for processing.

The Synchronizer 46 will report to the Error Handler 164 through the Synchronizer Interface 152 any errors it has detected in the Task Interactive Consistency (TIC) and System State (SS) messages. The Scheduler Interface 154 will forward to the Scheduler 40 the task identification (TID) code of the task started and the Node identity (NID) of each received Task Completed/Started message. In return, the Scheduler 40 will transmit to the Error Handler 164 through the Scheduler Interface 154 any errors it has detected.

The Tansmitter Interface 156 will forward to the Transmitter 30 to Base Penalty Count and Error messages generated by the Error Handler 164. As previously described, the Transmitter Interface 156 will load the first byte of the message to be transferred into the Transmitter's Input Register to signify it has a message ready for transmission. It will then await the reassertion of the buffer available (BAB) signal by the Transmitter 30 before forwarding the remainder of the message to the Transmitter 30 for transmission.

A Reset Generator 157 is responsive to a reset signal generated by the Error Handler 164 when it determines its own Node is faulty and to a power on reset (POR) signal generated when electrical power is first applied to the Node to generate an Operations Controller reset (OCRES) signal and an initial parameter load (IPL) signal which are transmitted to the other subsystems affecting a reset of the Operations Controller 12.

Figure 15:
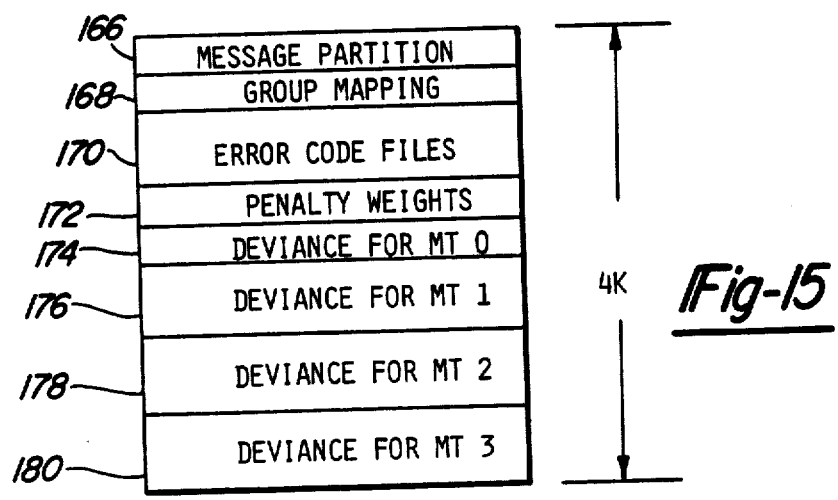
FIG. 15 shows the partitioning of the Fault Tolerator RAM.

The Fault Tolerator RAM Interface 160 will store in a Fault Tolerator RAM 162 the data contained in the message bytes as they are received from the Message Checker Interface 150. The Fault Tolerator RAM 162 is a random access memory partitioned as shown in FIG. 15. A message partition section 166, as shown on FIG. 15, stores in predetermined locations the messages received from each Node. In the message partition section 166 messages are reassembled to their original format using the identifier byte appended to the message bytes by the Message Checker 34. A double buffering or double partitioning scheme is used to prevent overwriting of the data that is still being used by the Voter 38. A context bit generated by the Message Checker Interface 150 determines into which of the two partitions the new data is to be written. Separate context bits are kept for each Node and are toggled only when the error status byte indicates the current message is error free. As previously discussed relative to the Message Checker 34, the message length (LENER) byte of the error status byte signifies that the preceding message had a message length error and, therefore, is ignored in the determination of an error free condition for the current message.

The format for a single message in the message partition section 166 is illustrated in FIG. 16. As shown, the message is reconstructed in its original format in the Fault Tolerator RAM 162 using the Node identification (NID) code and the byte count appended to each message byte in the Message Checker as a portion of the address. The content bit generated by the Message Checker Interface 150, along with the message partition code (bits 8 through 11) generated by the Fault Tolerator RAM Interface 160 completes the address and identifies which of the two locations in the message partition 166 the message from each Node is to be stored.

The Fault Tolerator RAM 162 has three sections used by the Error Handler 164 for generating the Base Penalty Count and Error messages.

An error code file section 170 stores the error codes used to generate the Error messages transmitted immediately after the beginning of each Atomic period and to generate the increment penalty count which is included in the Error message.

Since there are thirty-five different error detection mechanisms in each Operations Controller 12, there is a possibility of two to the thirty-fifth power of error combinations that may result from each message transmitted in the system. In order to reduce the number of combination of errors to a reasonable number, compatible with the state of the art storage capabilities of the Fault Tolerator RAM 162, the error reports from the various subsystems are formated into special error codes as they are received. The formated error codes, as shown on FIG. 17, include an identification of the subsystem which reported the error plus a flag indication of the errors detected. For example, the error status byte received from the Message Checker 34 is formated into two separate error codes. The first error code contains the subsystem code 0000 which reported the errors and the error flags from the four least significant bits of the error status byte. The second error code contains the sub-system code 0001 and the error flags from the four most significant bits of the error status byte. These error codes are stored in the error code file section 170 at an address defined by the faulty Nodes identification (NID) code and report number as shown in FIG. 19. The error code file section 170 is double partitioned the same as the message partition section 166 so that two error files are stored for each Node. The context bit generated by the Message Checker Interface 150 identifies in which of the two error files for that Node the error code will be reported.

Figure 20:
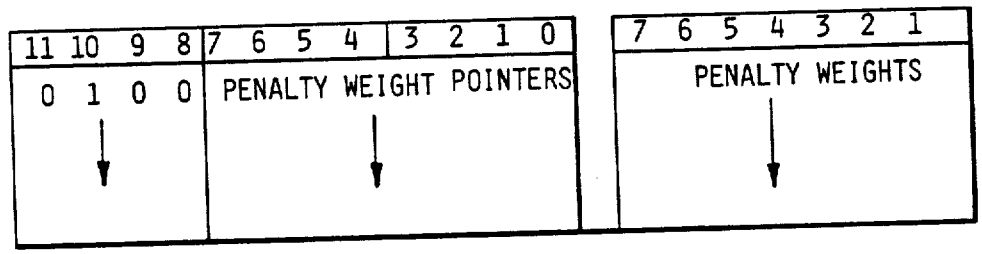
FIG. 20 shows the format of the Penalty Weight partition of the Fault Tolerator RAM.

Each error code is used to address a group mapping section 168 of the Fault Tolerator RAM 162. The error code addresses a penalty weight pointer, as shown in FIG. 18, which addresses a penalty weight section 172 of the Fault Tolerator RAM. As shown in FIG. 20, the penalty weight pointer addresses a specific penalty weight which is assigned to the specific combination of reported errors contained in the formated error code. The penalty weights resulting from each error code stored in the error file for that Node are summed in the Error Handler 164 and appended to the Error message as an increment penalty count (byte-8) for that Node. As previously indicated, the Error Handler 164 will generate only one Error message in each Atomic period for each Node which transmitted a message which contained an error.

The Fault Tolerator RAM 162 will also store the deviance limits for the one byte (MT0) two byte (MT1), and four byte (MT3 and MT4) Data Valye messages in four separate sections, 174, 176, 178 amd 180, which are used by the Voter 38, as shall be explained with reference to the Voter hereinafter.

Figure 21:
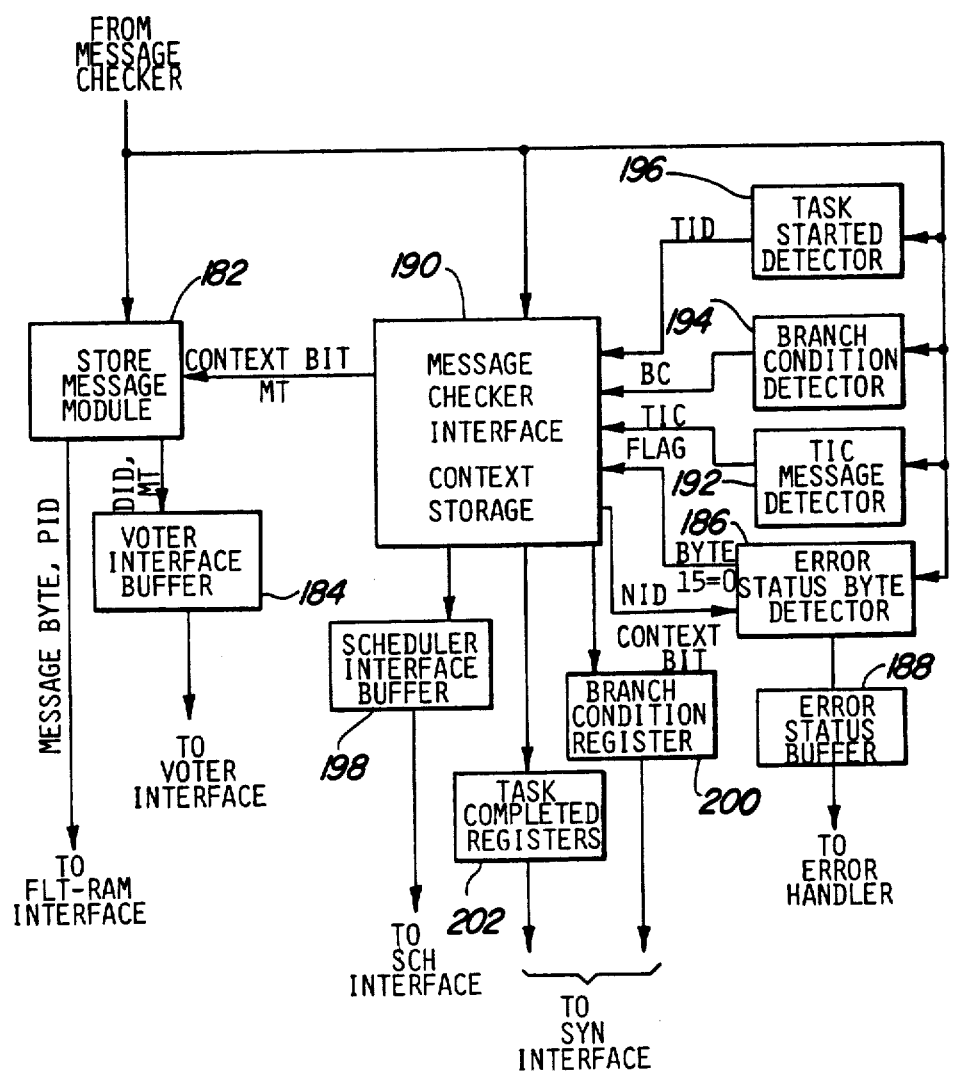
FIG. 21 is a block diagram of the Fault Tolerator's Message Checker Interface.

The details of the Message Checker Interface 150 are illustrated in FIG. 21. A Store Message Module 182 receives the message bytes directly from the Message Checker 34 and stores them in the message partition section 166 of the Fault Tolerator RAM 162. The Store Message Module 182 will add the context bits stored in the a Message Checker Interface Context Store 190 to the descriptor (NID plus byte count) appended to the message byte by the Message Checker 34 to generate a partition address (PID). The partition address identifies the location in the message partition section 166 where the particular message byte is to be stored. As previously discussed, at the beginning of each Master period, each Node will first transmit a Base Penalty Count message followed by a Task Completed/Started message. The Store Message Module 182 stores for each Node a first flag signifying the receipt of the Base Penalty Court message and a second flag signifying the receipt of the subsequent Task Completed/Started message. These flags are set to false at the beginning of each Master period and are reset to true when the Base Penalty Count and the Task Completed/Started messages are received for that Node. Unless both of these flags are set to true the Store Message Module 182 will disable the writing of the address of any subsequently received messages from that Node in a Voter Interface Buffer 184. As a result, the subsequently received data from that Node will not be processed by the Voter 38 and will be ignored during any subsequent processing. The Voter Interface Buffer is a 8×7 first in-first out buffer in which the four most significant bits are the four most significant bits of the partition address (context bits plus NID) for the received message in the message partition section 166 of the Fault Tolerator RAM 162. The remaining three bits are the message type code contained in the first byte of the message.

An Error Status Byte Detector 186 listens to the messages being transmitted from the Message Checker 34 to the Fault Tolerator 36 and will detect the receipt of each error status byte (byte 15) generated by the Message Checker 34. If the content of the error status byte, with the exception of the length error (LENER) bit, are all zones, the Error Status Byte Detector 186 will enable the Message Checker Interface Context Storage 190 to load the Voter Interface Buffer 184 through the Store Message Module 182, or to load a Task Completed Register 202 or to load a Branch Condition Register 200 as required. Otherwise the Error Status Byte Detector 186 will load each non-zero error status byte in an Error Status Buffer 188 for subsequent processing by the Error Handler 164. The Error Status Byte Detector 186 will also detect if a message is a self-test message (TID=NID) set a self-test flag in the Error Status Buffer 188. The Error Status Buffer 188 is an 8×12 first in-first out buffer in which the most significant bit is a self-test flag, the next three bits are the Nodes identification (NID) code and the remaining 8-bits are the received error status byte.

The Message Checker Interface Context Storage 190 temporarily stores for each Node the information contained in Table III. This information is temporarily stored since it is not known if the message is error free until the error status byte is received.

TABLE 3

| Message Checker Interface Context Storage | | |
|---|---|---|
| Bit | Description | When Written |
| 13 | TIC Flag | MT1, Byte Count = 2 (DID=0) |
| 12 | Partition Context Bit | Byte Count = 15 |
| 11-9 | Message Type Code | Byte Count = 1 |
| 8 | Branch Condition Bit | MT6, Byte Count = 4 |
| 7-0 | Started TID | MT6, Byte Count = 3 |

The most significant bit, bit 13, signifies that the received message is a Task Interactive Consistency (TIC) message which is processed by the Synchronizer 46. This flag is set by a Task Interactive Consistency Message Detector 192 in response to a message type MT1 having a data identification code which are all zero's, (DID=0) and will inhibit the loading of the address of this message in the Voter Interface Buffer 184 since it is only used by the Synchronizer and no other subsystem of the Operations Controller. The twelfth bit is the partition context bit which identifies in which partition of the message partition section 166 the message will be stored. The context bit is toggled when the Error Status Byte Detector 186 indicates the prior message was error free. If the message is not error free, the context bit is not toggled and the next message received from that Node is written over the prior message in the Fault Tolerator RAM 162.

The message type code bits are received directly from the first byte of the message. The branch condition bit, bit-8, is received from a Branch Condition Detector 194 which detects the branch condition contained in the fourth byte of the Task Completed/Started (MT6) message. The identification of the started task (TID) is obtained from a Task Started Detector 196 which loads the TID of the started task into the seven least significant bit locations of the Message Checker Interface Context Storage 190.

Upon the receipt of an error status byte which signifies that the received message was error free and if the message is not a Task Interactive Consistency message, the Message Checker Interface Context Storage 190 will transfer the context bit and the message type to the Store Message Module 182. In the Store Message Module 182, the context bit is added to the Node identification (NID) code to form the starting partition (PID) address of that message in the Fault Tolerator RAM 162. The message type code is appended to the partition address and they are transferred to the Voter Interface Buffer 184 for subsequent use by the Voter 38 to extract the data necessary for the voting process.

Upon the receipt of an error status byte signifying the receipt of an error free Task Completed/Started (MT6) message, the Message Checker Interface Context Storage 190 will transfer the identification (TID) code of the stared task and the Node identification (NID) code to a Scheduler Interface Buffer 198 where it is transferred to the Scheduler 40 when requested. The Scheduler Interface Buffer 198 is an 8×11 bit first in-first out buffer which is reset at the end of the soft error window (SEW). The soft error window is generated by the Synchronizer 46 and defines a period of time bracketing the end of each Subatomic period during which the time critical messages from other Nodes should be received if they are in synchronization with each other.

In parallel, the Message Checker Interface Context Storage 190 will transfer the stored branch condition (BC) bit to the Branch Condition Register 200 and transfer the node identification (NID) code of the Node that send the message to the Task Completed Register 202. These registers are read by the Synchronizer Interface 152 when requested by the Synchronizer 46. The Branch Condition Register 200 and the Task Completed Registers 202 are double buffered with a different set of registers being reset at the end of each hard error window (HEW) signal. The hard error window signal is generated by the Synchronizer 46 and brackets the soft error window (SEW) at the end of each Subatomic period and defines the maximum deviance in the arrival time of the time critical messages from the other Nodes. The function of the hard error window (HEW) and soft error window (SEW) will be discussed in greater detail in the detailed description of the Synchronizer 46.

Figure 22:
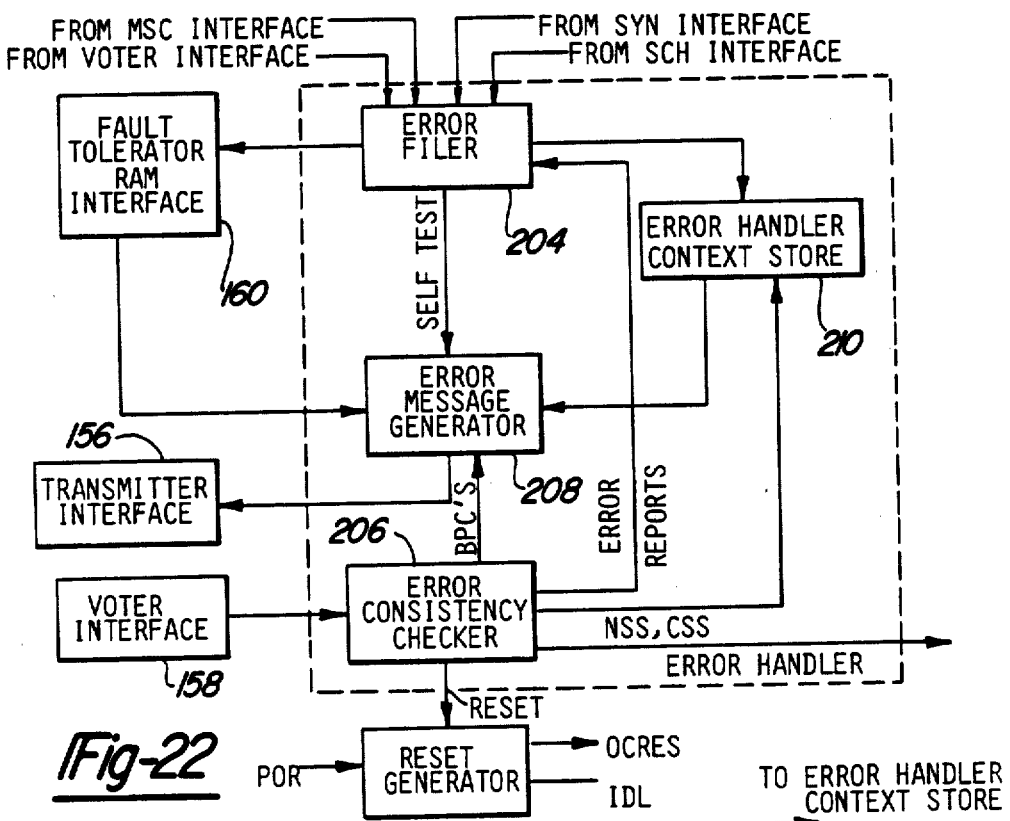
FIG. 22 is a block diagram of the Fault Tolerator's Error Handler.

The Error Handler, as shown on FIG. 22, incudes an Error Filer 204, an Error Consistency Checker 206, an Error Message Generator 208, and an Error Handler Context Store 210. The Error Filer 204 polls the Message Checker Interface 150, the Synchronizer Interface 152, the Scheduler Interface 154, and the Voter Interface 158 for error reports from the various subsystems within the Operations Controller. The Error Filer will format the received error reports into a formated error code, as shown on FIG. 17, and tag them with an error file address, as shown on FIG. 19. The error filer address is a 3-bit error file identification code, a context bit which is the one generated by the Message Checker Interface 150 for filing the message in the message partition of the Fault Tolerator RAM 162, the Node identification (NID) code and a report number. As previously described, the formated error code contains a 4-bit code which identifies the subsystem which detected the error and four flag bits identifying the errors detected.

The Error Filer 204 will pass these formated error codes to the Fault Tolerator RAM Interface 160 which will store them in the error code file section 170 of the Fault Tolerator RAM 162. The Error Filer 204 will also forward the number of error reports written to the Error Handler Context Store 210 so that the Error Message Generator 208 will be able to determine how many error reports to process from the Fault Tolerator RAM 162. The Error Filer 204 will also detect the self-test flag generated by the Message Checker 34 and forward this flag to the Error Message Generator 208. The self-test flag is part of one of the group codes whose penalty weight is programmed to be zero or a very small value. The self-test error message will identify all of the errors detected and will include the incremental and Base Penalty Count.

Figure 23:
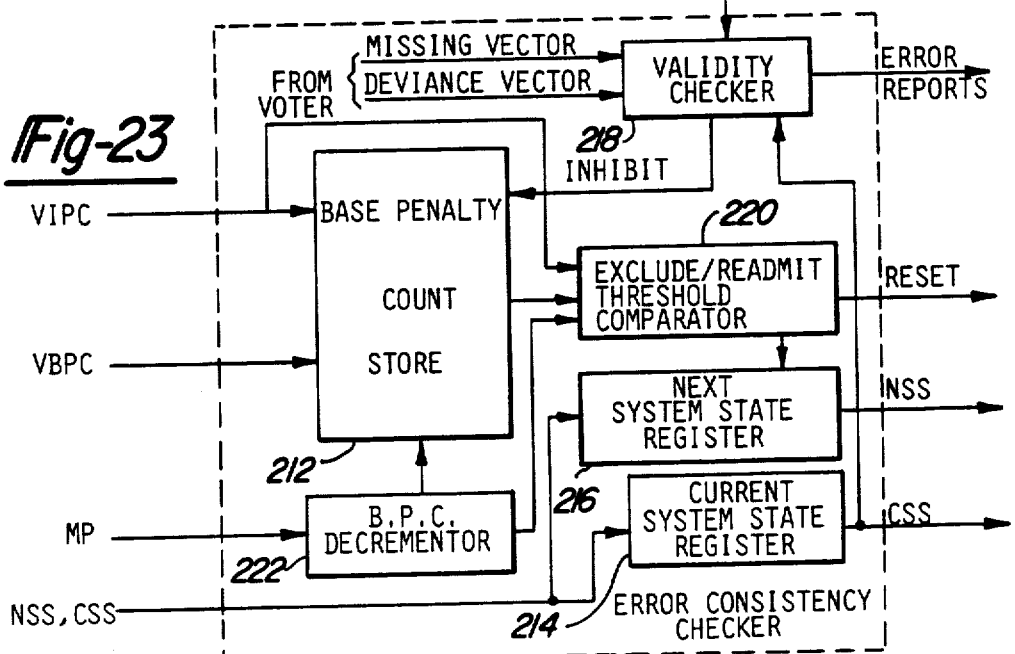
FIG. 23 is a block diagram of the Error Handler's Error Consistency Checker.

The Error Consistency Checker 206 is responsible for consistent handling of the error reports and the base penalty counts for each Node in the system. A form of implicit interactive consistency is used to achieve this goal. At the beginning of each Master period, the Error Consistency Checker 206 receives through the Voter Interface 158 a voted base penalty count (VBPC) which is generated by the Voter 38 in response to the Base Penalty Count messages received from all the Nodes in the system including its own. Referring now to FIG. 23, these voted base penalty counts are stored in a Base Penalty Count Store 212 as the base penalty counts for each Node independent of the values of the base value penalty count stored for the preceding Master period. In this manner all the Nodes in the system will begin each Master period with the same base penalty counts for each Node in the system. The Base Penalty Count Store 212 also receives a voted increment penalty count (VIPC) which is generated by the Voter 38 from the error messages received from all of the Nodes including its own. The voted increment penalty count (VIPC) is added to the base penalty count of the accused Node when the error is verified by a Validity Checker 218. Preferably the Validity Checker 218 is embodied in the Voter 38, but may be part of the Error Consistency Checker 206 as shown in FIG. 23.

The Error Consistency Checker 206 also maintains a Current System State Register 214 which stores a voted current system state (CSS) vector and a Next System State Register 216 which stores a next system state (NSS) vector. The current system state vector identifies which Nodes are currently active in the system and which are excluded, while the next system state vector identifies which Nodes are to be included and/or which are to be excluded in the next systems state of the system. The system will change its state at the beginning of the next Master period of the voted next system state vector is different from the current system state vector. The current and next system state vectors have 8 flag bits, one for each Node, which are set when the Node is excluded and which are reset when the Node is readmitted to the operating set of Nodes.

Prior to the discussion of the Validity Checker 218, the various types of errors that are detected in each Node will be discussed briefly. Table IV is a list of twenty-five fault detection mechanisms used in the systems.

TABLE IV

| Fault Detection Mechanisms | | |
|---|---|---|
| Error | Subsystem | Sym/Asym |
| Message Vertical Parity | MSC | A |
| Message Longitudinal Redundancy | MSC | A |
| Message Length | MSC | A |
| Synchronization - Hard | MSC | A |
| Synchronization - Soft | MSC | A |
| Send Node ID | MSC | S |
| Invalid Message Type | MSC | S |
| Invalid Data ID | MSC | S |
| Task ID Sequence | FLT | S |
| Data ID Sequence | FLT | S |
| Data Limit | MSC | S |
| Data Deviance | FLT | S |
| Task Run Time | SCH | S |

TABLE IV-continued

Fault Detection Mechanisms

| Error | Subsystem | Sym/Asym |
|---|---|---|
| Current System State | FLT | S |
| Next System State | FLT | S |
| Penalty Count Base Deviance | FLT | S |
| Penalty Count Increment Deviance | FLT | S |
| Missed BPC Message | FLT | S |
| Unsupported Error Report | FLT | S |
| Missing Error Report | FLT | S |
| Self Detection Monitor | FLT | S |
| M.P. Misalignment | SYN | S |
| Sync Sequence Error | SYN | S |
| Sync Missing Message | SYN | S |
| Too Many Data Messages | VTR | S |
| AP Reported Error | TSC | S |
| Last DID Shipped | TSC | S |
| Wrong Message during SEW | FLT | A |
| Too Many Error Reports | VTR | S |
| Too Many BPC | VTR | S |
| Exceeded Max. No. of Errors | FLT | A |

This table lists the error, the subsystem which detects the error, and whether the detection of the error is symmetric (S) or asymmetric (A). Since the system is symmetric in its structure, most of the errors contained in the messages transmitted to each other should be detected by every other Node. Therefore, every Node should generate an error message which identifies the error detected and the incremental penalty counts to be charged against the Node that made the error. These errors which are detected by all of the Nodes are called symmetric errors. Therefore, the existence of symmetric errors should be verified by at least a majority of the active Nodes in the system. There also is the case where channel noise occurs so that an error manifests itself differently among the receiving Nodes. In this case, the majority of the Nodes will agree which Node is faulty. However, the error or errors detected may be different for each Node and the incremental penalty count reported in the various error messages may likewise be different. A median vote on the incremental penalty count will be used to increment the base penalty count for that Node. However, the Validity Checker 218 will not generate a deviance error report to the Error Filer 204 identifying those Nodes whose incremental penalty counts differed from the voted incremental penalty count by more than the allowed amount. This is to prevent the unjust penalizing of a healthy Node.

Turning now to FIG. 24, the Validity Checker 218, whether embodied in the Voter 38 or the Fault Tolerator 36, has a Majority Agree Detector 224, an Asymmetric Error Detector 226, and an Error Reporter 230. The Majority Agree Detector 224 receives a "missing vector" from the Voter 38 indicating from which Nodes the Base Penalty Count or Error messages were not received and a "deviance vector" indicating which Nodes generated a Base Penalty Count or Error message in which the base penalty or increment penalty counts were outside of the permitted deviances about the voted values. The Majority Agree Detector 224 also receives a current system state vector from the Current System State Register 214. The Majority Agree Detector 224 will subtract the "deviance vector" and the "missing vector" from the current system state vector to generate a number corresponding to the number of Nodes which agree with the voted value. This number is then compared with the number of Nodes currently active in the system identified by the current system state vector. If a tie or a majority of the Nodes sent messages whose values agree with the voted values, then if the message is a Base Penalty Count message, the voted base penalty counts are stored in the Base Penalty Count Store 212. Otherwise, if the message is an Error message, the base penalty count stored in the Base Penalty Count Store 212 is incremented by the voted increment penalty count. If the messages received from the other Nodes do not represent a majority, then the Majority Agree Detector will generate a write inhibit signal which is applied to the Base Penalty Count Store 212 through an AND gate 234. This write inhibit signal will inhibit the writing of the voted values in the Base Penalty Count Store 212 provided the reported error or errors is not an asymmetric error.

The Asymmetric Error Detector 226 receives the deviance vector, the missing vector, the current system state vector, and generates a deviance report inhibit signal when a majority of the Nodes send error messages identifying a particular Node as faultly but they disagree as to the incremental penalty counts to be charged against the faultly Node. The Asymmetric Error Detector will interrogate the Error Handler Context Store 210 and will generate the deviance report inhibit signal when the detected errors are determined to be asymmetric errors of the type identified in Table IV. The deviance report inhibit signal will inhibit the Error Reporter 230 from reporting to the Error Filer 204 a deviance error for any Node which sent an error message containing an incremental penalty count which deviated from the voted incremental penalty count by more than the permitted tolerance. The deviance report inhibit signal is also applied to an inverted (negative) input of the AND gate 234. The deviance report inhibit signal will disable the AND gate 234 and block the write inhibit signal generated by the Majority Agree Detector 224. This will enable the voted incremented penalty count to be added to the base penalty count stored in the Base Penalty Count Store 212.

The Error Reporter 230, receives the missing and deviance vectors from the Voter 38, the current system state (CSS) vector from the Current System State Register 214, the error report inhibit signal from the Asymmetric Detector 226, and the write inhibit signal from the output of the AND gate 234. In response to the absence of a write inhibit signal, the Error Reporter 230 will report to the Error Filer 204 the Node identified in the deviance vector as having deviance errors, it will also report in response to the missing vector each Node which did not send a Base Penalty Count or Error message as required. In response to a write inhibit signal and the absence of a error report inhibit signal from the Asymmetric Error Detector 226, the Error Reporter 230 will report each Node having reported an unsupported error. No deviance errors are reported for these unsupported Error messages. Finally, in response to an error report inhibit signal from the Asymmetric Error Detector 226, the Error Reporter 230 will report to the Error Filer 204 any Node which fails to report the Asymmetric error as identified by the missing vector. As previously described, the Error Reporter 230 will not report any deviance errors in the presence of a deviance report inhibit signal from the Asymmetric Error Detector.

Returning to FIG. 23, the Error Consistency Checker 206 also includes an Exclude/Readmit Threshold Comparator 220 responsive to the incrementing of the base penalty count in the Base Penalty Count Store 212 by the voted increment penalty count. The Exclude/Readmit Threshold Comparator 220 will compare the incremented base penalty count with a predetermined exclusion threshold value and when the incremented base penalty count exceeds the exclusion threshold value, the Exclude/Readmit Threshold Comparator 220 will set the excluded flag in the next System State Register 216 in the bit position which corresponds to the faulty Node. The setting of the excluded flag signifies that in the next System State the Fault Tolerator has determined that the Node whose exclusion flag was set should be excluded from the operating set. At the end of each Atomic period, the current (CSS) and next (NSS) System State vectors are transferred to the Synchronizer 46 and are included in the next System State (MT5) message as the current system state and the new system state vectors, respectively. The new system state is globally verified by the Voter 38 upon the receipt of the System State messages from all of the participating Nodes in the system. The majority view of what the new system state is to be is the medial value generated by the voting process. Thus, an error in a local decision to exclude or include a Node will manifest itself as a deviance error.

Actual reconfiguration of the workload to the new voted system state is carried out by the Scheduler 40 and the time at which the sequence is initiated is based on an application's designer selectable parameter. Reconfiguration can either occur at the next Atomic period after which a new system state is globally verified or wait until the next Master period. If reconfiguration occurs at any Atomic period then the voted new system state vector is passed to the Scheduler 40 as a system state vector during normal transfer sequence between the Fault Tolerator and the Scheduler 40. However, if reconfiguration occurs at the Master period boundaries, the voted new system state vector is passed to the Scheduler 40 only when the flag signifying the last Subatomic period (LSAP) in the Master period is true.

To permit the readmittance of an excluded Node following an extended period of error free operation, the Error Consistency Checker 206 has a Base Penalty Count Decrementor 222 which will decrement the Base Penalty Count for each Node by a Predetermined quantity at the end of each Master period. After decrementing the base penalty count for each Node, the Base Penalty Count decrementor 222 will enable the Exclude/Readmit Threshold comparator 220 to compare the decremented base penalty count of each excluded Node with a predetermined readmittance value. The Exclude/Readmit Threshold Comparator 220 will reset the flag in the Next System State Register 216 for each previously excluded Node whose decremented base penalty count is less than the readmittance threshold value. This permits Nodes to be readmitted to the operating set the next time the system is reconfigured since its operation has been error free for an extended period of time. This error free operation indicates that the original fault was transient or had been corrected (repaired or replaced). Preferably, the readmittance threshold value is less than the exclusion threshold value to prevent the system from oscillating between two different system states if a Node has an intermittent fault which causes its base penalty count to fluctuate about the exclusion threshold value. The Base Penalty Count Store 212, the Current System State Register 214 and the Next System State Register 216, preferably, are incorporated in the Error Handler Context Store 210 but may be independent elements in the Error Consistency Checker 206, as shown in FIG. 23.

The Exclude/Readmit Threshold Comparator 220 will also detect the exclusion of its own Node and generate a RESET signal which activates a Reset Generator 157 shown in FIG. 22 to generate an Operations Controller Reset signal (OCRES) and an Initial Parameter Load signal (IPL) which will cause the Operations Controller to reset and reload the initial parameters as previously described. The Reset Generator 157 is also responsive to the Power On Reset (POR) signal to generate the OCRES and IPL signals each time the electrical power to the Operations Controller is turned on.

The Error Message Generator 208 will generate, during each Atomic period, an Error Message for each Node which generated a message containing an error detected by its own Operations Controller. The Error Message Generator 208 will also generate a Base Penalty Count Message at the beginning of each Master period. These messages are transmitted to the Transmitter 30 through the Transmitter Interface 156.

At the beginning of each Atomic period, the Error Message Generator 208 will set to zero (0) the Increment Penalty Count for each Node. It will then check the error code file section 170 of the Fault Tolerator RAM 162 for any error reports. The error code of each error report is used to address the Group Mapping Section 168 to obtain the pointer to the penalty weight section 172 of the Fault Tolerator RAM 162 to extract a penalty weight. This penalty weight is stored as the Increment Penalty Weight for the faulty Node in the Error Handler Context Store 210 and is used to increment the base penalty count currently being stored for that Node. This process is repeated for each reported error for each Node until the Fault Tolerator receives a System State message signifying the end of the Atomic period for each individual Node. In response to receiving a System State message from a particular Node, the increment penalty count and base penalty count for that Node are frozen. The Message Generator will then, using the content of the error code file section 170 of the Fault Tolerator RAM 162 and the stored increment penalty count and the base penalty counts stored in the Error Handler Context Store 210 construct an error message for each Node for which a fault was detected. In the event a System State message is not received from a faulty Node, the base penalty count and the increment penalty count will be frozen by sensing the High End of Fuzzy (HEOF) signal generated by the Node's own Synchronizer 46 which signifies that all valid State messages should have been received. This prevents the transmission of the error and base penalty count messages from being hung up while waiting for the missing System State message.

The format of the four (4) error bytes of the Error message (bytes 3 through 7) are shown in FIG. 25. The most significant bit of the first Byte is a self-test flag which identifies that the reported errors were detected in a Self-Test message. In a Self-Test Error message, the increment penalty count Byte 8 will have a small value or be zero.

At the beginning of each Master period, the Error Message Generator 208 will retrieve the base penalty counts currently stored for each Node and will generate a Base Penalty Count message which is the first message transmitted after the System State message which is sent by the Synchronizer 46 at the end of the last Atomic period in each Master period. As discussed relative to the Transmitter 30, the Transmitter's Message Arbitrator 56 will poll the Fault Tolerator Interface 52 after it sends a System State message at the end of the Master period, then wait for a Base Penalty Count message generated by the Fault Tolerator 36.

Figure 26:
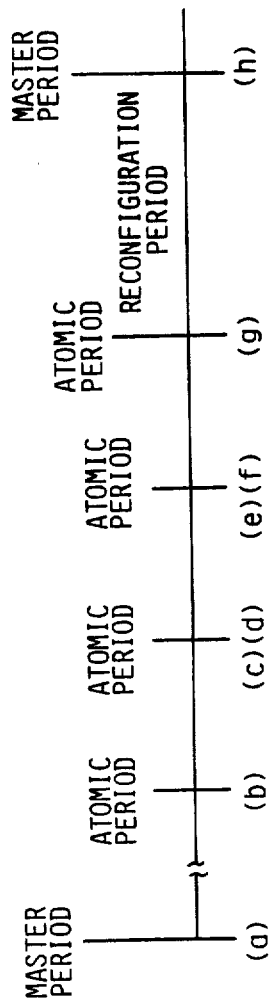
FIG. 26 is a timing diagram of the reconfiguration sequence.

FIG. 26 depicts the sequence of operations of the Operations Controller which results in a reconfiguration of the system and the role played by the Fault Tolerator 36. Referring to FIG. 26, at the beginning of each Master period, (a) signifies each Node will broadcast its Base Penalty Count message and reset all of the increment penalty counts in its Error Handler Context Store to zero. The Error Handler 164 will then begin the processing of any errors detected by its own Operations Controller's error detection mechanisms. At the end of the first or any subsequent Atomic period, (b), in which a message containing an error occurs, each Node will broadcast Error messages identifying the Node which sent the message for which the errors were detected and the increment penalty count and the base penalty count for that Node. By the end of the next Atomic period (c) the Error messages from all of the Nodes should have been received. During the next Atomic period (d) the Fault Tolerator will process the received Error messages and detect any unsupported Error messages from other Nodes and perform a medial vote on the increment penalty count for the accused Node whose reported error or errors are supported by a majority of the Nodes. This medial increment penalty count is then added to the base penalty count of the accused Node. The incremented base penalty count is then compared with the exclusion threshold. If the incremented base penalty count exceeds the exclusion threshold, the exclusion bit for that Node is set in the next System State Vector which is passed to the Synchronizer 46. At the end of that Atomic period, (e) the Synchronizer 46 will include the next System State Vector in the System State message which is broadcast to all of the other Nodes. At the beginning of the next Atomic period (f) the Fault Tolerator 36 will verify the correctness of the next System State by using a median vote of the healthy Nodes and pass this information to the Synchronizer 46 and to the Scheduler 40. Upon receipt of this information (g) the Synchronizer 46 and the Scheduler 40 will initiate a reconfiguration process in which the System State identified in the voted next System State Vector becomes the current System State for the System. After the reconfiguration is completed (h) the system will begin a new Master period in the new System State. Although the above example is directed to a single fault by a single Node, the Fault Tolerator operation is no different if more than one fault is detected for any one Node and more than one Node is accused of being faulty in the received Error messages. This sequence can be overliad if successive failures occur in different Atomic periods.

VOTER

Figure 27:
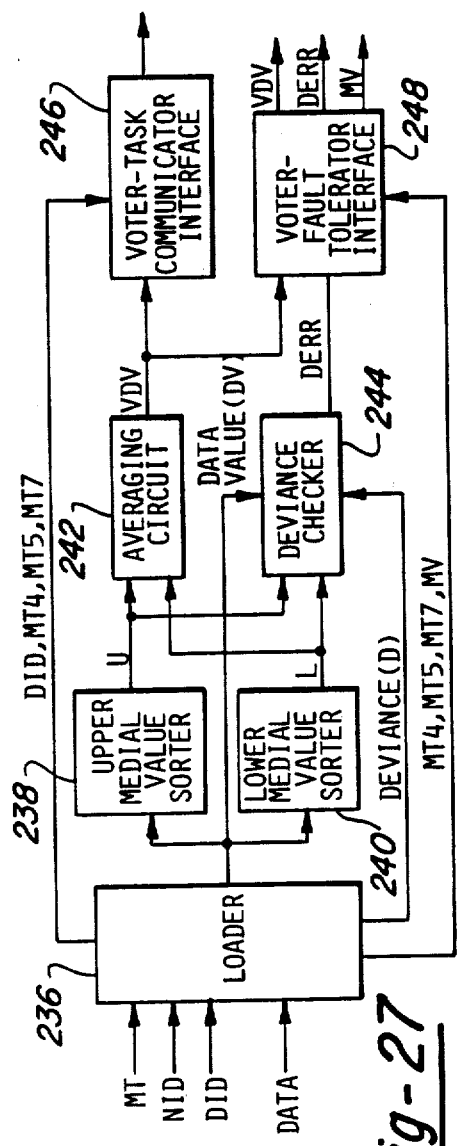
FIG. 27 is a block diagram of the Voter Subsystem.

The Voter 38 performs two primary functions in the processing of the data. First it generates a voted value for all available copies of the data and second, it performs a deviance check to determine if the data value of each copy of the data is within a predetermined tolerance or allowed deviance. Referring to FIG. 27, the Voter 38 has a Loader 236 which receives from the Fault Tolerator 236, the message type (MT) code, the node identification (NID) code, and the data identification (DID) code for each message for which a voted value is to be generated. As each such message is received, the Loader 236 will retrieve and temporarily store each copy of the data currently available in the Fault Tolerator RAM 162, which has the same data identification (DID) code as the received message. The Loader 236 will also, using the message type code, retrieve from the deviance sections, 174 through 180, of the Fault Tolerator RAM 162 the predetermined deviances for that particular message.

The Loader 236 will first transmit the most significant bit of each copy of the data in parallel to an Upper Medial Value Sorter 238 and a Lower Medial Value Sorter 240 which will, respectively, sort the received bits to generate an upper ($U_n$) and a lower ($L_n$) medial bit value. These upper and lower medial bit values ($U_n$ and $L_n$) are transferred, as they are generated, to an Averaging Circuit 242 and a Deviance Checker 244. At the end of the hard error window (HEW) the Loader 236 wil generate a missing vector (MV) identifying each Node which did not send a Task Interactive Consisteny or System State message. The Loader 236 will also generate a missing vector at the end of each Atomic period identifying each Node which did not generate an Error Message or a Base Penalty Count message.

The Averaging Circuit 242 adds the upper and lower median bit values and divides the sum by two to produce a voted average.

The Deviance Checker 244 receives the upper ($U_n$) and the lower ($L_n$) medial bit values, the deviance values retreived from the Fault Tolerator RAM 162 and the corresponding data bit from each copy of the data being processed and will determine for each bit in each copy of the data value whether or not it is within the allowed deviance. This process is repeated for each bit in each copy starting with the most significant bit to the least significant bit. At the end of each message, a deviance error (DERR) vector is sent to the Fault Tolerator 36 identifying each Node whose message contained a deviance error.

The voted data value generated by the Averaging Circuit 242 for the Data Value messages (MT0, MT1, MT2, and MT3) are transmitted to a Voter-Task Communicator Interface 246 which passes them to the Task Communicator 44 along with the data identification (DID) code for that data value. The voted values for the base penalty counts contained in the Base Penalty Count messages, the voted values for the current and new System State Vectors contained in the System State messages and the voted values for the incremental and base penalty counts in the Error messages are transmitted to a Voter-Fault Tolerator Interface 248 where they are passed to the Fault Tolerator 36 along with the deviance error (DERR) and the missing vector, as previously described.

The voting process and the deviance checks are repeated each time a message is received which requires a voted value to be generated. This assures that at all times the Task Communicator 44 and the Fault Tolerator 36 will have the best and most current voted values for the data value they may need. Using this type of on-the-fly voting, the system will not hang up if one or more copies of the data is unavailable due to a detected fault in the received message or a faulty Node fails to generate the required message.

The Upper and Lower Medial Value Sorters 238 and 240, respectively, extract two values from the data values being processed. The values chosen depend upon whether the median select (MS) or the median of the medial extremes (MME) voting is implemented. To avoid confusion, only the implementation for extracting the upper and lower median values will be discussed. Minor changes to implement the mean of the medial extremes (MME) sorting will be discussed briefly hereinafter.

Figure 28:
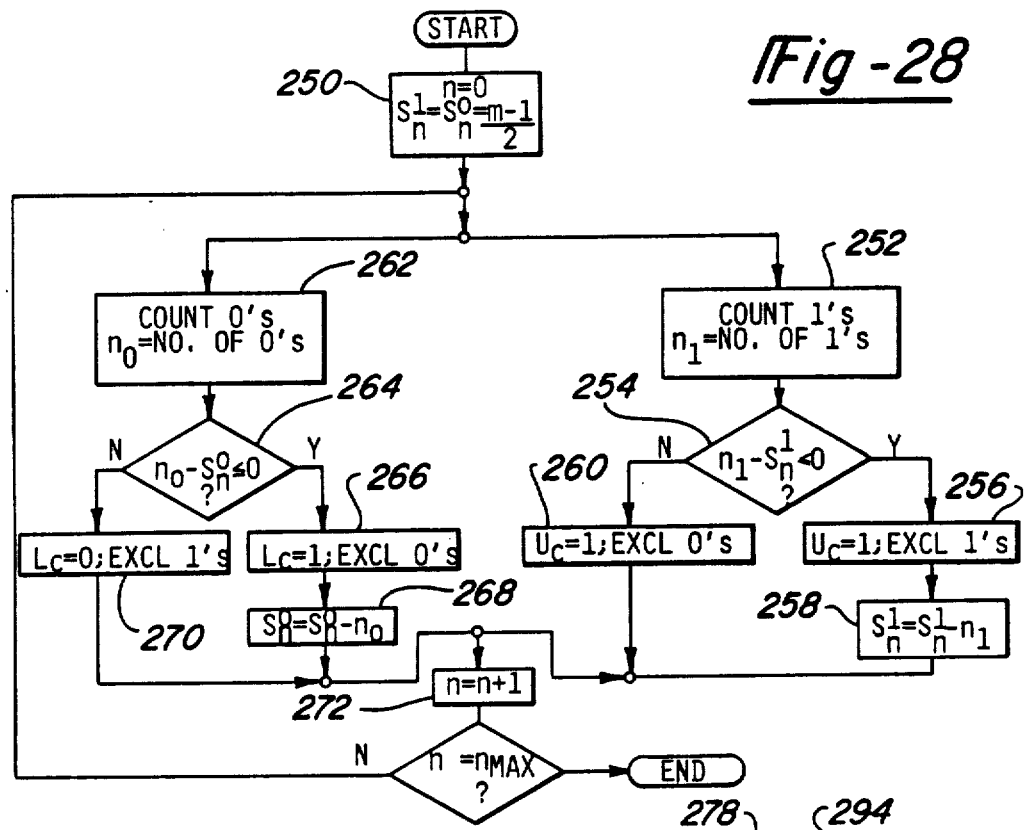
FIG. 28 is a flow diagram of the Upper and Lower Medial Value Sorters.
Figure 29:
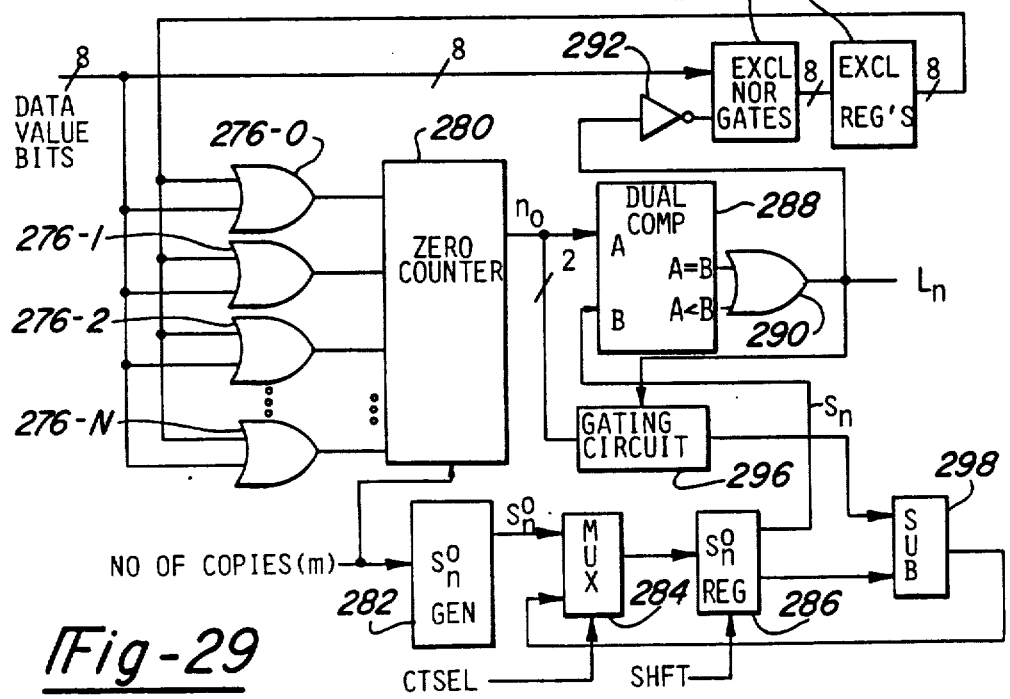
FIG. 29 is a circuit diagram of the Lower Medial Value Sorter.

The process used by the Upper and Lower Medial Value Sorters 238 and 240 are shown on the flow diagram illustrated in FIG. 28, while the details of the circuit for the Lower Medial Value Sorter 240 are shown in FIG. 29. Since the Upper Medial Value Sorter 238 is a mirror image of the Lower Medial Value Sorter 240, it need not be shown or discussed in detail.

Referring first to FIG. 28, the process begins by initializing the bit count (n) to zero and to generate an initial median value $S'_n = S^*_n = (m-1)/2$ as shown in block 250. In the calculation of the initial median value $S^*_n$, m is the actual number of copies of the data being processed which is obtained from the Loader 236. The Upper Medial Value Sorter 238 then counts, as shown in block 252, the number of ones (1's) contained in the most significant bit positions of all the copies to generate a number $n_1$, which is the number of one bits counted. The Upper Medial Value Sorter 238 will then inquire if $n_1 - S'_n$ is equal to or less than zero, as shown in decision block 254. If the number of 1's is less than $S'_n$ than the upper medial bit value is a 0-bit as indicated in block 256. If the upper medial value $U_n$ is a 0-bit, then all the copies having a 1-bit in the same bit position are excluded from the subsequent processing to determine the value of the remaining upper medial value bits. Because some copies of the data value are now excluded, a new value $S'_n$ is computed as indicated in block 258 by subtracting from $S'_n$ the number of excluded copies ($n_1$) to generate a new value for the analysis of the next highest bit.

When the number of 1-bits is greater than $S'_n$ then the upper median value $U_n$ is a 1-bit as indicated in block 260, and all of the copies having 0-bits in the same bit position are excluded from the subsequent processing. After the upper median value $U_n$ for the most significant bit is determined, the process will proceed to the next most significant bit, block 272, and the above procedure is repeated until all the bits in the data value ($n = n_{max}$) have been processed as indicated in decision block 274.

In a similar manner, the Lower Medial Value Sorter 240 will count the number of 0's as indicated in block 262 to generate a number $n_o$ equal to the number of 0's counted. If the number of 0's ($n_o$) is less than $S^*_n$, as indicated in decision block 264, ($n_o - S^*_n \leq 0$) then the lower medial bit ($L_n$) is a 1-bit and all the data copies having a 0-bit in the same bit position are excluded from processing of the subsequent lower medial bits. Again the medial value $S^*_n$ is corrected by subtracting the number of excluded copies ($n_o$) from the preceding values for $S^*_n$ as indicated in block 268. If the number of 0-bits ($n_o$) is greater than $S^*_n$, then the lower medial value of the bit position is a 0-bit as indicated in block 270 and the data copies having a 1-bit in the same bit position are excluded. This process is repeated until all of the lower medial value bits are determined.

The circuit details for the Lower Medial Value Sorter 240 are shown in FIG. 29. The circuit details for the Upper Medial Value Sorter 238 are the mirror of the circuit shown in FIG. 29 except that a Zero Counter 280 is replaced by an equivalent One Counter. Referring to FIG. 29, the data values from each copy of the data value retrieved by the Loader 236 are received bit by bit, from the most significant value to the least significant value, by a plurality of OR gates 276-0 through 276-N, and to a like plurality of exclusive NOR gates collectively indicated by block 278. The OR gates 276-0 through 276-N will pass the received bits to the Zero Counter 280. The Zero Counter 280 will actually count the number of 1-bits received and subtract that number from the number of copies (m) being processed to generate the number of 0's ($n_o$). The Loader 236 counts the number of copies of the data it retrieves from the Fault Tolerator RAM 162 and supplies this number to the Zero Counter 280 and to an $S^*_n$ Generator 282. The $S^*_n$ Generator 282 subtracts one from m and divides the remainder by two to generate the initial value for $S^*_n$.

The output of the $S^*_n$ Generator 282 is received by a 2:1 Multiplexer 284 which will pass the initial value of $S^*_n$ to a Register 286. The output ($n_o$) of the Zero Counter 280 and the content of the Register 286 are received by a Dual Comparator 288 which performs the dual comparison of $n_o = S^*_n$ and $n_o < S^*_n$. The outputs of the Dual Comparator 288 are applied to the inputs of an OR gate 290 which outputs the lower medial value $L_n$. If $n_o = S^*_n$ or $n_o < S^*_n$, then the lower medial bit value $L_n$ is a 1-bit, as indicated by decision block 264 and block 266 of FIG. 28. The exclusion of the copies having 0-bits in the same bit position is performed by the Exclusive NOR gates 278 and Register 294. The 1-bit value produced by the OR gate 290 is applied to the input to each of the Exclusive NOR gates. The exclusive NOR gates 278 will generate a logical 1 signal for each copy of the data value which has a 0-bit in the same bit position. This logical 1 is stored in the Exclusion Register 294, the output of which is connected to the alternate inputs of OR gates 276-0 through 276-N. As a result, the inputs of their respective OR gates 276-0 through 276-N whose data has a 0-bit in the same bit position will be a 1-bit which is passed to the Zero Counter, thereby excluding them from further participation in the determination of the lower medial bit values. If the lower medial bit value, $L_n$, is a 0, then a logical 0 signal is applied to the Exclusive NOR gates 278 which causes a logical 1 to be stored in the Exclusion Register 294 for each copy of the data value which presented a 1-bit for processing.

The output, $n_o$, from the Zero Counter 280 and the lower medial bit value $L_n$ are applied to the input of a Gating Circuit 296 which passes the value of $n_o$ to a Subtraction Circuit 298 when the lower medial bit value $L_n$ is equal to 1. The Subtraction Circuit 298 also receives the current value of $S^*_n$ stored in Register 286, and performs the subtraction $S^*_n = S^*_n - n_o$ indicated in block 268 of FIG. 28. This new value of $S^*_n$ is applied to a second input of the Multiplexer 284 and is passed to the Register 286 for use in the processing of the next lower medial bit value. A sequencer circuit (not shown) will monitor the number of bits processed and will clear the Exclusion Register 294 and $S^*_n$ Register 286 after the last lower medial bit $L_n$ is generated for the current set of data values in preparation for the processing of the next set of data values.

The operation of the Upper Medial Value Sorter 238 and the Lower Medial Value Sorter 240 for producing upper ($U_n$) and lower ($L_n$) medial values for generating a Mean of the Medial Extremes (MME) voted value is identical to that described above except that the medium values $S'_n$ and $S^*_n$ are replaed with values $T'_n$ and $T^\circ_n$ which are the smallest of $S'_n$ and $S^*_n$, respectively, or a fixed value. The resulted voted value generated by the Averaging Circuit 242 using these values is then the Mean of the Medial Extremes.

The operation of the Averaging Circuit 242 will be explained with reference to the flow diagram shown in FIG. 30 and the circuit diagram shown in FIG. 31. The averaging process forms the mean of the upper and lower values by keeping two versions of the mean value M and choosing between them as later bits arrive. This process rests on the following two facts:

(a) If the bits $U_n$ and $L_n$ are identical at any particular bit position, the mean bit M is the same except for the case described in (b) below. If the bits are different, then the mean is $\frac{1}{2}$, which in binary form is a 0.1; and (b) A sequence $\frac{1}{2}, \frac{1}{2}, \frac{1}{2}, \ldots \frac{1}{2}$ can be resolved into a binary format only when the first identical pair following the sequence arrives. For example, the sequence $\frac{1}{2}, \frac{1}{2}, \frac{1}{2}, \ldots \frac{1}{2}, 0$, where 0 represents the arrival of $U_n$ and $L_n$ both having 0 values, resolves to 011 . . . 11 and the sequence $\frac{1}{2}, \frac{1}{2}, \frac{1}{2}, \ldots \frac{1}{2}, 1$ where 1 represents the arrival of $U_n$ and $L_n$ both having 1 values resolves to 100 . . . 00.

Figure 30:
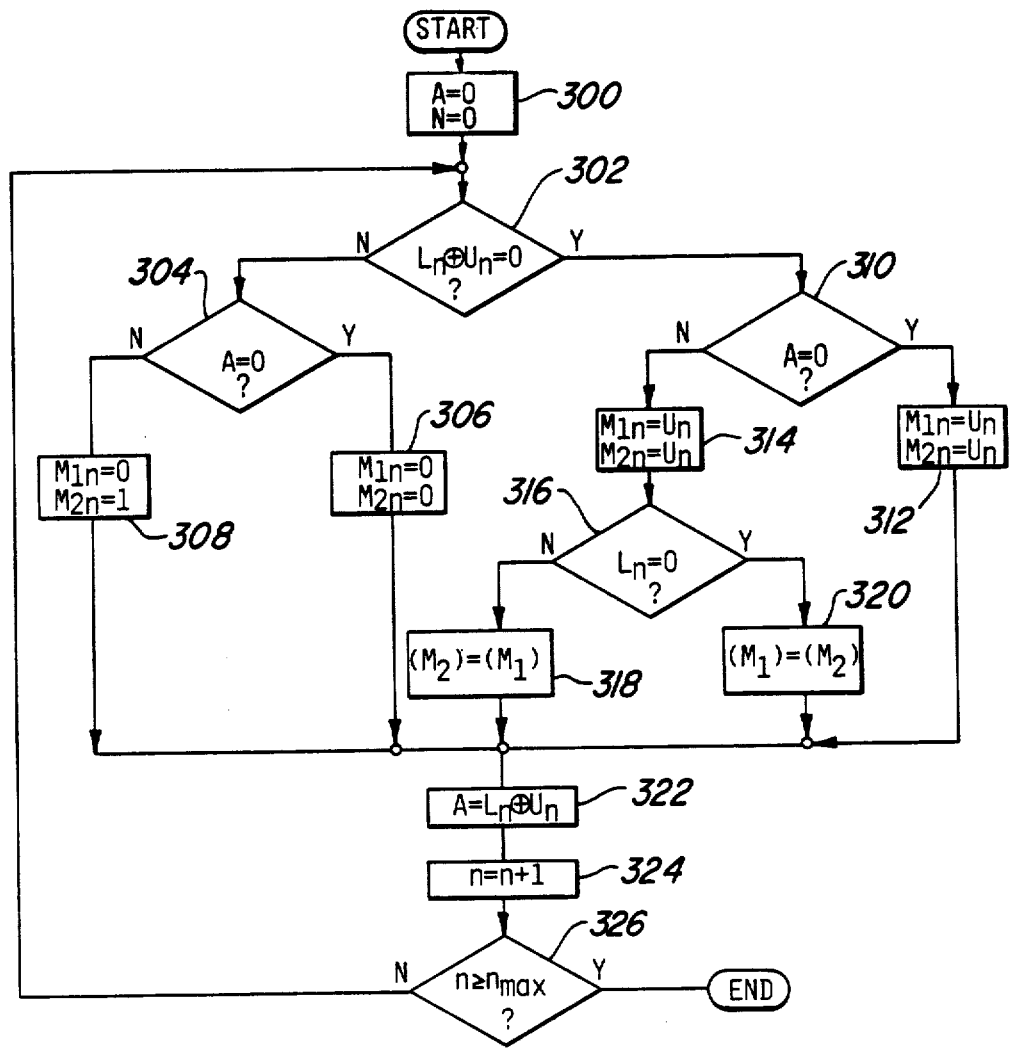
FIG. 30 is a flow diagram for the Averaging Circuit.

Referring to FIG. 30, the process begins by initializing the value A to 0 and the bit number n to 0 as indicated by block 300. The value A is the Exclusive OR of the preceding values of $L_n$ and $U_n$ and is set to 0 at the beginning of the process. The process then inquires decision block 302 if the Exclusive OR of $L_n$ and $U_n$ is equal to zero ($L_n \oplus U_n = 0$). If the Exclusive OR of $L_n$ and $U_n$ is equal to zero, the process then inquires if A is equal to 0, as indicated by decision block 310. If A is equal to 0, the value of $L_n$ is inserted into both registers $M_1$ and $M_2$ as indicated by block 312. Register $M_1$ and $M_2$ keep two different versions of the mean M in order to resolve the problem discussed above in (b) where $U_n$ and $L_n$ are different. If A in decision block 310 is not equal to 0, then the Averaging Circuit 242 enters the complement ($\overline{U}_n$) of $U_n$ into registers $M_1$ and $M_2$ as indicated by block 314. The process then inquires, decision block 316, if $L_n$ s equal to 0. This is the resolution of the sequences discussed in (b) above, if the sequences exist. In the instant embodiment $M_1$ stores the sequences (1, 0, 0, . . . 0, 0) described above and $M_2$ stores the second sequence (0, 1, 1, . . . 1, 1). If $L_n = 0$ then the sequence is resolved to be the sequence stored in $M_2$, therefore, $M_1$ is made equal to $M_2$, as indicated in block 320. Otherwise, if $L_n$ is not equal to 0, then $L_n$ is a 1, and the sequence is resolved to be the sequence stored in $M_1$ and $M_2$ is made equal to $M_1$, as indicated in block 318.

If the Exclusive OR of $L_n$ and $U_n$ in decision block 302 is equal to 1 signifying $L_n$ and $U_n$ are different, the process inquires, decision block 304, if this is the first time this has occurred (A = 0). If A = 0, then 1 is inserted into the corresponding bit position of the register $M_1$, starting the sequence (1, 0, 0, . . . 0, 0) and a zero is inserted into the register $M_2$ starting the sequence (0, 1, 1, . . . 1, 1). If A = 1 signifying that this is not a first occurrence of $L_n$ and $U_n$ being different, a zero is inserted into the corresponding bit positions of register $M_1$ and a 1 is inserted in the corresponding bit positions of register $M_2$. The process then generates a new value for A depending upon the exclusive OR of the current values of $U_n$ and $L_n$ as indicated by block 322. The process will then index the bit count to $n = n + 1$, block 324, then inquire, decision block 326, if the last bit ($n_{max}$) has been processed. If not, the Averaging Circuit 242 will proceed to process the next values of $U_n$ and $L_n$ generated by the Upper and Lower Medial Value Sorters 238 and 240, respectively.

Figure 31:
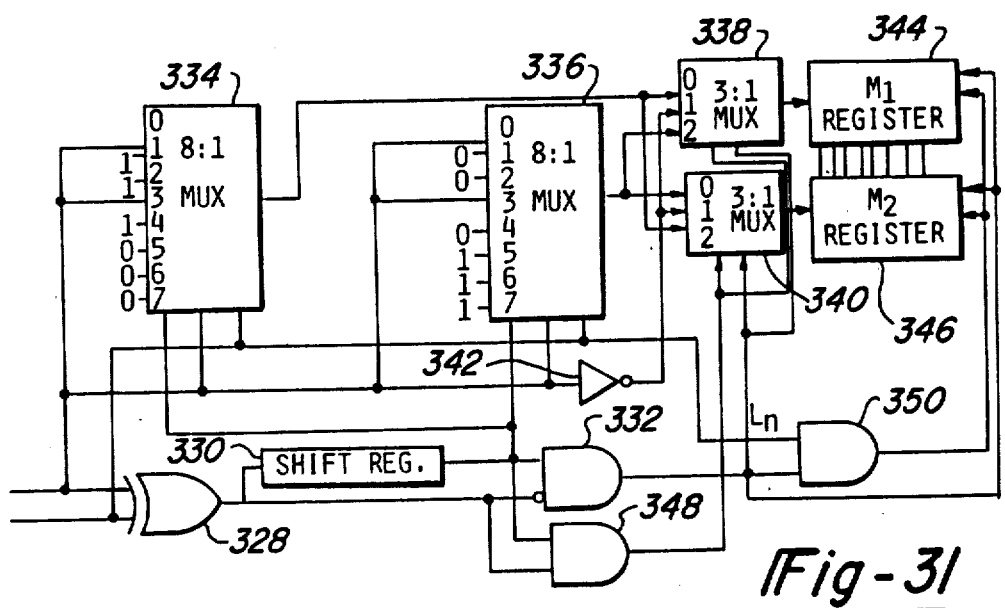
FIG. 31 is a circuit diagram of the Averaging Circuit.

Referring now to FIG. 31, the medial values, $U_n$ and $L_n$, respectively, are received by an Exclusive OR gate 328 which produces a 1 at its output when $U_n$ and $L_n$ are different and a 0 bit at its output when $U_n$ and $L_n$ are the same. The output of the Exclusive OR gate 328 is transmitted to the input of a 2-bit Shift Register 330 an inverted input of AND gate 332 and an input of AND gate 348. The Shift Register 330 temporarily stores the output of the Exclusive OR gate 328 for use in processing the next $U_n$ and $L_n$ bits received from the Upper and Lower Medial Value Sorters 238 and 240. The delayed output of the Shift Register 330 is the value A discussed with reference to FIG. 30. The upper medial bit $U_n$ is also applied to the 0 and 3 inputs of a pair of 8:1 Multiplexers 334 and 336. The other inputs to Multiplexers 334 and 336 are preset as shown. The values of A, $U_n$, and $L_n$ are used to address the Multiplexers 334 and 336 to output the value $U_n$ or one of the present values. For example, if $A = L_n = U_n = 0$ then the Multiplexers 334 and 336 would both output the 0 input which is the value of $U_n$ as indicated by block 312 in FIG. 30. Likewise, if $A = 0$ and $L_n = U_n = 1$ then the Multiplexers 334 and 336 would both output the value of $U_n$ applied to the third input to the Multiplexers 334 and 336 which is the value of $U_n$. In the first example, $U_n$ was equal to 0 and in the second example, $U_n$ was equal to 1. Note, if A is 0 and $U_n$ and $L_n$ are different then the Multiplexer 334 will output a 1 and the Multiplexer 336 will output a 0 as indicated by block 306. However, if $A = 1$ and $L_n$ and $U_n$ are different, the outputs of the Multiplexers 334 and 336 will be reversed as indicated by block 308 of FIG. 30.

The outputs of the Multiplexers 334 and 336 are received by 3:1 Multiplexers 338 and 340 as shown. The Multiplexers 338 and 340 also receive the outputs of an Inverter 342 which is the complement ($\overline{U}_n$) of the upper medial bit value $U_n$. The outputs of the 3:1 Multiplexers 338 and 340 are received by a $M_1$ Register 344 and $M_2$ Register 346, respectively. The outputs of the 3:1 Multiplexers 338 and 340 are controlled by NAND gate 332 and AND gate 348. The NAND gate 332 produces a logical 1 output when the output of Exclusive OR gate 328 is 0 and and the value A is 1. This actuates the 3:1 Multiplexers 338 and 340 to store the complement of $\overline{U}_n$ of the upper medial bit value in both the $M_1$ Register 334 and the $M_2$ Register 346, respectively, as indicated by block 314 of FIG. 30. The AND gate 348 produces a logical 1 output when the output of the Exclusive OR gate 328 is a 1 and A is a 1 which causes the output of the Multiplexer 334 to be stored in the $M_2$ Register 346 and the output of Multiplexer 336 to be stored in the $M_1$ Register 346 as indicated by block 308 in FIG. 30.

The output of the NAND gate 332 is also used to actuate the $M_1$ Register 344 and the $M_2$ Register 346 to copy the content of the $M_1$ Register 344 into the $M_2$ Register 346 or vice versa depending upon the value of $L_n$ as indicated by block 316 in FIG. 30. The output of the NAND gate 332 and the lower median bit $L_n$ are applied to the inputs of an AND gate 350, the output of which determines whether the content of the $M_1$ Register 344 will be transferred to the $M_2$ Register 346 or vice versa as indicated by blocks 318 and 320 of FIG. 30.

Figure 32:
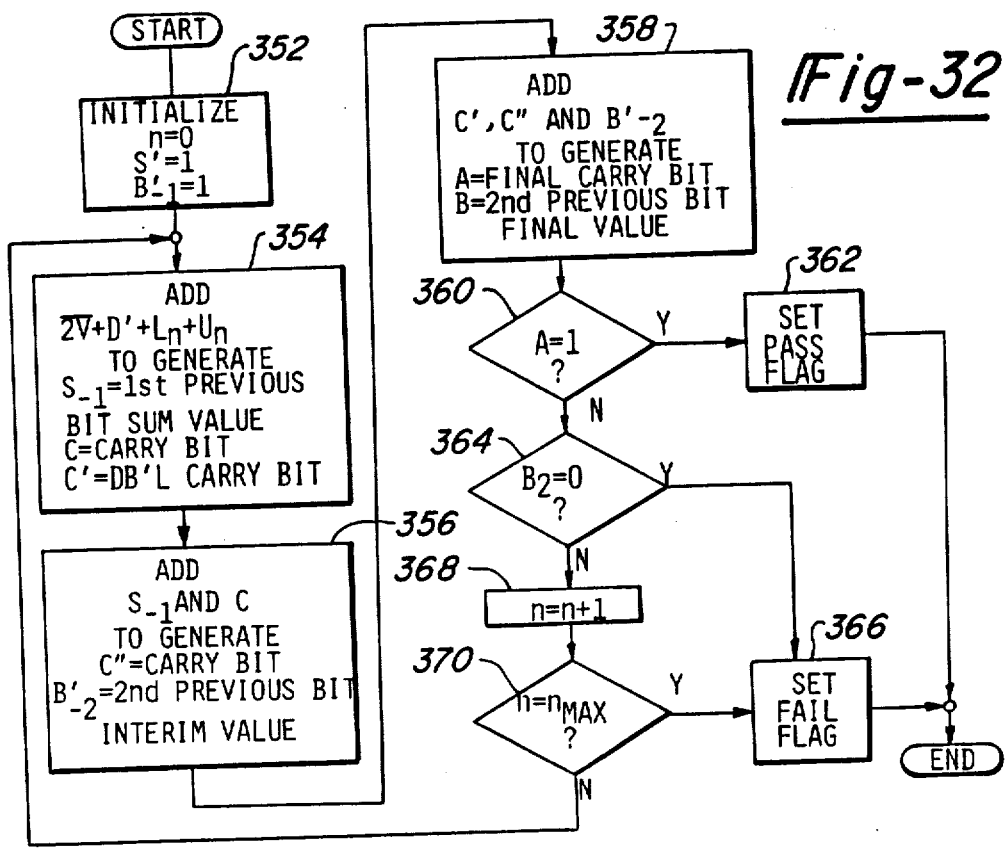
FIG. 32 is a flow diagram of the Deviance Checker.
Figure 33:
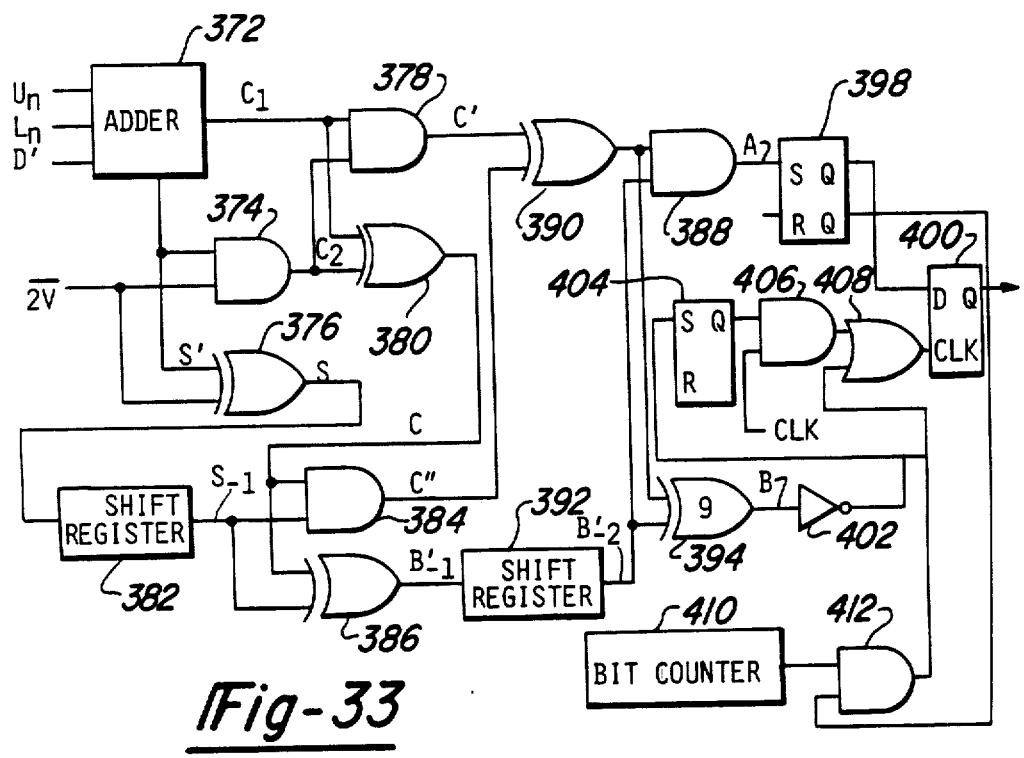
FIG. 33 is a circuit diagram of a Deviance Checker.

The operation of the Deviance Checker 244 shall be discussed with respect to the flow diagram shown in FIG. 32 and the circuit inplementation shown n FIG. 33. The circuit shown in FIG. 33 is replicated in the Deviance Checker 244, one circuit for each Node in the system, so that the deviance checks on all the data values being checked can be checked in parallel.

In order not to cause any significant delays in checking the deviance, the Deviance Checker 244 processes the data being checked on a bit-by-bit basis from the most significant bit to the least significant bit as the upper medial $U_n$ and the lower medial $L_n$ values become available from the Upper Medial Value Sorter 238 and the Lower Medial Value Sorter 240. The deviance checking process is based on the condition that $A > B$ can be distinguished from $A \leq B$ by adding B to the two's complement of A and looking for an overflow at the most significant bit (MSB). In the instant application the Deviance Checker actually checks the relationship of the following equation:

$$M - D \leq V \leq M + D \quad (1)$$

where:

M is the medial value $\frac{1}{2}(L_n + U_n)$;

D is the predetermined deviance limit retrieved from the Fault Tolerator RAM 162 for the particular data value being checked; and V is the data value being checked.

Since the solution for $M - D \leq V$ is substantially equivalent to the solution for $V \leq M + D$ we will only discuss the latter in detail. The differences between the two solutions are well within the perview of one skilled in the art.

The process adds the four available inputs $L_n$, $U_n$, D and $\overline{V}$ and looks for an overflow at the most significant bit position using the equation:

$$M + D - V = \tfrac{1}{2}(L+U) + D - V \leq 0 \quad (2)$$

which can be rewritten as:

$$L + U + 2D - 2V = L + U + 2D + \overline{2V} + 1 = L + U + 2D + 1 + \overline{2V} \leq 0 \quad (3)$$

where $\overline{2V}$ is the 2's complement of 2 times the data value V.

This process is complicated by the fact that we are adding four bits, rather than three since the bit value of the mean M is not available. In the addition of four bits there is the possibility that all four bits are 1's causing a double carry to the second previous bit. The solution to this is as follows:

(a) A sequence such as . . . 110XX cannot overflow. For example, in the worst case $(X = Y = 1)$ even two double carries gives the results . . . 111000. Therefore, if an overflow has not already occurred, a zero (0) in the second previous bit position unconditionally indicates that no overflow will occur at the most significant bit position whatever happens to the latter bits; and (b) The sequence before the second previous bit will always be 111 . . . 111 if neither an overflow nor the condition in (a) above has occurred. Therefore, a carry past the second previous bit will always cause an overflow.

The process proceeds by successively examining the value of the second previous bit B as carries from the later bits are added to it. If a carry occurs beyond the second previous bit, then an overflow occurs and $V \leq M + D$. However, if the second previous bit B is 0, without a prior or current overflow, then $V > M + D$. Finally, if all bits pass without either of the above conditions occurring, then the sum $M + D - V$ is less than 0 and $V > M + D$.

Referring now to the flow diagram shown in FIG. 32, the circuit is initialized as shown in block 352 by setting the bit number $n = 0$, the initial sum bit $S' = 1$, and the interim sum bit of the second preceding bit $B'_{-1} = 0$. The process then proceeds to add $\overline{2V}$, $D' + L + U$ as indicated in block 354, where 2V is the 2's complement of 2V, D' is $2D + 1$ which is the deviance value actually stored in the Fault Tolerator RAM 162 and $U_n$ and $L_n$ are the upper and lower medial values received from the Upper and Lower Medial Value Sorters 238 and 240, respectively. As indicated in block 354, the results of this addition produces a first previous sum bit $S_{-1}$ which is the sum value obtained during the processing of the preceding data value bit, a carry bit C and a double carry bit C' obtained in the processing of the current data bit value.

Next, the process adds the first previous sum bit $S_{-1}$ generated during the processing of the preceding data value bit, with the current carry bit C as indicated in block 356 to generate a second previous sum bit interim value $B'_{-2}$ which is used in the processing of the next data value bit. The addition also produces a third carry bit C'' which is indicative of an additional carry resulting from the processing of the current bits and the first previous bits. The carry bit C'', from block 356, is added to the double carry bit C' of the current data value being processed and to the interim value $B'_{-2}$. The sum and carry bits resulting from the addition of $(C' \oplus C'') + B_{-2}$ a carry bit A for the second preceding bit and bit value B which is the final bit value of the second previous bit after correcting for all carries. The process then inquires if the carry bit A is equal to 1 as indicated in decision block 360, if $A = 1$ then $V \leq M + D$ as previously indicated and the "pass" flag is set as indicated in block 362. However, if $A = 0$, the process inquires, decision block 364, if $B = 0$? If the second previous bit B is equal to zero, then there will be no overflow at the most significant bit position. Therefore, $V > M + D$ and the "fail" flag is set indicating that the data value failed the deviance test as indicated in block 366. If B is not equal to zero, the process will proceed to check the next bit of the data value as indicated by block 368. Finally, after checking all of the data value bits and neither the "pass" nor "fail" flags are set, the process will automatically set the "fail" flag as indicated ending the process.

Referring now to FIG. 33, an Adder 372 adds the first 3 bits $U_n$, $L_n$, and D', to produce an interim sum bit S' and a first carry bit $C_1$. The interim sum bit S' is received by an AND gate 374 and an Exclusive OR gate 376 as indicated in equation 3. The AND gate 374 will output a second carry bit $C_2$ which is applied to one input of an AND gate 378 and an input of an Exclusive OR gate 380. The AND gate 378 receives the carry bit $C_1$ from the Adder 372 at its other input. The Exclusive OR gate 380 also receives the carry bit $C_1$ from the Adder 372 at its alternate input.

The output of the Exclusive OR gate 376 is a sum bit S which is temporarily stored in a two bit Shift Register 382 until the processing of the next data value bit. The output of the Exclusive OR gate 380 is a single carry bit C which is received at the inputs of an AND gate 384 and an Exclusive OR gate 386. The AND gate 384 and the Exclusive OR gate 386 receive the sum bit $S_{31\,1}$ at their other inputs from the Shift Register 382. The sum bit $S_{-1}$ is the sum bit S generated during the processing of the previous data value bit. The output of the Exclusive OR gate 386 is the sum of the sum bit $S_{-1}$ and a carry bit generated during the processing of the current data bit which is a preliminary bit value $B'_{-1}$ which is stored in a second Shift Register 392. The preliminary value $B'_{-1}$ is an interim value of the second preceding bit value before correction for the carry bits. The output of the AND gate 384 is a carry bit $C''$ which is received at an input to an Exclusive OR gate 390 which also receives at its alternate input the double carry output $C'$ from the AND gate 378.

The output of the Exclusive OR gate 390 is received at an input to an AND gate 388 and an input to an Exclusive OR gate 394. The output of the Shift Register 392 is received at the alternate input to the AND gate 388 and Exclusive OR gate 394. The output of the AND gate 388 is the carry bit signal "A" for the second preceding bit which is applied to the set input of an S-R flip flop 398. The Q output of the S-R flip flop 398 is applied to the D input of a D-type flip flop 400. The output of the D-type flip flop 400 is the pass-fail flag for the deviance check. If $A-1$ as indicated in decision block 360 of FIG. 32, then the Q outputs of the S-R flip flop 398 and D-type flip flop 400 are 1's signifying that the data value (V) is less than the median (M) plus the deviance (D). If the Q output of the S-R flip flop 398 and D-type flip flop 400 are 0's, then the data value failed the deviance check.

The output of the Exclusive OR gate 394 is the final bit value B of the second preceding data value after corrections for single and double carries. The final bit volume B is inverted by an Inverter 402 whose output is connected to the SET input of a second S-R flip flop 404. The Q output of S-R flip flop 404 is applied to one input of an AND gate 406 whose output is connected to the clock input of the D-type flip flop 400 through an OR gate 408. A clock pulse (CLK) is applied to the alternate input of the AND gate 406 which is applied to the input of the D-type flip flop 400 when the AND gate 406 is enabled by the Q output of the S-R flip flop 404.

A bit counter 410 counts the number of bits processed and generates an overflow pulse after all the bits have been processed. The overflow pulse is applied to the clock input of the D-type flip flop 400 through an AND gate 412 and the OR gate 408. The alternate input to the AND gate 412 is received from the $\overline{Q}$ output of the S-R flip flop 398 and is disabled when the S-R flip flop 398 is placed in its SET state by the carry signal A being a 1.

In operation, the Adder 372 produces the interim sum bit S' and the carry bit $C_1$ resulting from the adding of $U_n$, $L_n$, and D'. The AND gate 374 produces a carry bit $C_2$ which results from adding the 2's complement (2V) of 2V to the sum of $U_n$, $L_n$, and D'. The carry bit $C_2$ is combined with the carry bit $C_1$ from the Adder 372 in AND gate 378 to produce the double carry bit $C'$ when both $C_1$ and $C_2$ are 1's. The output of the Exclusive OR gate 380 is indicative of a single carry bit C from either the Adder 372 or the AND gate 374. The sum output $S_{-1}$ is the sum S output from the Exclusive OR gate 376 which is output from the Shift Register 382 during the processing of the next subsequent data bit. These are the operations specified in block 354 of FIG. 32. The operations of block 356 are carried out by the AND gate 384, Exclusive OR gate 386, and Shift Register 392. The Exclusive OR gate 386 produces an interim sum value bit $B'_{-1}$ from the sum bit $S_{-1}$ from the Shift Register 382 and the carry bit C from the Exclusive OR gate 380.

The sum bit $B'_{-2}$ is the signal $B'_{-1}$ output from the Shift Register 392 during the processing of the second subsequent data value bit. The carry bit $C''$ is the output of the AND gate 384 which is a continuation of the carry bit C when the sum bit $S_{-1}$ generated in the processing the preceding data value bit is a 1. During the processing of the next data value bit, the Exclusive OR gate 390 and the AND gate 388 will generate the value A and the Exclusive OR gate 394 will generate the bit value B as indicated in block 358. The value of A is 0 when the interim value of the second preceding arm bit, $B'_{-2}$ is 0 or when both $C'$ and $C''$ are 0's indicating no carry bits $C_1$ or $C_2$ have resulted from the processing of the current data value bit. The value of A is 1 when $C'$ or $C''$ is a 1 and the interim value of the second preceding sum bit $B'_{-2}$ is 1. The value of B is 1 when $B'_{-2}$ is 1 and $C'$ and $C''$ are 0's or when $B'_{-2}$ is 0 and $C'$ or $C''$ are a 1.

When A is a 1, the S-R flip flop 398 will be set and its Q output will be a 1, which when applied to the D input of the D-type flip flop 400 will cause its Q output to become a 1. A 1 at the Q output of the D-type flip flop 400 is the pass flag as indicated in block 362. The Q output of the S-R flip flop 398 will disable the AND gate 412, preventing the overflow bit from the Bit Counter 410 from toggling the D-type flip flop 400 after the processing of the last bit. If the AND gate 412 is not disabled by the Q output of the S-R flip flop 398, the overflow bit from the Bit Counter 410 will toggle the D-type flip flop 400, changing its Q output from a 1 to a 0. A 0 Q output of the D-type flip flop 400 is the fail flag, as indicated by block 366.

The function of the decision block 364 is carried out by the Inverter 402, the S-R flip flop 404 and the AND gate 406. When B is 0, the Inverter 402 will cause the S-R flip flop 404 to be placed in the set state causing its Q output to be a 1. A 1 from the Q output from the S-R flip flop 404 enables the AND gate 406 to pass a clock (CLK) pulse which will toggle the D-type flip flop 400 through the OR gate 408. The Q output of the D-type flip flop 400 in the absence of the Q output of the S-R flip flop 398 being a 1 will go to a low or 0 signal. A low or 0 Q output of the D-type flip flop 400 as previously indicated is the fail flag indicated in block 366. The pass or fail flag is passed to the Fault Tolerator 36 through the Voter Fault Tolerator Interface 248 as a deviance error (DERR).

SCHEDULER

The Scheduler 40 has two modes of operation, a normal mode and a reconfiguration mode. In the normal mode, the Scheduler 40 schedules the application task for each operating Node in the system including its own, and monitors the execution of these tasks. The reconfiguration mode is entered whenever the Fault Tolerator 36 determines if one or more Nodes are to be excluded or readmitted to the operating set. The two modes interact through an activation status which defines which tasks are eligible for execution by each Node. The reconfiguration mode modifies the activation status, whereas the normal mode utilizes the activation status to schedule the task.

During normal mode operation, the Scheduler 40 implements a dynamic, priority base, nonpre-emptive task scheduling process. Concurrent programming practices and the resolution of inter task dependencies are supported at the boundaries between the tasks. Task-to-node allocation is static for any given System State (configuration), but the sequencing of tasks and the resolution of dependencies are performed dynamically. The Scheduler 40 in each Node replicates the scheduling process for every active Node in the system. Fault detection mechanisms permit each Node to recognize erroneous behavior in the sequencing or timing of the task executed by any Node.

During reconfiguration, tasks may be reallocated among the operating Nodes. Tasks may also be added or deleted from the active task set to conform to the changes in the overall system capabilities.

During start up or reset of the Operation Controller 12 the Scheduler 40 enters the reconfiguration mode with the assumption that no Nodes are operating. When the Fault Tolerator 36 recognizes an "operating set," that information is passed to the Scheduler 40 as a new System State Vector. The Scheduler then reconfigures the tasks in accordance with the received new System State Vector. By using this method the operation of the Scheduler 40 is self-boot strapping.

Figure 34:
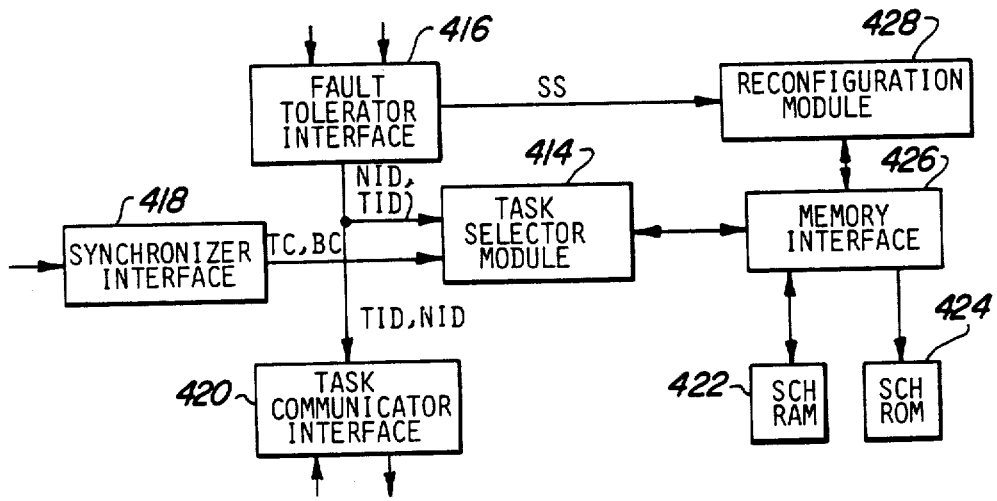
FIG. 34 is a block diagram of the Scheduler.

A block diagram of the Scheduler 40 is shown in FIG. 34. A Task Selector Module 414 receives information from the Fault Tolerator 36 through a Fault Tolerator Interface 416, from the Synchronizer 46 through a Synchronizer Interface 418, and from the Task Communicator 44 through a Task Communicator Interface 420. The Task Selector Module 414 also communicates with a Scheduler RAM 422 and a Scheduler ROM 424 through a Memory Interface 426.

A Reconfiguration Module 428 is responsive to the reception of a new System State Vector from the Fault Tolerator 36 to reallocate the task to be selected and executed by the new set of operating Nodes. The Reconfiguration Module 428 will change the activation status of the tasks stored in the Scheduler RAM 422 using predetermined information stored in the Scheduler ROM 424.

A map of the Scheduler RAM 422 is shown in FIG. 35. The entry Old TID contains an entry for each Node in the system and stores the TID previously started by that Node. The Swap table entry contains an entry for each task (TID) and stores a predecessor count which is the total number of immediate predecessors to that particular task. A periodicity corresponding to how many Atomic periods must pass between the execution of the task and two swap count numbers which are used to swap or change the active status of a task on a particular Node shall be explained during the discussion relative to reconfiguration.

The Allocation Table stores an allocation count for each task-node pair in the system and is used in the reconfiguration process to determine the distribution of the active tasks among the Nodes.

The Selection Queue 450 has 3 pages, NEXT, PREVIOUS and CHECK. Each page contains three entries for each Node corresponding to the three highest priority tasks currently ready for execution by that Node. "Used" is a Boolean value indicating whether the current iteration of the task in the entry has been started by that Node. ITER is the interation number of that task in the entry, and TID is the task identification code for that task. The NEXT page is the entry from which the next task to be executed for each Node is selected, the PREVIOUS page lists the tasks selected during the preceding Subatomic period, and the CHECK page contains the tasks selected during the second preceding Subatomic period for that Node. The pages are rotated at the beginning of each Subatomic period, and the newly selected task for each Node is stored in the NEXT page.

The completion Status List contains, for each task, a completion count which corresponds to the number of copies of that task that have been completed, the branch condition count which stores a number corresponding to the number of received Task Completed/Started messages in which the branch condition has a value of 1 and an allocation entry which contains the allocation of that task among the various Nodes.

The Priority Scan List stores for each task the predecessor count which is the number of preceding tasks which have to be completed before that task can be executed, the iteration number of that task and is allocation. The Task Activity List entry stores for each task the predecessor count, the periodicity of the task, and its allocation.

A map of the Scheduler ROM 424 is shown in FIG. 36. The first entry is the Successor List which lists the successor tasks for each terminated task. This list is accessed by the address of the Successor Offset as shall be explained hereinafter. There are two Successor-Lists, one for each of the two possible branch conditions. The next four entries are the Preference Vectors for each task and identifies those Nodes preferred for the execution of that task. The Relevance Vector contains two entries, the first INCLUDE/EXCLUDE identifies whether the task is to be executed by the Nodes included in the Operating Set or executed by the Nodes excluded from the Operating Set, and a Relevance Vector which identifies to which Nodes the task is relevant. The Initial Swap Table entry contains for each task, the initial processor count, the periodicity, and the initial swap counts for each task which are loaded into the Task Activity List of the Scheduler RAM 422 during reset or reconfiguration as shall be discussed later.

The next two entries are the Initial Allocation Counters for each task and lists the initial allocation count or toggle point for each task-node combination. These values are loaded into the Allocation Tables in the Scheduler RAM 422 following reset or power-up. The entry Maximum Execution Time Table stores the 2's complement of the maximum execution time for each task and is loaded into the execution time, for that Node, when the task is starated. The entry Minimum Execution Time Table stores the 2's complement of the minimum execution time for each task and is used to check the execution time of each task when it is reported as being completed. The Successor Offset entry contains for each task, the starting address in the Successor List where the successor tasks are stored. Finally, the Initializing Table entry stores the maximum Node Identification code (NID) and the maximum Task Identification code (TID) used in the system which are used to identify when a particular operation is completed.

Figure 37:
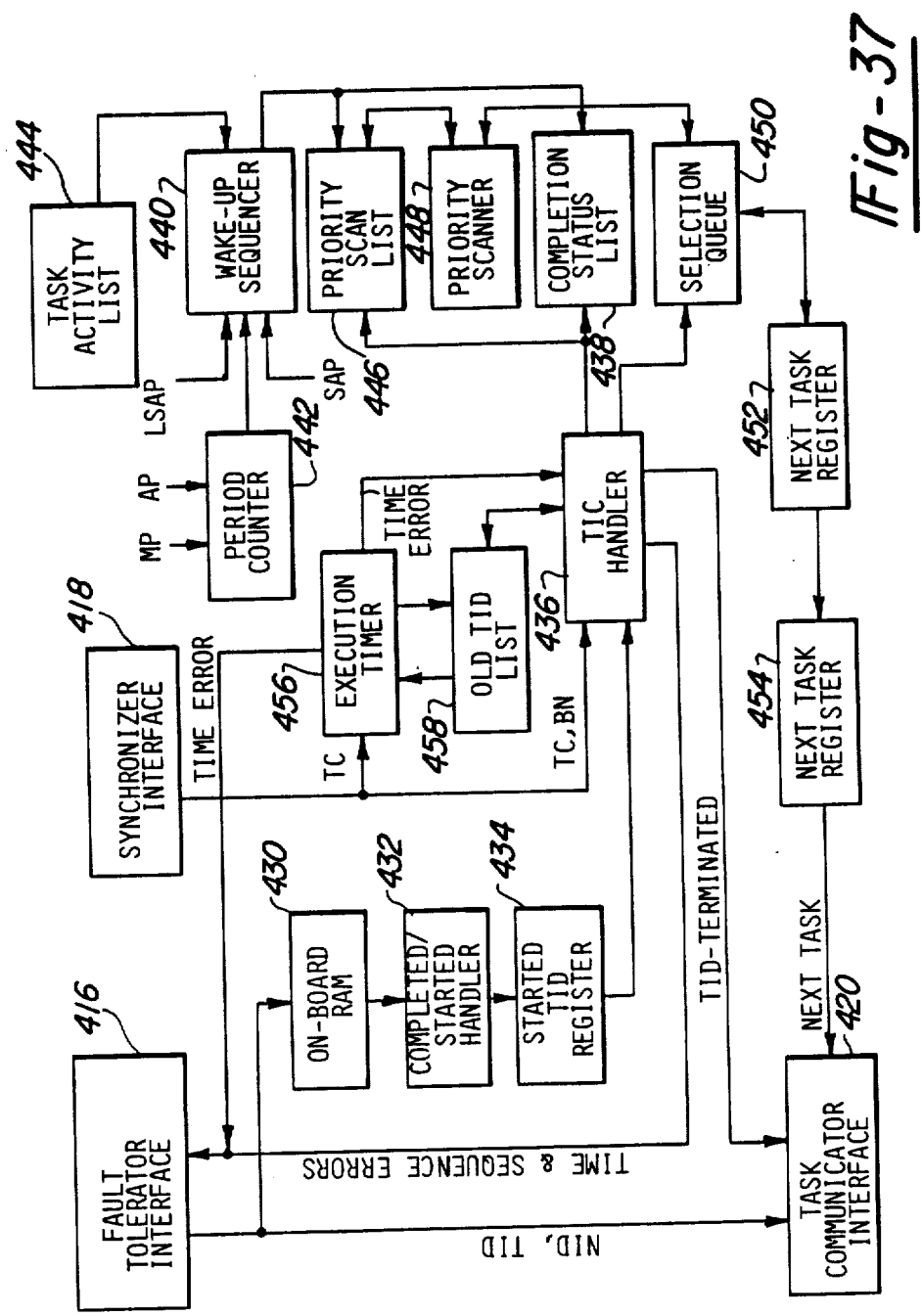
FIG. 37 is a block diagram of the Scheduler's Task Selector Module.

FIG. 37 shows the details of the Task Selector Module 414. The NID and started TID fields of the Task Completed/Started messages are transferred directly from the Fault Tolerator Interface 416 to the Tank Communicator Interface 420, and are also temporarily stored in an On-Board RAM 430. A Completed/Started Handler 432 transfers the TID and NID of each task identified in a Task Completed/Started messsage from the On-Board RAM 430 to a Started TID Register 434 shortly after the end of the Soft Error Window (SEW) at the end of each Subatomic period. This is the period of time when all non-faulty Operation Controllers are transmitting their Task Interactive Consistency or System State messages and all the Task Completed/Started messages from the preceding Subatomic period should have been received. The Started TID Register 434 for each Node is a 3-deep queue in which the new NID and TID are added to the tail of the queue and removed from the head.

The Task Selector Module 414 also has a TIC Handler 436 is responsive to the Byzantine volted values of the task completed vector and the branch condition bits of the Task Interactive Consistency (TIC) messages. This data, received from the Byzantine Voter in the Synchronizer 46 is used to update a Selection Queue 450 and a Completion Status List 438, a Wake-up Sequencer 440 responsive to the various period signals generated by a Period Counter 442 for transferring active tasks from a Task Activity List 444 to a Priority Scan List 446 and to the Completion Status List 439, a Priority Scanner 448 which selects the tasks in the Priority Scan List 446 which are placed in the Selection Queue 450, the Next Task Selector 452 which selects the highest priority task in the Selection Queue 450 and places it in a Next Task Register 454 from where it is transferred to the Task Communicator 44 for execution by the Application Processor, an Execution Timer 456 which monitors the execution time of each task being executed by the individual Nodes in the system, and an Old TID List 458 which stores the current task being executed by each Node. The Task Activity List 444, the Priority Scan List 446, the Completion Status List 438, the Selection Queue 450 and the Old TID List 458 are embodied in the Scheduler RAM 422 as discussed relative to FIG. 35.

The operation of the Wake-up Sequencer 440, the Execution Timer 456, the TIC Handler 436, the Priority Scanner 448, and the Next Task Selector 452 will be discussed relative to the flow diagrams shown in FIGS. 38 through 46. The operation of the Completed/Started Handler 432 is relatively simple in that it transfers the content of the On-Board RAM 430 to the Started TID Register 434 at the beginning of each Subatomic period.

Figure 38:
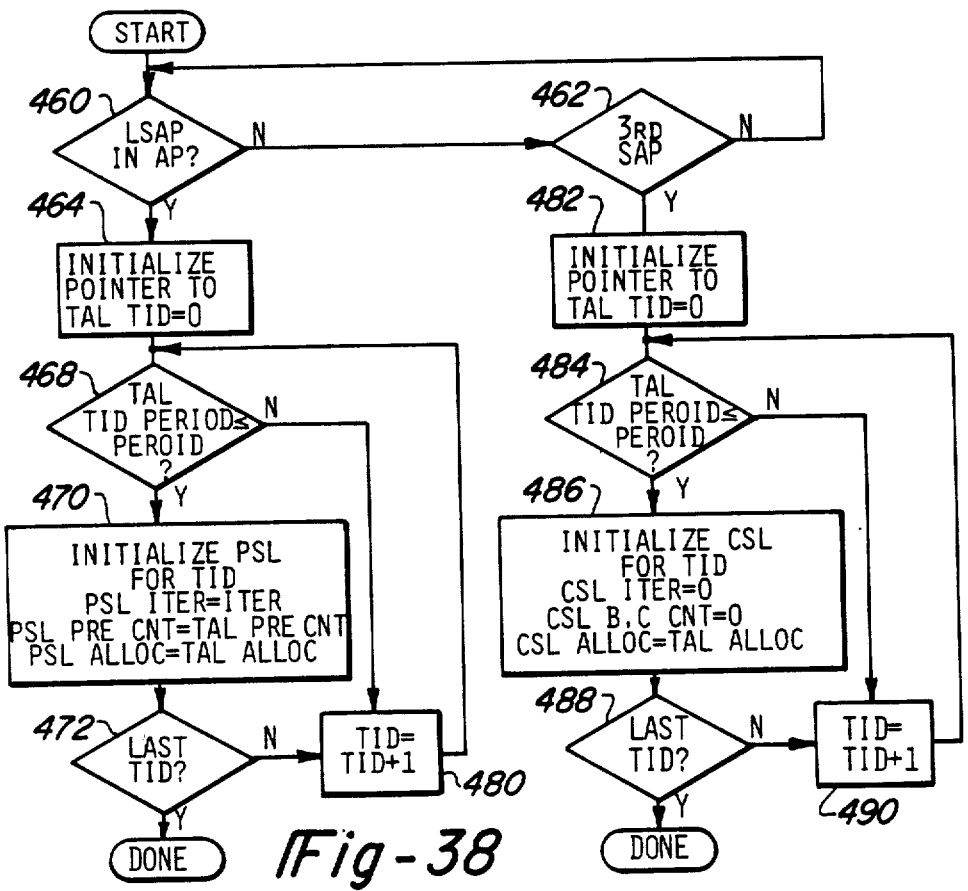
FIG. 38 is a flow diagram of the Wake-Up Sequencer's operation.

The flow diagram shown in FIG. 38 describes the operation of the Wake-up Sequencer 440. The process begins by repeatedly inquiring if the Subatomic period is the last Subatomic period (LSAP) or is the third Subatomic period (SAP), as indicated by Inquiry Blocks 460 and 462. If it is the last Subatomic period, the process initiators the TID pointer to the Task Activity List 444 to 0, as indicated by block 464. The process then inquires decision block 468, if the periodicity of the tasks TID is less than the period indicated by the Period Counter 442. If it is, the Priority Scan List is initialized, as indicated in block 470. The Priority Scan List iteration set is equal to the current iteration for that task. The predecssor count is set equal to the predecessor count contained in the Task Activity List and the allocation is set equal to the allocation contained in the Task Activity List. The process then proceeds to inquire, decision block 472, if the task just processed was the last task. If it is, the operation of the Wake-Up Sequencer 440 is completed, otherwise, the process will index to the next task on the Task Activity List 444 as indicated by block 480 and again check if the periodicity of that task is less than the period of the Period Counter, as indicated by decision block 468. If the TID period is greater than the Period Counter than the task is not entered into the Priority Scan List 446 and the task pointer is indexed to the next task in the Task Activity List as indicated by block 480. The last task in the Task Activity List 444 is a null task which has a periodicity of 0. Thus the last task will always be entered into the Priority Scan List 446 as indicated by block 470 when there is no other task whose periodicity is less than the period of the Period Counter 442.

If the period indicated by the Period Counter 442 is the third Subatomic period, the Wake-Up Sequencer 440 will again initialize the pointer to the Task Activity List to the first task as indicated by block 482. The Wake-Up Sequencer will then inquire, decision block 484, if the periodicity of the task is less than the period indicated by the Period Counter 442. If it is, the Wake-Up Sequencer will initiatize the Completion Status List 438, as indicated by block 486. It will then set the iteration in the Completion Status List to 0, the Branch Condition List to 0, and set the allocation to the allocation indicated to the Task Activity List. The Wake-Up Sequencer 440 will then inquire, decision block 488, if it is the last task in the Task Activity List. If it is, the operation of the Wake-up Sequencer 440 is completed. Otherwise the TID pointer in the Task Activity List will be indexed to the next task as indicated by block 490 and the above procedure will be repeated. If the periodicity of the task is greater than the period indicated by the Period Counter 442, the Completion Status List 438 will not be updated and the pointer to the task in the Task Activity List will be indexed to the next task. When the pointer in the Task Activity List is indexed to the last task, it will always be entered into the Completed Started List since it has a perodicity of 0.

Figure 39:
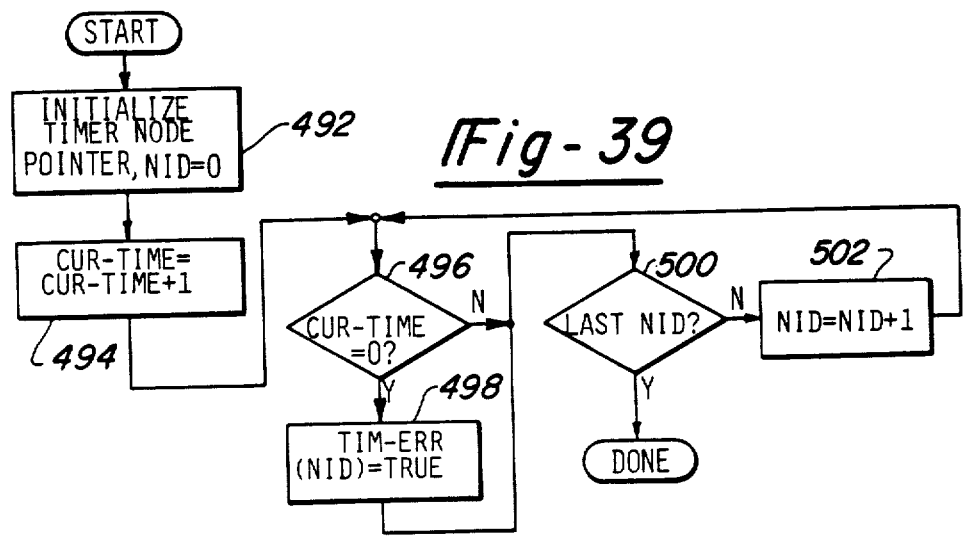
FIG. 39 is a flow diagram of the Execution Timer's operation.

After the wake-up process is completed, the Execution Timer 456 will check the execution timer for each Node as shown in the flow diagram in FIG. 39. As previously indicated, the execution time for the task being executed by each Node is the 2's complement of the maximum execution time. This is done because with current technology it is easier to increment the time rather than decrement the time. The operation of the Execution Timer 456 begins by initializing the timer pointer to the first Node, as indicated by block 492. The Execution Timer will then increment the times stored by each Node by one (1), as indicated in block 494. The Execution Timer 456 will then check each timer for the time remaining for the execution of the task, as indicated by decision block 496. If the timer for any particular Node is equal to 0, then the timer will set an error flag for that Node to true. This information is then sent to the TIC Handler 436 before it is passed to the Fault Tolerator Interface 416 for reasons which shall be explained later. If the current time is not equal to 0, the Execution Timer 456 will inquire, decision block 500, if it has checked the last Node and, if it has, it will exit the execution timer process. Otherwise it will increment the Node pointer to the next Node, as indicated by block 502 and check the current time of the next Node.

The operation of the TIC Handler 436 will be described with reference to FIGS. 40 through 44. The TIC Handler responds to the arrival of the voted value of the Task Interactive Consistency message and modifies the main data structure based upon that data. It treats the occurrence of a time error as equivalent to a confirmed completion so that a stalled or permanently hung copy of a task does not hold up the rest of the work load. The operation of the TIC Handler 435 starts following the completion of the Execution Timer checks and the receipt of the Byzantine data from the Synchronizer 46. The TIC Handler 436 selects a Node for which either a confirmed completion or an overtime error has been reported. If a confirmed completion has been reported, the TIC Handler clears the timer error bit associated with that Node since the completion was confirmed during the same Subatomic period in which the timer expired. The TIC Handler then searches the CHECK page of the Selection Queue 450 for the TID of the first unused task encountered for the Node which was reported to have completed a task. This is the TID of the task which the Node should have started. If this TID does not match the TID currently stored in the Started TID Register 434 for that Node, then a sequence error is recorded. Finally, the TIC Handler calls each of its sub-process, Selection Queue Update, Competion Termination, Execution Timer Reset, and Priority Scan Update, and sequentially updates the data structure for the selected Node. The TIC Handler process is repeated for each Node.

Figure 40:
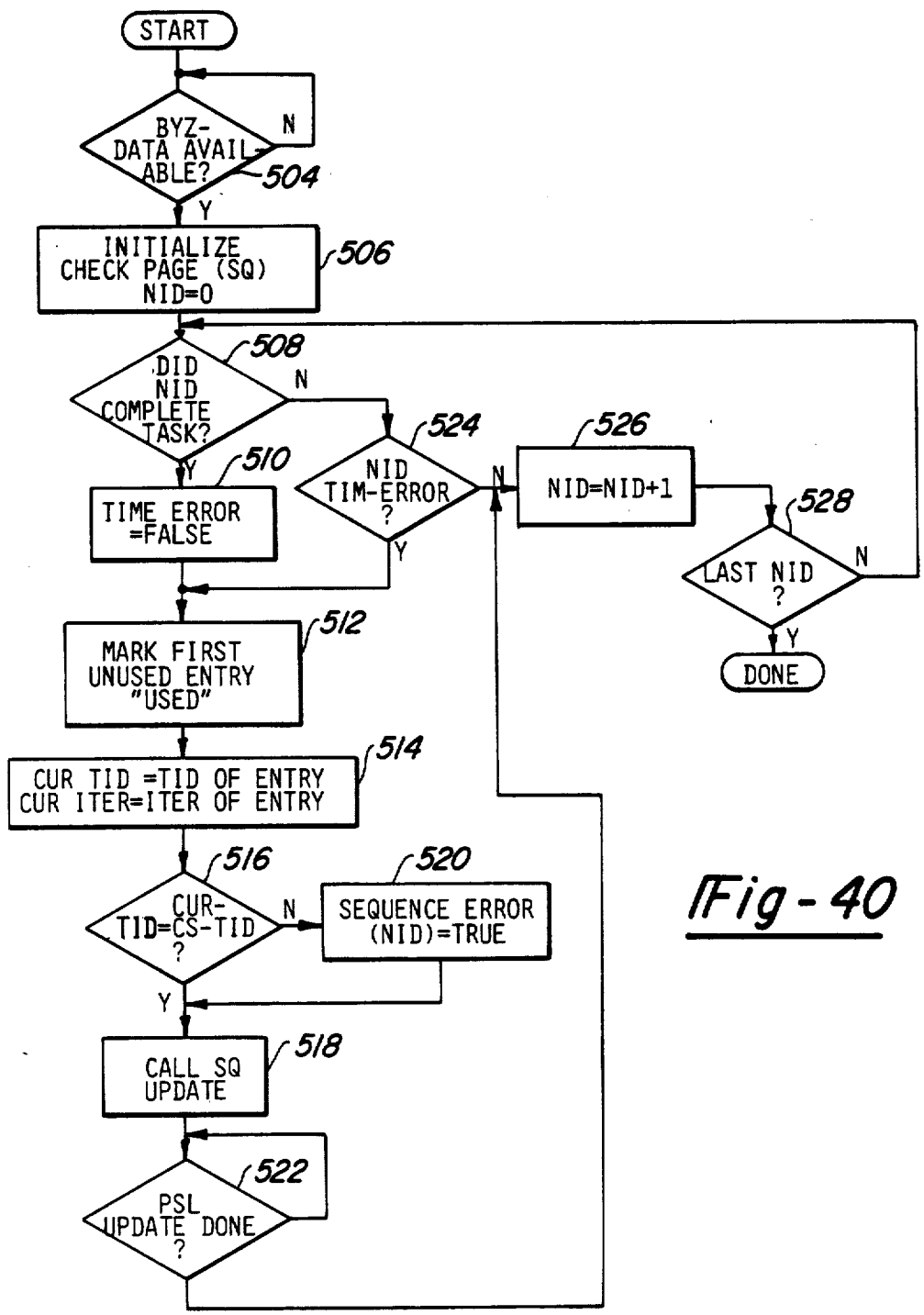
FIG. 40 is a flow diagram of the TIC Handler's operation.
Figure 41:
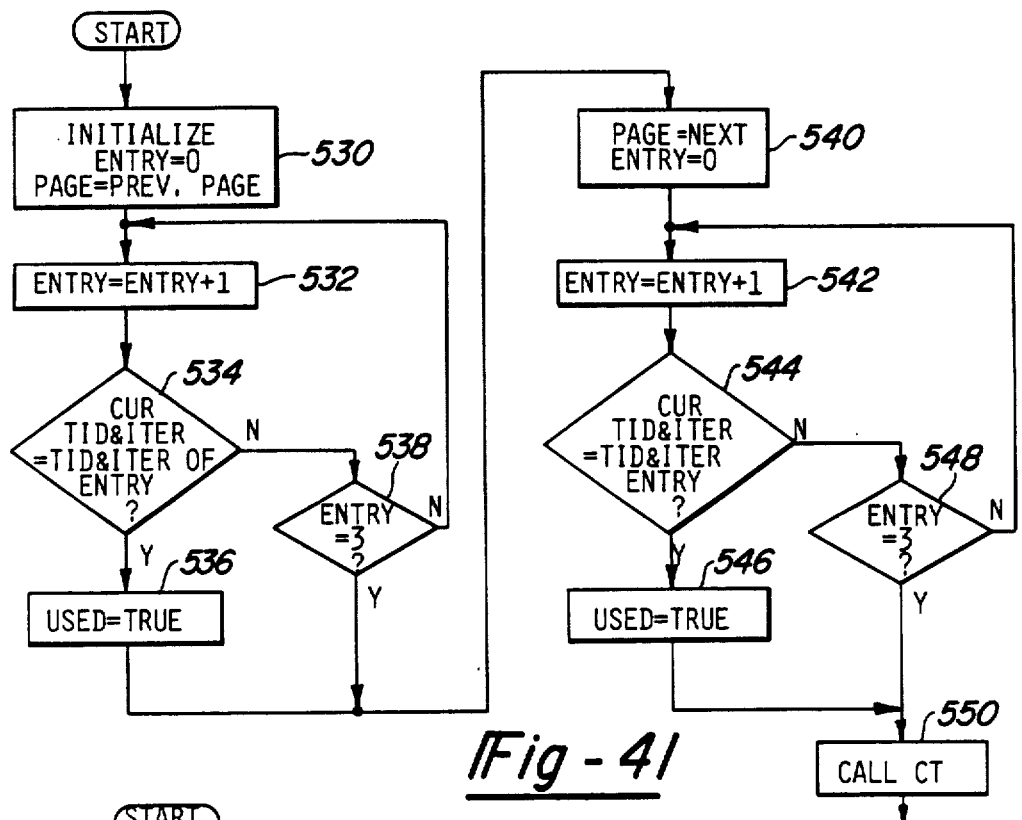
FIG. 41 is a flow diagram of the TIC Handler's Selection Queue Update sub-process.

As shown in FIG. 40, the operation of the TIC Handler begins by inquiring if the Byzantine data is available, as indicated by decision block 504. If it is not available, the TIC Handler 436 will wait until it does become available. Otherwise the TIC Handler will initialize the pointer to CHECK page of the Selection Queue 450 to the first Node position, as indicated by block 506. The process will then inquire as indicated by decision block 508, if the Node completed a task, as indicated by the Byzantine data. In parallel, if the Byzantine data did not indicate that a task was completed by that Node, the process will check to see if a time error had occurred, as indicated in decision block 524. If the Byzantine data indicated that the Node did not complete a task and there was no time error, the process will increment the Node pointer to the next Node, as indicated by block 526. The process will then check to determine if it had investigated the last or the maximum Node as indicated by block 528. If it was the last Node, it will exit the program, otherwise it will proceed to check the next Node to see if it had completed a task or a time error had occurred.

When a Node has completed a task and a time error has been recorded for that Node, the TIC Handler will set the time error to false, as indicated by block 510 since the task was completed in the same Subatomic period in which the time error was detected. Therefore, the time error is invalid and it is cancelled. If either the Node had completed a task or a time error had occurred, the process will then mark as used the first unused entry for that Node found in the CHECK page of the Selection Queue, as indicated by block 512. It will then store as the current TID the TID of the entry that had just been marked used and it will store the current iteration as the iteration of that same entry, as indicated by block 514. The process will then check to determine that the current task is also the same task that was reported by that Node in its last Task Completed/Started message which was stored in the Started TID Register 434 as shown in FIG. 37. If the current task and the task reported as completed in the last Task Completed/Started message for that Node are not the same, the TIC Handler 436 will set the Sequence Error flag to "true," as indicated by block 520. The Process will then call the Selection Queue (SQ) Update sub-process, as indicated by block 518 and wait for the completion of the Priority Scan List (PSL) Update sub-process, as indicated by block 522. When the Priority Scan List Update is completed, the process will then index a Node pointer to the next Node, as indicated by block 526 and then check to see if it has processed the last Node, as indicated by decision block 528.

The sub-process Selection Queue Update for the TIC Handler searches the NEXT and the PREVIOUS pages of the Selection Queue 450 for the Nodes selected by the TIC Handler. When an entry is found containing both the current task and the current iteration, it is marked "used." Such entries may or may not be found because the tasks with a higher priority than the current task may have become available between the generation of the CHECK page and the generation of the PREVIOUS or NEXT page. It is not necessary to mark the CHECK page entry since it will not be accessed again before it is refreshed. The Selection Queue Update sub-process begins by initializing the pointer to the PREVIOUS page to the 0 entry, as indicated by block 530. The process will then index the entry to the first entry, as indicated by block 532, and will inquire if the current TID and iteration are equal to the TID and iteration of the entry, as indicated in decision block 534. If they are the same, then the entry "used" is marked "true," as indicated by block 536. Otherwise the process will inquire if it has checked all of the three entries of the PREVIOUS page, as indicated by decision block 538. If it has not checked all of the entries on the PREVIOUS page of the Selection Queue 450, it will proceed to index the entry to the second entry and so on until it has checked all three entries on the PREVIOUS page. After either finding the TID in one of the entries in the PREVIOUS page or completing checking the PREVIOUS page and not finding an entry, the program will then proceed to the NEXT page of the Selection Queue 450 and again will set the pointer to the 0 entry, as indicated by block 540. It will index the entry, as indicated by block 542, then inquire if the current TID and iteration are the same as the TID and iteration of the entry, as indicated by block 544. If they are, it will mark the "used" entry "true," as indicated by block 546. Otherwise the process will then inquire if it has checked all three entries, as indicated by decision block 548. If it has not, it will then index the pointer to the next entry and continue to investigate until it has either found the current TID and iteration in the entry or it has checked all three entries. The process will then call the Completed Termination (CT) sub-process, as indicated by block 550.

The TIC Handler sub-process Completion/Termination records the completion of each copy of a task in the Completion Status List. If the final copy has been completed (or timed out), then the task is "terminated." The Successor List entries associated with the terminated task and the majority branch conditions are accessed via the base address in the Successor-Offset List, as indicated in FIG. 36. The predecessor count for each successor of the terminated task is then decremented. If the branch conditions generated by the various copies result in a tie, then the branch condition O is selected by the default.

The TIC Handler 436 retains an old valid bit for each Node indicating whether the TID listed in the Old TID section of the Scheduler RAM 422, as shown in FIG. 35 is a valid Old TID or not. All bits of the old valid are set to false during system reconfiguration to indicate that the next task to be executed by each Node is the first task and that there are no previous tasks to process. The old valid is set to true after the confirmed start of the first task on the Node and before the confirmed start of the second task on the Node.

If the old valid is false, then the started task is the first task being executed on that Node following a reconfiguration. Therefore, there is no completed task to process and the Completion/Termination sub-process need not be executed. Similarly, if the completed task is a null task, thee is no need to terminate the task. In the flow diagram shown in FIG. 41, the point at which the task is compared to the maximum task is the latest point at which the comparison can be made without potentially reporting a termination of a null task, and this makes the content of the maximum task entry on the Completion Status List irrelevant.

Figure 42:
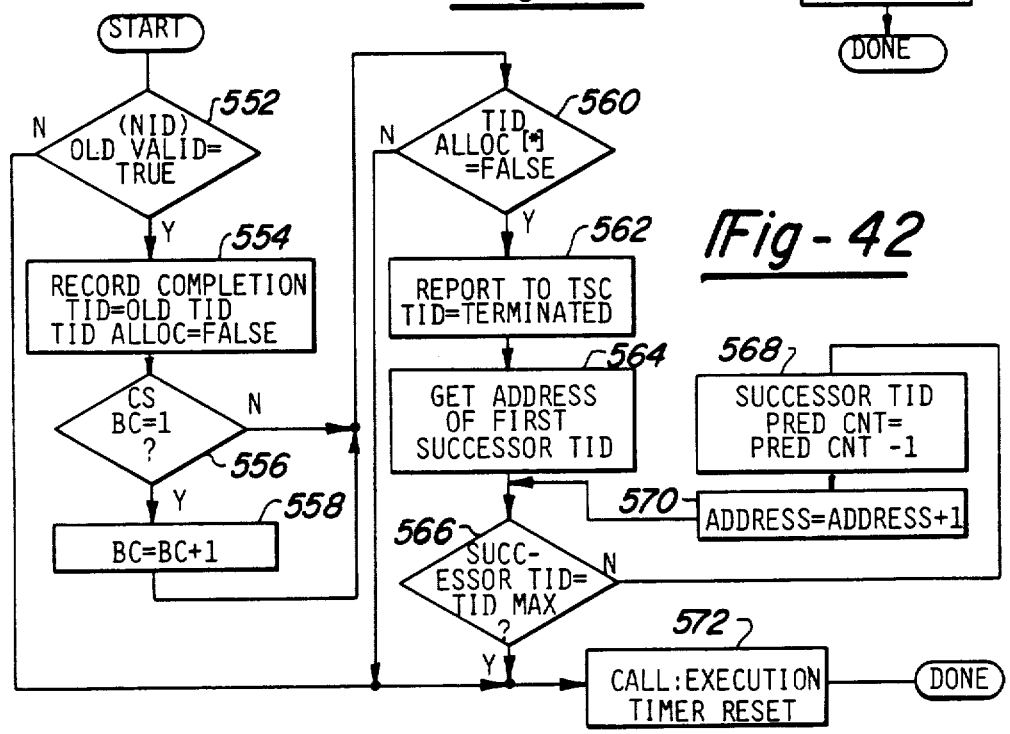
FIG. 42 is a flow diagram of the TIC Handler's Completion/Termination sub-process.
Figure 45:
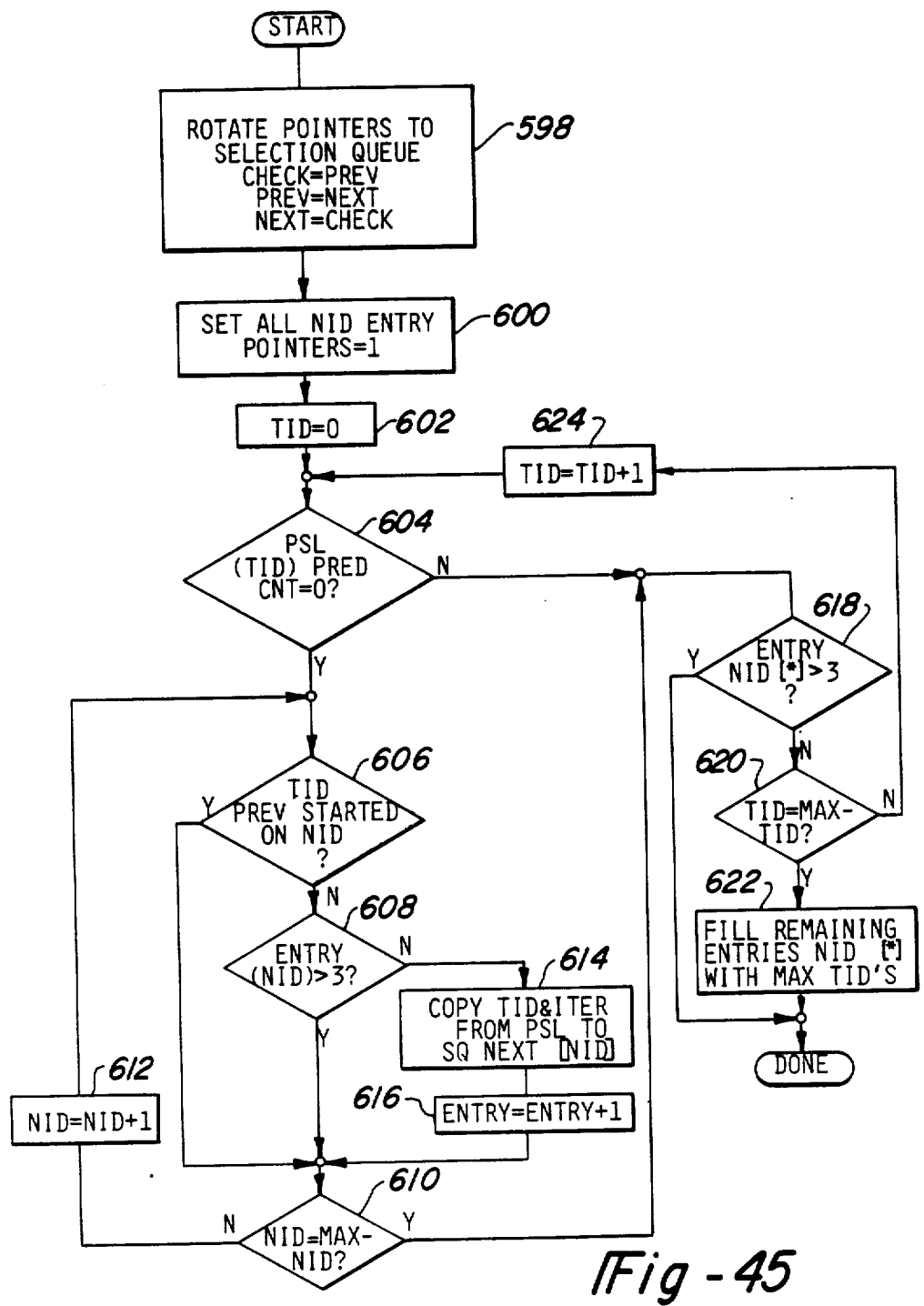
FIG. 45 is a flow diagram of the Priority Scanner's operation.

Referring now to FIG. 42, the sub-process Completion/Termination begins by checking the old valid flag for the Node, as indicated by block 552. As previously indicated, if old valid is not true, the process will then proceed to the next sub-process Execution Timer Reset as shall be discussed hereinafter. However, if old valid is true, the process will then record the completion of the task using the TID stored in Old TID as the TID of the completed task then accessing the Completion Status List 438 and setting the allocation for that TID-NID allocation to false, as indicated by block 554. The process will then inquire, as indicated in decision block 556, if the branch condition is equal to 1. If it is, it will then increment the branch condition entry in the Completion Status List 438, as indicated by block 558. However, if the branch condition is equal to 0, the process will proceed to inquire, as indicated by decision block 560, if all of the copies of that task have been completed. This is indicated by all the entries in the allocation section of the Completed Status List being set to false.

If all of the copies of the task have been completed, the sub-process will proceed to report to the Task Communicator the identity of the terminated task, as indicated by block 562. After reporting the termination of the task to the Task Communicator 44, the process will then get the address of the first successor task from the Successor-Offset entry contained in the Scheduler ROM 424, as indicated by block 564. The process will then inquire, as indicated by decision block 566, if the sucessor task is equal to the maximum successor task which corresponds to the end of the Successor Task List for the terminated task. If that is the end of the Successor Task List, the program will then proceed to call the Execution Timer Reset sub-process, as indicated by block 572. If the successor task is not the maximum TID listed on the Successor List for the terminated task, the process will continue to update the Completion Status Table by decrementing the predecessor count for each successor task by 1, as indicated by block 568. The process will then increment the address to the Successor List, as indicated by block 570 and proceed to analyze the next task on the Successor List.

The Execution Timer Reset sub-process of the TIC Handler 436 checks the execution timer for each Node for a minimum time error and reloads the timer for the newly started task. If the old valid flag for that Node is false, then there is no completed task and the error is not recorded. The Execution Timer Reset is the last process to access the Old TID entry in the Scheduler RAM 422. It is, therefore, a convenient place in which to copy the current TID and to set the flag old valid true.

FIG. 43 is a flow diagram showing the process executed by the Execution Timer Reset sub-process. The process begins by setting the TID equal to the Old TID for that particular Node, as indicated by block 574. The process then compares, as indicated by decision block 576, the current execution time for that TID with the minimum time. If the current execution time is greater than the minimum execution time it then inquires, as indicated by block 578, if the old valid flag is true. If old valid is true, then the Execution Timer Reset sub-process will set the time error flag for that Node to "true," as indicated by block 580. If the current execution time is not greater than the minimum time or if the old valid flag is not true or if a time error has been recorded, the process will then reset the Execution Timer, as indicated by block 582, by setting the current time for that Node equal to the maximum time for the current task which is contained in the Scheduler ROM 424 in the entry entitled Maximum Execution Time Table, as shown in FIG. 36. The process will then update the Old TID entry in the Scheduler RAM 422 by setting the Old TID for that Node equal to the current TID, as indicated by block 584, then set the old valid flag for that Node as true, as indicated by block 586. The process will then proceed to call up the Priority Scan List Update sub-process, as indicated by block 588.

The Priority Scan List Update sub-process of the TIC Handler 436 records the start of the current task on the Node by clearing the Priority Scan List current TID allocation for the Node. This process makes the current task ineligible for reexecution by that Node until its next iteration, at which time the Wake-up Sequencer 440 reinitializes the Priority Scan List entry for the task. Two conditions must be satisfied before the update is performed: (1) the started task must not be a null task, since a null task must always be available, it may never be removed from the Priority Scan List; and (2) the iteration number of the started task is the same as the iteratipon number in the Priority Scan List. The two iteration values may differ within the first three Subatomic periods of an Atomic period if the task ran during the last three Subatomic periods of the previous Atomic period.

FIG. 44 is a flow diagram showing the procedure executed by the TIC Handler 436 in the execution of the Priority Scan List Update. The process begins by inquiring if the entry is current, as indicated by block 590. If the entry is current, the process will then proceed to inquire if the current task is a null task (maximum TID), as indicated by block 592. If the current task is not a null task, the Priority Scan List is updated by recording that the Node has started that particular task, as indicated by block 594. Effectively, the process sets the flag in the allocation entry of the Priority Scan List for that particular Node to false. If the entry is not current, or if the task is a null task, the process returns, as indicated by block 596 to the TIC Handler process illustrated in FIG. 40.

The Priority Scanner 448 selects a candidate task for the next Subatomic period based on the latest confirmed data about the progress of the application work load. The operation of the Priority Scanner 448 follows the updating of the Priority Scan List by the TIC Handler 436. The Priority Scanner 448 will first rotate the page pointers of the Selection Queue 450 then select three tasks for each Node by scanning the Priority Scan List in the order of increasing TID's. In the Priority Scan List the highest priority tasks have the lower TID numbers and the lowest priority tasks have the higher TID numbers. The selected tasks are then written into the NEXT page of the Selection Queue for their respective Nodes.

The operation of the Priority Scanner 448 begins by rotating the pointers in the Selection Queue 450, as indicated by block 598. The Priority Scanner then sets all of the Node entry pointers to the first entry as indicated by block 600. It then starts at the top of the TID list for the first task, as indicated by block 602. The Priority Scanner 448 then inquires, as indicated by block 604, if the precedent count for that task is equal to 0 indicating that all of the predecessor tasks have been completed. If all of the preceding conditions are satisfied, the Priority Scanner 448 will investigate if the task has been previously started on that particular Node, as indicated by decision block 606. If the task has not been previously started on that Node, the Priority Scanner will then inquire if that particular Node alreaddy has three entries, as indicated by block 608. If it does have three entries, it will then check to see if that Node was the last Node, as indicated by block 610. If it is not the last Node, it will then index to the next Node, as indicated by block 612 and will proceed to check the entries for the next Node. If the Node being evaluated is the last Node, the Priority Scanner 448 will proceed to check if each Node has more than three entries, as indicated by block 618. If each Node has more than three entries, then the operation of the Priority Scanner is completed and it will exit. However, if not all of the Nodes have three entries, then the Priority Scanner 448 will inquire, as indicated in block 620, if it has processed the last task. If it has processed the last task, then it will fill all the remaining entries with the null task which is the maximum TID, as indicated by block 622. However, if the TID is not the maximum or last task in the list, the process will increment the TID number and will repeat.

Referring back to decision block 608, if the entries for a particular Node are not greater than 3 then the process will copy the TID and iteration from the Priority Scan List to the NEXT page of the Selection Queue 450 for that Node, as indicated by block 614. It will then increment the entry for that Node, as indicated by block 616 and then inquire, as indicated by decision block 610, if that Node was the last Node. If it is not the last Node, then the process will proceed to the next Node, as indicated by block 612 or will check if the entries in all the Nodes are full, as indicated by decision block 618.

The Next Task Selector 452 examines the first entry of the NEXT page of the Selection Queue 450 for its own Node (NID). If that task has not been previously started by its own Node, then it records that task in its Next Task Register 454 which is passed to the Task Communicator 44 through the Task Communicator Interface 420 when requested by the Applications Processor. If the task has been previously started, then the next entry on the NEXT page of the Selection Queue 450 is examined for the same criteria. The process continues until an entry is found which has not been executed, or until the third entry has been examined.

Since the Selection Queue 450 is not updated until the third Subatomic period after a task is started, the Next Task Selector must maintain a local record of tasks started on its own Node. The TID's of the previous tasks started are maintained in a two entry deep stack to record the previous two tasks actually started by the Node's Task Communicator 44. The Scheduler 42 receives immediate notification from the Task Communicator whenever a task is started. It then pushes the currently selected task onto the previous TID stack allowing the oldest entry to fall off the bottom of the stack. The operation of the Next Task Selector 452 is triggered by the beginning of the soft-error window, while the Transmitter is ocupied with the transmission of a Task Interactive Consistency or a System State message. Therefore, the Task Communicator cannot transmit a task Completed/Started message or start the selected task while the Next Task Selector 452 is modifying the selected task. The Next Task Selector 452 is the only module in the Scheduler which has access to its own Node Identification (NID) code.

The operation of the Next Task Selector 452 will be discussed with reference to the flow diagram shown in FIG. 46. The operation of the Next Task Selector begins with the setting of the entry pointer to the the NEXT page to its own NID and to entry O, as indicated by block 626. The Next Task Selector then increments the entry pointer to the first task, as indicated by block 628 and records as the selected task the task that is entered for its own Node in the entry of the Selection Queue 450, as indicated by block 630. The Next Task Selector will then inquire, decision block 632, if this is the third entry in its own entry of the NEXT page. If it is, it will store the selected tasks in the Next Task Register 454. However, if it is not the third entry, the Next Task Selector will inquire, as indicated by decision block 636, if the selected task and iteration are the same as the first or second previously selected task and iteration. If the selected task and iteration are the same as a first or second previously selected task and iteration, the Next Task Selector will proceed to increment the entry and examine the next task in the Selection Queue, as indicated by block 628. However, if the selected task and iteration were not previously selected, the Next Task Selector will store the selected task in the Next Task Register 454, as indicated by block 634 completing the selection process.

It can be seen from the above flow diagram that if the first two entries in the Selection Queue 450 have been previously executed by this Node, the Next Task Selector 452 selects the third entry regardless of its previous selection status. This feature allows multiple entries of the null task to be placed in the Selection Queue simultaneously in the event there are no other tasks ready to run. Thus, when no other tasks are ready to execute, the Node will start the null task every Subatomic period until another task becomes available.

The operation of the Task Selector Module begins with the end of the Soft Error Window (SEW), at which time no Task Complete/Started messages should be arriving from the non-faulty Nodes. First, the Completed/Started Handler will transfer the content of the Task Completed/Started messages stored on the On-Board RAM 430 to the Started TID Register 434 before the earliest possible arrival of the Task Completed/Started messages for the next Subatomic period. All of the other processes executed by the submodules with the exception of the Next Task Selector 452 must be completed before the beginning of the Next Soft Error Window. The operation of the Next Task Selector 452 is triggered by the beginning of the soft error window and must be completed by the time the Transmitter completes sending its Task Interactive Consistency and/or System State messages and becomes available to the Task Communicator for sending Task Completed/Started messages. The operation of the Wake-up Sequencer is triggered by the end of the operation of the Completed/Started Handler 432. After the operation of the Wake-up Sequencer 440 is completed the Execution Timer 456 will perform its execution timer checks. The TIC Handler 436 will then proceed to update the Selection Queue 450 and the Completion Status List 458, to reset the execution timers, and update the Priority Scan List 446. After the Priority Scan List is updated, the Priority Scanner 448 will then transfer the highest priority available task from the Priority Scan List 446 to the Selection Queue 450. Finally, the Next Task Selector 452 will select the next task from the Selection Queue 450 and place it in the Next Task Register 454.

The details of the Reconfiguration Module 428 will be discussed relative to FIG. 47. When the System State is modified by the exclusion or readmission of a Node, it is necessary to reconfigure the assignment of tasks to the remaining operating Nodes. There are $2^N$ possible states for an N Node system. Thus, in an 8 Node system there are 256 possible states. The storage of a Separate Assignment List for each of these states would require an excessive amount of memory. Therefore, reconfiguration is effected by a transition-based algorithm which does not deal with the new state directly. Rather, it reconfigures the task load based upon the change between the old and new states. The transition-based approach is inherently less complex than a state based approach since there are only 2N possible transitions, representing exclusion or readmission of each of the N Nodes.

The active task set for a Node is defined as a set of tasks enabled for execution on that Node. For given tasks and Nodes a Boolean value "activation-status" may be used to represent whether a given task is enabled for execution on the given Node. The purpose of reconfiguration is to modify the activation-status for each task Node pair when the System State is modified by the exclusion or readmission of a Node. Three independent operations are needed to correctly manage the activation-status values.

(1) Individual taks may be enabled or disabled for all Nodes in the system to account for changes in the overall system capabilities. For example, when the total number of operating Nodes falls below some preset value, a task may be eliminated completely from the active tast set or replaced by functionally equivalent simpler tasks. This operation of activation or deactivation of a task is referred to as swapping. A task which may be enabled for execution is said to be swapped in while a task which is disabled is said to be swapped out.

(2) Active tasks may be reallocated among the operating Nodes of the system. For example, if a Node is excluded, one copy of each task as executed by that Node will be lost. In order to maintain the desired redundancy of each task, one copy of each affected task must be executed by some other Node. The Scheduler does not require all these tasks to be reassigned to one Node but rather may distribute these tasks among the remaining Nodes as desired. A side affect of reallocation is that it may require that lower priority tasks be swapped out if the remaining Nodes are highly utilized.

(3) Tasks may be prohibited from executing on individual Nodes based upon their operational status. For example, when a Node is excluded by a state transition, it is generally desirable to prohibit any application tasks from executing on that Node. However, it is desiravble for the excluded Node to initiate a comprehensive sequence of diagnostic tasks. The set of all the tasks in the system are divided into two mutually exclusive subsets, the included task set and the excluded task set. Members of the included task set may only be executed by the included Nodes and the members of the excluded task set may only be executed by excluded Nodes.

The following discussions define the operations required for the reconfiguration of the task in response to a State Transition. If multiple changes to the System Statem are required, they are performed sequentially one Node at a time in any multiple reconfiguration, all readmissions are processed before any exclusions are processed.

Referring now to FIG. 47, the Reconfiguration Module includes a Task Swapper 638, a Task Reallocator 640, and a Task Status Matcher 642. A Current and Next System State Comparator 644 receives the System State Vector from the Fault Tolerator Interface 416, as indicated in FIG. 34 and generates a Delta System State Vector which identifies only those Nodes whose System State has changed between the next System State and the current System State. The Delta System State Vector also includes a flag indicating whether any Node has been readmitted to the current operating set. The Task Swapper 638 generates a Boolean swap-status value indicating whether the task is swapped in or swapped out of the Active Task set. This process uses the Swap Table 646 which is contained on the Scheduler RAM 422 as previously described. The Task Reallocator 640 generates one Boolean allocation-status value for each task-node pair in the system. The Task Reallocator 640 uses the Allocation Tables 648 which are contained in the Scheduler RAM 422, as indicated in FIG. 35. The Status 642 Matcher generates a Boolean match-status value for each task-node pair. The Task Status Matcher 642 uses the Relevance Vector Table 650 which is one of the tables stored in the Scheduler ROM 424, as previously discussed with reference to FIG. 36. The swap-status value, the allocation-status value, and the match-status value are handled together as symbolically indicated by AND Gate 652 and stored in the Task Activity List 444 shown in FIG. 37.

Figure 48:
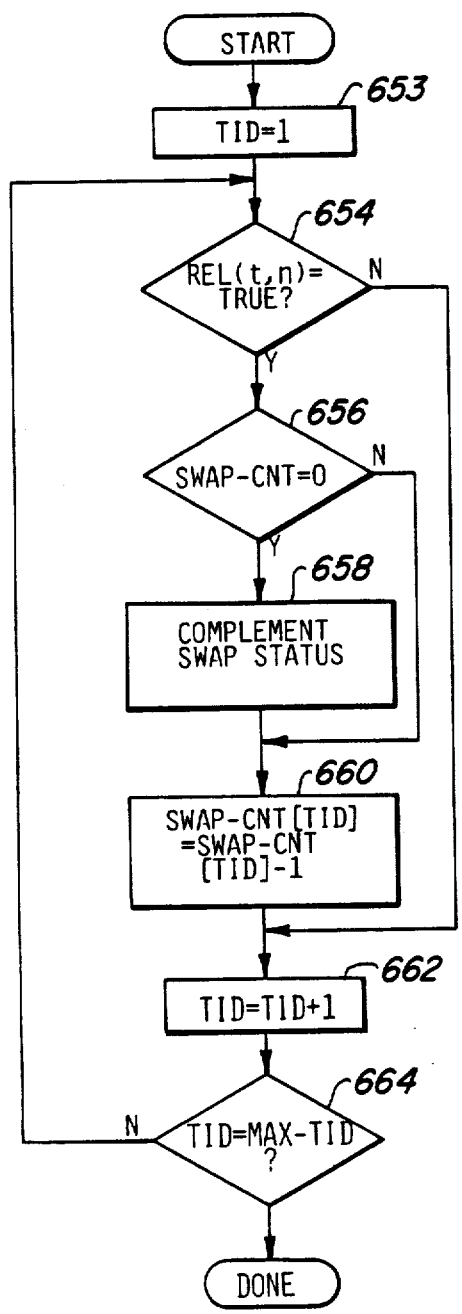
FIG 48 is a flow diagram for the Task Swapper's operation in response to a Node being excluded from the operating set.

The operation performed by the Task Swapper 638 is largely one determining the relevance of each Node to each task. The application designer may define any subset of the Nodes as relevant to the performance of each task. The swapped-status of each task is determined solely by the number of relevant Nodes included in the operating set. When a State Transition occurs, the new System State is examined to determine whether the number of relevant Nodes in the operating set will change the swap-status of each task. The number of relevant Nodes at which the change is required is defined as the "toggle value" for that task. In the preferred embodiment of the system, two toggle values are provided to enhance the flexibility for system reconfiguration. The operation of the Task Swapper 638 will be discussed relative to the flow diagram in FIG. 48.

The operation of the Task Swapper 638 begins with the setting of the pointers of the Relevance Vector in the Scheduler ROM 424 and the pointer to the Swap Tables in the Scheduler RAM 422 to the first task, as indicated by block 653. The Task Swapper will then inquire if the task is relevant to the Node excluded from the operating set as indicated by decision block 654. If the task is not relevant to the excluded Node, the Task Swapper will proceed to evaluate the next task, as indicated by block 662. However, if the task is relevant to the excluded Node, the Task Swapper will inquire, as indicated by block 656, if the number of relative Nodes in the System State is equal to the Toggle Point (swap count=0). If the number of relevant Nodes equals the Toggle Point, the Task Swapper 638 will complement the swap status, as indicated by block 658, then will decrement the swap count for that task in the Swap Table 646 as indicated by block 660. However, if the swapped count is not equal to 0, the Task Swapper 638 will not complement the swap status of that task, but will simply decrement the swap count stored in the Swap Table 646. After decrementing the Swap Table 646, the Task Swapper will proceed to increment TID pointers to the next task as indicated by block 662 then inquire if this task is the last task in the system as indicated by decision block 664. If it is the last task, the operation of the Task Swapper is completed, otherwise the Task Swapper will repeat the above process until all the tasks have been evaluated.

Figure 49:
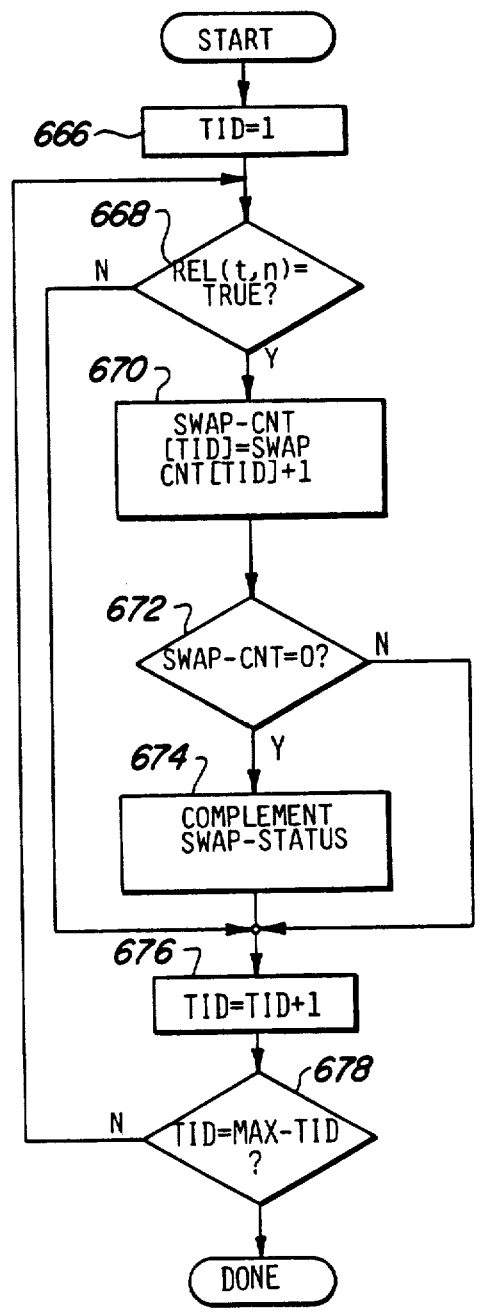
FIG. 49 is a flow diagram of the Task Swapper's operation in response to a Node being readmitted to the operating set.

The operation of the Task Swapper 638 when the Delta System State Vector indicates that a Node has been readmitted to the system is indicated in the flow diagram in FIG. 49. As indicated with reference to operation of the Task Swapper for an excluded Node, when a Node is readmitted into the operating set, the Task Swapper 638 will first set the pointers to the Preference Vector entry of the ROM 424 and the Swap Table 646 to the first task (TID=1) as indicated by block 666. The Swap Table 646 is part of the Scheduler RAM 422 as illustrated in FIG. 34. The Task Swapper will then inquire, decision block 668, if the task is relevant to the Node which has been readmitted into the operating set. If the task is not relevant to the readmitted Node, the Task Swapper will proceed to evaluate the next task, as indicated by block 676 and decision block 678. However, if the task is relevant to the readmitted Node, the Task Swapper will increment the swapped count in the Swap Table 646 as indicated by block 670 then inquire, as indicated by decision block 672, if the number of relevant Nodes is equal to the Toggle Point. If the number of relevant Nodes equals the Toggle Point, then the Task Swapper 638 will complement the swap status of that task, as indicated by block 674 and proceed to the next task, as indicated by block 676. If the number of relevant Nodes is not equal to the Toggle Point (swap count≠0), the swap-status of the task will not be complemented and the Task Swapper will proceed to evaluate the next task, as indicated in block 676. The Task Swapper will then inquire, as indicated by decision block 678, if the task was the last task to be evaluated. If the last task has been processed, the Task Swapper 638 is finished with its operation, otherwise the process will be repeated for each task until the last task is processed.

The swapping process has the following properties:

(1) All tasks and toggle points are treated independently;

(2) The swapped status depends on the number of available relevant Nodes, not on the identity of those Nodes; and (3) The process is reversible and path independent. The swapped status of a task depends only on the System State and not on the sequenace of transitions which preceded that state.

The operation of the Task Reallocator 640 is very similar to the process of the Task Swapper. There are, however, two major differences between swapping and reallocation:

(1) In reallocation, not all Nodes respond identically to a particular change of state. For example, if a give Node is excluded, a second Node may be required to assume the excluded Node's tasks, while the rest of the Nodes take no action whatsoever. It is, therefore, necessary to treat each Node independently.

(2) In order to reallocate active tasks, it is not sufficient to note just the relevance of a given Node to each task. A method is required to determine which of the operating Nodes will assume or drop tasks in response to the transition. This is accomplished by allocating each task to various Nodes in a predetermined order of preference.

The "preferred set" for a given task-node pair is defined as the set of Nodes which are more preferred than others for execution of a given task. The application designer may define any subset of system Nodes which are the preferred set for each task-node pair. The allocation-status of each task-node pair is determined solely by the number of preferred Nodes included in the current System State. When a State Transition occurs, the new System State is examined to determine whether the number of preferred Nodes in the operating set will change the allocation-status of each task. The number of preferred Nodes at which the change is required is defined as a Toggle Value for that task and Node. In general, any number of Toggle Values may be defined for any task pair. However, only one Toggle Value is required for each task-node pair to provide the flexibility desired for system reconfiguration.

Figure 50:
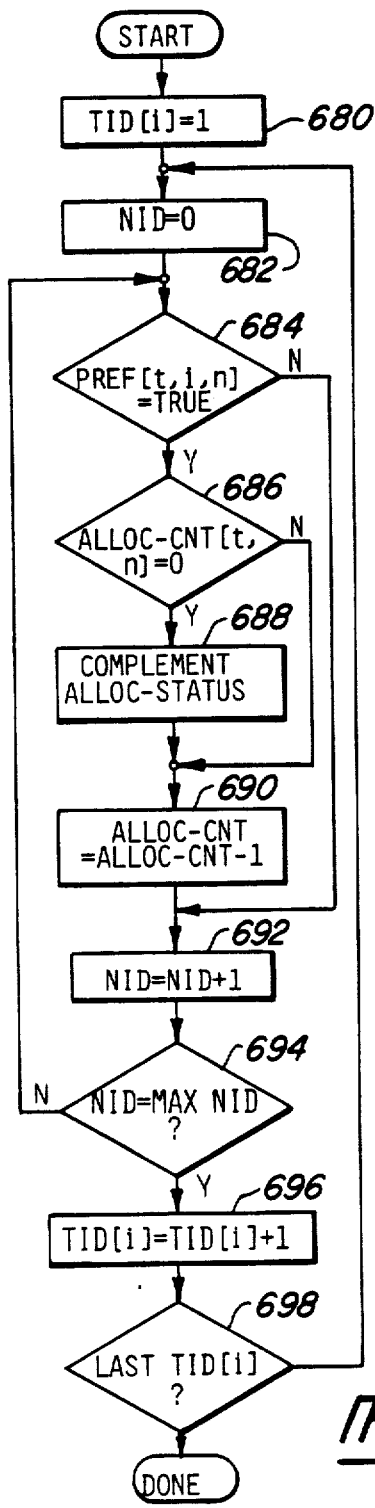
FIG. 50 is a flow diagram of the Task Reallocator's operation in response to a Node being excluded from the operating set.

The Reallocation process begins with the first task, as indicated by block 680, in FIG. 50. The Task Reallocator 640 will then start with the first Node (NID=0), as indicated by block 682. The Task Reallocator 640 will then inquire if the excluded Node (i) is a more preferred Node for that task than the Node (n) being evaluated, as indicated in decision block 684. If the excluded Node (i) it is not a more preferred Node for that task, the Task Reallocator will then proceed to determine if it is a more preferred Node than the next Node, as indicated by block 692 and decision block 694. If the excluded Node is a more preferred Node for the execution of the task, then the Task Reallocator inquires if the number of preferred Nodes in the state equals the Toggle Point (allocation count=0), as indicated in block 686. If the number of preferred Nodes is equal to the Toggle Point, the allocation-status for Node (n) is complemented, as indicated in block 688, otherwise the allocation-status is not complemented and the allocation count for that task-node combination is decremented, as indicated by block 690. After decrementing the allocation count, the Task Reallocator will increment the pointer to the next Node, as indicated by block 692 then inquire, as indicated by decision block 694, if the Node is the last Node in the system. If it is not the last Node, the Task Reallocator will repeat the process for each Node until the last Node is evaluated then the Task Reallocator will index to the next task, as indicated by block 696 and repeat this process until all of the task-node combinations have been completed, as indicated by decision block 698.

The operations of the Task Reallocator treats all tasks Nodes and Toggle Points independently. The allocation-status depends on the number of available preferred Nodes and not on the identity of these Nodes. Also, the operation of the Task Allocator is reversible and path independent. For example, if the Delta System State Vector indicates a Node has been readmitted into the operating set, the operation of the Task Allocator parallels that of the Task Swapper in that the allocation count is incremented rather than decremented, as indicated by block 680 and the incrementing of the allocation count takes place prior to the inquiry to determine if the number of preferred Nodes in the state is equal to the Toggle Point, as indicated by decision block 676. The allocation-status of the task-node pairs depends only on the System State and not on the sequence of transitions which preceded that task.

The operation of the Task Status Matcher 642 will be discussed with reference to FIG. 51. When a Node is excluded from the operating set for a faulty behavior, it is generally desirable to prohibit application tasks from executing on that Node. However, it is desirable, to institute a comprehensive set of diagnostic tasks on the excluded Nodes. The Swapping and Allocation processes described above are not capable of supporting this function. Therefore, the total task set is divided into two mutually exclusive sets, the included task set and the excluded task set. The tasks of the included task set are permitted to be active only on the Nodes included in the operating set. Similarly, the tasks in the excluded task set are permitted to be active only in the Nodes excluded from the operating set.

If the included/excluded status of a given task matches the included/excluded status of a given Node, then the activation-status of that task on the Node is determined by the Swapping and Allocation processes. Conversely, if the status of the task does not match the status of the Node, then that task is prohibited from being executed on that Node regardless of the results of the swapping and reallocation processes.

Figure 51:
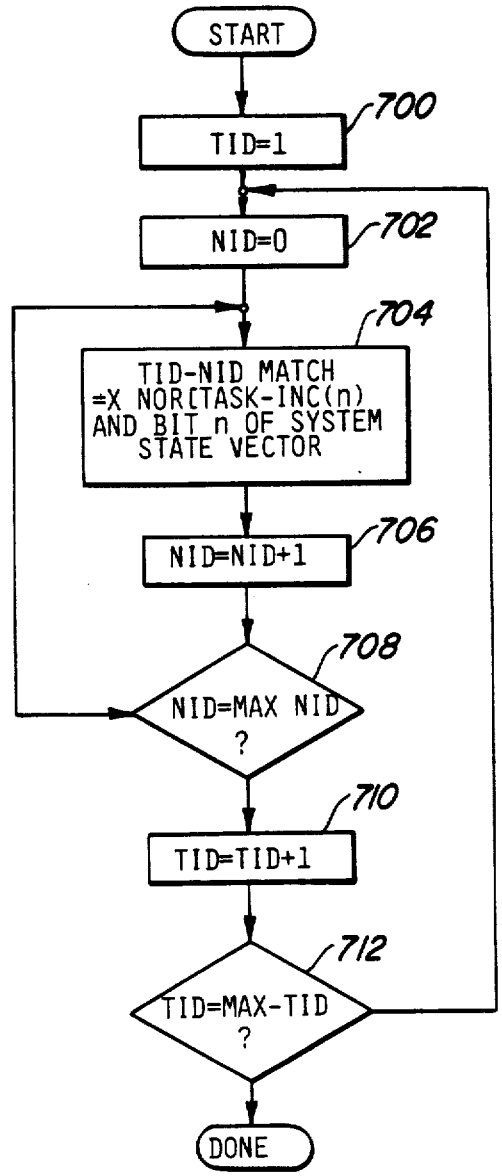
FIG. 51 is a flow diagram of the Task Status Matcher's operation.

Referring now to FIG. 51, the Task Matching Process begins by setting the task pointer to the first task, as indicated by block 700. The Task Status Matcher 642 then sets the pointer to the first Node (NID=0), as indicated by block 702. The Task Status Matcher then determines if there is a match between the included/excluded status of the task with the included/excluded status of the Node, as indicated by the System State Vector. This is indicated in block 704 which says "TID-NID match equal to the Exclusive OR the Relevance Vector contained in ROM 424 and bit "n" the System State Vector." The Task Status Matcher will then process the next Node, as indicated by block 706 and decision block 708 until all of the Nodes have been evaluated with respect to the given task. The Task Status Matcher 642 will then index the task pointer to the next task, as indicated by block 710 and repeatedly evaluate all of the tasks until the last task has been evaluated, as indicated by decision block 712. After all of the task-node combinations have been evaluated, the operation of the Task Status Matcher is completed.

TASK COMMUNICATOR

Figure 52:
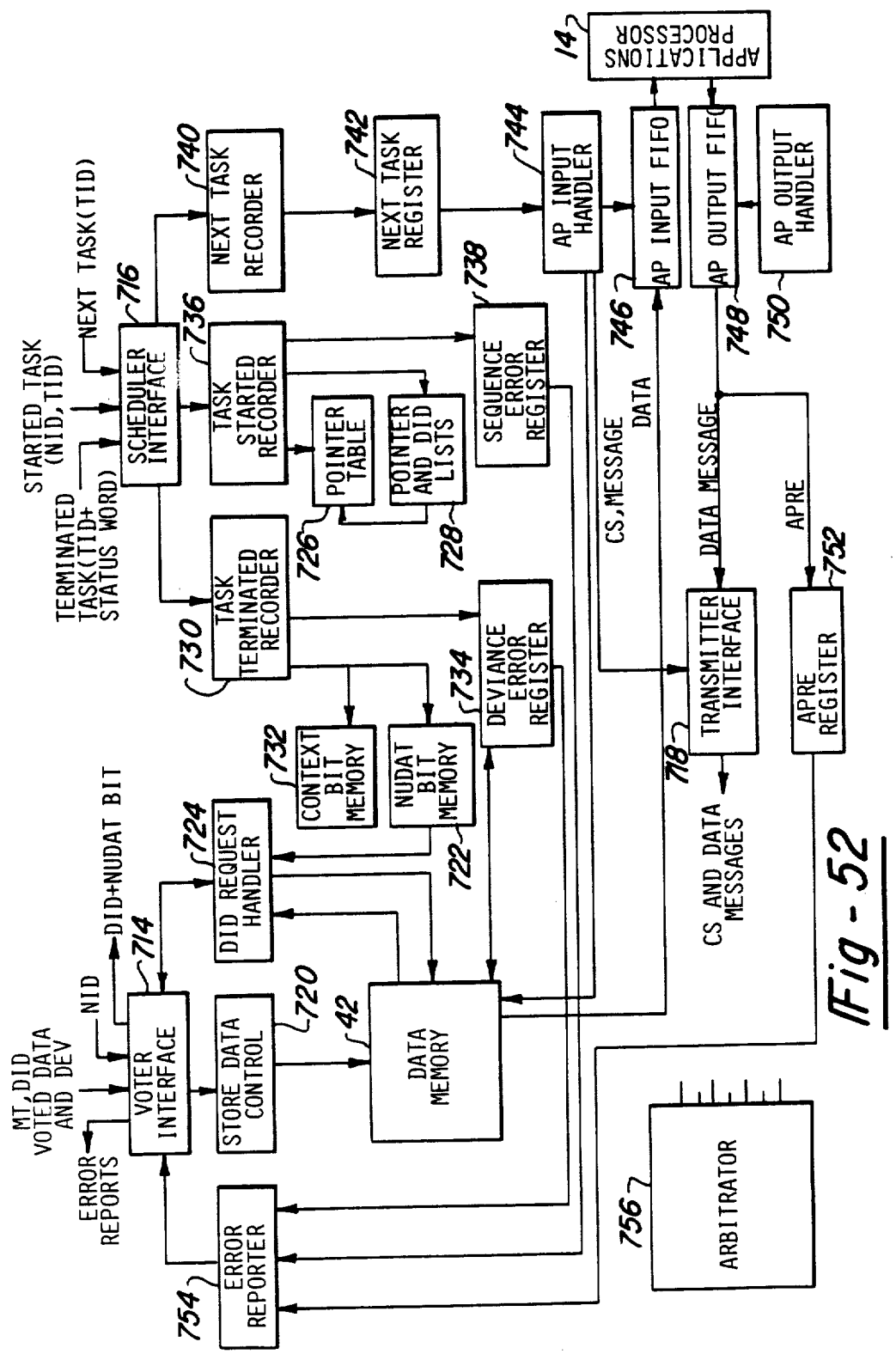
FIG. 52 is a block diagram of the Task Communicator.

The details of the Task Communicator 44 are shown in FIG. 52. However, the operation of the Task Communicator will be discussed in detail with reference to the subsystem diagrams and flow diagrams shown in FIGS. 53 through 70.

The Task Communicator 44 coordinates and supports all the communications between the Operations Controller 12 and its associated Applications Processor 14. Upon demand, the Task Communicator 44 provides the Applications Processor 14 with the Task Identification Code (TID) of the next task to be executed and supplies the required input data values. The Task Communicator receives all output data generated by the Applications Processor 14 and broadcasts them to all the other Nodes in the system via the Transmitter 30. When the Applications Processor 14 reports an error condition, the Task Communicator 44 reports the error condition to the Fault Tolerator 36 through the Voter 38. When a task is completed by the Applications Processor 14, the Task Communicator receives the value of the Branch Condition (BC) generated by the Applications Processor 14, and broadcasts it to all the other Nodes in the next Task Completed/Started message.

The Task Communicator 44 communicates directly with the Scheduler 40, the Voter 38, the Transmitter 30, and the Applications Processor 14. The Task Communicator has a table which lists by tasks the expected sequence of the input data to be used by the Applications Processor 14 and the expected sequence of the output data generated by the Applications Processor. Using messages from the Scheduler 40, the Task Communicator keeps track of the current tasks currently being executed by all the Nodes and uses this information to supply information to the Voter relating to the message currently being processed.

Referring to FIG. 52, the Task Communicator has a Voter Interface 714, a Scheduler Interface 716, and a Transmitter Interface 718. The Voter Interface 714 interfaces with the Voter 38 and receives the voted data and deviance vector and the Message Type Code (MT), and Data Identification Code (DID) of the voted data. The Voter will also send the Node Identification Code (NID) of a Node from which it has received data and request that the Task Communicator identify the DID of the data it has received. The Voter Interface 714 will also receive an Error Report from an Error Reporter 754 which is communicated to the Voter Interface 74.

The Voter Interface 714 receives data and the associated MT and DID codes from the Voter 38. A Store Data Control 720 passes the data to the Data Memory where it is stored using the MT and DID codes and the complement of a context bit taken from a Context Bit Memory 732 as an address. The Data Memory is partitioned in a manner similar to that previously discussed with reference to the Fault Tolerator RAM 162 and shown in FIG. 16. The context bit taken from a Context Bit Memory 732 is used to store the data in the Data Memory 42 in the appropriate partition. A DID Request Handler 724 receives a DID request from the Voter 38 through the Voter Interface 714 in the form of a Node Identification Code (NID). The DID Request Handler 24 will access a Pointer Table 726 and transmit back to the Voter 38, the identity (DID) of the expected data that the Voter should currently be processing. If the Voter detects a mismatch between the expected DID and the DID of the data value it is currently processing it will set an error flag.

The Scheduler Interface 716 receives from the Scheduler 40 the identification of the task terminated, the identification of the task started, the identification of the Node, and the next task selected by the Scheduler. A Task Terminated Recorder 730 will flip the context bit of the Context Bit Memory 732 for output DID's of the task reported as terminated. The Task Terminated Recorder 730 will also set a new NUDAT bait in a Nudat Bit Memory 722 indicating to the Voter next time it requests that same DID it will be the first request for that DID since the task that generated it was terminated. The Task Terminated Recorder 730 will also OR all the deviances stored in the Data Memory 42 for the terminated task output DID's and store them in a Deviance Error Register 734.

A Task Started Recorder 736, upon the receipt of a message from the Scheduler Interface 716 indicating the starting of a new task by any Node in the system, will access the Pointer Table 726 to determine if the address stored in the Pointer Table points to a null DID indicating that the Node had completed the preceding task. If the address stored in the Pointer Table 726 does not point to a null DID, the Task Started Recorder 736 will set a sequence error flag for that Node which is stored in a Sequence Error Register 738. After it has completed this check, the Task Started Recorder 736 will access the pointer in a DID List 728 with the Task Identification Code (TID) of the task started and store the address for the first DID in that task in the Pointer Table 726. A Next Task Recorder 740 will store the next task received from the Scheduler in a Next Task Register 742.

An AP Input Handler 744 will transfer the identification of the next task stored in the Next Task Register 742 to an AP Input FIFO 746. The AP Input Handler will then access the Pointer and DID List 728 with the Task Identification Code (TID) and get the address for the data stored in the Data Memory 42 needed for the execution of that task. This data will then be stored in the AP Input FIFO 746. When the Applications Processor 14 is ready to begin the execution of the next task, it will access the AP Input FIFO 746 for the Task Identification Code and the data necessary for the execution of the task. The AP Input Handler 744 will also generate a Task Completed/Started message which is sent to the Transmitter 30 through the Transmitter Interface 718, which transmits this message to all the other Nodes in the system. When the Applications Processor 14 executes the selected task, the data resulting from the executing of the task will be stored in an AP Output FIFO 748. An Applications Output Handler 750 will access the pointer and DID List 728 and obtain the Message Type Code (MT) and the Data Identification Code (DID) for each data value generated by the Applications Processor. Each Message Type Code, and the Data Identification Code along with the data is transmitted to the Transmitter Interface 718 and transmitted by the Transmitter 30 to all the other Nodes in the system. The last word generated by the Applications Processor 14 contains an Applications Processor Reported Error (APRE) vector which is stored in an APRE Register 752. The last word generated by the Applications Processor 14 also contains the branch condition bit which is to be included in the next Task Completed/Started message generated by the AP Input Handler 744. This branch condition is stored in the Transmitter Interface 718 until it receives the remainder of the Task Completed/Started message from the AP Input Handler 744.

The Error Reporter 754 receives the Deviance Error Vector from the Deviance Error Register 734, the Sequence Error Vector from the Sequence Error Register 738, and the Application Processor Reported Error Vector from the APRE Error Register 752 and transmits these Error vectors to the Voter 38 through the Voter Interface 714. An Arbitrator 756 arbitrates the operation of the various Modules in the Task Communicator.

Figure 53:
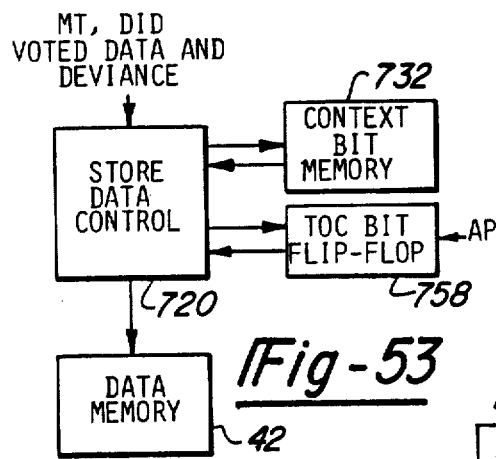
FIG. 53 is a partial block diagram of the Task Communicator showing the elements associated with the operation of the Store Data Control.
Figure 54:
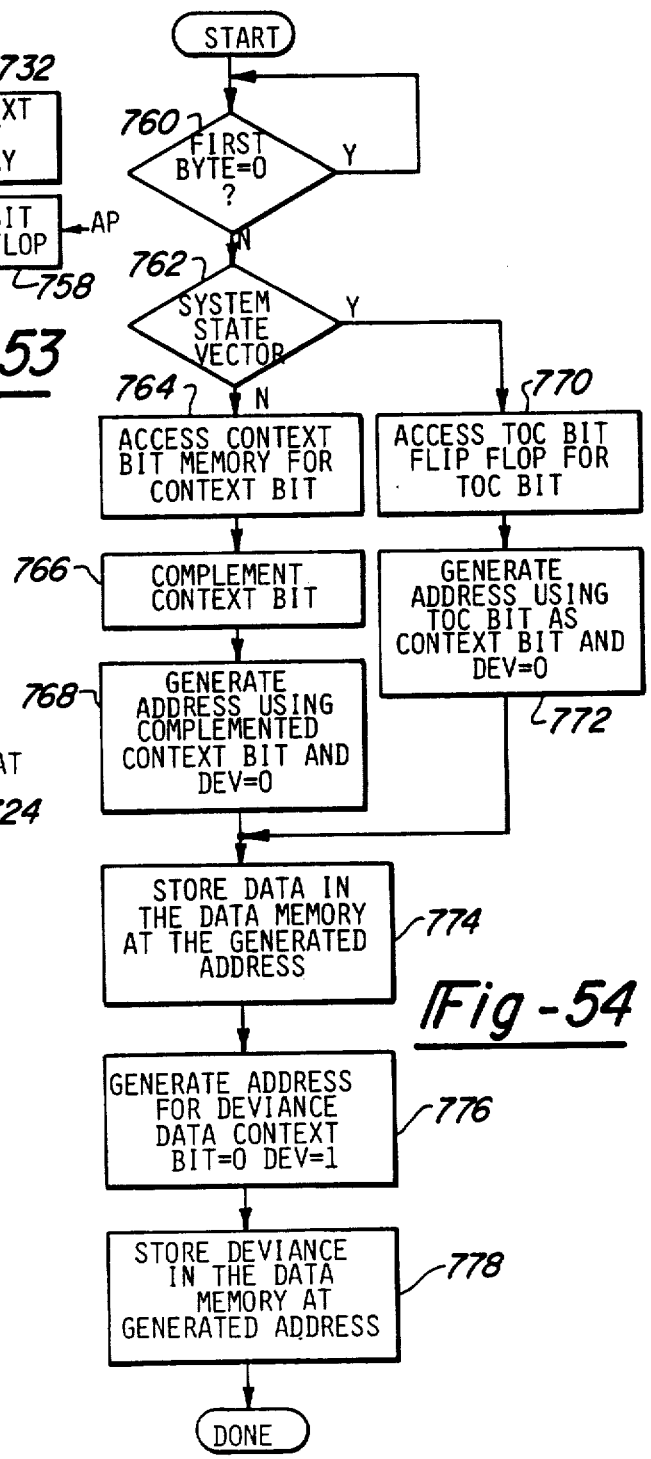
FIG. 54 is a flow diagram of the Store Data Control's operation.

The operation of the Store Data Control will be discussed relative to FIG. 53 and the flow diagram shown in FIG. 54. As more clearly indicated in FIG. 53, the Store Data Control receives the voted data and deviances from the Voter. Along with this information, it also receives the Message Type Code (MT) and the Data Identification Code (DID). Referring now to FIG. 53, the operation of the Store Data Control 720 begins by evaluating the first byte received from the Voter Interface 714, as indicated by decision block 760. When the first byte is all 0's, as indicated in block 760, there is no data available and the Store Data Control 720 will wait until it receives the first non-zero first byte. After receiving a non-zero first byte, the Store Data Control 720 will inquire, as indicated in decision block 762, if the data is a System State vector. If the data is not a System State vector, the Store Data Control 720 will access the Context Bit Memory 732 for the state of the context bit, using MT and DID codes as indicated by block 764. The Store Data Control 720 will then complement the context bit, as indicated by block 766 then generate an address, block 768, using the complemented context bit and the deviance bit set equal to zero (DEV=0). However, if the data is a System State Vector, the Store Data Control 720 will access a TOC Bit Flip Flop 758 for the TOC bit, as indicated by block 770 then generate the address using the TOC bit as the context bit and setting the deviance bit to zero, as indicated by block 772. The TOC bit marks the Atomic period in which the System State Vector was generated. The TOC Bit Flip Flop 758 is complemented to mark the beginning of each new Atomic period in response to the rising edge of the Atomic period (AP) signal.

In either case, after the address is generated, the Store Date Control 720 will then store the voted data in the Data Memory 42 at the generated address, as indicated by block 774. The Store Data Control 720 will then generate an address for the deviance vector by setting the deviance bit equal to 1 and the context bit equal to 0 as indicated by block 776. It will then store the deviance vector in the Data Memory 42, as indicated by block 778.

As previously indicated, a change in the System State will only occur at the Atomic period boundaries. Therefore, for those tasks which require the current System State Vector, this Vector is stored in the Data Memory 42 and the TOC bit identifies where the current System State Vector is stored. The Context Bit Memory 732 stores a context bit for each DID used in the system and the context bit identifies which of the data stored in the Data and Deviance RAM is the current data and which data is pending or incomplete since all of the copies of that data have not been received. The context bits in the Context Bit Memory 732 for the output DID's of each terminated task are complemented by the Task Terminated Recorder 730 in response to a message from the Scheduler that a particular task is terminated. The Task Terminated Recorder 730 will the complement all of the DID's which resulted from the terminated task as shall be discussed hereinafter.

The DID Request Handler 724 receives from the Voter Interface 714 the identification or NID of the Node whose data is being processed by the Voter 38 indicating that the Voter is requesting the Data Identification (DID) Code of the data currently being processed a NUDAT bit embedded in this DID code tells the Voter 38 whether this is the first time the Voter has requested this particular DID since termination of the task that generated the data.

Figure 55:
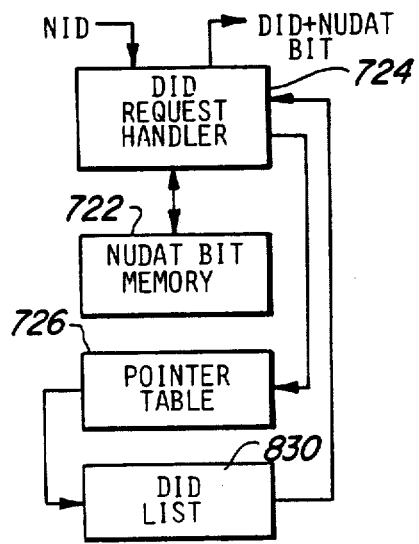
FIG. 55 is a partial block diagram of the Task Communicator showing the elements associated with the operation of the DID Request Handler.

As shown in FIG. 55, the DID Request Handler will address the Pointer Table 726 with the NID to obtain a Pointer to a DID List 830 which is part of the Pointer and DID List 728 shown in FIG. 52. The DID Request Handler will then access the DID List 830 and obtain the Data Identification Code DID from the DID List 830. It will then access the Nudat Bit Memory 722 and transmit the nudat bit with the DID back to the Voter 38 through the Voter Interface 714.

Figure 56:
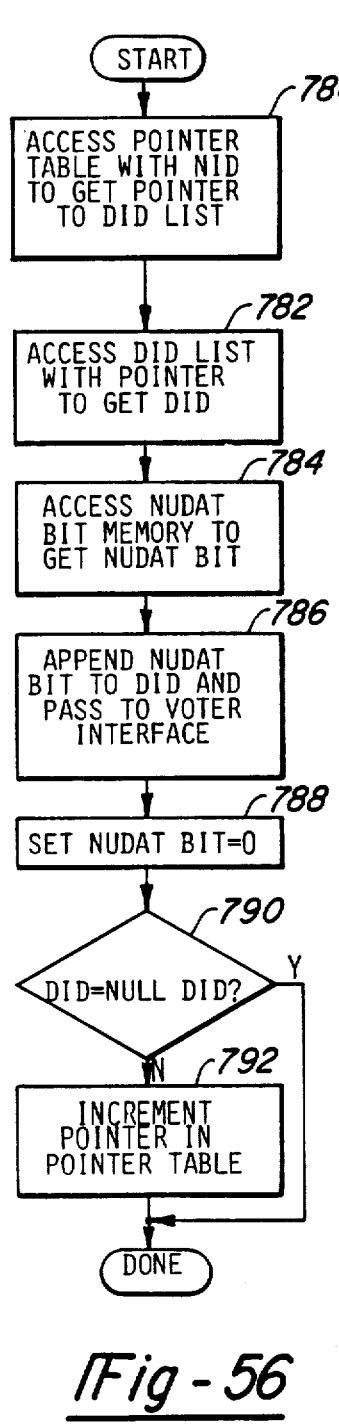
FIG. 56 is a flow diagram of the DID Request Handler's operation.

Referring now to FIG. 56, the operation of the DID Request Handler 724 begins by accessing the Pointer Table 726 with the NID to get the Pointer to the DID List 830, as indicated by block 780. The DID Request Handler will then access the DID List 830 to get the DID of the data which is currently being processed by the Voter, as indicated by block 782. The DID Request Handler 724 will then access the Nudat Bit Memory 722 to get the NUDAT bit, as indicated by block 784. It will then append the NUDAT bit to the DID as indicated by block 786 and pass the DID and the NUDAT bit to the Voter Interface 714. The DID Request Handler will then set the NUDAT bit to 0, as indicated by block 788, then inquire, as indicated by decision block 790, if the DID was a null task. If it was not a null task, the DID Request Handler 724 will then increment the pointer in the Pointer Table 726 to the next DID for that Node, as indicated by block 792. However, if the DID was a null DID, the DID Request Handler 724 will not increment the pointer in the Pointer Table 726 but will leave it at the null DID indicating that all the DID's for that task have already been transmitted.

The data stored in the DID List has two 8 bit bytes, as shown in FIG. 65. The first byte consists of three fields, a Data Value Mask, a Data Type, and a Message Type. The second byte is the actual Data Identification Code (DID) of the data. This information is used by the AP Output Handler 750 to tag the data generated by the Applications Processor 14 in the transmitted Data Value message. The DID Request Handler 724 will append the NUDAT bit to the most significant bit position (MSB) of the first byte obtained from the Data List 830, as indicated in FIG. 66, since the most significant bit of the Data Value Mask is not needed by the Voter 38.

Figure 57:
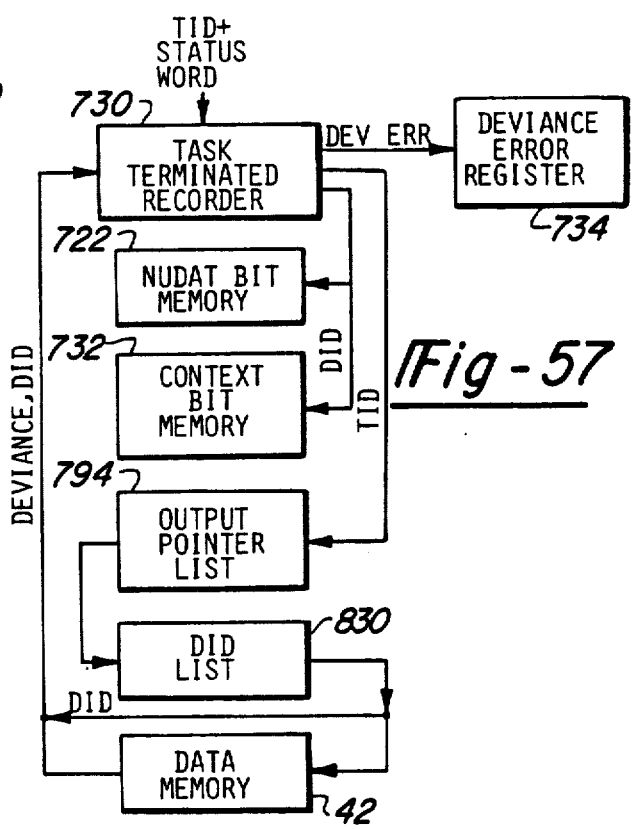
FIG. 57 is a partial block diagram of the Task Communicator showing the elements associated with the operation of the Task Terminated Recorder.
Figures 58, 60:
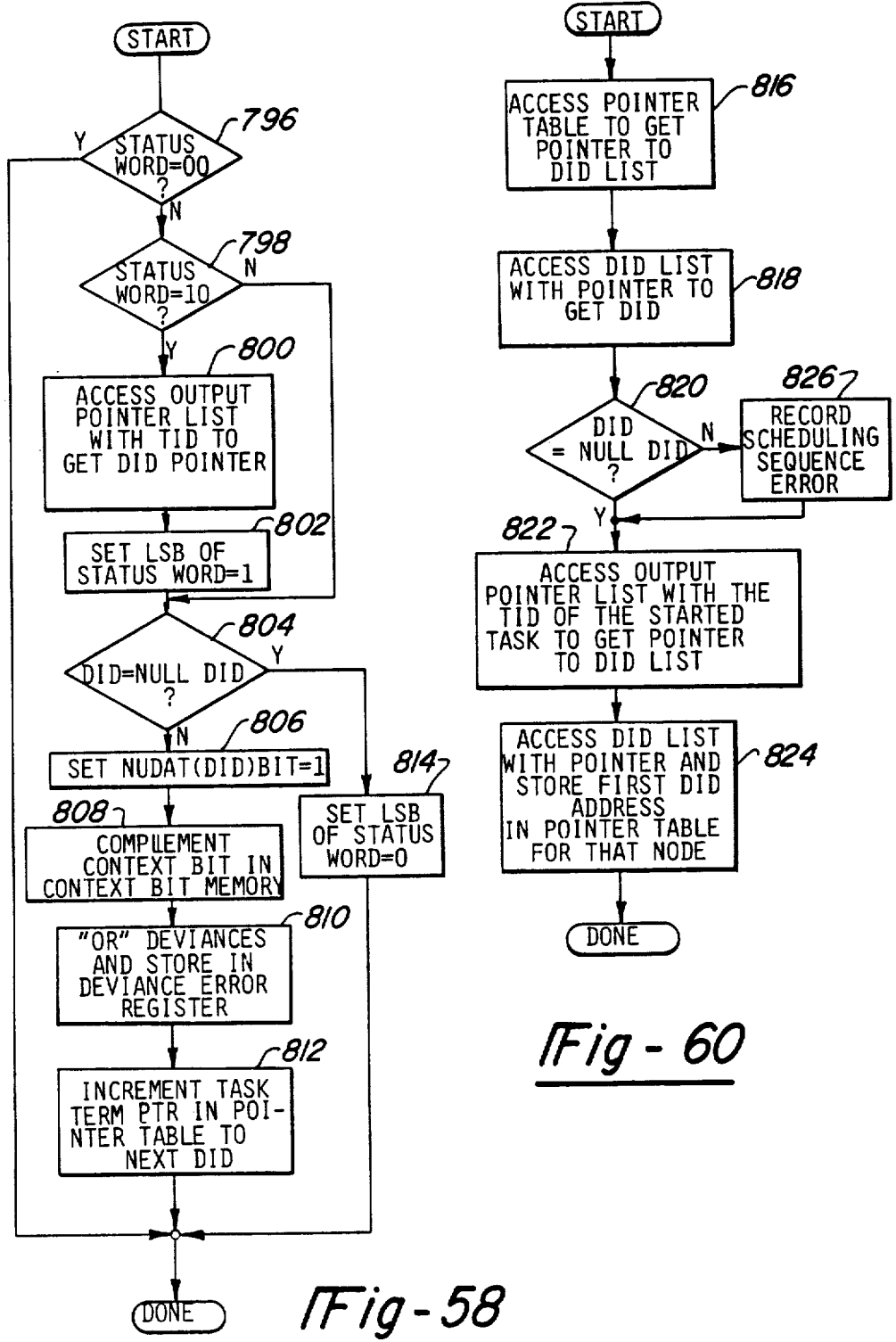
FIG. 58 is a flow diagram of the Task Terminated Recorder's operation.
FIG. 60 is a flow diagram of the Task Started Recorder's operation.

The operation of the Task Terminated Recorder 730 shall be discussed relative to the block diagram shown in FIG. 57 and the flow diagram shown in FIG. 58. Referring first to the block diagram shown in FIG. 57, the Task Terminated Recorder 730 receives the Task Identification Code (TID) of the Terminated Task from the Scheduler Interface 716. The Task Terminated Recorder 730 will then access the Output Pointer List 794 which is part of the Pointer and DID List 728 shown in FIG. 52. The Output Pointer List 794 and the DID List 830 are embodied in a common offboard ROM not shown. The Task Terminated Recorder 730 will then access the Context Bit Memory 732 and the Nudat Bit Memory 722, and complement the context bits and set the NUDAT bits for all the DIDs that resulted from the terminated task. The Task Terminated Recorder 730 will then, using the addresses obtained from the DID List 830 access the deviance vectors stored in the Data Memory 42 for all the deviance vectors associated with the DIDs of the terminated task. It will then OR all of these deviance vectors with the content of the Deviance Error Register 734.

The operation of the Task Terminated Recorder 730 will now be discussed with reference to the flow diagram shown in FIG. 58.

The operation of the Task Terminated Recorder 730 begins by inquiring, as indicated by block 796, if there is a task to be terminated. If there is no task to be terminated, as indicated, by the two bits of the Status Word being 0's, the Task Terminated Recorder 730 will do nothing. However, if either of the bits of the Status word is a 1 then the Task Terminated Recorder will inquire, as indicated by decision block 798, if the Status word is a 10. The least significant bit of this Status Word indicates whether the task is a null task which requires no further action by the Task Termination Recorder 730. If it is not a null task, the Task Terminated Recorder 730 will access the Output Pointer List 794 to get a Pointer to the DID List 830, as indicated by block 800. The Task Terminated Recorder will then set the least significant bit of the Status Word to 1, as indicated by block 802. The Task Terminated Recorder 730 will then access the DID List 830 with the Pointer and will inquire, as indicated by block 804, if the DID is a null DID, indicating that it is the last DID of that task. If it is a null DID, then the Task Terminated Recorder 730 will set the least significant bit of the status word to 0, as indicated by block 814 and terminate the processing of the terminated task. If, however, DID is not a null DID, the Task Terminated Recorder will set the nudat bit for that DID to 1, as indicated by block 806, complement the context bit in the Context Bit Memory for that DID, as indicated by block 808. The Task Terminated Control 736 will then OR the deviances stored in the Data Memory 42, as indicated by block 810 and store the OR values in a Deviance Error Register 734 to generate a deviance vector which is transmitted to the Voter Interface 714 by the Error Reporter 754. The task terminated pointer in the Pointer Table 726 is incremented as indicated by block 812.

Figure 59:
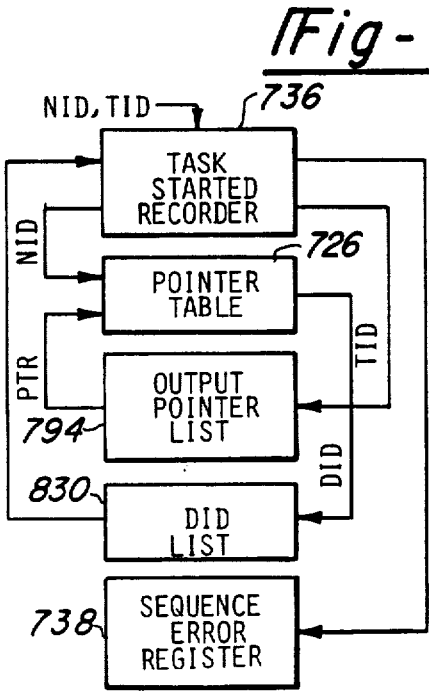
FIG. 59 is a partial block diagram of the Task Communicator showing the elements associated with the operation of the Task Started Recorder.

The operation of the Task Started Recorder 736 will be discussed with reference to the block diagram shown in FIG. 59 and the flow diagram in FIG. 60. Referring first to the block diagram of FIG. 59, the Task Started Recorder 736 receives the TID and NID of the task started which is contained in a received Task Started message from the Scheduler 40. The Task Started Recorder 736 will first check the Pointer Table 726 to determine if the current DID is a null DID. If it is not, it will record a sequence error in the Sequence Error Register 738 for the identified Node. This check is made because a new task should not have been started until all the data from the preceding task has been received. The Task Started Recorder 736 will then update the Pointer Table 726 by accessing the Output Pointer List 794 with the TID to get the Pointer to the DID List 830 for the first DID resulting from the execution of that task. The Task Started Recorder 736 will then store the Pointer obtained from the Output Pointer List 794 into the Pointer Table 726.

Referring now to FIG. 60, the operation of the Task Started Recorder 736 begins with accessing the Pointer Table 726 to get the pointer to the DID List 830, as indicated in block 816. The Task Started Recorder will then access the DID List 830 with the pointer to get the DID currently being stored for that Node, as indicated by block 818. Then it will inquire, as indicated by decision block 820, if the DID is a null DID. If it is not, the Task Started Recorder will record a scheduling error in the Sequence Error Register 738, as indicated by block 826. However, if the DID task is a null DID, the Task Started Recorder will access the Output Pointer List 794 with the TID of the started task to get the Pointer to the DID list 830 to the first DID for that task, as indicated by block 822. It will then access the DID list 830 with the Pointer then write the address of the first DID into the Pointer Table 726 for that Node, as indicated by block 824, completing the recording of the task started.

Figure 61:
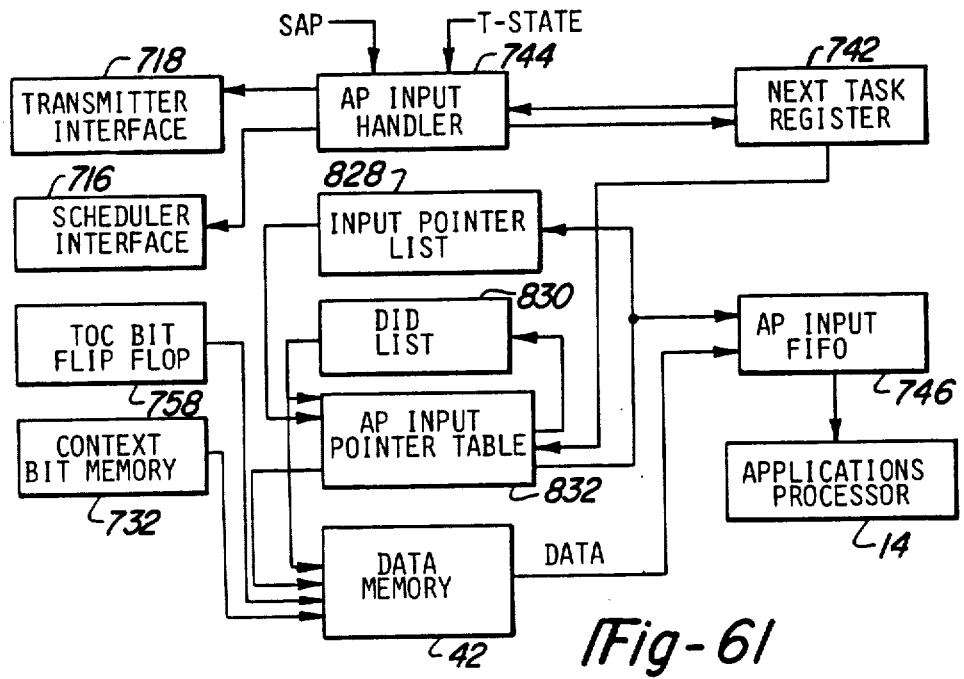
FIG. 61 is a partial block diagram of the Task Communicator showing the elements associated with the operation of the AP Input Handler.

The details of the AP Input Handler 744 will be discussed relative to the block diagram shown in FIG. 61 and the flow diagram shown in FIG. 62. The AP Input Handler 744 identifies and fetches the input data values required by the Applications Processor 14 for the execution of the next task. From the view point of the Applications Processor 14, the Task Communicator 44 acts like a storage device containing an input file. The values are provided in a predetermined order as specified by the input TID-to-DID Mapping List for the current TID. As previously described, each input data mapping word DID consists of the Data Value Mask (DVM), the Data Type (DT), and the Message Type (MT), and the actual Data Identification Code (DID) which is the starting address of the data value in the Data Memory 42. The addresses are ambiguous because each address points to two different locations in the Data Memory 42. The context bit for a particular DID defines the location that has the current input data.

The AP Input Data Handler 744 fetches each current data value from the Data Memory 42 and loads it into the AP Input FIFO 746. Upon a request from the Applications Processor 14, the data values from the AP Input FIFO 746 are transferred to the Applications Processor. This cycle is repeated until all input data values have been transferred. Referring now to FIG. 61, the AP Input Handler 744 interacts with an Input Pointer List 828, the DID List 830, an AP Input Pointer Table 832, and the AP Input FIFO 746. The Input Pointer List 828 and the DID List 830 are part of the Pointer and DID List 728 shown in FIG. 52 and are embodied in an off-board ROM (not shown). The AP Input Handler 744 receives the next task from the Next Task Register 742 and, using the Input Pointer List 828, DID List 830, and the AP Input Pointer Table 832, will extract from the Data Memory 42 the data required for the execution of the task. This information is stored in the AP Input FIFO 746 and made available to the Applications Processor 14. The AP Input Handler 744 will also generate a Task Completed/Started message identifying the task completed and the next task to be started by its own Applications Processor 14. The AP Input Handler 744 will also generate a Task Release message sent to the Scheduler 40 through the Scheduler Interface 716. The contents of the TOC Bit Flip Flop 758 are appended to the addresses stored in the AP Input Pointer Table 832 to identify the current system state. The contents of the Context Bit Memory 732 are appended to the addresses to identify the current data values stored in the Data Memory 42. The mapping list for each task in the Input Pointer List 828 consists of a contiguous group of DID's terminated by a null DID. A pointer to the beginning of each mapping list is stored in the Input Pointer List 828 and is addressed by the TID of the task. The null DID is used to identify the end of the contiguous group of DID's in the DID List 830.

Figure 62:
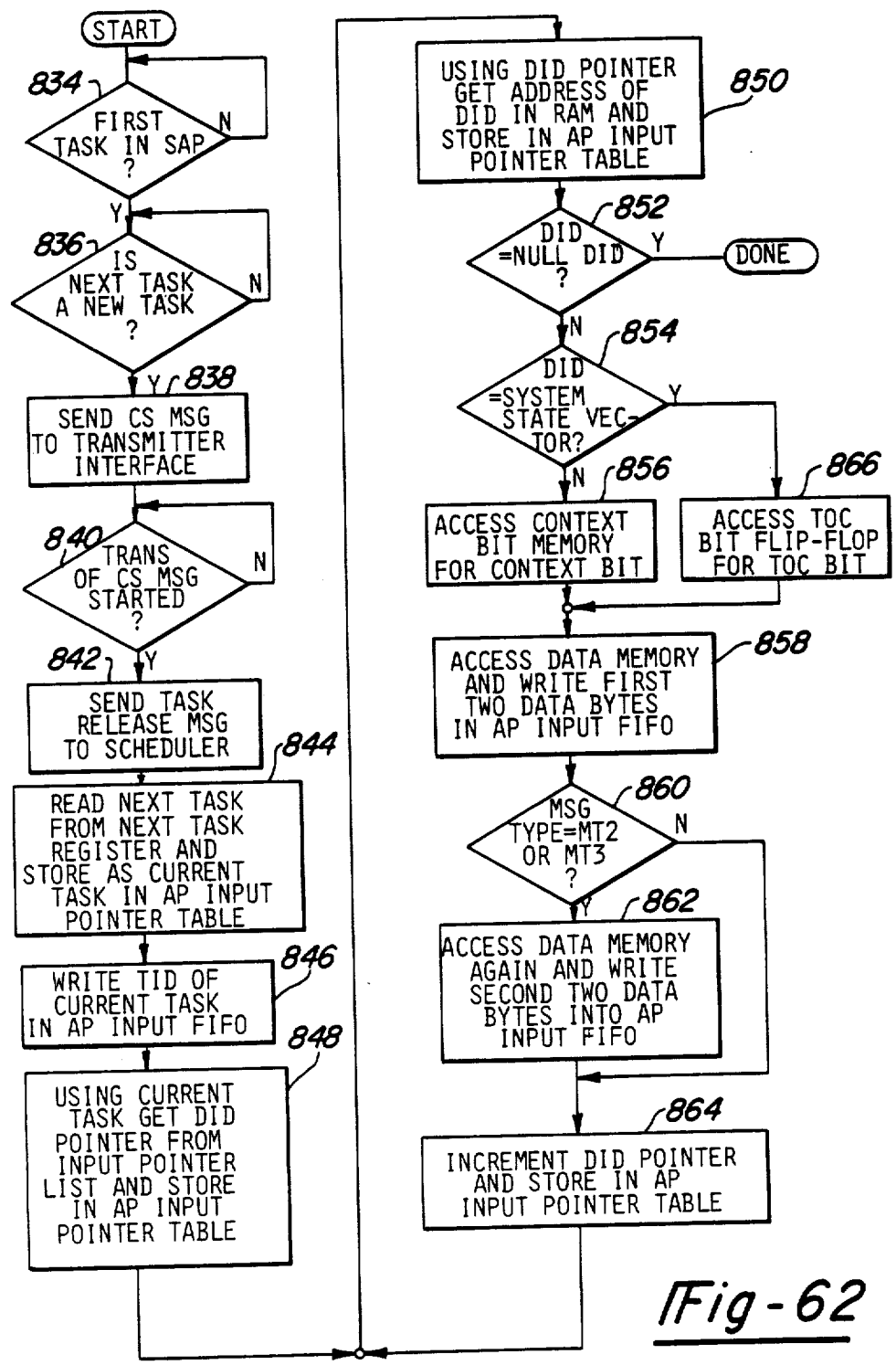
FIG. 62 is a flow diagram of the AP Input Handler's operation.

Referring to the flow diagram shown in FIG. 62, the AP Input Handler 744 first inquires if this is the first task to be executed in this Subatomic period, as indicated by decision block 834. This is because only one task can be started in any given Subatomic period. If this is not the first task, then the AP Input Handler 744 will wait until the beginning of the next Subatomic period. Otherwise the AP Input Handler 744 will inquire if the next task is a new task received since the last CS message or reset or reconfiguration commands, as indicated by decision block 836. If the task is not a new task, the AP Input Handler 744 will wait until it receives a new task. If, however, the task is a new task and it is the first task in the Subatomic period, the AP Input Handler 744 will send a Task Completed/Started message to the Transmitter Interface 718, as indicated by block 838. This Task Completed/Started message will subsequently be transmitted by the Transmitter 30 to all of the other Nodes in the system. The AP Input Handler 744 will then inquire, as indicated by decision block 840, if the transmission of the Task Completed/Started message has started. In the event that the transmission of the Task Completed/Started message is delayed because of the transmission of a time dependent message, such as a System State or a Task Interactive Consistency message, the AP Input Handler will wait until the transmission of the Task Completed/Started message has begun. After the transmission of the Task Completed/Started message has begun, the AP Input Handler 744 will send a Task Release message to the Scheduler 40 through the Scheduler Interface 716, as indicated by block 842, informing it that the Task Communicator has transmitted a Task Completed/Started message identifying the selected next task as the started task. The AP Input Handler 744 will then transfer the next task from the Next Task Register 742 and store it as the current task in the Applications Input Pointer Table, as indicated by block 844. The AP Input Handler will then write the TID of the current task into the AP Input FIFO 746, informing the Applications Processor 14 of the identity of the task, as indicated by block 846. Then using the current task, the AP Input Handler 744 will get the DID Pointer from the Input Pointer List 828 and store the DID Pointer in the AP Input Pointer Table 832, as indicated by block 848. Using the DID Pointer, the AP Input Handler will then get the address of the DID in the Data and Deviance RAM and store this address in the AP Input Pointer Table, as indicated by block 850. The AP Input Handler 744 will then inquire, as indicated in decision block 852, if the DID is a null DID. If the DID is a null DID indicating it is the last DID in the task, the operation of the AP Input Handler 744 is completed. Otherwise, the AP Input Handler 744 will inquire, as indicated in decision block 854, if the DID is a System State Vector. If the DID is a System State Vector, the AP Input Handler 744 will access the TOC Bit Flip Flop and get the TOC bit which is used in place of the context bit for addressing the Data Memory 42, as indicated by block 866. Otherwise, if the DID is not a null DID nor a System State Vector, the AP Input Handler will access the Context Bit Memory for the context bit as indicated by Block 856 and append it to the address in the AP Input Pointer Table. Using the address in the DID list 83 and the context bit or the TOC bit from the TOC Bit Flip Flop, the AP Input Handler will access the Data Memory 42 and write the fist two data bytes into the AP Input FIFO, as indicated by block 858. The AP Input Handler will then inquire, as indicated by block 860, if the Message Type is either a Message Type 2 or Message Type 3 which have 4 bytes rather than 2 bytes. If the Message Type is not either a Message Type 2 or 3, the AP Input Handler 744 will index the DID Pointer and store the indexed DID Pointer in the AP Input Pointer Table, as indicated by block 864. If the Message Type is either a Message Type 2 or a Message Type 3, the AP Input Handler 744 will address the Data Memory 42 again and write the final 2 data bytes into the AP Input FIFO 746, as indicated by block 862, then increment the DID Pointer as indicated in block 864. The AP Input Handler 744 will repeat this process to obtain all of the data values needed by the Applications Processor 14 for the execution of the task. As previously discussed, the last DID for any task is a null DID. This null DID is recognized by the AP Input Handler 744, as indicated in decision block 852 and will terminate the loading of the AP Input FIFO 746.

The AP Output Handler 750 will be discussed relative to the block diagram shown in FIG. 63 and the flow diagram shown in FIG. 64. The AP Output Handler 750 receives and processes the output data vlaues generated by the Applications Processor 14 and broadcasts them to all the Nodes in the system. As with input values, output values are expected in a predetermined order specified by the output TID-to-DID Mapping List for the current task.

When a Data Value is received from the Applications Processor 14, the AP Output Handler 750 loads it into an Output Data Register along with its MT and DID codes and initiates broadcast of the Data Value message. After outputting the last value for each task, the Applications Processor generates a combined Applications Processor Reported Error Vector (APRE) and the Branch Condition (BC). The Applications Processor Reported Error portion is used with the previous Applications Processor Reported Error data to be reported to the Voter 38 through the Error Reporter 754. The Branch Condition (BC) is used as part of the next Task Completed/Started message generated by the AP Input Handler 744.

Figure 63:
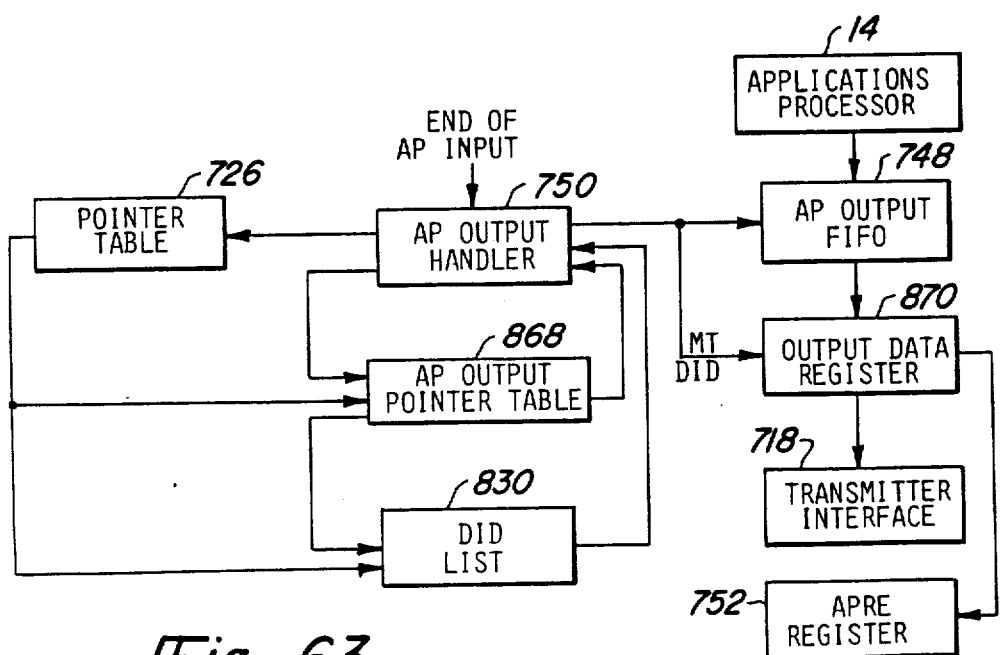
FIG. 63 is a partial block diagram of the Task Communicator showing the elements associated with the operation of the AP Output Handler.

Referring now to FIG. 63, the AP Output Handler 750 responds to the AP Input Handler completing its operation. The AP Output Handler 750 first accesses the Pointer Table 726 and obtains the pointer which identifies the current ask which is stored in the DID List 830. This Pointer is then used to address the DID List 830 to obtain the Data Identification code (DID), the Message Type (MT), and the Data Value Mask (DVM). The AP Output Handler 750 will then store the Message Type bits and the Data Identification Code in an Output Data Register 870. As the data is generated by the Applications Processor 14, the data is stored in the AP Output FIFO 748. The data is then transferred from the AP Output FIFO 748 to the Output Data Register 870. The AP Output Handler 750 will then transmit the first 2 bytes to the Transmitter Interface 718, and will transmit the Applications Processor Reported Error Vector to the AP RE Register 752.

The details of the operation of the AP Output Handler 750 will now be discussed with reference to the flow diagram shown in FIG. 64. After the AP Input Handler 744 had completed the loading of the initial data value into the AP Input FIFO 746, the AP Output Handler 750 will read the current DID Pointer from the Pointer Table 726 and store it in the AP Output Pointer Table 868, as indicated by block 872. The AP Output Handler will then access the DID List using the pointer stored in the Pointer Table 726 and store the Message Type and DID in the Output Data register 870, as indicated by block 874. After the Message Type and DID bytes are stored in the Data Output Register 870, the AP Output Handler 750 will inquire, as indicated by decision block 876, whether the Applications Processor has placed any data values in the AP Output FIFO 748. If no data has been placed in the AP Output FIFO 748, the AP Output Handler 750 will wait until data is generated by the Applications Processor 14, as indicated by decision block 876. After the Applications Processor 14 has stored the generated data values in the AP Output FIFO 748, the AP Output Handler 750 will transfer the data values ot the Output Data Register 870, as indicated by block 878. The AP Output Handler 750 will then inquire, as indicated in decision block 880, if the Message Type is a Message Type 2 or a Message Type 3. If the Message Type is a Message Type 2 or 3, the AP Output Handler 750 will wait until the final two data bytes of the data are generated and placed in the AP Output FIFO 748, as indicated by decision block 882. After the Applications Processor has written the second two data bytes into the AP Output FIFO 748, the AP Output Handler 750 will transfer the contents of the AP Output FIFO 748 into the Output Data Register 870, as indicated in block 884. If the Message Type is a Message Type 0 or 1, or after the content of the second two data bytes are written into the Output Data Register 870, the AP Output Handler will inquire if the DID of this data is a null DID, as indicated by decision block 886. If the DID is not a null DID, the AP Output Handler 750 will send the Message Type and Data Identification Code byes (DID) to the Transmitter Interface 718, as indicated by block 888. The AP Output Handler will then send the data bytes to the Transmitter Interface 718 to complete the Data Value message, as indicated by block 890. The AP Output Handler 750 will then increment the current DID Pointer in the AP Output Pointer Table 868, as indicated in block 892 and repeat the processing of the next data value generated by the Applications Processor 14. As previously indicated, the last DID in the DID List 830 for that particular task will be a null DID which will be detected by the AP Output Handler 750, as indicated by decision block 886. If the DID is a null DID indicating that the Applications Processor 14 has generated all of the data values for that task, the Applications Processor will generate a last data word containing the Applications Processor Reported Error and the Branch Condition (BC) bit for the subsequent task. The AP Output Handler 750 will store the Applications Processor Reported Error Vector in the APRE Register 752, as indicated by block 894, and then will proceed to process the branch condition, as indicated by decision block 896. The AP Output Handler will first inquire if the majority of the branch condition bits are equal to 0. If the majority of branch condition bits are 0's, then the AP Output Handler will generate a branch condition byte consisting of all 0's, as indicated by block 898, otherwise, if the majority of branch condition bytes are 1's, the AP Output Handler 750 will generate a branch condition byte of consecutive 1's, as indicated by block 900. Finally, the AP Output Handler 750 will store the branch condition byte in the Transmitter Interface 718, as indicated by block 902. This byte will be appended to the next Task Completed/Started message generated by the AP Input Handler 744 as the branch condition of the completed task.

Figures 67, 68:
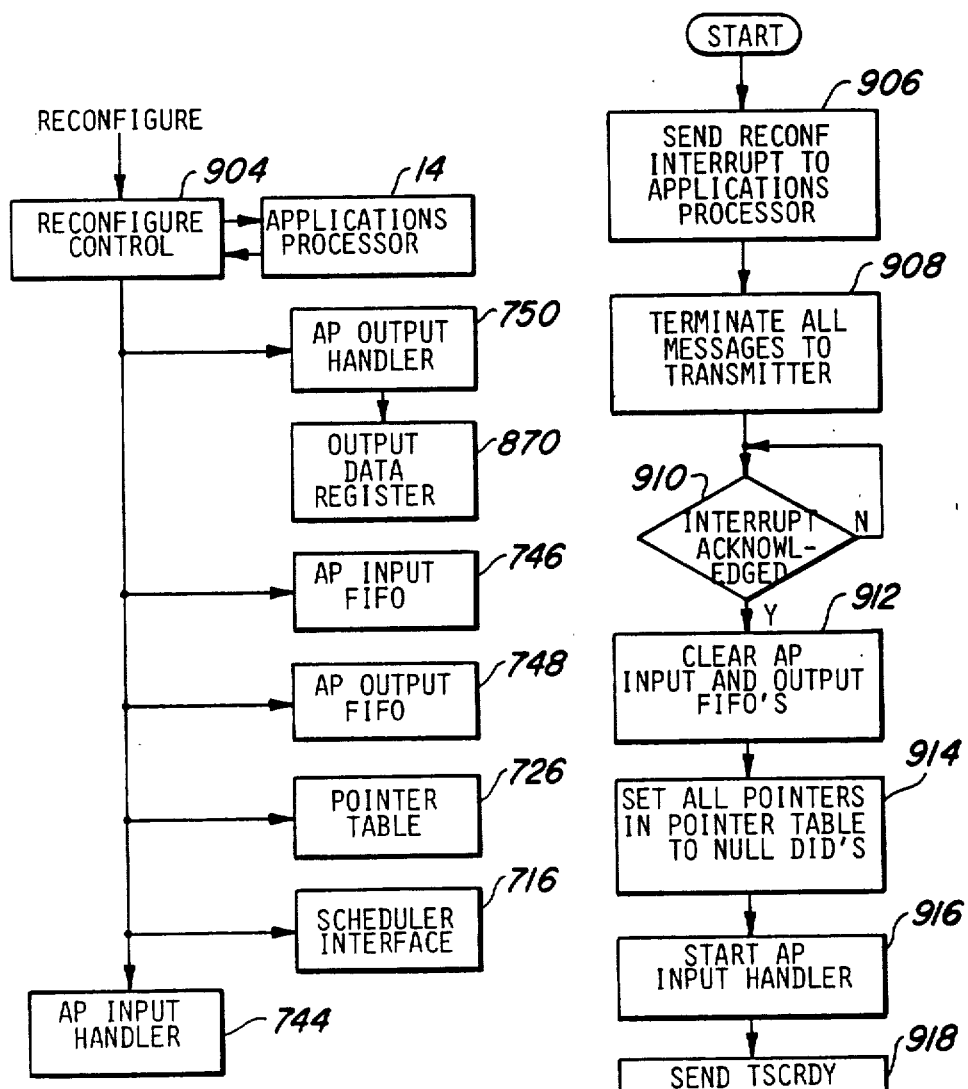
FIG. 67 is a partial block diagram of the Task Communicator showing the subsystem involved in "reconfiguration"
FIG. 68 is a flow diagram showing the operation of the Reconfigure Control during reconfiguration.

The Task Communicator 44 also includes a Reconfigure Control 904, as shown in FIG. 67, and a Reset Control 920, as shown in FIG. 69. Referring first to FIG. 67, the Reconfigure Control 904 transmits an interrupt to the Applications Processor 14 and awaits acknowledgement. After acknowledgement, the Reconfigure Control 904 will initialize the Output Handler 750 and its Output Data Register 870, the AP Input FIFo 746, the AP Output FIFO 748, and the Pointer Table 726. The operation of the Reconfigure Control 904 will be discussed relative to the flow diagram shown in FIG. 68. In response to a reconfiguration request from the Scheduler 40, the Reconfigure Control 904 will send a reconfigure interrupt to the Applications Processor 14, as indicated in block 906. It will then terminate all messages to the Transmitter Interface 718, as indicated by block 908, by clearing the Output Data Register 870. The Reconfigure Control 904 will then await acknowledgement of the interrupt signal from the Applications Processor 14, as indicated by decision block 910. After the Applications Processor has acknowledged the interrupt, the Reconfigure Control will clear the AP Input FIFO 746 and the AP Output FIFO 748, as indicated by block 912, then set all the pointers in the Pointer Table 726 to null DID's, as indicated by block 914. After the Input and Output FIFO's have been cleared, the Reconfigure Control will restart the AP Input Handler 744, as indicated in block 916, then send a Task Communicator Ready (TSCRDY) signal to the Scheduler 40, as indicated in block 918, indicating that the Task Communicator 44 is ready to begin processing data in the new reconfigured System State.

The Task Communicator also has a Reset Control 920 responsive to the Operations Controller Reset (OCRES) signal, as indicated in FIG. 69. The Reset Control 920 interfaces with the Applications Processor 14, an AP Ready Flag 922, a Reset flag 924, the AP Input FIFO 746, the AP Output FIFO 748, the Pointer Table 726, and the AP Input Handler 744. Referring to FIG. 70, the operation of the Reset Control 920 begins by sending a reset request to the Applications Processor 14, as indicated by block 926. The Reset Control 920 will then set the Reset Flag 924 to "ON," as indicated by block 928 to signify to the other subsystems of the Task Communicator 44 that the Operations Controller is being reset. The Reset Control 920 will then set the AP Ready Flag 922 to "OFF," as indicated by block 930, to signify to the Scheduler 40 that the Applications Processor is not yet ready to start processing any tasks. The Reset Control 920 will then proceed to clear the AP Input FIFO 746 and the AP Output FIFO 748, as indicated by block 932, then set all of the pointers in the Pointer Table 726 to null DID's, as indicated by block 934. The Reset Control will then start the AP Input Handler 744, as indicated by block 936, and wait for the Applications Processor to signify that it is ready, as indicated by decision block 938. After the Applications Processor 14 signifies that it is ready to start processing data, the Reset Control 920 will turn the Reset Flag 924 "OFF" and the AP Flag 922 "ON," signifying that the Task Communicator 44 is now ready to start processing data, as indicated by block 940.

SYNCHRONIZER

The Synchronizer 46 establishes and maintains the synchronization between all of the Operation Controllers in the System. The multi-computer architecture uses loose synchronization which is accomplished by synchronous rounds of message transmission by each Node in the system. In this method, each Synchronizer 46 detects and time stamps each time dependent message received by its own Node. These time dependent messages are transmitted by every other Node in the System at predetermined intervals and they are received by all the other Nodes in the system. As a result of the wrap-around interconnection shown in FIG. 1, a Node will receive its own time dependent messages along with the other time dependent messages sent by the other Nodes. The comparison of the time stamps on a Nodes own time dependent message with the time stamps on all of the other time dependent messages is what drives the fault tolerant conversion algorithm.

The synchronization is done over two timing message intervals. These intervals are delimited by a pre-sync message and a sync message which are transmitted alternatively. A Node is defined to be in point-to-point synchronization with another Node when it is sending its own sync and pre-sync messages at the same time the other Node is sending its sync and pre-sync messages. Since the synchronization cannot be exact, a window is specified by the user which defines the allowable error in the time that messages are received from the Nodes that are considered to be synchronization with each other.

Fundamentally, the mechanism which forces the Nodes into synchronization with each other involves a calculation done by each Node, that determines where in time the center of the last cluster of pre-sync messages occurred. Each Node will then determine the difference between its own pre-sync time stamp and that of the center. Each Node will then use that difference to adjust the length of the interval from the time it sent its pre-sync message to the transmission of its sync message. Fault tolerance in these calculations is required and is accomplished with an approximate agreement algorithm. System convergence is accomplished by having all Nodes repeat these steps continuously. Over every sync to pre-sync interval all Nodes listen to the time dependent messages received from all of the Nodes, including their own, determine a correction, and then apply the correction over the following pre-sync to sync interval. The pattern is repetitive: taking the form measure error, make correction, measure error, make correction, . . . etc. The time interval from the sync to the pre-sync message is a nominal user defined value.

The explanation of the synchronization procedure described above is accurate. However, the actual mechanism implemented is more involved than the steady state system described because it must also be fault tolerant under all conditions, be capable of detecting and characterizing system timing errors, and must support the other time dependent functions of the system.

The implemented synchronization logic supports three catagories of operation: a cold start, a warm start, and steady state operation. Cold start synchronization logic handles the situation where the system has just powered up and no one Node is necessarily in synchronization with any other Node. In particular, a cold start is executed when no operating set of Nodes exists. In this case, every good Node in the system attempts to synchronize with every other good Node and then simultaneously and consistently decide together which Nodes are in synchronization and whether or not the number which are synchronized is larger than the user specified start up size. In order to accomplish initial synchronization and start up, each Node maintains a byte of information called the "in-sync-with" (ISW) vector. The content of the "in-sync-with" vector defines which other Nodes in the system the local Node believes it is in synchronization with. Byzantine Agreement on the ISW vectors of all the good Nodes in the system is used to define the initial operating set. Byzantine Agreement is required concerning this "in-sync-with" data in order for cold starts to be fault tolerant. Once enough Nodes reach Byzantine Agreement on a potential operating set (POS), all the Nodes that are in that set begin operating. All the other healty Nodes not in the potential operating set will reach the same conclusion, that an operating set is formed, but they will also recognize that they are not included in the operating set and will switch to a warm start mode of operation.

In the warm start mode of operation each good Node continues its efforts to synchronize with the existing operating set. Once a Node in the warm start mode of operation believes it is in synchronization with the operating set it will begin normal operation. After the warm starting Node has behaved correctly long enough, the other Nodes will admit it into the operating set.

The last situation is the steady state mode of operation where each operating Node simply maintains synchronization and alignment with the other good Nodes in the system. In practice the steady state convergence algorithm runs under all conditions since it has the ability to converge the local Node to a common synchronization point with all other good Nodes in a fault tolerant manner. The real differences between warm and cold starts centers around the logic used to determine when the operating set is formed and the Nodes in the operating set are ready to start scheduling tasks to be executed by their Applications Processor.

The details of the Synchronizer 46 are shown on FIG. 71. The Synchronizer includes a Synchronizer Control 952 which receives the Task Interactive Consistency (TIC) messages and the System State (SS) messages from the Message Checker through a Message Checker Interface 942. The System State messages are the sync and pre-sync messages previously described and are distinguished by a function bit which identifies the System State message as a sync or pre-sync message. A Timing Signal Generator 950 generates timing signals which are transmitted to the Synchronizer Controller 952. The signals generated by the Timing Signal Generator are the Subatomic period (SAP) signal. The Atomic period (AP) signal the Master period (MP) signal the Last Subatomic period (LSAP) signal the Last Atomic period (LAP) signal the Soft Error Window (SEW) signal and the Hard Error Window (HEW) signal. The Synchronizer Control 952 also receives a Clock signal and Reset signal from the system bus. The Reset signal may be either the power on Reset (RESET) or the internal Operation Controller Reset (OCRESET) signals. These signals have been previously discussed and need not be repeated here. The Synchronizer Control 952 will also receive its own 3 bit Node identification (NID) code.

A Byzantine Voter 954 performs a byzantine vote on the "in-sync-with" matrices received from itself and the other Nodes during the cold start mode of operation and on the content of the Task Interactive Consistency messages. The byzantine vote on the content of the Task Interactive Consistency (TIC) messages is transmitted directly to a Scheduler Interface 944, while the result of the byzantine vote on the "in-sync-with" matrices is passed to a Fault Tolerator Interface 946. A Time Stamp Voter 956 will vote on the time stamps of the System State messages received from all of the Nodes to generate a voted time stamp value. A Synchronizer Memory 948 stores the data received from the Message Checker Interface and other data required by the Synchronizer Control 952 for establishing and maintaining synchronization between its own Node and the other Nodes in the system. The Synchronizer Memory 948 has a Scratch Pad Memory 962, a Message Memory 964 and a Time Stamp Memory 966, as shown in FIG. 72. An Error Reporter 958 receives the errors detected by the Synchronizer Control 952 and transmits them to the Fault Tolerator Interface 946. The Synchronizer Control 952 generates the time dependent Task Interactive Consistency (TIC) and the System State (SS) messages which are transmitted to the other Nodes in the system through the Transmitter Interface 960, as previously described.

Figure 76:
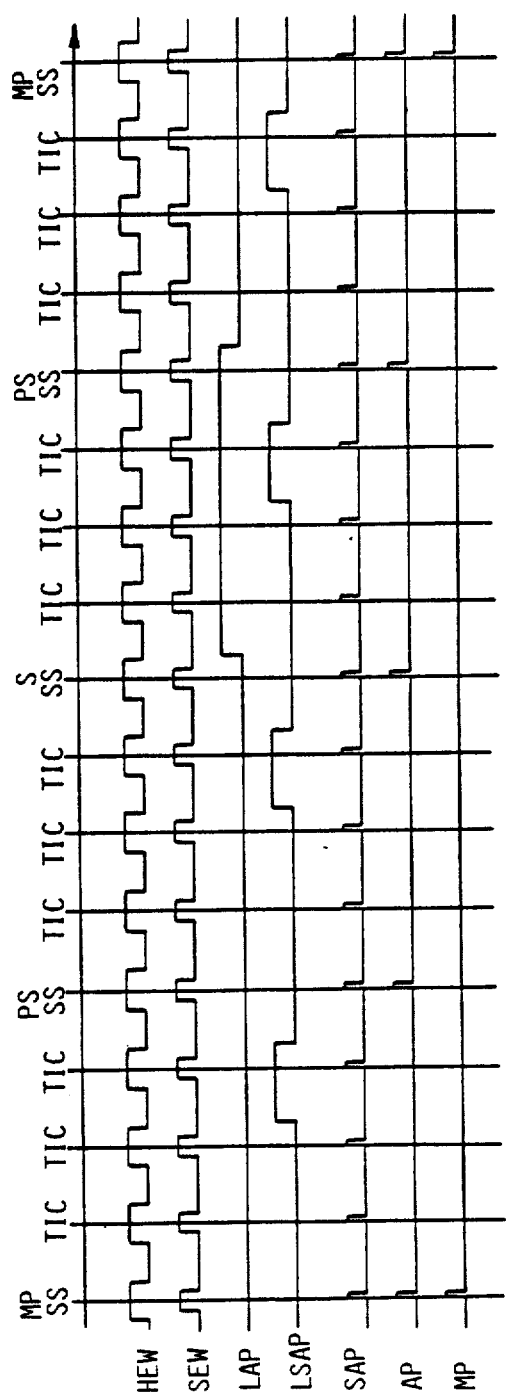
FIG. 76 shows the waveforms of the signals generated by the Timing Signal Generator.

FIG. 76 shows the waveforms of the various signals generated by the Timing Signal Generator 950. The Master period (MP) is a timing signal which reflects the length of each Master period interval of the Operations Controller. This interval is the longest of the synchronization clocks and reflects the periodicity of the lowest repetition task being run in the application. The Master period can be considered to be the "frame size" of the application. During the Master period interval the total pattern of tasks are repeated. The Atomic period (AP) is a timing signal which reflects the beginning and end of each Atomic period interval. This interval is representative of the fastest repetition task being run in the application. The Master period described above is user specified as an integer number of Atomic periods. The Subatomic period (SAP) is a timing signal which reflects the beginning and end of each Subatomic period interval. The Atomic period interval is user specified as an integer number of Subatomic periods. The last Atomic period (LAP) is an active high signal that windows the last Atomic period that occurs in each Master period. The last Subatomic period (LSAP) is an active high signal that windows the last Subatomic period that occurs in each Atomic period. The soft error window (SEW) is an active high signal that brackets a span of time around an event time mark that defines the soft error window for the arrival of System Synchronization messages. Finally, the hard error window (HEW) is an active high signal that brackets a span of time around an event time mark that defines the hard error window for the arrival of system synchronization messages.

The format of the Message Memory 964 is shown in FIG. 73. The Message Memory 964 stores for each Node the branch condition byte, the task completed vector, the next system state vector, the current system state vector, the content of the Atomic period counter, and two bytes, one reserved for a cold start and the other reserved for a warm start. This format is repeated for each Node in the system.

The format of the Time Stamp Memory 966 is shown in FIG. 74. The Time Stamp Memory consists of a coarse time count and a fine time count and includes an update (u) flag and a time stamp (TS) flag. The update flag signifies that the stored time stamp is for a System State message received during the current time stamp interval. The time stamp flag indicates whether the time stamp is for a System State message in which the sync function bit is set or for a System State message in which the pre-sync function bit is set. The coarse count of the time stamp is indicative of the number of Subatomic periods that have passed since the preceding System State message was generated. The fine time stamp count corresponds to the number of synchronizer clock pulses receiving during the last Subatomic period of the Atomic period. The coarse or Subatomic period counts are used primarily during the cold start and the warm start to achieve rapid convergence of the synchronization between the local Node and the other Nodes in the system. The fine or synchronizer clock time stamp counts are used primarily during the steady state operation to maintain the synchronization between the Nodes. The Time Stamp Memory 966 will store a time stamp for each Node in the system and includes a special entry for storing the time stamp of the System State messages transmitted by its own Node.

The format of the Scratch Pad Memory 962 is shown in FIG. 75. The Scratch Pad Memory 962 stores the "in-sync-with" (ISW) vectors for each Node in the system. These "in-sync-with" vectors are contained in the sync and pre-sync System State messages. The Scratch Pad Memory 962 will also store two message warning counts, one indicative of the time from the end of the warning period to the transmission of the Task Interactive Consistency message and the other indicative of the time from the end of the warning period to the transmission of the System State message. The Scratch Pad Memory will also store the Subatomic period count which is used to time stamp the received messages. The Scratch Pad memory also has an entry storing the number of Subatomic periods per an Atomic period, the Atomic period count, and the number of Atomic periods per Master period. The Scratch Pad Memory also will store an actual hard error window (HEW) to warning period count and a nominal hard error window (HEW) to warning period count. The actual hard error window to warning period reflects the corrected length of the Atomic period between the pre-sync and sync messages which is computed from the difference between the voted time stamp value and its own time stamp value. The next entries in the Scratch Pad Memory are the error window parameters. The error window parameters include a hard error window count and a soft error window count. The next two entries in the Scratch Pad Memory are the computed correction for the Subatomic period delta and the computed correction for the Subatomic period count. The next entry is the maximum allowed correction for the subatomic period delta. The final entry in the Scratch Pad Memory is the minimum start up size for determining the existence of a potential operating set.

Figure 77:
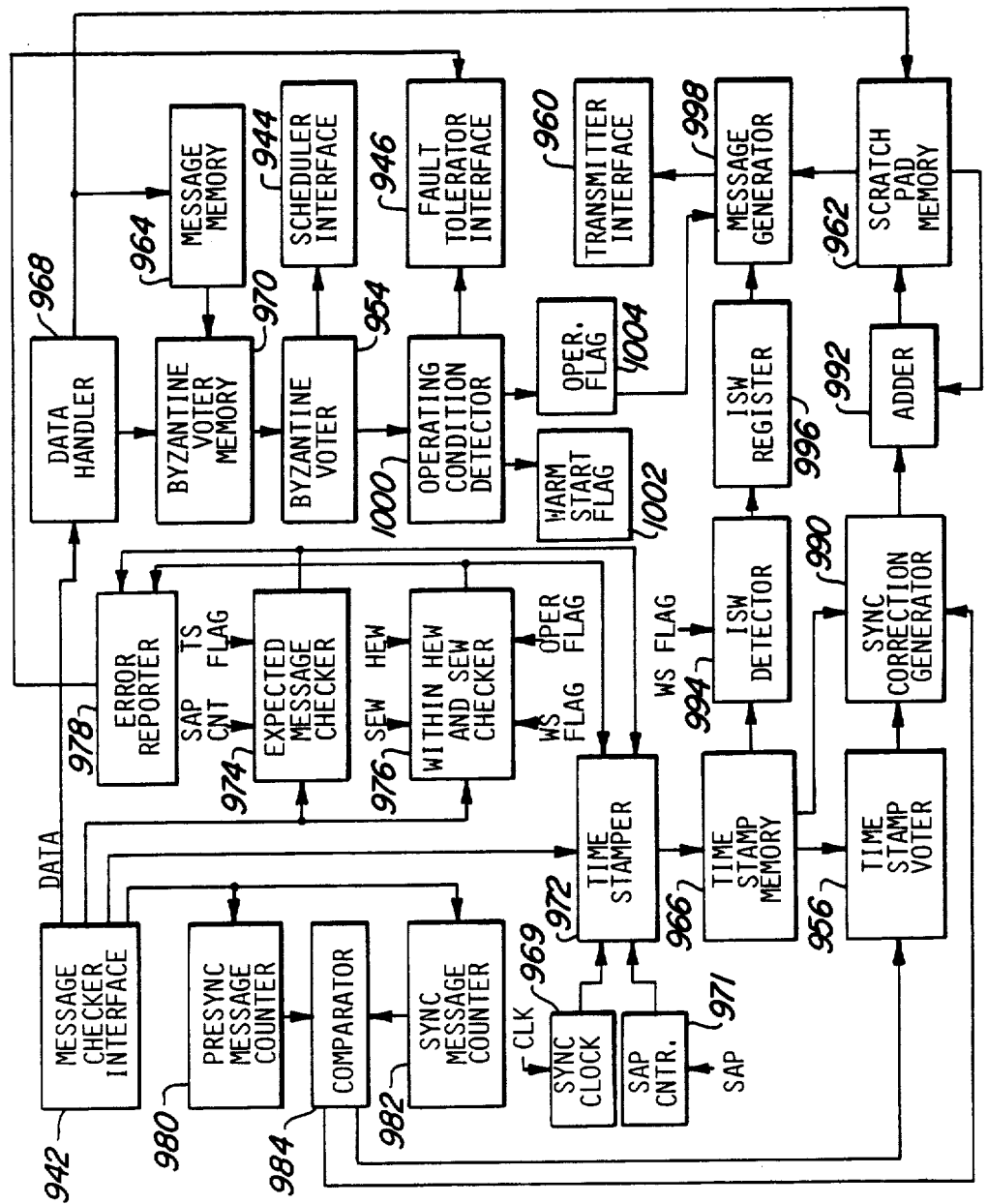
FIG. 77 is a block diagram of the Synchronizer Control.
Figure 78:
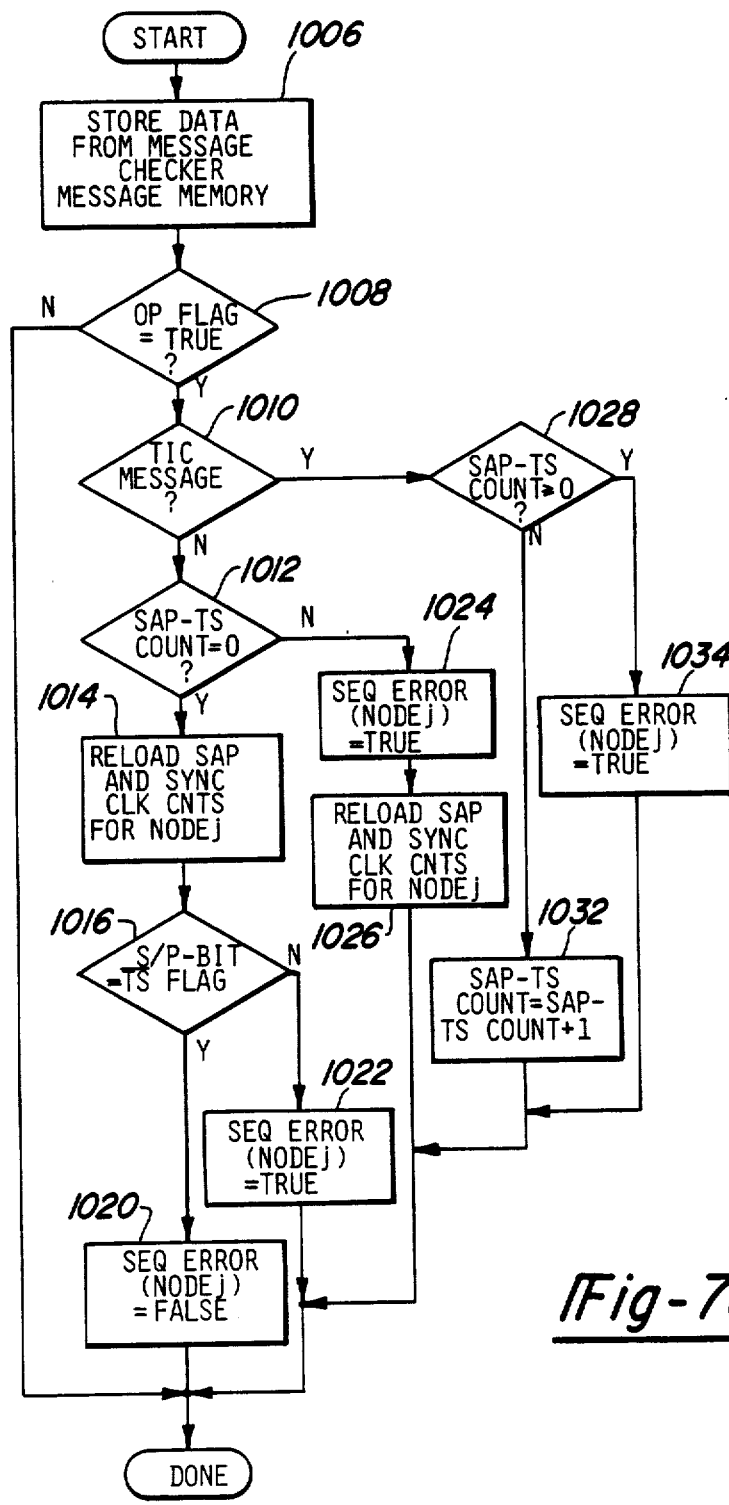
FIG. 78 is a flow diagram showing the operation of the Data Handler and Expected Message Checker.

The details of the Synchronizer Control 952 are illustrated in FIG. 77. The data received by the Message Checker Interface 942 is passed directly to a Data Handler 968 and a Time Stamper 972. The Data Handler 968 will store the data in the Message Memory 964, the Scratch Pad Memory 962, or a Byzantine Voter Memory 970 as required. Prior to the Time Stamper 972 storing the time stamp of the message in the Time Stamp Memory 966 the received message is checked by an Expected Message Checker 974 and a Within Hard Error Window and Soft Error Window Checker 976. If the message is not an expected message, as shall be discussed later, the Expected Message Checker 974 will generate a sequence error signal which is transmitted to an Error Reporter 978 and to the Time Stamper 972. In a like manner, if the received message is outside the hard error window or the soft error window the Within Hard Error Window and Soft Error Window Checker will generate either a hard error or a soft error which is also transmitted to the Error Reporter 978 and the Time Stamper 972. The Time Stamper 972 will not record the time stamp in the Time Stamp Memory 966 if either a sequence error or a hard error is detected. Any message which is received outside the hard error window or not received at all is essentially ignored by the Synchronizer. However, a received vector will be generated showing a missing message error for each Node which failed to report during the hard error window interval. The synchronization process will not use any time stamp value associated with the Nodes which failed to report within the hard error window. This prevents good Nodes from trying to move towards badly out-of-sync Nodes that may possibly be faulty. The Time Stamper 972, however, will record the time stamp in the Time Stamp Message if only a soft error is detected.

The Time Stamper 972 will record the number of Subatomic periods counted in a Subatomic Period (SAP) Counter 971 as the coarse time stamp count and the number of sync clock bits from a Sync Clock 969 as the fine time stamp. The Time Stamper 972 will set the update flag in the Time Stamp Memory and set the time stamp flag to indicate if the received message was either a sync or pre-sync System State message.

Figure 84:
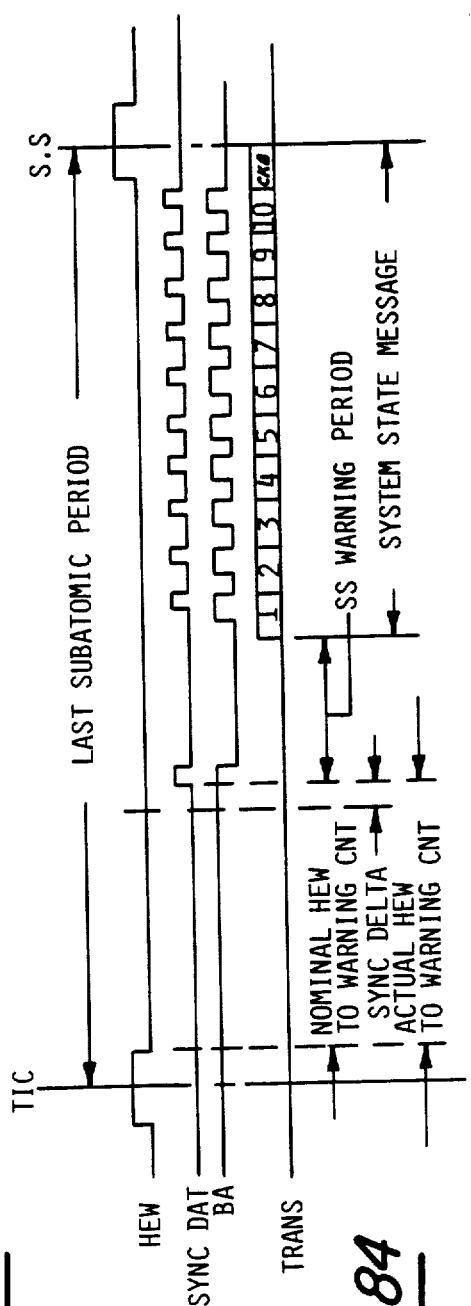
FIG. 84 shows the waveforms of the timing signals for generating a sync System State message.

A Pre-sync Message Counter 980 and a Sync Message Counter 982 will count, respectively, the number of sync messages or pre-sync messages received during the particular time stamp interval. A comparator 984 will determine whether the number of pre-sync messages was greater than the sync messages or vice versa. This information is communicated to the Time Stamp Voter 956 which will extract from the Time Stamp Memory 966 the time stamps corresponding to whether there were a greater number of pre-sync messages or sync messages received during the time stamp interval. The Time Stamp Voter 956 will vote on the received time stamps and generate a medial or voted value for the time stamps of the received messages. This information is passed to a Sync Correction Generator 990 which compares the time stamp of the Synchronizer's own System State message with the medial or voted value generated by the Time Stamp Voter 956 and will generate a correction delta. This correction delta is added to the nominal interval between System State messages in the Adder 992 to correct for the detected differences. The sum of the nominal interval plus the correction delta are then stored in the Scratch Pad Memory 962 as the computed correction Subatomic period count and the actual HEW to warning period count, as indicated in the format of the Scratch Pad Memory shown in FIG. 75. The computed correction Subatomic period count and the actual HEW to warning period count are used in the timing of the duration of the interval from the pre-sync System State message to the sync System State message, as shown in FIG. 84.

A Byzantine Voter 954 performs a byzantine vote on the task completed vector and the branch condition bits contained in the Task Interactive Consistency messages which are passed back to the Scheduler 40 through the Scheduler Interface 944. During a cold start the Byzantine Voter 954 will also perform a byzantine vote on the "in-syn-with" matrix transmitted in the pre-sync System State messages to generate a voted "in-sync-with" vector. This "in-sync-with" vector is transmitted to an Operating Condition Detector 1000 which sums the number of "in-sync-with" bits contained in the voted "in-sync-with" vector and compares this sum with the minimum start up size for a potential operating set (POS) of Nodes. If the sym of the bits in the Byzantine voted "in-sync-with" vector is greater than the minimum start up size, the Operating Condition Detector 1000 will then determine if its own Node is contained in the "in-sync-with" vector. If its own Node is contained within the "in-sync-with" vector, the Operating Condition Detector will set an Operating Flag 1004 indicating that it is ready to start operating. However, if an operating set is detected and the Operating Condition Detector 1000 determines that its own Node is not within the operating set, it will set a Warm Start Flag 1002 indicating the existence of an operating set and that it is not in synchronization with that set. This will cause the Synchronizer 46 to enter into a warm start mode of operation as previously discussed. If an operating set is detected, and its own Node is in the operating set, the Operating Condition Detector 1000 will then transmit the "in-sync-with" (ISW) vector and the operating flag bit to the Fault Tolerator 36 through the Fault Tolerator Interface 946.

An In-Sync-With Detector (ISW) 944 will compare the time stamp of its own System State message with each time stamp stored in the Time Stamp Memory 966 to generate an "in-sync-with" vector which is stored in an In Sync With (ISW) Register 996.

The "in-sync-with" vector stored in the In-Sync-With Register 996 and the state of the Operating Flag 1004 are passed to a Message Generator 998 and are used in the generation of the next System State message. The output of the Message Generator 998 is passed to the Transmitter through the Transmitter Interface 960.

The steady state operation of the Synchronizer will be discussed with reference to the flow diagrams illustrated in FIGS. 78 through 82 and the waveforms shown in FIGS. 83 and 84. The flow diagram shown in FIG. 78 describes the operation of the Data Handler 968, the Expected Message Checker 974, and the Within Hard Error Window and Soft Error Window Checker 976. As indicated by block 1006, all of the data received from the Message Checker Interface 942 is stored in the Message Memory 964. The system will then inquire, as indicated by decision block 1008, if the operating flag is true. If the operating flag is not true, the system will default to either a cold start or a warm start as will be described later herein. If the operating flag is true the Expected Message Checker will then inquire if it is a Task Interactive Consistency (TIC) message as indicated by decision block 1010. If it is not a Task Interactive Consistency message, then the message is a System State messge, then the Expected Message Checker 974 will inquire if the Subatomic period count in the Time Stamp Memory is equal to zero, as indicated by block 1012. The Subatomic period count stored in the Time Stamp Memory is the two's complement of the number of Subatomic periods in the Atomic period. This Subatomic period count is incremented each time the Timing Signal Generator 950 generates a Subatomic period signal. When the Subatomic period count in the Time Stamp Memory is equal to zero, then a System State message is the expected message. If the Subatomic period count is equal to zero, the Expected Message Checker will reload the time stamp counters for the Node from which the message was received, as indicated by block 1014, and then inquire if the sync/pre-sync (s/p) function bit contained in the message was equal to the complement of the (TS) flag stored in the Time Stamp Memory. In normal operation the sync and pre-sync System State messages are sent in an alternating manner, therefore, the function bits in the received message should be the complement of the function bits of the previous message which is currently stored by the TS flag in the Time Stamp Memory 966. If the sync/pre-sync function bit is the complement of the time stamp flag stored in the Time Stamp Memory, then the sequence error flag for the Node from which the message was received (NODE j) is set to false, as indicated by block 1020. Conversely, if the sync/pre-sync bit is not the complement of the time stamp flag the sequence error flag for the Node from which the message was received is set to true, as indicated by block 1022. If the Subatomic period count in decision block 1012 is not equal to zero, the Expected Message Checker will set the sequence error flag for the Node from which the message was received to true, as indicated by block 1024, then reload the time stamp counters for Node j, as indicated by block 1026.

If the received message is a Task Interactive Consistency (TIC) message, as determined in decision block 1010, the Expected Message Checker 974 will then inquire if the Subatomic period count in the Time Stamp Memory is equal to or greater than zero, as indicated by decision block 1028. If the Subatomic period time stamp count is equal to or greater than zero, then a System State message should have been received and, therefore, there is a sequence error. The Expected Message Checker 974 will then set the sequence error flag for the Node from which the message was received to true, as indicated by block 1034. However, if the Subatomic period count in the Time Stamp Memory is less than zero, the Expected Message Checker 974 will increment the time stamp count stored in the Time Stamp Memory for that Node (Node j), as indicated by block 1032.

Figure 79:
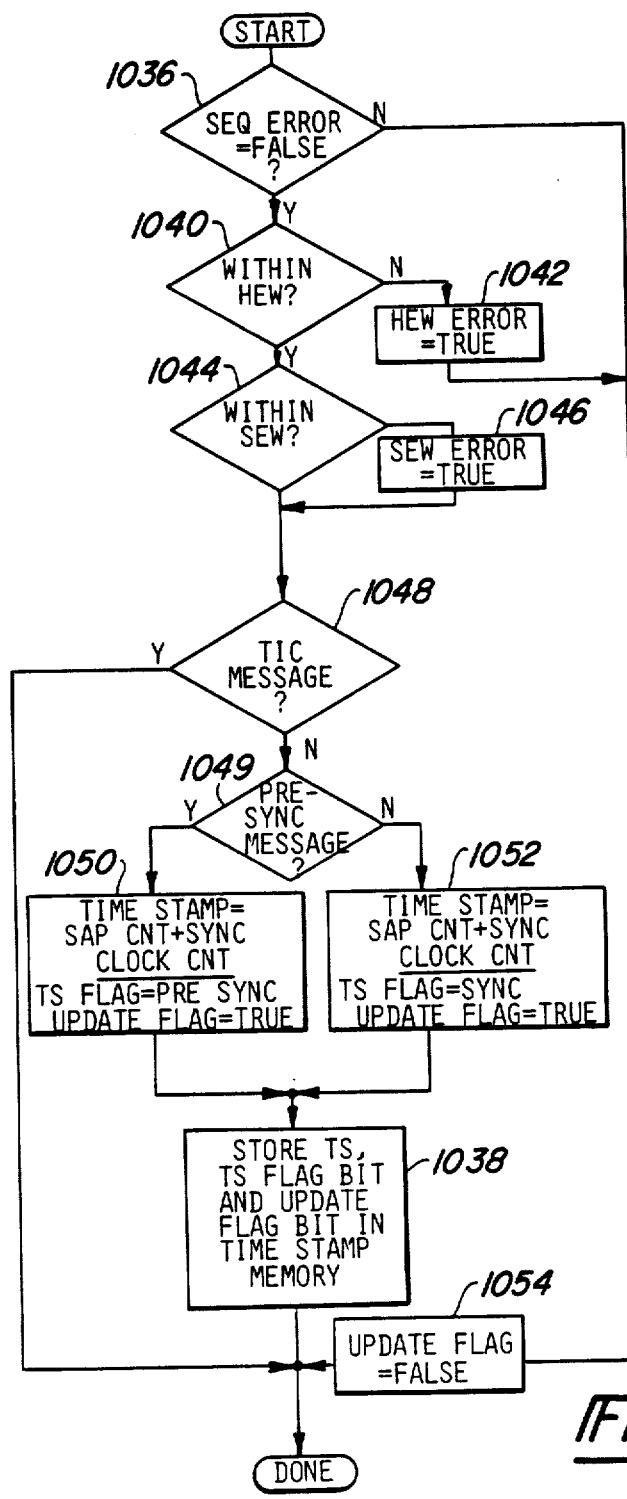
FIG. 79 is a flow diagram showing the operation of the Within Hard Error Window and Soft Error Window Checker and the Time Stamper.

The operation of the Within Hard Error Window and Soft Error Window Checker 976 and the Time Stamper 972 will be discussed with reference to the flow diagram shown in FIG. 79. The operation of the Within Hard Error Window and Soft Error Window Checker 976 begins by checking to determine if a sequence error has been detected, as indicated by decision block 1036. If a sequence error has been detected by the Expected Message Checker, the Within Hard Error Window and Soft Error Window Checker 976 will set the update flag in the Time Stamp Memory 966 to false, as indicated by block 1054. Otherwise, the Within Hard Error Window and Soft Error Window Checker 976 will inquire whether the message was received within the hard error window, as indicated by decision block 1040. If the message was not received within the hard error window (HEW), the Within Hard Error Window and Soft Error Window Checker 976 will set the hard error window flag to true, as indicated by block 1042, then set the update flag in the Time Stamp Memory to false, as indicated by block 1054. If the message was received within the hard error window, the Within Hard Error Window and Soft Error Window Checker 976 will inquire, as indicated by decision block 1044, whether the message was received within the soft error window. If the message was not received within the soft error window, the Checker will set the soft error window flag to true, as indicated by block 1046 and the Checker will proceed to ask, as indicated by decision block 1048, whether the received message was a Task Interactive Consistency (TIC) message. If the message is not a TIC message, the Checker will then proceed to ask the if the message was a pre-sync System State message, as indicated by decision block 1049.

If the message was a pre-sync System State message, then the Time Stamper will be enabled to time stamp the received message. The Time stamp equals the SAP count received in the SAP Counter 971 and the sync clock count received from the Sync Clock 969. The Time Stamper 972 will then set the TS flag bit to pre-sync and the update flag equal to true, as indicated by block 1050. However, if the message is a System State sync message, the Time Stamper 972 will time stamp the received message and set the time stamp flag to sync and the update flag to true, as indicated by block 1052. After the message has been time stamped it is stored in the Time Stamp Memory 966, as indicated by block 1038. As indicated by decision block 1049, the Task Interactive Consistency (TIC) messages are not time stamped.

Figure 80:
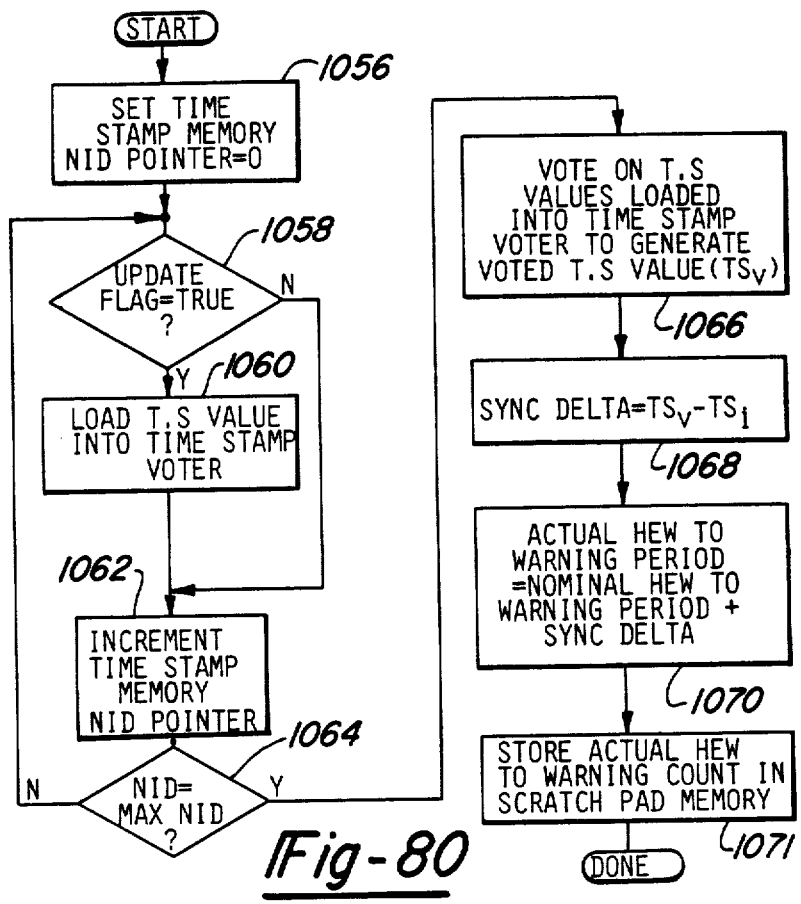
FIG. 80 is a flow diagram for the operation of the "HEW to warning count"

The generation of the actual HEW to warning period count is described with reference to the flow diagram shown in FIG. 80. The generation of the actual HEW warning period counts begins by setting the Node (NID) pointer in the Time Stamp Memory to the first Node (NID=0), as indicated by block 1056. The Time Stamp Voter will then inquire if the update flag is true, as indicated by decision block 1058. If the update flag is not true, indicating that the time stamp value has not been updated during the current Atomic period, the Time Stamp Voter will then increment the time stamp memory Node pointer to the next Node and inquire if the update flag of that Node is true. If the update flag is true, then the time stamp value is loaded into the Time Stamp Voter, as indicated by block 1060, then the Node pointer to the Time Stamp Memory is incremented, as indicated by block 1062. The Time Stamp Voter 956 will then inquire if the Node to which the pointer is pointing is the maximum or last Node to be polled, as indicated by decision block 1064. If the Node is not the last Node, (MAX NID) the process of loading the Time Stamp Voter will continue until the time stamp value from the last Node is loaded into the Time Stamp Voter 956. Once the Time Stamp Voter is loaded with all of the current time stamp values it will vote on the time stamp values which were loaded into it and generate a voted time stamp value ($TS_v$), as indicated by block 1066. The Sync Correction Generator 990 will then subtract the Node's own time stamp value from the voted time stamp value to generate a sync delta, as indicated by block 1068. The actual HEW to warning period is then generated by adding in Adder 992 the sync delta to the nominal HEW to warning period stored in the Scratch Pad Memory, as indicated by block 1070. This actual HEW to warning count is then stored in the Scratch Pad Memory, as indicated by block 1071.

Figure 81:
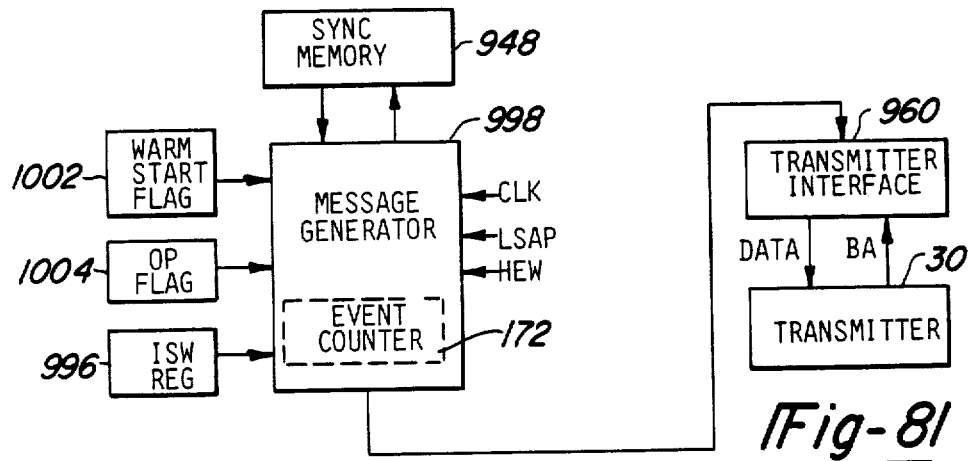
FIG. 81 is a partial block diagram of the Synchronizer showing the elements associated with the operation of the Message Generator.

The operation of the Message Generator 998 will be discussed relative to the block diagram shown in FIG. 81 and the flow diagram shown in FIG. 82. Referring first to the block diagram shown in FIG. 81, the Message Generator receives the clock (CLK), the Last Subatomic (LSAP) period, and the HEW signals from the Timing Signal Generator 950. It also receives the Warm Start Flag 1002, the Operating Flag 1004, and the "in-sync-with" vector from the In-Sync-With (ISW) Register 996. The data used in the messages generated by the Message Generator 998 is obtained from the Sync Memory 948, which includes the Scratch Pad Memory 962, the Message Memory 964, and the Time Stamp Memory 966. The messages generated by the Message Generator are passed to the Transmitter Interface 960 which ultimately passes these messages to the Transmitter 30.

Figure 82:
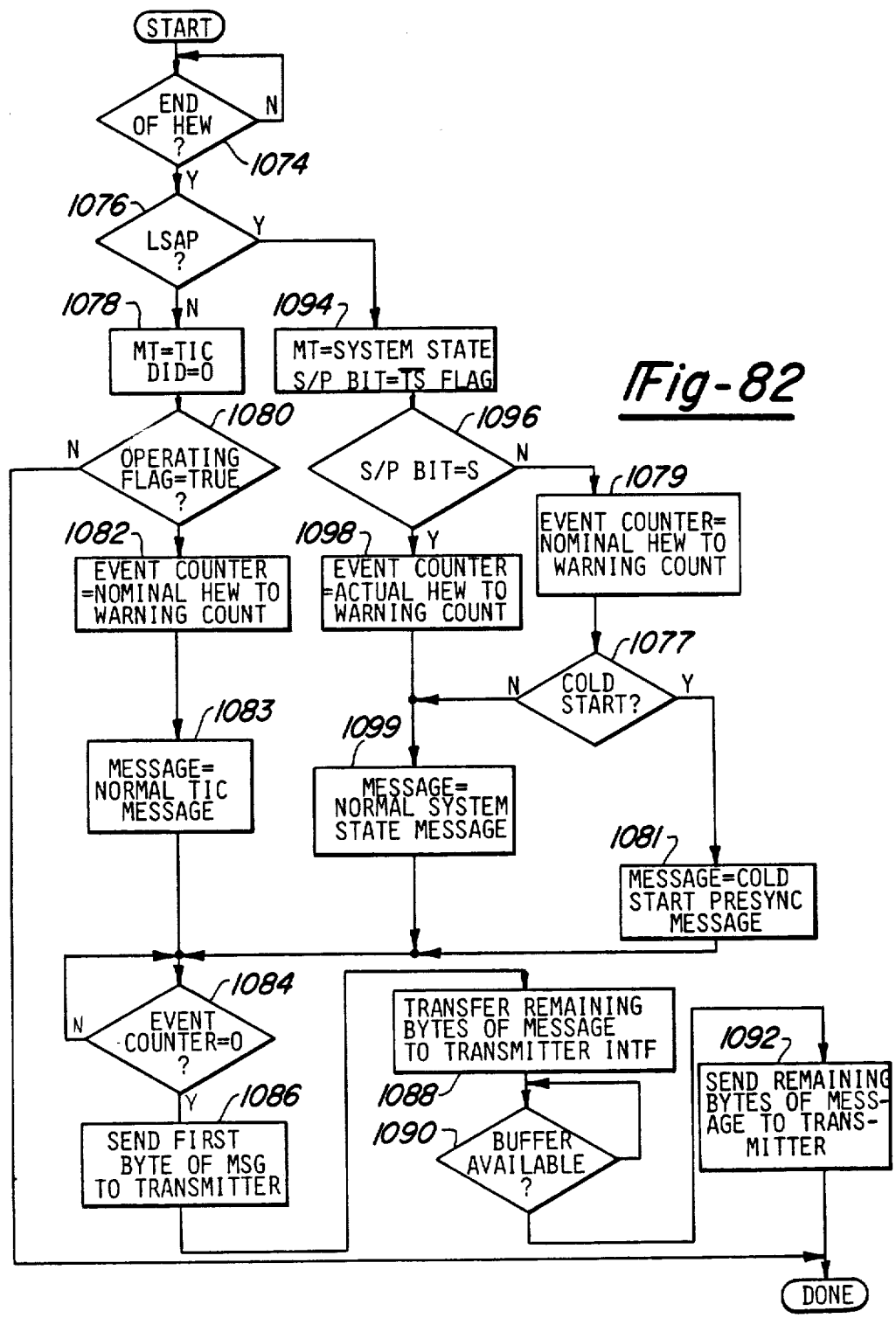
FIG. 82 is a flow diagram of the operation of the Message Generator and the Transmitter Interface.

Referring now to the flow diagram shown in FIG. 82, the Message Generator 998 first waits until the end of the hard error window, as indicated by decision block 1074. At the end of the HEW the Message Generator will inquire if the Subatomic period is a Last Subatomic period, as indicated by decision block 1076. If the Subatomic period is not a Last Subatomic period, then the message to be generated is a Task Interactive Consistency (TIC) message in which the data identification code (DID) is set equal to zero, as indicated by block 1078. If the current Subatomic period is the last Subatomic period then the message to be transmitted is a System State message in which the sync/pre-sync bit is equal to the complement of the TS flag currently stored in the Time Stamp Memory, as indicated by block 1094.

If the message type is a Task Interactive Consistency message, the Message Generator will inquire if the operating flag is true, as indicated by decision block 1080. If the operating flag is not true then no TIC message is to be sent. However, if the operating flag is true, the Message Generator 998 will load an Event Counter 1072 with the nominal HEW to warning count stored in the Scratch Pad Memory 962, as indicated in block 1082, then assemble a normal Task Interactive Consistency message, as indicated by block 1083. As shown in Table 1, the normal Task Interactive Consistency message includes the task completed vector and the branch condition bits obtained from the Message Memory 964. The Message Generator will then wait until the Event Counter 1072 is incremented to zero by the clock signals, as indicated by decision block 1084. When the Event Counter is equal to zero, the Message Generator 998 will send the first byte of the message to the Transmitter through the Transmitter Interface 960, as indicated by block 1086, then transfer the remaining bytes of the message to the Transmitter Interface 960, as indicated by block 1088. The Transmitter Interface 960 will then wait for the buffer available (BA) signal from the Transmitter 30, as indicated by decision block 1090, then send the remaining bytes of the message to the Transmitter, as indicated by block 1092.

As previously described relative to the operation of the Transmitter 30, the sending of the first byte of a message from the Synchronizer will start the warning period for the time dependent Task Interactive Consistency and System State messages. At the end of the warning period, the Transmitter will begin the transmission of the time dependent message and will transmit a buffer available signal to the Transmitter Interface, which triggers the transferring of the remaining bytes stored in the Transmitter Interface to the Transmitter.

If the message type is a System State message, as indicated by block 1094, the Message Generator will then inquire if the System State message to be transmitted is a sync or pre-sync message, as indicated by block 1096. If the message is a sync message, the Message Generator will load the Event Counter 1072 with the actual HEW to warning count from the Scratch Pad Memory, as indicated by block 1098, and then will generate a normal System State message, as indicated by block 1099. If, however, the message is a pre-sync System State message, the Message Generator will load the Event Counter 1072 with the normal HEW to warning count, as indicated by block 1097, and then will interrogate the warm start and operational flags to determine if the system is in the cold start mode, as indicated by decision block 1077. A cold start is indicated by both the Warm Start and Operating Flags being false. If the system is not in a cold start mode, the Message Generator 998 will then generate a normal System State message, as indicated by block 1099. However, if the Synchronizer is in the cold start mode, the Message Generator will generate a cold start pre-sync message, as indicated by block 1081. The cold start pre-sync message has a format as indicated in FIG. 85, which is different from the normal pre-sync System State message shown on Table I. This cold start pre-sync message contains an "in-sync-with" matrix containing the in sync vectors received from all the operating Nodes in the system. The Message Generator 998 will then wait for the end of the HEW to warning period by monitoring the Event Counter, as indicated in decision block 1084. The Message Generator will then send the first byte of the message to the Transmitter 30, as indicated by block 1086, then transfer the remaining bytes of the message to the Transmitter Interface, as indicated by block 1088. When the Transmitter generates the buffer available signal, as indicated in decision block 1090, the Transmitter Interface 960 will then pass the remaining bytes of the System State message to the Transmitter, as indicated by block 1092.

Figure 83:
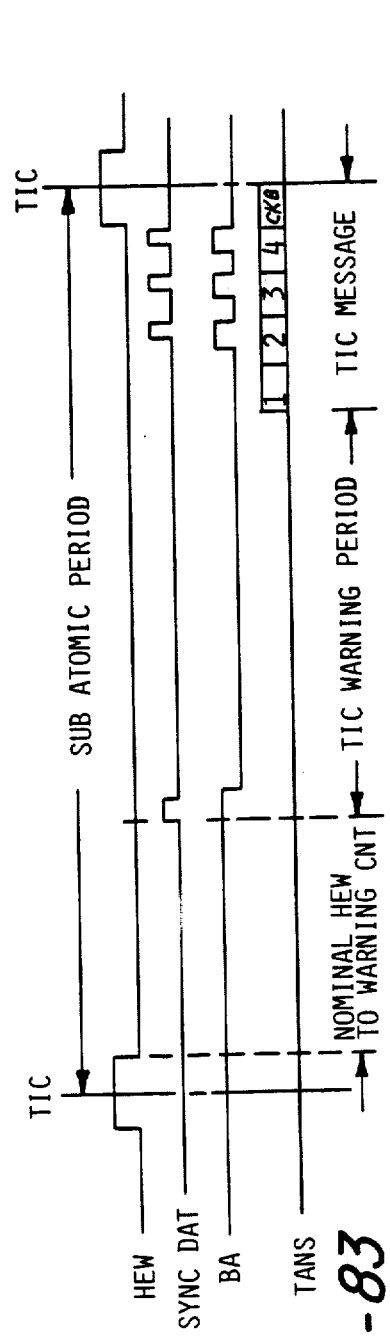
FIG. 83 shows the waveforms of the timing signals for generating a TIC message.

The timing sequences for the Task Interactive Consistency messages and the System State messages are shown in FIGS. 83 and 84, respectively. Referring first to the waveforms shown on FIG. 83, the Message Generator's Event Counter 1072 is loaded at the end of the hard error window (HEW) with the nominal HEW to warning count, as indicated by block 1082 in flow diagram FIG. 82. The Message Generator 998 will then wait until the end of the HEW to warning period and then transmit the first byte of the Task Interactive Consistency message to the Transmitter, as indicated by the waveform sync dat. As previously described with reference to the Transmitter 30, the receipt of this first byte of the Task Interactive Consistency message will initiate the beginning of the Task Interactive Consistency warning period and will also terminate the buffer available (BA) signal, as indicated by buffer available (BA) waveform, as indicated on FIG. 83. At the end of the Task Interactive Consistency warning period, the Transmitter will initiate the transmission of the first byte to all of the other Nodes in the system. It will also reassert the buffer available signal, causing the Transmitter Interface 960 to send the remaining data bytes to the Transmitter, as indicated by the sync dat and buffer available waveforms. As shown, the last byte transmitted by the Transmitter is the longitudinal redundancy code check byte, the end of which is timed to coincide with the end of the Subatomic period. As discussed relative to FIG. 82, when the next message to be sent is a pre-sync System State message, the HEW to warning period is the same as for the Task Interactive Consistency message, however, the Transmitter will substitute the System State warning period for the Task Interactive Consistency warning period and will begin the transmission of the System State message at a point in time earlier than it would have started to transmit the Task Interactive Consistency message, as indicated in FIG. 84.

Referring now to FIG. 84, there is shown the timing sequence for the transmission of a sync System State message. In the transmission of a sync System State message, the Event Counter 1072 in the Message Generator 998 is loaded with the actual HEW to warning count, as indicated by block 1098 in FIG. 82. As previously discussed, the actual HEW to warning count is the sum of the nominal HEW to warning count plus the calculated sync delta. At the end of the actual HEW to warning count, the Message Generator will transmit the first byte of the sync System State message directly to the Transmitter 30 through the Transmitter Interface 960. The Transmitter then will initiate the transmission of the System State message at the end of the System State message warning period and will reinstate the buffer available signal, as indicated, causing the Transmitter Interface to transmit the remaining sync System State message to the Transmitter 30. The transmission of the last byte of the System State message defines the end of the Atomic period. The adding of the sync delta to the nominal HEW to warning period corrects the length of the Atomic period so that its ending should coincide with the ends of the Atomic periods generated by the other Nodes in the system, thus, establishing point-to-point synchronization with all of the other Nodes.

The operation of the Synchronizer in a cold start mode is discussed relative to the flow diagram shown in FIGS. 86 through 89 and the timing diagram shown in FIG. 90.

Referring first to FIG. 86, the cold start procedure begins by inquiring if the Synchronizer is in the cold start mode, as indicated by decision block 1100. The cold start is indicated by the absence of the warm start flag and the operation flag. If the Synchronizer is not in the cold start mode of operation it will inquire whether it is in the warm start mode of operation, as indicated by decision block 1102. If the Synchronizer is in the warm start mode of operation, as indicated by the warm start flag being true, the Synchronizer will call the warm start procedure, as indicated by block 1105. Otherwise, the Synchronizer will exit the cold start routine and default to the steady state mode of operation, as indicated by block 1103.

If the Synchronizer is in the cold start mode of operation, the Synchronizer will listen for messages from the other Nodes over the listening period shown in FIG. 90. The Synchronizer will then inquire, as indicated by decision block 1104, if the message received is a sync or a pre-sync message, as determined from the function bits contained in the message. If the message is a pre-sync message, the message is time stamped, as indicated by block 1106, and the pre-sync Message Counter 980 is incremented, as indicated by block 1108. The In Sync With Detector 994 will then inquire if the time stamp of the received message minus the time stamp of its own message is less than the hard error window, as indicated by decision block 1110. If the difference between the time stamp of the received message and the time stamp of its own message is less than the hard error window the "in-sync-with" flag corresponding to the Node from which the message was received is set to true, as indicated by block 1112. Otherwise if the difference between the time stamp of the received message minus the time stamp of its own message is greater than the hard window error the "in-sync-with" flag in the In-Sync-With Register 996 is set to false, as indicated by block 1114.

Returning now to decision block 1104, if the sync/pre-sync function bit contained in the received message is a sync bit, the Time Stamper will time stamp the received message and set the TS flag to sync and the update flag to true, as indicated by block 1116. The Synchronizer will then increment the Sync Message Counter 982, as indicated by block 1118.

Figure 87:
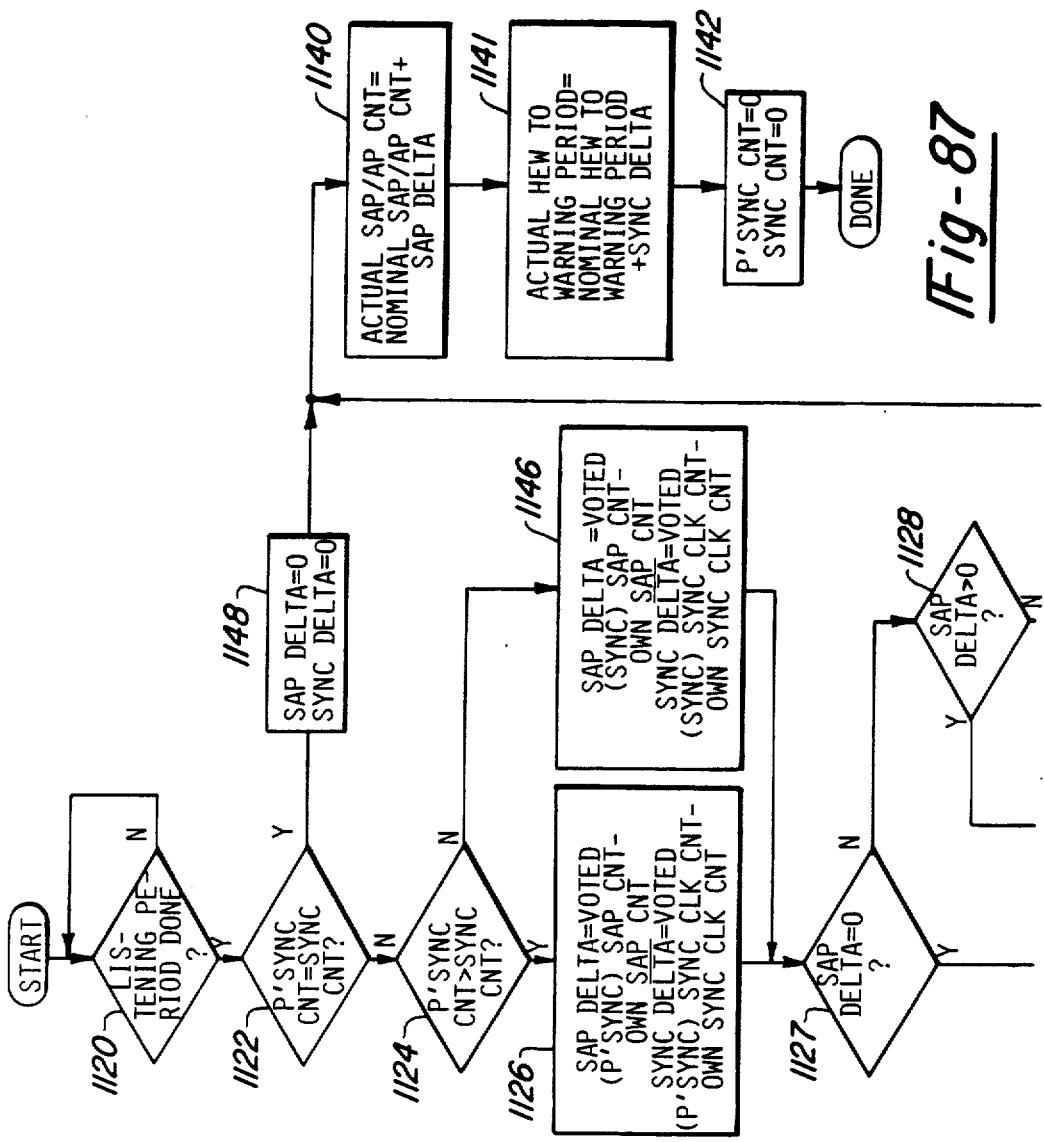
FIGS. 87 and 87a are flow diagrams showing the generation of the HEW to warning signal during "cold start"
Figure 87A:
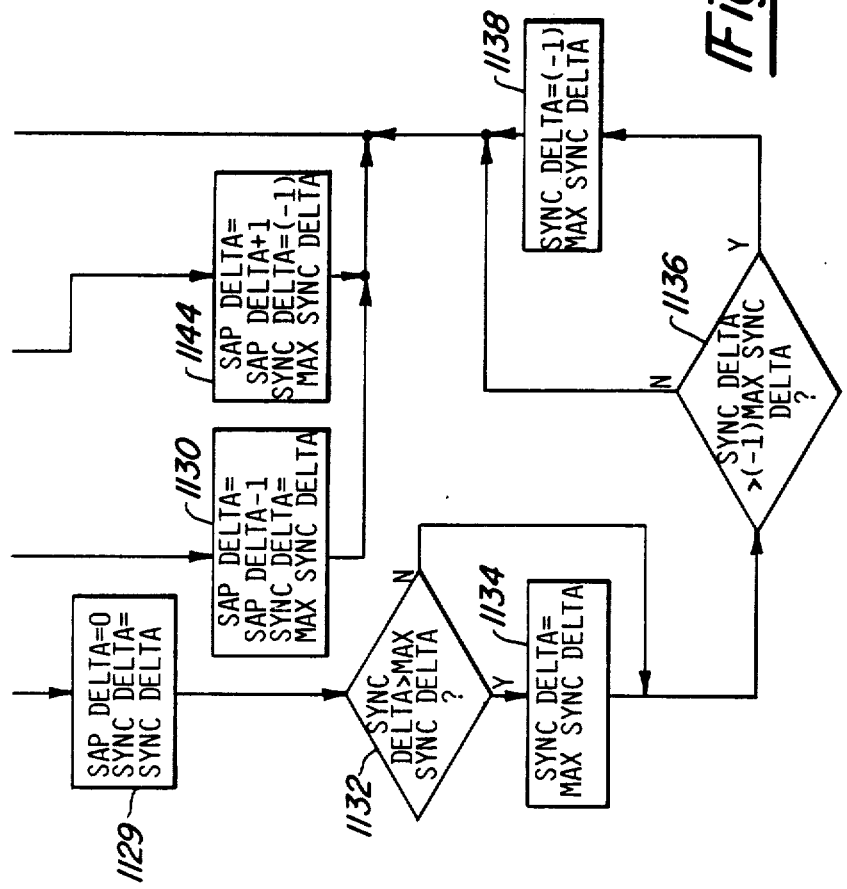

The operation of the Sync Correction Generator 990 and Adder 992 shall be explained with reference to the flow diagram illustrated in FIG. 87. The Sync Correction Generator 990 first inquires, as indicated by decision block 1120, if the listening period is done. The listening period during a cold start is equal to a full Atomic period plus the hard error window, as indicated in FIG. 90. During this phase of the operation the Within Hard Error Window and Soft Error Window Checker 976 will not generate any error signals during this period in response to the Warm Start Flag and the Operating Flag being set to false.

Once the listening period is over the Sync Correction Generator 990 will inquire if the number of pre-sync counts stored in the Pre-Sync Message Counter 980 is equal to the number of sync counts stored in the Sync Message Counter 982. If the pre-sync count is equal to the sync counts, the Sync Correction Generator will set the Subatomic period delta equal to zero and the sync delta equal to zero, as indicated by block 1148. If the pre-sync count is not equal to the sync count, the Sync Correction Generator 990 will then inquire if the pre-sync count is greater than the sync count, as indicated by block 1124. If the pre-sync count is greater than the sync count the Time Stamp Voter 956 will extract from the Time Stamp Memory all of the time stamps for which the TS flag is set to the pre-sync and the update flag is set to true. The Time Stamp Voter 956 will then generate a voted Subatomic period count and a voted sync clock count using the extracted values. The Sync Correction Generator 990 will then subtract its own Subatomic period count from the voted Subatomic period count to generate the SAP delta and will subtract its own sync clock count from the voted sync clock to generate a sync delta, as indicated by block 1126.

Alternatively, if the sync count is greater than the pre-sync count, the Time Stamp Voter 956 will generate a SAP delta and a sync delta using the time stamps having their TS flag set to sync and the update flag equal to true, as indicated by block 1146.

If the Subatomic period delta is equal to zero, as indicated by decision block 1127, then the Sync Correction Generator 990 will set the Subatomic period delta equal to zero and the sync delta equal to computed sync delta, as indicated in block 1129. The Sync Correction Generator 990 will then inquire if the sync delta is greater than the maximum sync delta, as indicated by decision block 1132. If it is, the Sync Correction Generator will set the sync delta equal to the maximum sync delta stored in the Scratch Pad Memory 962, as indicated in FIG. 75. If the sync delta is not greater than the maximum sync delta, as determined by decision block 1132, the Sync Correction Generator will inquire if the sync delta is greater than the two's complement of the maximum sync delta, as indicated by decision block 1136. If the sync delta is greater than the two's complement of the maximum sync delta, the Sync Correction Generator 990 will set the sync delta equal to the two's complement of the maximum sync delta, as indicated by block 1138. Otherwise, the sync delta will remain the computed sync delta.

Returning now to decision block 1127, if the Subatomic period delta is not equal to zero then the Sync Correction Generator 990 will inquire if the Subatomic period delta is greater than zero, as indicated by decision block 1128. If the Subatomic period delta is greater than zero, the Sync Correction Generator will set the Subatomic period delta equal to the Subatomic period delta minus 1 and the sync delta equal to the maximum sync delta, as indicated in block 1130. Otherwise, the Sync Correction Generator will set the Subatomic period delta equal to the Subatomic period delta plus 1 and the sync delta equal to the two's complement of the maximum sync delta, as indicated by block 1144.

Once the Subatomic period delta and the sync deltas are determined, the actual Subatomic period per Atomic period count is generated by adding the Subatomic period delta to the nominal Subatomic period per Atomic period count, as indicated in block 1140. The actual HEW to warning period is generated by adding the sync delta to the nominal HEW to warning period in the Adder 992, as indicated by block 1141. The actual Subatomic period per Atomic period count and the actual HEW to warning period counts are stored in the Scratch Pad Memory 960, in the locations identified in FIG. 75. The final operation of the Sync Correction Generator 990 is to set the Pre-sync Message Counter 980 and the Sync Message Counter 982 to zero, as indicated in block 1142.

The operation of the Data Handler 968 during the cold start mode of operation is shown in the flow diagram of FIG. 88. As each message is received from the Message Checker Interface 942, the Data Handler inquires if the sync/pre-sync bit is a sync bit, as indicated by decision block 1150. If the sync/pre-sync function bit contained in the message from Node j is a sync bit, the Data Handler, as indicated by block 1152, will store the "in-sync-with" vector of the received message in the In-Sync-With matrix (row j) contained in the Scratch Pad Memory, as shown in FIG. 75. However, if sync/pre-sync function bit contained in the message is a pre-sync bit, the In-Sync-With matrix contained in the pre-sync message is stored in the Byzantine Voter Memory 970, as indicated by block 1154.

Figure 89:
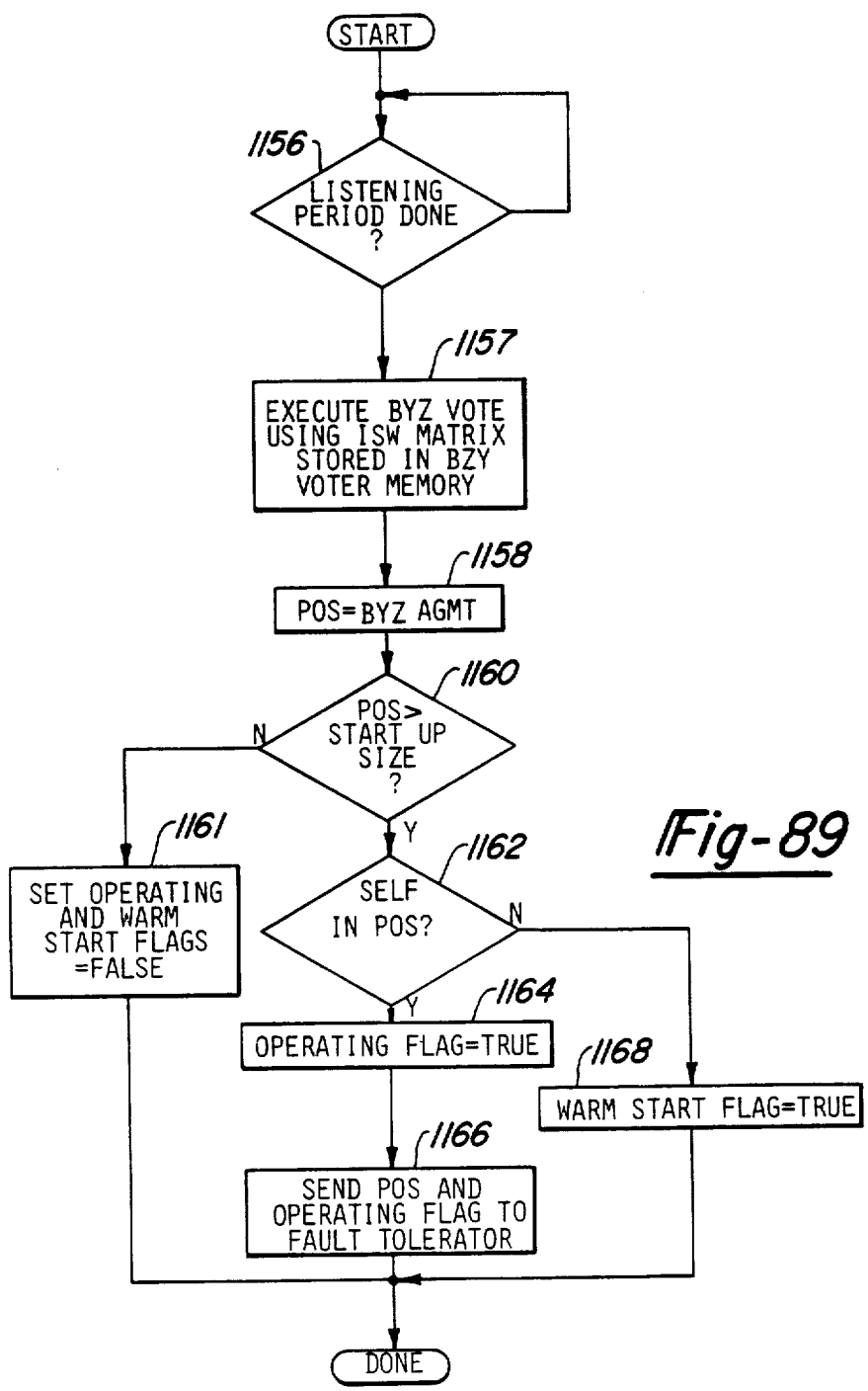
FIG. 89 is a flow diagram showing the operation of the Operating Condition Detector during a "cold start"
Figure 94:
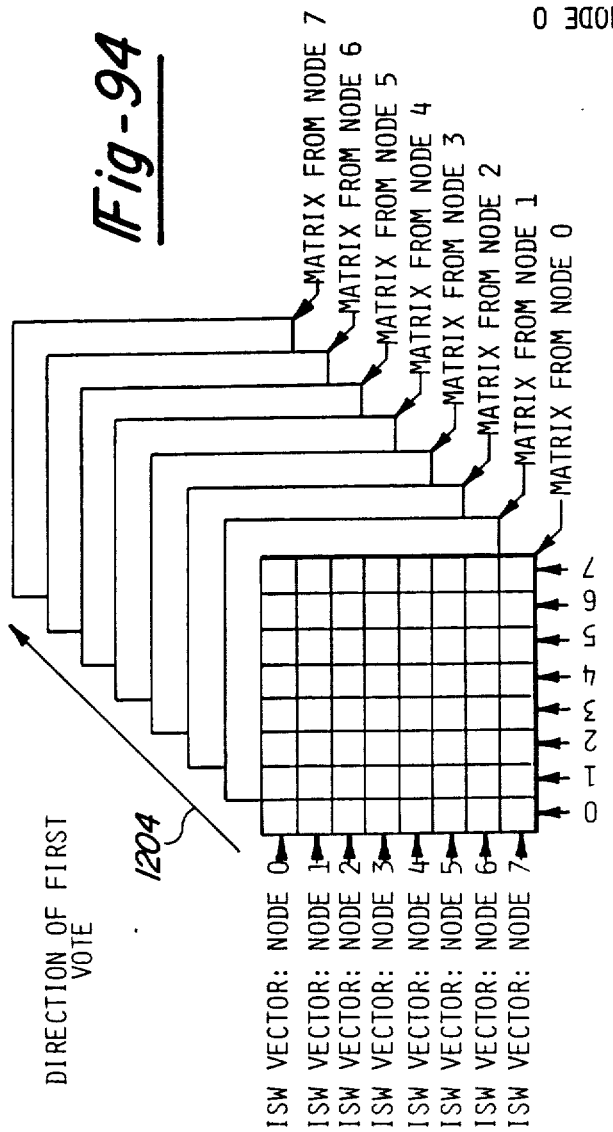
FIG. 94 is a perspective of the Byzantine Voter's three-dimensional memory.
Figure 95:
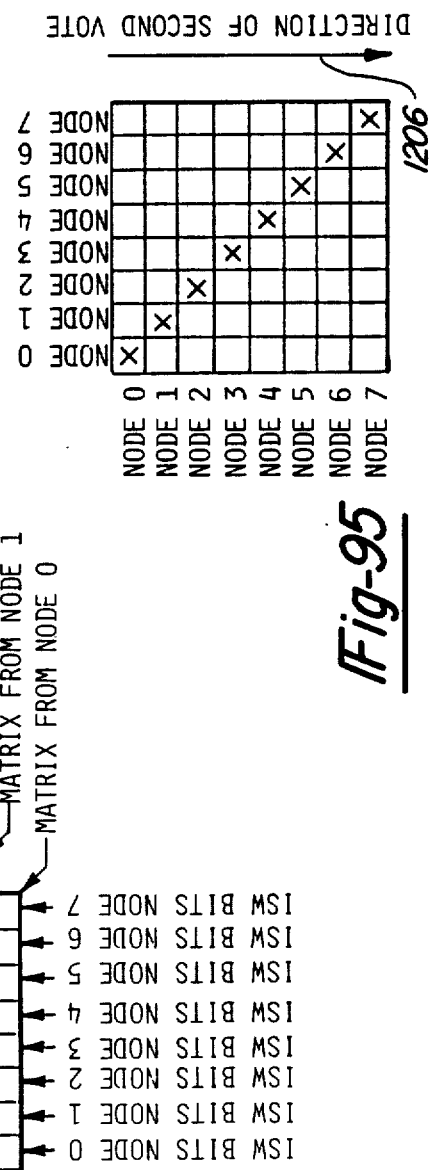
FIG. 95 shows the two-dimensional format of ISW vectors resulting from the first Byzantine vote on the three-dimensional ISW matrices.

The determination of a potential operating set of Nodes and the setting of the Operating and Warm Start Flags shall be discussed relative to the flow diagram shown in FIG. 89. The Byzantine Voter 954 will wait until the listening period is over, as indicated by decision block 1156, then execute a byzantine vote using the In-Sync-With matrix stored in the Byzantine Voter Memory 920, as indicated by block 1157. Since each Node sends an In-Sync-With matrix which is stored in the Byzantine Voter Memory, these In-Sync-With matrices form a three-dimensional cube of "in-sync-with" vectors, as shown in FIG. 94. The Byzantine Voter makes a first vote through the In-Sync-With matrix, as shown by the arrow 1204 in FIG. 94, which will reduce the three-dimensional matrix to a two-dimensional matrix, as shown in FIG. 95. The Byzantine Voter 954 will then take a second vote in a direction of the arrow 1206, shown in FIG. 95, to generate a Byzantine Agreement as to which Nodes are in synchronization with each other. The Byzantine Agreement is then forwarded to the Operating Condition Detector 1000 as a potential operating set (POS), as indicated by block 1158. The Operating Condition Detector 1000 will then compare the number of Nodes in the potential operating set with the minimum number of Nodes required for start up, as indicated by decision block 1160. If the number of Nodes in the potential operating set is less than the minimum start up size, the Operating Condition Detector will set the Warm Start Flag 1002 and the Operating Flag 1004 to false, as indicated by block 1161. However, if the number of Nodes in the potential operating set is greater than the start up size, the Operating Condition Detector 1000 will then determine if its own Node is in the potential operating set, as indicated by block 1162. If the Node is in the potential operating set, the Operating Condition Detector will set the Operating Flag equal to true, as indicated by block 1164, and then send the potential operating set to the Fault Tolerator along with the Operating Flag, as indicated by block 1166. If the Node is not within the potential operating set, the Operation Condition Detector will set the Warm Start Flag 1002 to true, as indicated in block 1168. The setting of the Warm Start Flag to true will switch the operation of the Synchronizer from the cold start mode to the warm start mode, as indicated by block 1105 in FIG. 86. The potential operating set and the Operating Flag transmitted to the Fault Tolerator are transferred to the Scheduler 40 and initiates the operation of the Operations Controller.

FIG. 90 shows the operation of the Synchronizer during a cold start. At the beginning of the cold start each Synchronizer will transmit an initial sync System State message in which the "in-sync-with" vector is all zeros. The Time Stamper 972 will then time stamp the System State messages received from all of the other Nodes in the system during the time stamp listening period which is equal to an Atomic period plus the hard error window interval, as indicated. During this period, the Synchronizer will count the number of Subatomic periods which elapsed from the initial sync System State message and will send a pre-sync System State message at the appropriate time. In this first pre-sync message the In-Sync-With matrices are all zeros since it has not received any in-sync-with vectors from the other Nodes at this point in time. At the end of the hard error window following the transmission of the pre-sync System State message, the Synchronizer will process the received time stamps and will generate the required SAP delta and the sync deltas and adjust the interval between the pre-sync message and the next sync message. The Synchronizer will also compare its time stamp with the voted time stamp and determine which Nodes it is in synchronization with. At the end of the adjusted interval, the Synchronizer will again transmit a sync message which contains the generated "in-sync-with" vector. During the interval from the preceding pre-sync message to the following pre-sync message the Synchronizer will collectand store the "in-sync-with" vectors received from the other Nodes in the Scratch Pad Memory and assemble an "In-Sync-With" matrix in the Scratch Pad Memory.

The Synchronizer then will count the nominal number of Subatomic periods per Atomic period and will generate the special "cold-start" pre-sync System State message which contains the In-Sync-With matrix assembled in the Scratch Pad Memory. During the listening period preceding the sending of the second pre-sync System State message the Synchronizer will time stamp all of the sync messages received from the other Nodes. In the hard error window interval either side of the transmission of the second presync System State message, the Synchronizer will collect the In-Sync-With matrices transmitted by the other Nodes and store them in the Byzantine Voter Memory 970. After the end of the hard error window the Synchronizer will compute the sync correction for the interval between the pre-sync and the next sync message to effect synchronization between the Nodes. It will then determine its own "in-sync-with" vector and perform a byzantine vote on the In-Sync-With matrices stored in the Byzantine Voter Memory.

During this processing interval immediately following the end of the HEW interval, the Synchronizer will also test to determine if a potential operating set exists and whether or not its own Node is included in the potential operating set.

At the end of the adjusted synchronization interval the Synchronizer will once again transmit a sync System State message which will include its own "in-sync-with" vector. It will also assemble a new "in-sync-with" matrix from the "in-sync-with" vectors generated by the other Nodes between the second and the third pre-sync System State message. This process is repeated until a potential operating set is determined by the result of the byzantine vote on the In-Sync-With matrices stored in the Byzantine Voter Memory.

The operation of the Synchronizer during a warm start will be discussed relative to the flow diagram shown in FIG. 91 and the timing diagram shown in FIG. 92. During the warm start, the Synchronizer recognizes the existence of a potential operating set and its main function is to establish synchronization with that operating this set.

Referring now to FIG. 91, the warm start begins by the detection of the warm start flag, as indicated by decision block 1170. If the warm start flag is true, the Timer Stamper will time stamp each received message, as indicated by block 1172. The In Sync With Detector 994 will then determine if it is "in-sync-with" any of the other Nodes, as indicated by decision block 1174, in which the difference between the Node's own time stamp and the time stamp for each received message is compared with the hard error window. If the difference between the Node's own time stamp and the time stamp of the received message is less than the hard error window interval the "in-sync-with" flag in the ISW Register 996 is set to true for each Node in which this occurs, as indicated by block 1176. If the difference between its own time stamp and the time stamp of the received message is greater than the hard error window interval, the ISW Detector 994 will set the "in-sync-with" bit for that particular Node stored in the ISW Register 996 to false, as indicated by block 1178.

During the warm start the Synchronizer will time stamp all of the System State messages received during a listening period which is equal to one Atomic period plus the hard error window interval. This is the same listening period used during a cold start. When the listening period is done, as indicated by decision block 1180, the Synchronizer will compute the sync correction which will adjust the length of the Atomic period between the pre-sync and the next sync System State message, as indicated by block 1184. The computation of this correction is the same as the computation used during a cold start. If the Operating Condition Detector 1000 concludes that its own Node is in synchronization with the existing operating set of Nodes the Operating Condition Detector will set the operating flag equal to true and the warm up flag equal to false, as indicated by block 1188, and then it will send the "in-sync-with" vector and the operating flag to the Fault Tolerator 36, as indicated by block 1190. The Fault Tolerator 36 will use this in-sync-with vector as its initial system state vector during the subsequent start up operations.

Referring now to the timing diagram shown in FIG. 92, during the warm start period the Synchronizer will only transmit sync and pre-sync System State messages in an alternating sequence. In the processing interval following the hard error window associated with each sync and pre-sync System State message the Synchronizer will compute the sync correction to adjust the length of the Atomic period following the pre-sync message to effect synchronization with the existing operating set. It will also generate its own local "in-sync-with" vector during the same processing interval and test this "in-sync-with" vector to determine if its own Node is in synchronization with the operating set. If its own Node is in synchronization with the existing operating set, the Synchronizer will then go to the operating state and will exit the warm up state. As shown in FIG. 92, this process is repeated until the Synchronizer is in sync with the existing operating set.

The Synchronizer also performs a byzantine vote on the task completed vector and the branch condition bits, as previously described with reference to the Scheduler 40. The task completed vector and the branch condition bits are embodied as separate bytes in the Task Interactive Consistency and the System State messages and are stored in the Message Memory 964.

Referring now to FIG. 93, at the end of each hard error window, as indicated by block 1192, the Synchronizer will transfer the task completed vectors from the Message Memory 964 to the Byzantine Voter Memory 970, as indicated by block 1194. After all the task completed vectors are transferred to the Byzantine Voter Memory the Byzantine Voter 954 will execute a byzantine vote on all of the transferred task completed vectors and generate a voted task completed (TC) vector, as indicated by block 1196. The Synchronizer will then transfer the branch condition bits to the Byzantine Voter Memory 970, as indicated by block 1198, then execute a byzantine vote to generate voted branch condition bits, as indicated by block 1200. The Byzantine Voter 954 will then pass the voted task completed vector and the voted branch condition bits to the Scheduler, as indicated by block 1202. This assures that the Scheduler in each Node will record the task completed in a consistent fault tolerant manner.

BYZANTINE VOTER

The function of the Byzantine Voter is to guarantee consistency among the Nodes in reaching agreement on certain critical matters. The reliability of a distributed fault-tolerant system depends on the ability of all the non-faulty Nodes to reach a consistent agreement despite the presence of one or more faulty Nodes. Since all failure modes of the faulty Node cannot be enumerated, any mechanism for achieving agreement must be provably correct in the presence of arbitrary failures.

The problem of reaching agreement was originally expounded by analogy to the several divisions of the Byzantine army encamped around an enemy city, as described by Lamport, L., Shostak, R., and Pease, M., "The Byzantine General's Problem," ACM TOPLAS, Volumn 4, Number 3, July 19, 1982 and "Reaching Agreement in the Presence of Faults," JACM, Volume 27, No. 2, April 1980. In the Byzantine army analogy, each division is commanded by a general (Node) which can communicate with other generals via messengers (communication links). The generals need to reach a consistent decision about whether to attack or retreat. Some of the generals may be traitors who will attempt to confuse the other generals. Since all possible failure modes must be considered a traitorous general is permitted to lie, send different messages to different generals, to tamper with relayed messages, to act in collusion with other traitors, or otherwise appear to act in a pernicious manner.

The system state which guarantees system consistency is referred to as Byzantine Agreement, and is defined by two conditions.

1. Agreement: All loyal generals agree on the contents of every message sent.
2. Validity: If the sending generaly is loyal, then all loyal receiving generals agree on the content of his messages as originally sent.

These Agreement conditions embody three important concepts. First, if the sending general is a traitor the specific decision made by the loyal generals is immaterial provided they all make the same decision. Second, reaching agreement does not require identification of the traitors. Third, no assumptions have been made restricting the traitor's behavior.

In order to guarantee Byzantine Agreement regarding a given message, one or more synchronous rounds of transmission are required. During each round, every general broadcasts a copy of every message received during the previous round. Agreement can be guaranteed in the presence of one traitor if there are at least four generals and two rounds of messages are transmitted.

For numerical data, it is also possible to define a state of approximate agreement as meeting two similar conditions.

1. Agreement: All non-faulty Nodes eventually agree on the values that are within some small difference of each other.
2. Validity: The voted value obtained by each non-faulty Node must be within the range of initial values generated by the non-faulty Nodes.

Figure 96:
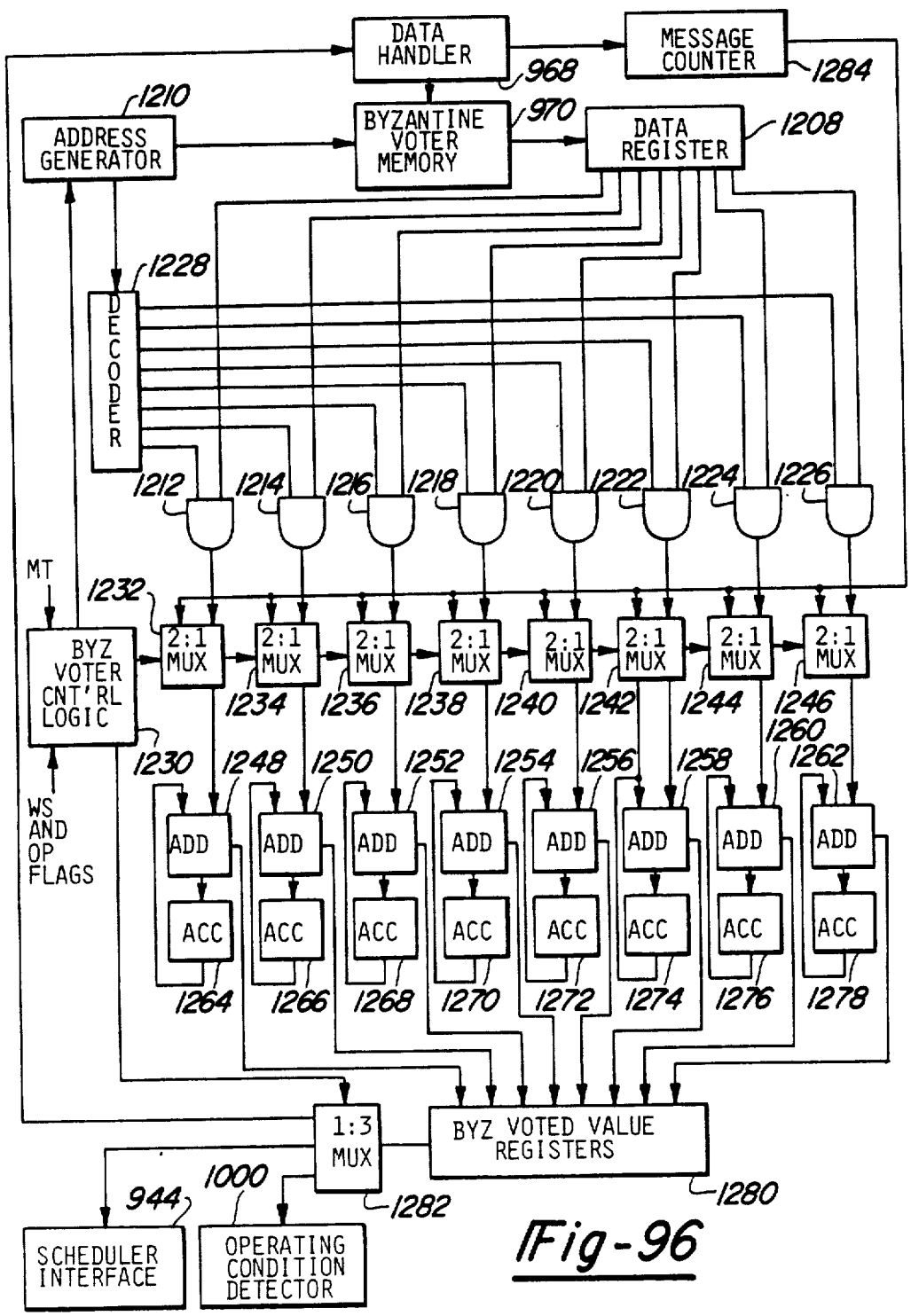
FIG. 96 is a functinonal circuit diagram of the Byzantine Voter.

The details of the Byzantine Voter are shown in FIG. 96 and will be discussed with reference to the "in-sync-with" matrices and vectors shown in FIGS. 94 and 95, respectively. It is to be recognized that the Byzantine Voter discussed here is not limited to the voting on the "in-sync-with" vectors, the task completed vectors, or the binary bits as applied to the instant application.

As previously discussed, each Synchronizer will generate its own "in-sync-with" vector which is transmitted to all of the other Nodes in the System State messages. Each Node will store the "in-sync-with" vectors received from all of the other Nodes in the Scratch Pad Memory 962 to form an "in-sync-with" matrix, as shown in FIG. 75. During the cold start mode of operation this "in-sync-with" matrix, a shown in FIG. 85, is tansmitted with each pre-sync System State message to all of the other Nodes in the system. Each Synchronizer will then store each of these "in-sync-with" matrices in the Byzantine Voter Memory to form a three-dimensional cube, as shown in FIG. 94. This constitutes the two rounds of transmission required for a Byzantine Agreement.

The Byzantine Voter will first vote on the value of each "in-sync-with"L bit of the matrix longitudinally through the matrix, as indicated by the direction of the arrow 1204 in FIG. 94. The first vote will reduce the three dimensional cube to a two-dimensional matrix, as shown in FIG. 95, where each "in-sync-with" bits is the voted value of the first vote. The Byzantine Voter 954 will then vote on the values of the "in-sync-with" bit in each column of the "in-sync-with" matrix shown in FIG. 95. The direction of the second vote by the Byzantine Voter is indicated by arrow 1206. The result of the second vote will be a Byzantine Agreement of the individual "in-sync-with" bits for each Node in the system, which is transmitted to the Operating Condition Detector 1000, as shown in FIG. 77. The circuit details of the Byzantine Voter are shown in FIG. 96.

Referring now to FIG. 96, the Data Handler 968 will load the data to be voted on by the Byzantine Voter into the Byzantine Voter Memory 970. A Byzanine Voter Control Logic 1230 will activate an Address Generator 1210 in respone to the message type and the operating flags. As previously discussed, the Byzantine Voter will vote on the task completed and branch condition vectors contained in the Task Interactive Consistency messages and the "in-sync-with" matrices contained in the pre-sync System State messages during the cold start mode of operation. The Address Generator 1210 will address the Byzantine Voter Memory in the appropriate manner and store the addressed data in a Data Register 1208. Each bit in the Data Register 1208 is applied to one input of a plurality of AND gates 1212 through 1226. Each AND gate receives a respective one of the data bits stored in the Data Register 1208. A Decoder 1228, responsive to the addresses being generated by the Address Generator, will selectively deactivate one of the AND gates which corresponds to the "in-sync-with" bit generated by each Node with respect to itself, as indicated by the X's in the blocks shown in FIG. 95.

A Message Counter 1284 monitors the number of vectors or matrices loaded into the Byzantine Memory 970 and generates a two's complement value corresponding to one half of the number of vectors or matrices loaded into the Byzantine Voter Memory 970. This value is loaded into a plurality of Accumulators 1264 through 1278 through a like plurality of 2:1 Multiplexers 1232 through 1246 and Adders 1248 through 1262. Under the control of the Byzantine Voter Control Logic the Data Register will then switch the 2:1 Multiplexers 1232 through 1246 to the output of the AND gates 1212 through 1226 and will add the content stored in the Data Registers to the amount stored in the Accumulators. The Byzantine Control Logic will then load the data from the Byzantine Voter Memory into the Data Register 1208 in accordance with the message type and the operating flags. For example, if the byzantine vote is being taken among the "in-sync-with" matrices generated during the cold store, the Address Generator 1210 will sequentially load the in sync with vector from Node O from the matrix transmitted by Node O and then sequentially the matrix from Node 1 through Node 7. During the adding of the bit value in each of the Adders 1248 through 1262 to the amount stored in the Accumulators 1264 through 1277, an overflow bit will be generated when the sum is greater than 0. Any overflow bits generated during the addition process will be stored in a Byzantine Voted Value Register 1280. After the data from the matrix from Node 7 is processed, the content of the Byzantine Voted Value Register is passed to a 1:3 Multiplexer 1282 which stores this data in the Byzantine Voter Memory 970 to form the two-dimensional matrix, such as shown in FIG. 95.

The Address Generator will then index and will process the "in-sync-with" vectors from Node 1 from the matrices from Node 0 through Node 7 as previously doen with regard to the "in-sync-with" vectors of Node 0. First the Message Counter 1284 will load the Accumulators with a two's complement value corresponding to one half of the number of matrices that will be processed. The Address Generator will then load the "in-sync-with" vectors generated by Node 1 taken from the matrices received from Node 0 through Node 7, as previously described. Again, the overflow bits signifying that the results from the addition exceed zero, are stored in the Byzantine Voted Value Register 1280 which also is restoed in the Byzantine Voter Memory 970 through the Multiplexer 128. This process is repeated for the "in-sync-with" vector generated by each of the Nodes and is terminated when the vectors from Node 7 ae completely processed and all the Byzantine Voted Values are stored back into the Byzantine Voter Memory 970, forming the two-dimensional matrix shown in FIG. 95.

After the first vote has been completed on all of the "in-sync-with" vectors stored in the "in-sync-with" matrices from all of the Nodes, the Byzantine Voter Control Logic 1230 will initiate the second vote in which the voting is taken down the columns, as indicated by arrow 1206 in FIG. 95. During the second vote the Address Generator 1210 will load the column for Node 0 into the Data Register 1208. The Message Counter again will load the two's complement corresponding to the value of one half the number of bits to be processed by the Byzantine Voter into the Accumulators 1264 through 1278. The Adders will then add the bits stored in the Data Register to the value stored in the Accumulators 1264 through 1278. This process is repeated until the columns for all of the Nodes have been processed. Again, the overflow bits from the Adders 1248 through 1262 are stored in the Byzantine Voted Value Register 1280. The Byzantine Voter Control Logic 1230 will then activate the 1:3 Multiplexer to pass the "in-sync-with" vector stored in the Byzantine Voted Value Register to the Operating Condition Detector 1000, as previously described. This "in-sync-with" vector represents a Byzantine Agreement on which Nodes are in synchronization with each other.

When the Byzantine Voter is voting on the task completed vectors and the branch condition bits contained in the Task Interactive Consistency and System State messages, the Data Handler will load these values into the Byzantine Voter Memory 970. The Byzantine Voter Control Logic 1230 will then activate the Address Generator 1210 to load the columns of the task completed vectors into the Data Register 1208, as previously described with reference to the second vote on the "in-sync-with" vectors. The voting process is then identical to the voting process for the second vote on the "in-sync-with" vectors and the voted value is loaded into the Byzantine Voted Value Register from the overflow outputs of the Adders 1248 through 1262. The Byzantine Voter Control Logic 1230 will then activate the 1:3 Multiplexer 1282 to pass the voted task completed vector and the voted branch condition bits to the Scheduler Interface 944, as previously described.

The Operations Controller and the subsystems discussed herein represent a distributed multi-computer fault-tolerant architecture based on the functional and physical partitioning of the application task and the overhead functions. It is not intended that the invention be limited to the structures illustrated and discussed herein. It is known that those skilled in the art are capable of making changes and improvements within the spirit of this invention as described above and set forth in the appended claims.

What is claimed is:

1. In a multiple node processing system having a plurality of nodes, an application processor for processing a predetermined set of tasks and an operations controller for controlling its own node, the operations controller having a transmitter for transmitting a synchronizer for synchronizing its own node with all of the nodes in the system through an exchange of inter-node time-dependent messages comprising alternating pre-sync and sync time-dependent messages separated in time by a nominal timing interval, said synchronizer comprising:

a message interface for receiving the sync and pre-sync time-dependent messages;

counter means for generating a local time;

a time stamp memory having one entry for each node in the system, each entry storing a time stamp for a most recent time-dependent message received from an associated node;

a time stamper connected to said message interface, said counter means and said time stamp memory, said time stamper responsive to receiving a time-dependent message from each node for generating a time stamp corresponding to a local time at which said time-dependent message is received and for storing said time stamp in said time stamp memory in an entry associated with the node from which the time-dependent message was received;

a time stamp voter connected to said time stamp memory for generating a voted time stamp corresponding to a medial value of said time stamps stored in said time stamp memory for said pre-sync time-dependent messages;

a sync correction generator connected to said time stamp memory and said time stamp voter for generating sync delta having a value corresponding to a difference between said voted time stamp and the time stamp of its own pre-sync time-dependent message;

means connected to sid sync correction generator for adding said sync delta to a nominal transmission timing interval for generating an actual transmission timing interval, said nominal transmission timing interval corresponding to a nominal timing interval between the end of the transmission of said sync time-dependent message and a passing of said pre-sync time-dependent message to said transmitter; and message generator means connected to said means for adding for generating said sync and pre-sync time-dependent messages, said message generator means passing said pre-sync time-dependent messages to said transmitter at an end of said nominal transmission timing interval and passing said sync time-dependent messages to said transmitter at an end said actual transmission timing interval.

2. The synchronizer of claim 1 having a timing signal generator for generating at least a first timing signal coincident with an end of the transmission of said sync and pre-sync time-dependent messages and a hard error window signal defining an interval of time bracketing said first timing signal during which all of said sync and pre-sync time-dependent messages should be received from the nodes which are in synchronization with its own node, said synchroziner having a hard error window detector connected to said message checker interface, said timing signal generator and said time stamper for inhibiting said time stamper from recording a time stamp in said time stamp memory for each node whose time-dependent message was not received within said hard error window, and for recording a hard error for each node whose time-dependent message was not received within said hard error window.

3. The synchronizer of claim 2 wherein said timing signal generator generates clock pulses and a second timing signal which divides a first nominal timing interval into a plurality of subintervals, said counter means comprising:

a first counter means connected to said timing signal generator for counting each occurrence of said second timing signal during said first timing signal to generate a sub-interval count;

a second counter means connected to said timing signal generator for counting said clock pulses between each occurrence of said second timing signal to generate a clock count; and wherein said time stamp comprises a coarse time stamp portion containing said sub-interval count and a fine stamp portion containing said clock count.

4. The synchronizer of claim 3 wherein said time stamp voter generates a voted coarse time stamp corresponding to a medial value of said sub-interval count stored in said time stamp memory and a voted fine time stamp corresponding to a medial value of said clock count stored in said time stamp memory and wherein said sync correction generator generates a coarse delta equal to a difference between said voted coarse time stamp and its own coarse time stamp and a fine delta equal to a difference between said voted fine time stamp and a number of clock counts in its own time stamp.

5. The synchronizer of claim 4 wherein said sync and pre-sync time-dependent messages have a message type code, said message type code of said sync time-dependent message is distinguished from said message type code of said pre-sync time-dependent message by function bits contained therein, said synchronizer further has an expected message detector connected to said message checker interface and said time stamper for recording a sequence error for each node which sends a message within the hard error window which has a wrong message type code and records a sequence error for each node in which said sync and pre-sync time-dependent messages are not received in an alternating manner, said expected message detector inhibiting said time stamper from recording a time stamp in said time stamp memory for each node which sent a message having a detected error sequence.

6. The synchronizer of claim 5 having:

an in-sync-with register having a flag bit for each node in the processing system; and an in-sync-with detector connected to said hard error window detector and said in-sync-with register for setting the flag bit in said in-sync-with register for each node whose time stamp differed from the time stamp stored for its own node by a time interval less than said hard error window to generate an in-sync-with vector.

7. The synchronizer of claim 6 wherein said message generator includes said in-sync-with vector in at least said sync time-dependent message.

8. The synchronizer of claim 7 wherein said synchronizer has at least three modes of operation, a cold start mode initiated when power to the multiple node processing system is first turned on, a warm start mode in which an operating set of nodes are in synchronization with each other but its own node is not in snychronization with said operating set, and an operating mode in which its own node is included in the operating set, said synchronizer has:
- an operating flag connected to said message generator, said operating flag when set to true signifying the synchronizer is in said operating mode of operation;
- a warm start flag connected to said message generator, said warm start flag when set to true signifying the synchronizer is in said warm start mode of operation;
- a scratch pad memory connected to said means for adding and said message generator, said scratch pad memory having an entry for each node in the processing system, each entry storing the in-sync-with vector received from the node associated with the entry in said sync time-dependent messages to form an in-sync-with matrix; and
- wherein said message generator will include said in-sync-with matrix in said pre-sync time-dependent messages in response to said operating flag and said warm start flag being set to false.

9. The snychronizer of claim 8 having:
- a Byzantine memory connected to said message checker interface for storing said in-sync-with matrix received from each node to generate a three-dimensional in-sync-with matrix cube in response to said operating flag and warm start flag being set to false;
- a Byzantine voter connected to said Byzantine memory for generating a Byzantine voted in-sync-with vector from said in-sync-with matrix cube; and
- operating condition detector means connected to said Byzantine voter, said operating flag and said warm start flag for detecting an existence of an operating set of nodes when said Byzantine voted in-sync-with vector signifies that more than a minimum number of nodes are in synchronization with each other, to set said operating flag to true when an operating set of nodes exists and its own node is included in said operating set, and to set said warm start flag to true when an operating set of nodes exists and its own node is not included in said operating set of nodes.

10. The synchronizer of claim 9 wherein the operations controller includes a fault tolerator subsystem, said operating condition detector means passes said Byzantine voted in-sync-with vector to said fault tolerator subsystem as an initial system state for its own node.

11. The synchronizer of claim 10 wherein said hard error window detector enables said time stamper to time stamp all pre-sync time-dependent messages received from the nodes for a predetermined listening period, larger than said hard error window, in response to said operating flag being set to false.

12. The synchronizer of claim 11 wherein said predetermined listening period is equal to the nominal timing interval said interval of time of said hard error window.

13. The synchronizer of claim 12 wherein said time stamp entry includes a sync flag bit signifying the stored time stamp is for a sync time-dependent message, a pre-sync flag bit signifying the stored time stamp is for a pre-sync time-dependent message and an updated flag when set to true signifying that a new time stamp was recorded for that node during a current time stamp interval, said synchronizer further has:
- a sync message counter connected to said message checker interface for counting a number of sync time-dependent messages received during the current time stamp interval to generate a sync message count;
- a pre-sync counter connected to said message checker interface for counting a number of pre-sync time-dependent messages received during the current time stamp interval to generate a pre-sync message count; and
- a comparator connected to said sync and pre-sync message counters for generating a first signal when said sync message count is greater than said pre-sync message count, a second signal when said pre-sync message count is greater than said sync message count, and a third signal when said sync and pre-sync message counts are equal;
- wherein said time stamp voter uses a time stamp having said updated flag and said sync flag set to true, to generate said voted time stamp value in response to said first signal and uses a time stamp having said updated flag and said pre-sync flag set to true to generate said voted value in response to said second signal; and
- wherein said sync correction generator sets said coarse delta and said fine delta equal to zero in response to said third signal generated by said comparator.

14. The synchronizer of claim 4 wherein said sync correction generator has means responsive to said coarse delta being greater than zero for generating a substitute coarse delta having a value equal to said coarse delta minus one, and a substitute fine delta having a value equal to a predetermined maximum fine delta value, and responsive to said coarse delta being less than zero for generating said substitute coarse delta having a value equal to said coarse delta plus one and a substitute fine delta having the 2's complement of said predetermined maximum fine delta value.

15. The synchronizer of claim 9 wherein the operations controller for each node has a scheduler for selecting the tasks to be executed by the applications processor, and each scheduler has a scheduling table from which the tasks are selected and wherein each node transmits a task interactive consistency message to every node in the processing system and wherein each task interactive consistency message includes a task completed vector identifying each node which reported to have completed a task and a branch condition bit which is used by said scheduler to identify a successor task to the completed task, said synchronizer has a message memory connected to said message checker interface and said Byzantine voter memory, said message memory having an entry for each node in which said task completed vector and said branch condition bit are stored and wherein said Byzantine voter generates a Byzantine voted task completed vector and Byzantine voted branch condition bits which are passed to said scheduler for updating its scheduling table.

16. The synchronizer of claim 5 wherein said operations controller includes a fault tolerator and said timing signal generator generates a soft error window defining an interval of time bracketing said first and second timing signals which has a duration less than said hard error window and wherein said synchronizer includes:
- a soft error window detector for generating a soft error for each node whose time-dependent message is received within said hard error window and outside of said soft error window; and an error reported for reporting said hard errors, soft errors, and said sequence errors to said fault tolerator.

17. The synchronizer of claim 15 wherein said message generator means generates said task interactive consistency messages when said synchronizer is in said operating mode and passes them to the transmitter at a predetermined time prior to their transmission, said transmitter including means to start the transmission of each task interactive consistency message such that an end of its transmission is coincident with said second timing signal generated by said timing signal generator.

18. The synchronizer of claim 17 wherein said timing signal generator generates a last sub-interval signal identifying a beginning of a last sub-interval in each nominal timing interval, and wherein each second timing signal is also bracketed by said hard error window signal, said actual and nominal transmission timing intervals used by said message generator to pass said sync and pre-sync messages to said transmitter, when said synchronizer is in said operating mode, is measured from an end of said hard error window bracketing the second timing signal coincident with a last sub-interval signal and wherein said task interactive consistency message is passed to said transmitter at the end of said nominal transmission timing interval measured from said end of the hard error window bracketing a preceding second timing signal.

19. The synchronizer of claim 15 wherein said Byzantine voter comprises:

a data register having a plurality of bit positions, one bit position for each node in said processing system;

an address generator connected to said Byzantine memory for generating addresses enabling said Byzantine memory to unload its contents into said data register in a selectable sequence;

a plurality of AND gates, each having a first input connected to a respective one of said plurality of bit positions in said data register, each of said AND gates further having a second input and an output;

decoder means responsive to said addresses generated by said address generator for generating individual signals applied to said second input of said plurality of AND gates, said decoder means generating an inhibit signal which deactivates one of said plurality of AND gates in a sequential manner each time new data ia loaded into said data register;

a plurality of multiplexers, one associated with each AND gate, each of said plurality of multiplexers having a first input connected to said output of its associated AND gate, a second input, and an output;

a message counter for generating a 2's complement reference number which is applied to said second input of each of said plurality of multiplexers, said 2's complement reference number corresponding to the 2's complement of one half of a number of messages whose contents are stored in said Byzantine memory;

a plurality of adders for generating sum data and voted data, each adder having a first input connected to said output of a respective one of said multiplexers, a second input, a sum output outputting said sum data and an overflow output outputting said voted data;

a plurality of accumulators for storing said sum data, each accumulator having an input connected to said sum output of a respective one of said plurality of adders, each of said plurality of accumulators having an output connected to said second input of said adder whose sum output is connected to its input to return said sum data to said adder;

a voted data register having a bit position associated with a respective one of said plurality of adders, each bit position connected to and storing said voted data generated by its associated adder;

a 3:1 output multiplexer having a first state passing said voted data stored in said voted data register to the Byzantine memory where it is temporarily stored, a second state passing said voted data to said operating condition detector and a third state passing said voted data to the scheduler; and control logic means responsive to a message type code of the data being processed for generating sequence signals identifying the sequence in which said Byzantine memory is to be addressed to load said data register, for generating a load accumulator signal enabling said plurality of multiplexers to load said 2's complement reference number into said accumulators through said plurality of adders, for generating an add data signal enabling said AND gates each time said data register is loaded with new data, for generating a first multiplexer signal placing said output multiplexer in said first state, a second multiplexer signal placing said output multiplexer in said second state and a third multiplexer signal placing said output mulitplexer in said third state.

20. The synchronizer of claim 19 wherein said control logic means is responsive to a message type code for said pre-sync time-dependent message to generate a first sequence signal causing said address generator to generate addresses loading said data register with in-sync-data bytes from said cube matrix row by row from a front row of the cube to a back row of the cube, and to generate said first multiplexer signal to store said voted data stored in said voted data register in said Byzantine memory to form a two-dimensional in-sync-with matrix, said control logic means further being responsive to a loading of a last voted in-sync-with vectors into said Byzantine memory to generate a second sequence signal causing said address generator to load each column of said two-dimensional in-sync-with matrix, column by column into said data register and to generate said second multiplexer signal enabling said output multiplexer to pass a final content of said voted data register to said operating condition detector.

21. The synchronizer of claim 20 wherein said control logic means is responsive to a message type code of said task interactive message indicating the data stored in the Byzantine memory is a two-dimensional task completed vector matrix and a two-dimensional branch condition bit matrix to generate said second sequence signal causing said address generator to generate addresses loading said data register with the data from each column of said task completed vector matrix, column by column, and to generate said third multiplexer signal to pass voted data stored in said voted register to said scheduler after each column of task completed vectors has been processed and wherein said second sequence signal further causes said address generator to generate addresses loading said data register with the data from each column of said branch condition bit matrix, column by column, and to generate, a second time, said third multiplexer signal to pass said voted data to said scheduler after each column of said branch condition bit matrix has been processed.

22. A Byzantine voter comprising:
a voter memory having transverse and lateral rows and columns for storing a three-dimensional cube of data, said transverse and lateral rows and columns each having an equal number of bit positions;
a data register connected to said vector memory having a plurality of bit positions, said plurality of bit positions at least equal to said number of bit positions in said transverse and lateral rows and columns of said voter memory;
an address generator connected to said voter memory for generating addresses enabling said voter memory to unload said data stored in said rows and columns into said data register, one row or one column at a time in a selected sequence;
a plurality of AND gates each having one input connected to a respective one of said bit positions in said data register, said AND gates each having a second input and an output;
decoder means connected to said address generator and said AND gates responsive to said addresses generated by said address generator for generating individual signals applied to said second input of each of said plurality of AND gates, said decoder means generating an inhibit signal which deactivates one of said plurality of AND gates in a sequential manner each time new data is loaded into said data register;
a plurality of multiplexers, one associated with each AND gate, each of said plurality of multiplexers having a first input connected to said output of its associated AND gate, each multiplexer further having a second input and an output;
a message counter connected to said plurality of multiplexers for generating a reference number which is applied to said second input of each of said plurality of multiplexers, said reference number corresponding to a 2's complement of one half of the number of data values to be processed;
a plurality of adders for generating sum data and voted data, each having a first input connected to said output of a respective one of said multiplexers, each of said adders having a second input, a sum output outputting said sum data and an overflow output outputting said voted data;
a plurality of accumulators for storing said sum data, each accumulator having an input connected to said sum output of a respective one of said plurality of adders, each of said plurality of accumulators having an output connected back to said second input of the adder to add said sum data back into said adder;
a voted data register having a plurality of bit positions, each bit position associated with a respective one of said plurality of adders, each of said bit positions connected to the overflow output of its associated adder and storing said voted data;
an output gate connected to said voted data register for passing said voted data stored in said voted data register back to said voter memory in response to a recycle signal; and
control logic means responsive to an input signal signifying a particular type of data stored in said voter memory for generating sequence signals identifying the sequence that data from said voter memory is to be loaded into said data register, for generating a load reference number signal enabling said plurality of multiplexers to load said reference number into said plurality of accumulators through said adders, for generating an add signal enabling said multiplexers to pass said data stored in said data registers to said adders to be added to said sum data stored in said accumulators, and for generating said recycle signal when necessary enabling said voted data to be stored in said voter memory.

23. The Byzantine voter of claim 22 wherein said control logic means is responsive to an input signal identifying the data being stored in said voter memory is a plurality of data matrices forming a cube matrix having three axes, said control logic means having means for generating a first sequence signal causing said address generator to generate addresses along one of said three axes of said cube to sequentially load said data register, one byte at a time, until all of the data in the cube is processed a first time and for generating said recycle signal storing said voted data back in said voter memory to form a two-dimensional matrix of voted data, said control logic means further being responsive to loading of said voted data from said voted data register into said voter memory for generating a second sequence signal causing said address generator to generate addresses along a different axis of the cube to sequentially load said data register, one byte at a time, until all the data in said two-dimensional data matrix of voted data is processed and a final Byzantine voted data value is stored in said voted data memory.

24. The Byzantine voter of claim 23 wherein said control logic means is responsive to an input signal identifying the voted data stored in said data memory is a two-dimensional data matrix, said control logic means generates said second sequence signal causing said address generator to generate addresses along said different axis to generate said Byzantine voted data value.

* * * * *